US010558769B2

(12) United States Patent
Dembo et al.

(10) Patent No.: US 10,558,769 B2
(45) Date of Patent: Feb. 11, 2020

(54) SYSTEMS AND METHODS FOR SCENARIO SIMULATION

(71) Applicant: Goldman Sachs & Co. LLC, New York, NY (US)

(72) Inventors: Ron Dembo, Toronto (CA); Atul Pawar, New York, NY (US); Ezra Nahum, New York, NY (US); Andrew Phillips, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 16/240,446

(22) Filed: Jan. 4, 2019

(65) Prior Publication Data

US 2019/0197206 A1 Jun. 27, 2019

Related U.S. Application Data

(63) Continuation of application No. PCT/IB2018/052999, filed on Apr. 30, 2018, which is a continuation of application No. 15/897,010, filed on Feb. 14, 2018.

(60) Provisional application No. 62/492,668, filed on May 1, 2017.

(51) Int. Cl.

*G06F 17/50* (2006.01)
*G06N 5/02* (2006.01)
*G06Q 40/04* (2012.01)

(52) U.S. Cl.

CPC ......... *G06F 17/5009* (2013.01); *G06N 5/025* (2013.01); *G06Q 40/04* (2013.01)

(58) Field of Classification Search

None

See application file for complete search history.

(56) References Cited

U.S. PATENT DOCUMENTS 7,761,287 B2 * 7/2010 Li ...................... G06F 17/2715 704/1
8,180,693 B2 5/2012 Lakshminarayan et al.
8,694,455 B2 4/2014 Eder
9,852,232 B2 * 12/2017 Anderson ......... G06F 16/24578
2004/0230468 A1 11/2004 King et al.
2005/0197988 A1 * 9/2005 Bublitz ................ G06Q 10/105 706/46
2009/0138307 A1 5/2009 Belcsak et al.
2014/0257931 A1 * 9/2014 Rinzler ............. G06Q 30/0203 705/7.32
2014/0279800 A1 9/2014 Anastasopoulos

OTHER PUBLICATIONS

Vazsonyi, Miklos. "Overview of scenario tree generation methods, applied in financial and economic decision making", Periodica Polytechnica 14(1) Jan. 2006, 9 pages. (Year: 2006).*

(Continued)

*Primary Examiner* — Suzanne Lo

(74) *Attorney, Agent, or Firm* — Fenwick & West LLP

(57) ABSTRACT

Systems and methods for automatically generating scenarios and user interface elements representing valuations of instruments under the scenarios are described. The systems and methods use expert polling systems and machine learning rules to generate tree data storage structures representing different scenarios of macro factors for outcomes of events. Machine implemented interfaces for expert polling, presentment of scenarios, and interaction with scenarios are also provided.

20 Claims, 99 Drawing Sheets

(56) References Cited

OTHER PUBLICATIONS

Dillion-Merrill et al. "Logic Trees: Fault, Success, Attack, Event, Probability, and Decision Trees", Wiley Handbook of Science and Technology for Homeland Security, Mar. 2009, 13 pages. (Year: 2009).*
Pedersen et al. "Economic Scenario Generators a Practical Guide", Society of Actuaries, Jul. 2016, 200 pages. (Year: 2016).*
PCT International Search Report and Written Opinion, PCT Application No. PCT/IB2018/052999, dated Dec. 27, 2018, 11 pages.

* cited by examiner

500A

| Second Party Wins | | | | | | |
|---|---|---|---|---|---|---|
| | EUR | US10y | FRGE | SPX | SX5E | iTraxx |
| Probability Up | 12% | 20% | 88% | 20% | 13% | 79% |
| Probability Dn | 88% | 80% | 12% | 80% | 87% | 21% |
| Shock Up | 7.38 | 64.8 | 47.39 | 15.68 | 18.29 | 28 |
| Shock Dn | (7.06) | (37.00) | (47.50) | (10.56) | (16.27) | (34.00) |

| First Party Wins | | | | | | |
|---|---|---|---|---|---|---|
| | EUR | US10y | FRGE | SPX | SX5E | iTraxx |
| Probability Up | 77% | 46% | 13% | 47% | 75% | 18% |
| Probability Dn | 23% | 54% | 87% | 53% | 25% | 82% |
| Shock Up | 4.79 | 47.3 | 46.15 | 7.44 | 10.36 | 29.94 |
| Shock Dn | (3.98) | (29.33) | (26.09) | (7.22) | (8.00) | (21.00) |

| Third Party Wins | | | | | | |
|---|---|---|---|---|---|---|
| | EUR | US10y | FRGE | SPX | SX5E | iTraxx |
| Probability Up | 13% | 25% | 71% | 21% | 17% | 70% |
| Probability Dn | 87% | 75% | 29% | 79% | 83% | 30% |
| Shock Up | 7.27 | 54.4 | 25.92 | 11.94 | 13.65 | 24.6 |
| Shock Dn | (4.78) | (33.92) | (22.76) | (7.89) | (10.94) | (10.50) |

Second Party

| | EUR (%) | US10y(bps | FRGE (bp | SPX % | SXSE % | iTraxx bps |
|---|---|---|---|---|---|---|
| Probability Up | 13% | 26% | 93% | 31% | 17% | 26% |
| Probability Dn | 87% | 74% | 7% | 69% | 83% | 74% |
| Shock_up | 10.65 | 60.00 | 102.00 | 7.10 | 10.59 | 61.10 |
| Shock_Dn | (12.69) | (56.40) | (34.30) | (10.00) | (16.70) | (27.65) |

500D

| Third Party | | | | | | |
|---|---|---|---|---|---|---|
| | EUR | US10y | FRGE | SPX | SXSE | iTraxx |
| Probability | 28% | 57% | 58% | 52% | 40% | 60% |
| Probability | 72% | 43% | 42% | 48% | 60% | 40% |
| Up | 6.50 | 36.00 | 72.00 | 8.96 | 10.20 | 41.60 |
| Dn | (10.00) | (36.00) | (23.38) | (8.80) | (15.30) | (20.48) |

6 Macro Factors
$2^6$ paths in the tree = 64 paths = 64 scenarios 192 distinct Macro scenarios
Corresponding to 3 x 64 = 192
unique paths through the tree
(partially shown)

FIG. 31B
3100B
Client Portfolio #1
140,300,321
Distribution of Portfolio Shocks Relative to Peers
-5
0
5
10
You
worst loss (000)
$123,000
best gain (000)
$450,989
Peers
worst loss (000)
$123,000
best gain (000)
$450,989

FIG. 31D
3100D
Client Portfolio #1
worst loss scenario
Second Party Wins
First Party Wins
Third Party Wins
Second Party Wins
First Party Wins
Third Party Wins
User
Peers

| Date | Filter: EUR | GBP | HKD | JPY | CHF |
|---|---|---|---|---|---|
| 12-Dec-08 | 5.49% | 1.83% | 0.02% | 1.01% | 3.76% |
| 15-Dec-08 | 5.56% | 3.02% | 0.01% | 2.29% | 3.85% |
| 16-Dec-08 | 6.73% | 3.65% | -0.01% | 2.72% | 5.75% |
| 17-Dec-08 | 10.26% | 4.25% | 0.00% | 5.79% | 10.15% |
| 18-Dec-08 | 7.54% | 0.96% | 0.00% | 2.38% | 10.19% |
| 19-Mar-09 | 6.96% | 5.38% | 0.03% | 4.45% | 6.12% |
| 20-Mar-09 | 5.37% | 3.81% | 0.03% | 2.44% | 5.62% |

FIG. 41

Macro Scenarios

| CATEGORY ▾ | MACRO SCENARIO ▾ | PROBABILITY ▾ | SCENARIO DRILLDOWN |
|---|---|---|---|
| Center-Left Wins | EUR -1.8% \| US10y 1.3% \| FR/GE 1.2% \| S&P -0.8% \| STOXX -0.6% \| iTraxx -0.3% | 2.5% | › |
| Center-Right Wins | EUR -1.7% \| US10y 1.4% \| FR/GE 1.2% \| S&P -0.9% \| STOXX -0.5% \| iTraxx -0.4% | 2.5% | › |
| Le Pen Wins | EUR -1.6% \| US10y 1.0% \| FR/GE 1.4% \| S&P -1.1% \| STOXX -0.8% \| iTraxx -0.2% | 2.5% | › |
| Center-Right Wins | EUR -1.7% \| US10y 1.4% \| FR/GE 1.2% \| S&P -0.9% \| STOXX -0.5% \| iTraxx -0.4% | 2.5% | › |
| Le Pen Wins | EUR -1.8% \| US10y 1.3% \| FR/GE 1.2% \| S&P -0.8% \| STOXX -0.6% \| iTraxx -0.3% | 2.5% | › |
| Center-Left Wins | EUR -1.6% \| US10y 1.0% \| FR/GE 1.4% \| S&P -1.1% \| STOXX -0.8% \| iTraxx -0.2% | 2.5% | › |
| Le Pen Wins | EUR -1.7% \| US10y 1.4% \| FR/GE 1.2% \| S&P -0.9% \| STOXX -0.5% \| iTraxx -0.4% | 2.5% | › |
| Le Pen Wins | EUR -1.6% \| US10y 1.0% \| FR/GE 1.4% \| S&P -1.1% \| STOXX -0.8% \| iTraxx -0.2% | 2.5% | › |
| Center-Right Wins | EUR -1.8% \| US10y 1.3% \| FR/GE 1.2% \| S&P -0.8% \| STOXX -0.6% \| iTraxx -0.3% | 2.5% | › |
| Center-Left Wins | EUR -1.7% \| US10y 1.4% \| FR/GE 1.2% \| S&P -0.9% \| STOXX -0.5% \| iTraxx -0.4% | 2.5% | › |
| Center-Right Wins | EUR -1.6% \| US10y 1.0% \| FR/GE 1.4% \| S&P -1.1% \| STOXX -0.8% \| iTraxx -0.2% | 2.5% | › |
| Le Pen Wins | EUR -1.8% \| US10y 1.3% \| FR/GE 1.2% \| S&P -0.8% \| STOXX -0.6% \| iTraxx -0.3% | 2.5% | › |
| Center-Right Wins | EUR -1.6% \| US10y 1.0% \| FR/GE 1.4% \| S&P -1.1% \| STOXX -0.8% \| iTraxx -0.2% | 2.5% | › |
| Le Pen Wins | EUR -1.8% \| US10y 1.3% \| FR/GE 1.2% \| S&P -0.8% \| STOXX -0.6% \| iTraxx -0.3% | 2.5% | › |
| Center-Left Wins | EUR -1.7% \| US10y 1.4% \| FR/GE 1.2% \| S&P -0.9% \| STOXX -0.5% \| iTraxx -0.4% | 2.5% | › |

FIG. 62

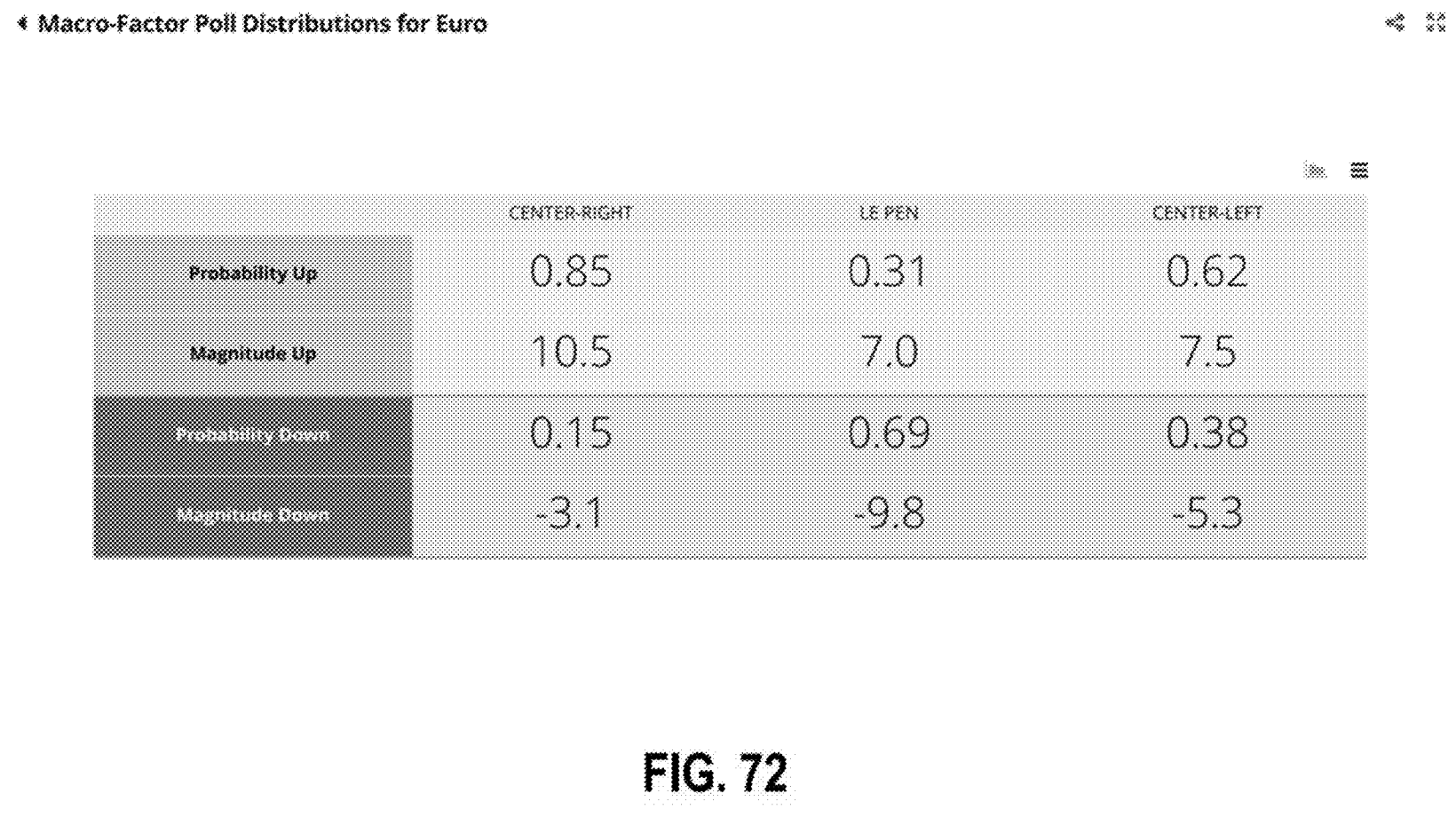

Macro-Factor Poll Distributions for Euro

| | CENTER-RIGHT | LE PEN | CENTER-LEFT |
|---|---|---|---|
| Probability Up | 0.85 | 0.31 | 0.62 |
| Magnitude Up | 10.5 | 7.0 | 7.5 |
| Probability Down | 0.15 | 0.69 | 0.38 |
| Magnitude Down | -3.1 | -9.8 | -5.3 |

FIG. 72

SYSTEMS AND METHODS FOR SCENARIO SIMULATION

CROSS-REFERENCE TO RELATED APPLICATION AND CLAIM OF PRIORITY

This application is a continuation of International Patent Application No. PCT/IB2018/052999 filed on Apr. 30, 2018, which in turn claims the benefit of U.S. Provisional Patent Application No. 62/492,668 filed on May 1, 2017, and U.S. patent application Ser. No. 15/897,010 filed on Feb. 14, 2018, all of which are incorporated by reference.

TECHNICAL FIELD

The present disclosure generally relates to the field of graphical user interfaces, computer tools, and artificial intelligence applied to decision making under uncertainty.

BACKGROUND

Real-world scenario analysis is challenging given the large number of decision points and probabilistic events that have myriad interdependencies and effects on one another. Macro-factors and micro-factors in an increasingly globalized world are impacted as events occur, and understanding the effects of these impacts and possible outcomes may aid in decision making.

SUMMARY

In various further aspects, the disclosure provides corresponding systems and devices, and logic structures such as machine-executable coded instruction sets for implementing such systems, devices, and methods.

Embodiments described herein relate to systems, methods and devices for automatically generating scenarios and user interface elements representing valuations of instruments under the scenarios.

Embodiments described herein relate to systems, methods and devices for automatically generating scenarios and user interface elements using artificial intelligence, polling and network theory. For example, embodiments described herein can use sentiment analysis to process polling results for scenario generation. For example, artificial intelligence can be used to identify trends and insights in large datasets from polling. As another example, sentiment analysis can be used to understand distribution of opinions by experts polled by various embodiments. Further details are provided herein.

Embodiments described herein relate to methods for automatically generating data structures representing scenarios and user interface elements. The method can involve processing a plurality of data feeds by applying a first set of rules to generate an event from a plurality of events defined by the first set of rules, the event linked to a set of outcomes. The method can involve generating a set of macro factors by applying a second set of rules to the event. Example macro-factors can include balance sheet items for an organization so that the organization can understand the risks associated with those items. For example, factors in a supply chain have associated risks that can be evaluated by embodiments described herein. The method can involve obtaining a third set of rules that define a plurality of poll questions. The method can involve processing the subset of macro factors by applying the third set of rules to generate a subset of poll questions, each poll question linked to a macro factor of the subset of macro factors and a range of input responses acceptable as data values for the macro factor. The method can involve generating and displaying a user interface with visual elements for the poll questions linked to macro factors and the ranges of input responses acceptable as the data values for the macro factors. The method can involve generating a graph data storage structure representing scenarios for the macro factors and the outcomes, each node in the graph structure defining a descriptor and a data value, the graph structure having an event node corresponding to a root node, outcome nodes connected to the root nodes, and macro factor nodes connected to the outcome nodes, each macro factor node having a data value. The method can involve receiving, at the user interface, selected input responses to the poll questions. The method can involve obtaining a fourth set of rules that compute the data values for the macro factor nodes. The method can involve processing the selected input responses by applying the fourth set of rules to generate the data values for the macro factor nodes. The method can involve populating the graph data storage structure with the data values for the macro factor nodes to generate scenarios for the outcome nodes. The method can involve updating the interface to produce further visual elements indicating a distribution of responses.

The method can involve generating the set of macro factors by applying the second set of rules to the event involves deep learning on historical data.

The method can involve generating the set of macro factors by applying the second set of rules to the event involves regression on historical data.

In some embodiments, the data values for the macro factor are computed based on the distribution of responses.

In some embodiments, the data values for the macro factor nodes include a range to an extreme.

In some embodiments, the data values for the macro factor nodes include a probability for increasing or decreasing in value.

In another aspect, embodiments described herein provide a device for automatically generating scenarios and user interface elements representing valuations of instruments under the scenarios comprising a data storage device and a processor to: receive a plurality of data feeds and applying a first set of rules to generate an event, the event linked to a set of outcomes; generate a set of macro factors for the event; generate a subset of poll questions for the subset of macro factors, each poll question linked to a macro factor of the subset of macro factors and a range of input responses acceptable as data values for the macro factor; generate a user interface with visual elements for the poll questions linked to macro factors and the ranges of input responses acceptable as the data values for the macro factors; generate a graph data storage structure representing scenarios for the macro factors and the outcomes, each node in the graph structure defining a descriptor and a data value, the graph structure having an event node corresponding to a root node, outcome nodes connected to the root nodes, and macro factor nodes connected to the outcome nodes, each macro factor node having a data value; receive, at the user interface, selected input responses to the poll questions; compute the data values for the macro factor nodes using the selected input responses; populate the graph data storage structure with the data values for the macro factor nodes to generate scenarios for the outcome nodes; and update the interface to produce further visual elements indicating a distribution of responses or valuation of portfolio.

In some embodiments, the processor generates the set of macro factors using deep learning on historical data.

In some embodiments, the processor generates the set of macro factors using regression on historical data.

In some embodiments, the data values for the macro factor are computed based on the distribution of responses.

In some embodiments, the data values for the macro factor nodes include a range to an extreme.

In some embodiments, the data values for the macro factor nodes include a probability for increasing or decreasing in value.

In another aspect, embodiments described herein provide a method for automatically generating scenarios and user interface elements representing valuations of instruments under the scenarios. The method involves obtaining a first set of rules that define a plurality of events. The method involves processing a plurality of data feeds by applying the first set of rules to generate an event from the plurality of events, the event linked to a set of outcomes. The method involves obtaining a second set of rules that define a plurality of macro factors. The method involves processing the event by applying the second set of rules to generate a subset of macro factors. The method involves obtaining a third set of rules that define a plurality of poll questions. The method involves processing the subset of macro factors by applying the third set of rules to generate a subset of poll questions, each poll question linked to a macro factor of the subset of macro factors and a range of input responses acceptable as data values for the macro factor. The method involves generating and displaying a user interface with visual elements for the poll questions linked to macro factors and the ranges of input responses acceptable as the data values for the macro factors. The method involves generating a graph data storage structure representing scenarios for the macro factors and the outcomes, each node in the graph structure defining a descriptor and a data value, the graph structure having an event node corresponding to a root node, outcome nodes corresponding to children of the root nodes, and macro factor nodes corresponding to further children of the outcome nodes, each macro factor node having a data value. The method involves receiving, at the user interface, selected input responses to the poll questions. The method involves obtaining a fourth set of rules that compute the data values for the macro factors nodes. The method involves processing the selected input responses by applying the fourth set of rules to generate the data values for the macro factors nodes. The method involves populating the graph data storage structure with the data values for the macro factor nodes to generate scenarios for the outcome nodes. The method involves updating the interface to produce further visual elements indicating a distribution of the selected input responses and the scenarios of the graph data storage structure.

In some embodiments, each outcome node of the graph defines a subtree of $2^n$ paths of macro factor nodes, each path corresponding to a scenario, n being the number of macro factors in the subset of macro factors.

In some embodiments, the method involves generating the ranges of input wherein a parent node and a child node in the graph data storage structure are connected by an edge, the edge being associated with a probability of traversing from the parent node to the child node, each scenario associated with a scenario probability derived using the probability associated with the edge.

In some embodiments, the fourth set of rules that compute the data values for the macro factors nodes generate one or more distributions for the responses.

In some embodiments, the method involves generating the ranges of input responses acceptable as the data values for the macro factors using a scale with a middle point representing no change, a portion representing upward change to an extreme, and another portion representing downward change to another extreme.

In some embodiments, the scenarios are defined by a path from the root node to a leaf node of the tree data storage structure.

In some embodiments, the method involves processing the input responses to generate a probability distribution for each macro factor.

In some embodiments, each probability distribution includes $p^u(F_i)$, a probability of an upward movement in factor i over a time horizon.

In some embodiments, each probability distribution includes $p^d(F_i)$, the probability of a downward movement in an ith factor over a time horizon.

In some embodiments, the input responses are processed to obtain, for each macro factor, at least one: a range of possible upside, $r^u(F_i)$, and downside, $r^d(F_i)$, moves for an ith factor.

In another aspect, embodiments described herein provide a system for automatically generating scenarios and user interface elements representing valuations of instruments under the scenarios. The system comprises a memory and at least one processor coupled to the memory. The at least one processor is configured to provide a first set of rules that define a plurality of events, a second set of rules that define a plurality of macro factors, a third set of rules that define a plurality of poll questions, and a fourth set of rules that compute the data values for the macro factors' nodes. The at least one processor is also configured to process a plurality of data feeds by applying the first set of rules to generate an event from the plurality of events, the event linked to a set of outcomes. The at least one processor is also configured to process the events by applying the second set of rules to generate a subset of macro factors. The at least one processor is also configured to process the subset of macro factors by applying the third set of rules to generate a subset of poll questions, each poll question linked to a macro factor of the subset of macro factors and a range of input responses acceptable as data values for the macro factor. The at least one processor is also configured to control a display to display a user interface with visual elements for the poll questions linked to macro factors and the ranges of input responses acceptable as the data values for the macro factors. The at least one processor is also configured to generate a tree data storage structure representing scenarios for the macro factors and the outcomes, each node in the tree structure defining a descriptor and a data value, the tree structure including an event node corresponding to a root node, outcome nodes corresponding to children of the root nodes, and macro factor nodes corresponding to further children of the outcome nodes, each macro factor node having a data value, wherein each outcome node of the tree defines a subtree of 2n paths of macro factor nodes, each path corresponding to a scenario. Then at least one processor is also configured to receive selected input responses to the poll questions. The at least one processor is also configured to process the selected input responses by applying the fourth set of rules to generate the data values for the macro factors nodes, and populating the tree data storage structure with the data values for the macro factors nodes to generate scenarios for the outcome nodes. Then at least one processor is also configured to update the interface to produce further visual elements indicating a distribution of poll questions and the selected input responses and valuations of instruments under the scenarios of the tree data storage structure.

In another aspect, embodiments described herein provide a method of automatically generating scenarios and user interface elements representing valuations of instruments under the scenarios using a graphical user interface and a user input device. The method involves maintaining a tree data storage structure representing the scenarios, the tree data storage structure including a plurality of nodes defining a descriptor, a probability value, and a data value, the tree structure having an event node corresponding to a root node, outcome nodes corresponding to children of the root nodes, and macro factors nodes corresponding to further children of the outcome nodes, each macro factors node having a data value. The method involves periodically or continuously updating the tree data storage structure based on received input data sets including at least machine-readable answers to poll questions, the periodically or continuous updating including processing each machine-readable answer to determine and apply one or more morph factors to at least one node of the plurality of nodes, the one or more morph factors modifying at least one of the probability value and the data value. The method involves using the tree data storage structure, determining a set of one or more paths that, in combination, span all possible combinations of nodes, and for each path, traversing the tree data storage to determine a corresponding contribution to a particular portfolio under analysis. The method involves instantiating a graphical scenario tree based on the tree data storage structure and the plurality of nodes, the graphical scenario tree rendering a visual representation of the tree data storage structure and the plurality of nodes, the graphical scenario tree having user interface elements associated with each node of the plurality of nodes. The method involves dynamically rendering the instantiated graphical scenario tree on the graphical user interface. The method involves receiving one or more user inputs from the user input device corresponding to a selected set of the one or more user interface elements. The method involves determining a path or a partial path spanning the selected set of the one or more user interface elements and selecting a region of the instantiated graphical scenario tree, the region selected such that all nodes spanning the path or partial path are visible on the graphical user interface. The method involves controlling the graphical user interface to adapt a view displayed on the graphical user interface to be bounded such that the selected region is graphically displayed as an expanded partial display of the graphical scenario tree. The method involves determining one or more estimated values of contributions to the particular portfolio under analysis, each of the one or more estimated values of contributions corresponding to a corresponding node of the path or partial path. The method involves dynamically appending one or more graphical elements representing the one or more estimated values of contributions to the corresponding node of the path or partial path, the one or more graphical elements aligned with the nodes of the path or partial path.

The method involves dynamically rendering an expert interface for receiving the input data sets representing inputs from one or more experts, the expert interface including one or more expert interface visual interface elements, which when interacted with by the one or more experts, indicate the inputs from the one or more experts.

In some embodiments, the one or more expert interface visual interface elements include one or more scales having selectable icons that are configured for placement along the one or more scales.

In some embodiments, each scale of the one or more scales has a dynamically set range, each dynamically set range determined to constrain a set of possible values available for an expert to select. In some embodiments, the dynamically set range is set based in accordance with a set of rules that constrain the set of possible values and a distribution of values along the corresponding scale based at least on identified patterns of bias identified for the corresponding expert.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

BRIEF DESCRIPTION OF THE DRAWINGS

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 5A illustrates a table of effects on macro factors according to some embodiments;

FIG. 41 illustrates a graph of percentage values according to some embodiments.

FIG. 62 illustrates an interface with a listing of macro scenarios according to some embodiments;

FIG. 72 illustrates an interface with a table of poll distributions according to some embodiments;

DETAILED DESCRIPTION

Figure 1:
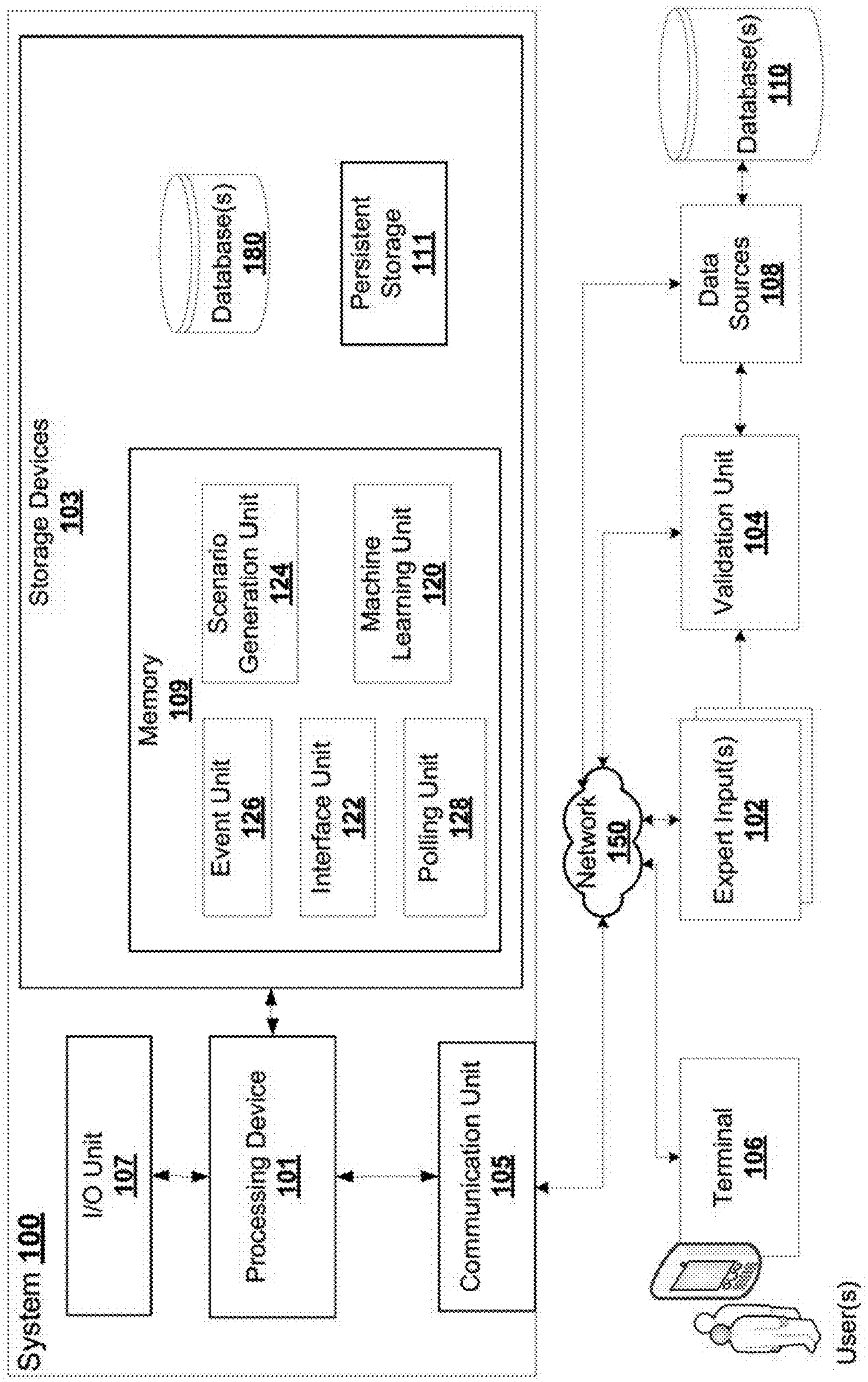
FIG. 1 illustrates a block schematic diagram of a scenario simulation/generation platform, according to some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Various embodiments described herein are directed to machine analytical tools related to the analysis of outcome scenarios (e.g., weather, world events, financial events) to determine potential impacts on financial securities. Presumably, these scenarios are used to guide decision making related to initiating in translations relating to financial securities. The tools may be adapted for various purposes, and in some embodiments, may be specifically configured to provide modified interfaces that are designed to aid humans in avoiding bias when interacting with the system.

Systems, methods, and computer-readable media are provided that are used to generate and process scenarios that may occur in view of one or more future events. Each of these events is associated with one or more probabilities of occurrence, and these probabilities may vary based on the outcome of other events. For example, probabilities may be provided in the form of conditional probabilities ((P(A|B), etc.). Inferential approaches may be utilized where, as evidence of event outcomes occurring in real-time may be used in taking a Bayesian approach in interpreting and/or re-evaluating downstream outcomes.

These probabilities also include corresponding impact scores, which, for example, may determine the magnitude of impact on a particular metric, asset value, or other factor for consideration, relative or absolute.

As interrelationships between the various underlying events and impacts on factors are highly complex and difficult to model, an approach is provided whereby an adaptive, machine learning method is utilized to generate models that take into account conditional probabilities, analyzed across a multitude of interconnected factors and indicators. Regression approaches may be utilized, for example, to determine relationships between different factors and variables using the models.

In a specific, non-limiting example, an election, such as the French primary election may be considered an "event" associated with different outcomes. Embodiments described herein can automatically detect events and outcomes by processing data feeds using rules. Embodiments described herein can automatically identify macro-factors relevant to the events and outcomes. Macro-factors (e.g. currencies, swaps, spreads, indices) may be provided in the form of a model. In the French primary election, depending on the outcome of the event (and potentially sub events and corresponding outcomes), there may be different paths for price movement.

There are different approaches for generating a model, and a proposed approach is the combined use of an expert system (e.g., an expert polling mechanism) alongside a machine learning engine that is configured to refine a process for automatically detecting macro-factors and corresponding data values across a period of time given a large enough corpus of data (e.g., obtained based on feedback on real-world analysis, or based on training data sets).

Various experts in a field are given a machine-generated set of questionnaires by way of an interface with a poll. The interface includes indicators to request that the experts provide their comments or selected data values in relation to specifically chosen questions relating to potential impacts on indicators (e.g., macro-factors), such as financial indicators, given the occurrence of various events.

The expert polling system is further configured to utilize a specially adapted interface that is also modified and refined over a period of time to update the interface with the poll to ask more relevant questions and constrain inputs from the experts such that the experts can only provide their input within a specific span of inputs. Accordingly, in some embodiments, the system is configured not only for automatically refining an approach taken to model generation, but also for automatically refining the approach taken to receive inputs from human experts.

The system may be configured to refine the approach responsive to accuracy determinations, machine determined expert biases, past performance, areas of expertise, etc. For example, a challenge with experts is that there may be cognitive biases that are evident over a corpus of data points. A particular expert or experts having particular profiles may be prone to confirmation biases, being overly conservative (e.g., sandbagging), being overly aggressive, etc. In some situations, experts may also be unevenly biased. For example, over time, an expert may be shown to consistently underestimate downside risk while overestimating upside potential. The system may be configured to automatically take a twofold approach to bias; the system may be configured to modify how the expert's inputs are weighed and their overall impact, and/or the system may be configured to modify the information and available interactions available when polling the expert via an input interface. The constrained set of ranges, the selected set of available factors for polling, among others, may be modified in an automated attempt to shift the behavior of the expert (e.g., to avoid biases).

A model generation platform is provided that generates or otherwise instantiates a model indicative of different scenarios for the events and outcomes. The model can indicate various upside and downside amplitudes associated with probabilistic determinations of impacts on various factors conditional on the occurrence of events and sub events, such as economic factors. The model may, for example, be in the form of a tree data structure, and this tree data structure may be traversed to perform various analyses or report generation.

In some embodiments, specific data structures are applied in the generation and refinement of the model such that improved efficiency and processing may be achieved. In some scenarios, the underlying model and data can be voluminous, requiring either significant resources to process or the application of simplifying approaches (e.g., heuristics) to generate and transform the voluminous data into a usable subset of data.

The system may be configured to generate and refine multiple interfaces to improve the effectiveness of its inputs and/or the effectiveness of delivery of information to end users of the system.

Software/Hardware Description

FIG. 1 illustrates a block schematic diagram of a scenario simulation and generation system 100 according to some embodiments. As shown in FIG. 1, the system 100 denotes a computing system that includes at least one processing device 101, at least one storage device 103, at least one communications unit 105, and at least one input/output (I/O) unit 107.

The processing device 101 executes instructions that may be loaded into a memory device 109. The processing device 101 includes any suitable number(s) and type(s) of processors or other devices in any suitable arrangement. Example types of processing devices 101 include microprocessors, microcontrollers, digital signal processors, field programmable gate arrays, application specific integrated circuits, and discrete circuitry.

The memory device 109 and a persistent storage 111 are examples of storage devices 103, which represent any structure(s) capable of storing and facilitating retrieval of information (such as data, program code, and/or other suitable information on a temporary or permanent basis). The memory device 109 may represent a random access memory or any other suitable volatile or non-volatile storage device(s). The persistent storage 111 may contain one or more components or devices supporting longer-term storage of data, such as a read only memory, hard drive, Flash memory, or optical disc.

The communications unit 105 supports communications with other systems or devices. For example, the communications unit 105 could include a network interface card or a wireless transceiver facilitating communications over a wired or wireless network. The communications unit 105 may support communications through any suitable physical or wireless communication link(s).

The I/O unit 107 allows for input and output of data. For example, the I/O unit 107 may provide a connection for user input through a keyboard, mouse, keypad, touchscreen, or other suitable input device. The I/O unit 107 may also send output to a display, printer, or other suitable output device.

In some embodiments, the instructions executed by the processing device 101 could include instructions that implement the system 100 of FIG. 1. System 100 includes a machine learning unit 120, interface unit 122, scenario generation unit 124, event unit 126, and polling unit 128. In one embodiment, the units 120-128 are sets of program code or instructions that are executable by processing device 101. These units 120-128 may be stored on memory device 109. In other embodiment, the units 120-128 may be specific hardware processing devices or implemented as firmware.

System 100 connects to data sources 108 to receive real time and historic data feeds for event detection. Data sources 108 can connect to one or more databases 110.

System 100 automatically generates scenarios and user interface elements representing valuations of instruments under the scenarios.

Machine learning unit 120 configures and updates a first set of rules that define a plurality of events. Event unit 126 interacts with machine learning unit 120 to process the data feeds by applying the first set of rules to generate or detect an event to generate scenarios for. The event is linked to a set of outcomes.

Machine learning unit 120 configures and updates a second set of rules that define a plurality of macro factors. Scenario generation unit 124 processes the event by applying the second set of rules to generate or detect a subset of macro factors. Scenario generation unit 124 generates a tree data storage structure representing scenarios for the macro factors and the outcomes. Each node in the tree structure defines a descriptor and a data value. The tree structure has an event node corresponding to a root node, outcome nodes corresponding to children of the root nodes, and macro factor nodes corresponding to further children of the outcome nodes. Each macro factor node has a data value. The edge between two nodes can correspond to a probability of traversing from the parent node to a given child node.

A scenario represents a path from a root node to a leaf node. This scenario can have a corresponding probability that can be generated or derived from the probabilities associated with the edges between all the nodes in the path of the tree that represents the particular scenario. Correlation or independence between the factors modelled by the tree can be used to derive the probability for the overall scenario or particular edge. Accordingly, scenario generation unit 124 models all possible scenarios for the event and outcomes along with probabilities for each of the scenarios to include not only the most likely scenarios but also outlier or rare scenarios that may still greatly impact the valuation of a portfolio.

A tree data storage structure is one example graph structure that can be used to model the set of scenarios. Other types of connected graph structures with nodes and edges can also be used in some embodiments.

The machine learning unit 120 automatically generates a set of macro factors from the event and outcomes. The machine learning unit 120 can also generate an ordered set of macro factors based on correlations and dependencies between the macro factors. The set of macro factors can be used by scenario generation unit 124 to generate a graph structure to represent scenarios. For example the graph structure can be a tree structure with different nodes corresponding to different macro factors. Machine learning unit 120 maintains a set of rules linking events and outcomes to macro factors. The machine learning unit 120 also maintains a set of rules to define dependencies and correlations between the macro factors to generate the ordered set of macro factors. For example an event can relate to a geographic area. The machine learning unit 120 can have a rule that maps the geographic area of an event to macro factors relevant to that geographic area, such as a currency for that geographic area or an index of that geographic area. As another example an event can be associated with an attribute such as an election. The attribute value, an election, can be linked to one or more macro factors relevant to the attribute value.

Machine learning unit 120 configures and updates a third set of rules that define a plurality of poll questions. Polling unit 128 interacts with machine learning unit 120 to process a subset of macro factors by applying the third set of rules to the set of macro factors to generate a subset of poll questions. Each poll question is linked to a macro factor of the subset of macro factors and a range of input responses acceptable as data values for the macro factor.

Interface unit 122 is configured to generate and display a user interface with visual elements for the poll questions linked to macro factors. Interface unit 122 also generates visual elements for the ranges of input responses acceptable as the data values for the macro factors. System 100 connects to terminal 106 or expert input(s) 102 to generate and display the user interface thereon. Terminal 106 or expert input(s) 102 receives, at the user interface, selected input responses to the poll questions. Terminal 106 or expert input(s) 102 transmits the response data to system 100 and in particular to interface unit 122 and polling unit 128.

The responses to the poll questions are processed by scenario generation unit 124 to define data values for the macro factor nodes. Machine learning unit 120 generates and updates a fourth set of rules that compute the data values for the macro factors nodes. Scenario generation unit 124 interacts with machine learning unit 122 to process the selected input responses by applying the fourth set of rules to generate the data values for the macro factors nodes. Scenario generation unit 124 populates the tree data storage structure with the data values for the macro factors nodes to generate scenarios for the outcome nodes. The tree data storage structure is maintained in database 180 for example.

Interface unit 122 updates the user interface to produce further visual elements indicating a distribution of poll questions and the selected input responses and valuations of instruments under the scenarios of the tree data storage structure. Interface unit 122 generates output data using the tree data storage structure for display as part of interface of terminal 106 or expert input(s) 102. The further visual elements may be generated dynamically based on rule sets maintained by the machine learning unit 120. As the machine learning unit 120 reviews and validates scenario outcomes over a period of time, the machine learning unit 120 may be configured to automatically modify how the further visual elements are generated and provided. For example, given a particular expert, the machine learning unit 120 may mine a sustained pattern of biases or inaccuracies from the expert's inputs. To account for these biases or inaccuracies, the machine learning unit 120 may modify how the visual elements are produced such that the expert's inputs are constrained to improve the potential accuracy of the expert. These modifications may be dynamic, and may include the modification of scale ranges, the modification of scale factors, the reordering of presentment of questions requiring inputs, etc.

Validation unit 104 can interact with machine learning unit 120 to provide feedback on the automatically detected events, outcomes, macro factors, and so on. The validation unit 104 can also transmit rules to machine learning unit 120 or other feedback to refine the rules. Validation unit 104 provides electronic information gathered from data sources 108 and databases 110 relating to the real-world outcomes, including impacts on macro-economic factors, micro-economic factors, and event occurrence, among others. In some embodiments, validation unit 104 may be configured to provide feedback in real or near real time relating to events and sub-events that are currently taking place, causing the dynamic modification of probabilities and associated outcomes associated with various nodes of the tree. In some embodiments, the probabilities associated with various nodes may actively shift as more information about an event is available. For example, for an election, as various regional voting offices submit their voting results, the final result of the election becomes increasingly certain. The validation unit 104 may be configured to mirror or otherwise monitor such event probabilities and cause dynamic modifications to information stored in the tree storage structure as outcomes shift.

In some embodiments, validation unit 104 is further configured to validate the estimations of experts as it relates to a corpus of real event data over a period of time. The validation unit 10 may be configured for interoperation with machine learning unit 120 to determine differences between actual event occurrences, and their impact on various economic factors. The validation unit 104 may be configured to detect sustained biases in expert estimations and in some embodiments, rules may be generated and stored in database 180 that either reduce the weight of the expert estimations in some scenarios, or modify how the particular expert is polled by polling unit 128 (e.g., interface unit 122 changes the available ranges of impact presented to the expert, questions are re-ordered, different types of scales are presented, different intervals of decimation marks are used).

Where an expert is particularly wrong or unhelpful for a particular metric or event type, the expert may simply not be chosen to opine on the metric or event type (e.g., the validation unit 104 determines that Expert A is worse than random over a statistically significant period of time in relation to EUR/USD rates, and Expert A is thus dropped from opining on EUR/USD rates).

System 100 enables the automated detection of an event that is about to occur (e.g., "Brexit", U.S. elections, French elections, Scottish referendum) and associated outcomes. System 100 automatically generates data indicating the risk to different portfolios using automated scenario generation.

In addition to tracking specific metrics, automated scenario generation may include an analysis of the downstream impact on a particular portfolio. For example, a portfolio having a basket of different equities, fixed income products, and derivatives products. Each of these different assets or types of assets could be impacted differently by changes in macro/micro-economic factors that may occur as a result of an event occurrence. An interest rate change, for example, would have different effects on fixed income products than equity products. Similarly, an increase in overall volatility may push certain derivatives products in the money, out of the money, etc. Automated scenario generation in these situations may be used to trigger notifications indicative of attention required in relation to a particular portfolio/asset, or trigger workflows configured to generate and transmit instruction sets that cause automatic electronic transactions to occur (e.g., buy/sell, hedge, un-hedge, cancel, modify).

The macro factors can be derived from events using machine learning and probability distributions. The data graph or tree structure models the macro factors as scenario sets. The tree is automatically generated by system 100 to derive scenarios from macro factors. The tree can indicate an order for the macro factors to indicate correlations, in some embodiments. The macro factors can be derived by machine learning ability distributions. If the macro factors are correlated they may be structured in the tree based on the correlation. Machine learning rules can define the macro factors.

System 100 determines events with nonfinancial outcomes. System 100 links the outcomes to macro factors. System 100 identifies a set of macro factors based on the outcome. System 100 automatically generates a tree for a specified time period to model scenarios for the macro factors. System 100 links the set of macro factors and the scenario sets to micro factors to evaluate portfolios.

System 100 is operable to generate the set of macro factors in different ways. For example, expert systems can provide input to link macro factors to outcomes and events. As another example, system 100 implements a regression process to look at historical outcomes and identify macro factors that are most greatly impacted. System 100 is operable to implement deep learning to generate a network of nodes and edges to represent the macro factors and the scenario sets. System 100 is operable to implement deep learning to generate inference data from the outcome and events based on historical data for macro factors. The inference data can be processed to identify sentiment and macro factors.

System 100 is operable to generate different visual representations of value ranges for the set of macro factors. For example, system 100 is operable to generate polls using polling unit 128 and process the data to generate a histogram representation. System 100 is operable to process the data to generate a smooth distribution for the response data from the polls. For example, system 100 can smooth the histogram using polynomial smoothing to generate distribution curves. The distribution curve has a middle section corresponding to the zero range and to the left and right corresponding to extreme value ranges for the macro factors. System 100 is operable to filter the data to remove extreme responses. For example, system 100 may select a range such as the 95th percentile to generate the distribution curve. System 100 implements a cleaning and filtering phase to remove obviously incorrect data to avoid spurious numbers. For example, system 100 is operable to detect suspicious activity such as all responses to polls being in the most extreme value for a particular expert system. Filtering the data enables system 100 to remove those extreme values that may be wrong or incorrect.

System 100 uses response data to generate value ranges and probabilities for the macro factors to represent different scenarios. System 100 has data structures to store response data for specific macro factors and expert attributes. System 100 can generate a matrix with rows for experts and columns for responses for different macro factors. System 100 can generate a distribution curve for a particular macro factor. The probability for that macro factor can be represented by an area under the curve in the range of values. The response data from the polls is used by system 100 to get the probability of the macro factor going up and the up range, and the probability of the macro factor going down and the down range. System 100 can also generate the medium or other points along the curve. System 100 generates the data in order to populate the scenario tree or graph. The shock or value range corresponds to the range from zero to the shock value. For example there may be a 12% probability that the value for a particular macro factor will be within the range of 0 to 7.38. The macro factors can be independent or correlated. Conditional probabilities can be used to capture those correlations. System 100 displays poll questions to an expert system which may create some dependence based on the order or presentation. System 100 generates the tree from the probabilities and range values for the macro factors. The scenarios are associated with each of the probabilities and value ranges of the macro factors. System 100 then processes the macro factor scenarios to generate micro factor values using a market model, regression, conditional expectations and so on. System 100 then uses the micro-shocks to generate portfolio valuations. System 100 is operable to generate distribution curves for the scenario values. For example the different scenarios can lead to the same range and probability of other scenarios.

The following objects in the system 100 can be used for scenario definition and evaluation for the purpose of pricing and risk measure calculation:

Financial Instrument
Coordinate
Shock
Event
Scenario
Poll

Financial Instrument

A financial instrument can be modelled as a map of key attributes or terms required for construction of a pricing model for evaluation of various measures. Individual attributes generally follow ISDA terminology where possible, but may extend the standard definitions for exotic or bespoke products. The map may have depth greater than one for structured or complex products which comprise multiple legs or are nested in definition. The data structure will contain the complete set of terms required to unambiguously represent the payoff of the instrument, in accordance with the corresponding term sheet or confirmation (where generated). Example terms for a vanilla instrument would be: strikePrice, expirationDate, settlementDate, volatilityStrikePrice etc. The ability to create instruments in the system will be exposed via the Asset API which will serialize these terms to JSON.

A coordinate may refer to any supported financial instrument that can generate a list of market data coordinates which form a dependency graph required to compute price or other risk measures. Each coordinate has the following form:

Class or dataset, e.g. FX Volatility
Asset, e.g. EUR/USD
Other dimensions, e.g. strikePrice, expirationDate Coordinates form nodes in a graph of dependencies, connected by edges which define relation between pricing inputs. Nodes are shared across multiple instruments, so a portfolio (i.e. its collection of instruments) can form a complete graph of pricing coordinates. Coordinates may be implied from other parametric calculations. For example points sampled on a volatility surface may be calculated from a mathematical function which defines the surface via a set of parameters. The choice of parameter space can be selected by expert systems in specific asset class and domain knowledge.

A shock is a function which can be used to perform a translation on one or more coordinates. A shock can have the following form:

Coordinate selector: a query which determines the subset of coordinates affected by the shock. E.g. all coordinates where asset region is "Europe", or the 10 yr volatility level for a given asset across all strikes Transformation: the function to apply to each selected point:

Absolute: apply a fixed quantity directional adjustment to each value

Relative: apply a percentage move to each value

The system 100 can add more complex transformations, e.g. calculate the one standard deviation move for each point using 6 m of historical returns data and apply this adjustment. An event is a systematic model of a real world event, or the model of a predicted event generated via an analytical framework. An event is modelled as follows:

Metadata: name, description, tag, etc.
Event date/time: date and/or time the event takes place
Children: identifiers of related child events Events may also form a graph, i.e. one event can generate a cascading set of child events (recursive).

A scenario is a set of shocks which models a transformation to the state of the world. These may or may not be tied to real world events, for example the "2016 U.S. Election Scenario". Scenarios can have the following properties:

Metadata: name, description, tags, etc.

EventId: if related to a given event, the identifier of the event

Shocks: an array of shocks per above definition, to be executed in order.

A poll is a set of questions used to conduct a survey across one or more participants. Polls can have the following form:

Metadata: name, description, tags, etc.
Questions: Array of Question

In order to scale the inputs, system 100 looks at the historical moves (e.g. over last 20 years) for the same time horizon and scale it by the largest moves. In addition, the user is provided with information about the standard deviation of the move and the historical percentile of the inputs.

In certain cases, proxy underlyers may be introduced to compute the range where the studied event is expected to have similar effect on the underlyer as past event(s) had on the proxy event. For example, looking at a "Frexit" risk (Frexit defined as France withdrawing from the European Union), one might scale the French/German bond using Italian/German bond spreads as the proxy as that was the moving asset in the European crisis of 2012. In some embodiments, system 100 can store pre-canned moves next to the poll questionnaire (indicating worst events and moves that happened during that timeframe).

Questions can have the following form:

Identification and number: ordering in rendered survey

Group: if questions are grouped, the group name/identifier

Figure 2A:
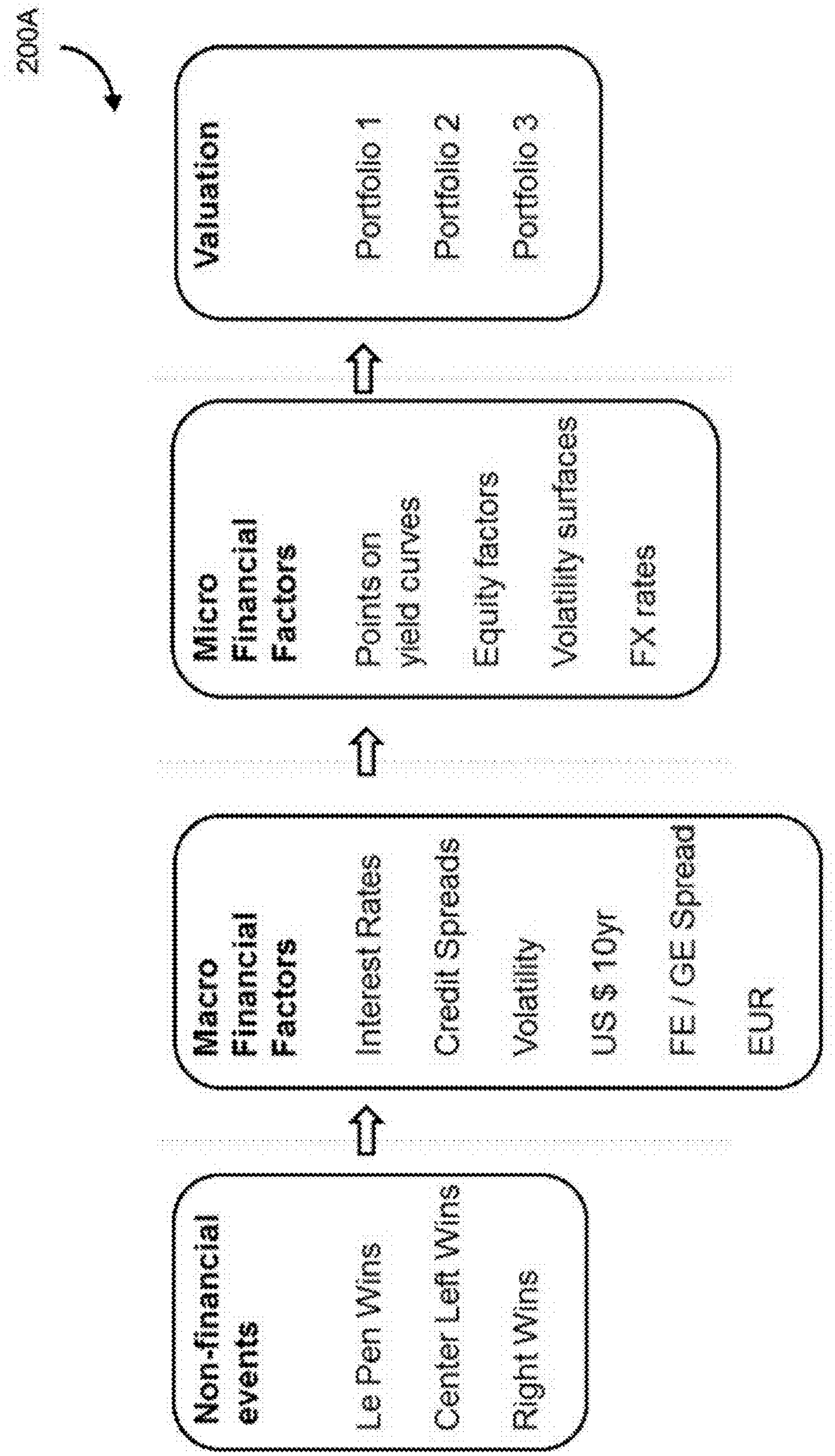
FIG. 2A illustrates a flowchart of different types and tiers of analytical factors, according to some embodiments.

Shock: where the question prompts the respondent to predict a pricing shock, the initial (default) state, range of possible values, and the values entered by the user for the response FIG. 2A illustrates a flowchart 200A of different types and tiers of analytical factors, according to some embodiments. This is a specific non-limiting example of an event, outcomes, macro factors, micro factors, and valuations. One example event can include an election, such as is the French election. The example outcomes include different parties winning. For example, as discussed herein, the different parties can refer to left wing, right wing, center-left, center-right, libertarian, republican, democrat, etc. Any references herein to a party winning could also be references to one or more candidates of that party winning. The event and outcomes are used by system 100 to automatically generate a subset of macro factors. The example macro factors are interest rates, credit spreads, volatility, the value of 10 year USD swaps, other types of spreads (e.g., default spreads), and EUR currency valuation.

System 100 uses the macro factors to automatically generate different scenarios for the outcomes. System 100 uses the macro factors to automatically generate a subset of micro factors. The example micro factors include points on yield curves, equity factors, volatility surfaces, and foreign exchange rates. In some embodiments, each factor being analyzed can be used as a point of split between different outcomes. In an example tree data structure where every nodal outcome is binomial (aside from the initial event) and can be used for bifurcation, $2^x$ combinations are possible for each main event outcome (in the example of FIG. 3B, first, second, and third party wins).

Figure 2B:
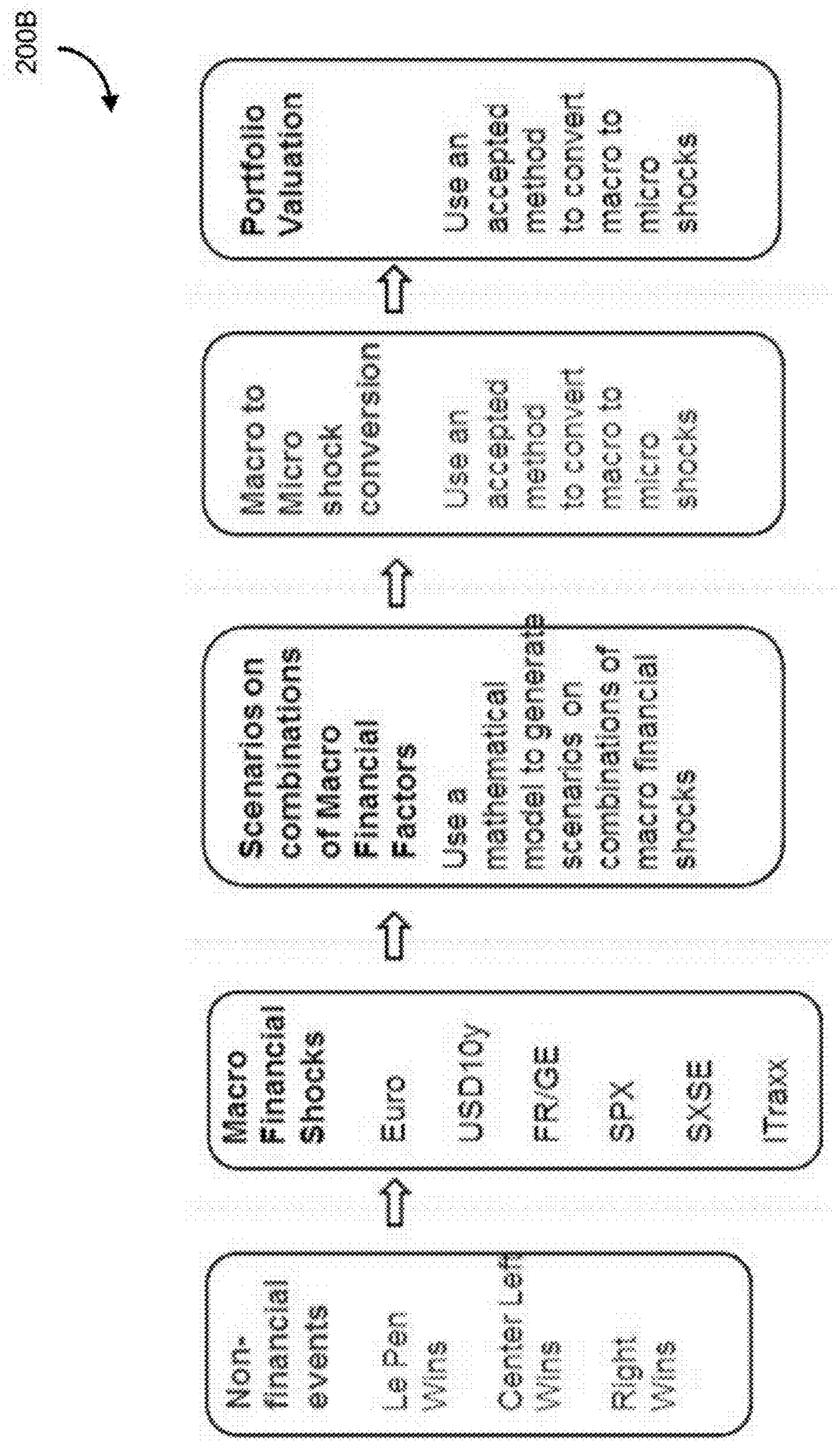
FIG. 2B illustrates a flowchart of different types and tiers of analytical factors, according to some embodiments.

FIG. 2B illustrates a flowchart 200B of different types and tiers of analytical factors, according to some embodiments. The example macro factors include EUR currency value, 10 year USD swaps/Treasury bond values, France Germany spreads, S&P 500® (SPX) index, Euro Stoxx 50® (SXSE) index, and ITRAXX. System 100 uses a mathematical model defined by rules to generate scenarios on combinations of macro factors that are associated with various shocks (e.g., potential amplitude/magnitude of impact on a particular factor). System 100 converts macro factors to micro-factors and corresponding shocks are associated with the micro factors. There may be co-dependencies between the various factors, and further, macro factors may be associated with downstream factors, and the tree data structure is applied to provide a suitable data structure that can capture conditional probabilities in relation to nodal linkages.

System 100 uses the micro factors to automatically evaluate one or more portfolios. The generation and/or selection of macro factors can be done using an expert system and machine learning. System 100 generates scenarios to span the range of possible future events. The automated scenario generation enables system 100 to find the "black swans" and eliminate human bias. In some embodiments, morph factors are utilized to modify received expert inputs to account for potential biases. These morph factors may be, among others, weightings or multiplication factors that may adapt, shift, or otherwise transform expert inputs to account for persistent biases.

The system 100 provides a robust scenario generation tool that can provide an overview and analysis into every path that is possible through probabilistic combinations of factors, given various potential outcomes. Testing every possible path (or a large enough proportion of them, if heuristics are applied to extremely complex scenarios) allows for a reduced "blind spot" for scenario analysis.

A machine-generated analysis allows for a reasonably fast analysis of a large number of different scenarios, and variations thereof (e.g., sensitivity analysis). Additional insights may be determined, for example, where a human would otherwise have not been able to comprehend that a large number of seemingly insignificant paths have an outsized impact on an outcome, or vice versa, that a singular path has a very outsized impact on an outcome that is not evident from human intuition.

Further, human bias may be reduced where a human is able to use a suitably configured interface to be able to see, holistically, and interact with all of the scenarios. In some embodiments, interfaces and tools are provided whereby the interfaces are adapted to provide an improved tool for decision making that may help guide a human reviewer graphically by, in response to inputs received from various interface elements, enabling the traversal or analysis of specific paths. For example, paths or partial paths may be grouped in a region, and that region may be "zoomed into" or otherwise refactored (e.g., resized, highlighted) onto the graphical user interface such that the human reviewer is either more able to glean information from the graphical user interface or further interact in a deeper analysis.

Given that informational advantages are time-limited, there is a significant early mover advantage that comes with the use of the system 100. The outcomes and determinations provided by system 100 are advantageously provided in as near real-time as possible to provide as much lead time as possible when taking actions based at least on the outputs of system 100. In some embodiments, an automated workflow engine is utilized to generate signals or otherwise cause downstream transactions to be processed (e.g., buy/sell orders, cancel orders, modification orders, options exercising, hedging).

Model Generation

A problem for known manual methods of scenario generation is the sentiment that scenarios are simply a group or an individual's guesses as to future states of the world. This makes scenario-based risk management a guessing game. Another issue with scenarios, such as in applications for stress testing (risk analysis) portfolios, is that one cannot know whether a scenario stresses or impacts the risk associated with a portfolio until after the fact. Embodiments described herein systematize the generation of scenarios so as to enable them to be generated automatically. Machine learning unit 120 processes input data to detect events and outcomes (e.g., shocks) that trigger the forward looking scenario analysis. Embodiments described herein enable the generation of contrarian scenarios and can capture extreme events, and scenarios that would not have been foreseen as well. More importantly, embodiments described herein can minimize the bias introduced when humans design scenario sets.

System 100 enables completely autonomous machine generated scenarios with little or no bias. Also, these scenarios need to "span" the range of possible future states and, in the case of financial applications, stress the portfolios they will encounter without a priori knowledge of the positions of securities in the portfolios (the definition of a spanning set in this case). For example, machine learning unit 120 is configured to define, generate, and apply different rule sets relating a plurality of events, poll questions, and macro factors to generate a tree data storage structure representing the various scenarios.

The rule sets are defined such that a spanning set of all future states is generated. The machine learning unit 120 instantiates the tree data structure with information regarding the linkages between nodes (e.g., probabilities), potential magnitudes of impacts (e.g., shock values), and processes the paths that can be obtained by traversing the tree independent of knowledge of what assets are in the portfolio. This approach improves on pre-existing human approaches that are tedious and time consuming, and further, flawed in relation to potential biases that may even be subconscious in nature. The intermediate step of instantiating the tree structure is important in performing a rigorous and robust analysis of the spanning set of paths such that an accurate view of the potential impacts on the portfolio can be obtained.

System 100 can capture correlations and dependencies between macro factors using functions or formula, historical data, regression, Bayes law, or other statistical methods. For example a regression process can identify a correlation between macro factors. System 100 can generate a correlation matrix for the values and probabilities of macro factors in order to identify dependencies between them. System 100 uses rules to define the order or structure of the tree and the arrangement of the macro factors. For example, system 100 can include rules to identify what are the most affected micro factors and what factors impact other factors to define correlations and dependencies. As noted, system 100 does not only have to define scenarios using tree structures and can also use other connected graph structures. System 100 is operable to filter or cleanse polling responses to remove incorrect responses for example and is operable to automatically generate a poll for a set of macro factors and generate a tree or graph structure for the scenario sets. System 100 receives an event and outcomes and generates a set of macro factors. System 100 is operable to determine interrelations between the macro factor variables when generating the graph structure. System 100 generates a spanning coordinate system for all macro factors to automate the generation of the graph and tree structure. System 100 can generate an API to interact with the generated scenarios.

System 100 is configured to automatically identify the set of macro factors based on the event and outcomes. System 100 is configured to automatically sequence the factors and identify dependencies between the factors. System 100 is configured to generate a poll to receive input that is used to populate values of the macro factors. The input received from the polls is preprocessed using distributions to generate values and probabilities for the macro factors.

The sequence of the macro factor nodes can be important. The probabilities can be conditional probabilities based on the preceding factor nodes in the tree or graph, for example. The system 100 can create a correlation matrix to generate probabilities. The matrix can have leafs and ends of trees as rows and the factors as the columns. The system 100 can use a variance and covariance matrix. The outcomes of each scenario can imply a correlation. If the variance is small then the factors can be correlated (e.g. if it is 0 then they are perfectly correlated). A given tree and poll can generate a covariance matrix. There may be multiple polls over time to generate multiple covariance matrices. The multiple covariance can matrices indicate changes over time (e.g. the variance of the variance).

System 100 is configured to automatically generate polls for experts to derive the values for the macro factors. Given an event, system 100 is configured to automatically define a set of macro factors and interrelationships between the macro factors when defining the tree or graph structure. System 100 is configured to convert macro factors to micro factors to evaluate portfolios. System 100 uses rules to define interrelationships between the macro factors when generating the tree. System 100 generates a spanning coordinate system for all market factors to automate the generation of the tree.

Embodiments described herein relate to a fully automated scenario generation method. Events and outcomes or shocks provoke a need for understanding possible future scenarios. Armed with that information, system 100 uses machine learning techniques to gather information about the macro factors that can change significantly as a result of the event in question. For example, machine learning unit 120 can derive rules using data representing historical and current market sentiment and, using a model, develop a spanning set of scenarios or possible future states of the world. System 100 can estimate automatically the probabilities of these scenarios occurring, as influenced by the market view today and also with history that is relevant.

Scenario evaluation can involve two general steps. Firstly, one needs to know the value of the portfolios to be examined under these scenarios, independent of their likelihood of occurring. This information is crucial. It shows the scenarios that could cause havoc with the portfolio. So, regardless of the probability of occurrence, these are scenarios that require decisions to be made—does one hedge or not hedge? Ignoring these scenarios is another way of betting against them. But at least the bets taken by system 100 are explicit and can be communicated. Secondly, one should examine the likelihood as estimated by the probabilities associated with the scenarios. This allows computation of summary statistics such as value at risk (VaR) or shortfall or ranking the outcomes by the likelihood of occurrence.

Automating Scenario Generation

System 100 identifies the initial event and the outcomes or the economic shocks it produces. To illustrate the methodology, a complete end-to-end automatic scenario generation process is described that is based on the wisdom of the crowds using a polling mechanism to obtain relevant data to generate data values and probabilities for different scenarios.

The process starts with an event (for example, an election), financial or non-financial, that could have an effect on the financial markets. System 100 processes the event to decide on the macro factors that could be affected by this event (for example, various indices, spreads, GDP, etc.).

During a training phase, experts in the field, coupled with machine learning unit 120 can be used to ascertain what macro factors are important to consider for defining and updating rules to automate the identification of macro factors. Once these factors are determined, the system 100 can poll a large independent sample of actors in the financial markets for data on the possible effect of the event on these factor movements over the time horizon in question.

The result is a probability distribution for each macro factor. This gives $p^u(F_i)$, the probability of an upward movement in factor i over the time horizon that has been chosen. Similarly, system 100 can obtain, $p^d(F_i)$, the probability of a downward movement in the ith factor. In addition, system 100 can get the range of possible up, $r^u(F_i)$, and downside, $r^d(F_i)$, moves for the ith factor. Using this data, system 100 generates a spanning set of scenarios. Note that in lieu of this poll, in some embodiments, system 100 can also run artificial intelligence engines using machine learning unit 120 to derive these probability distributions.

Figure 3A:
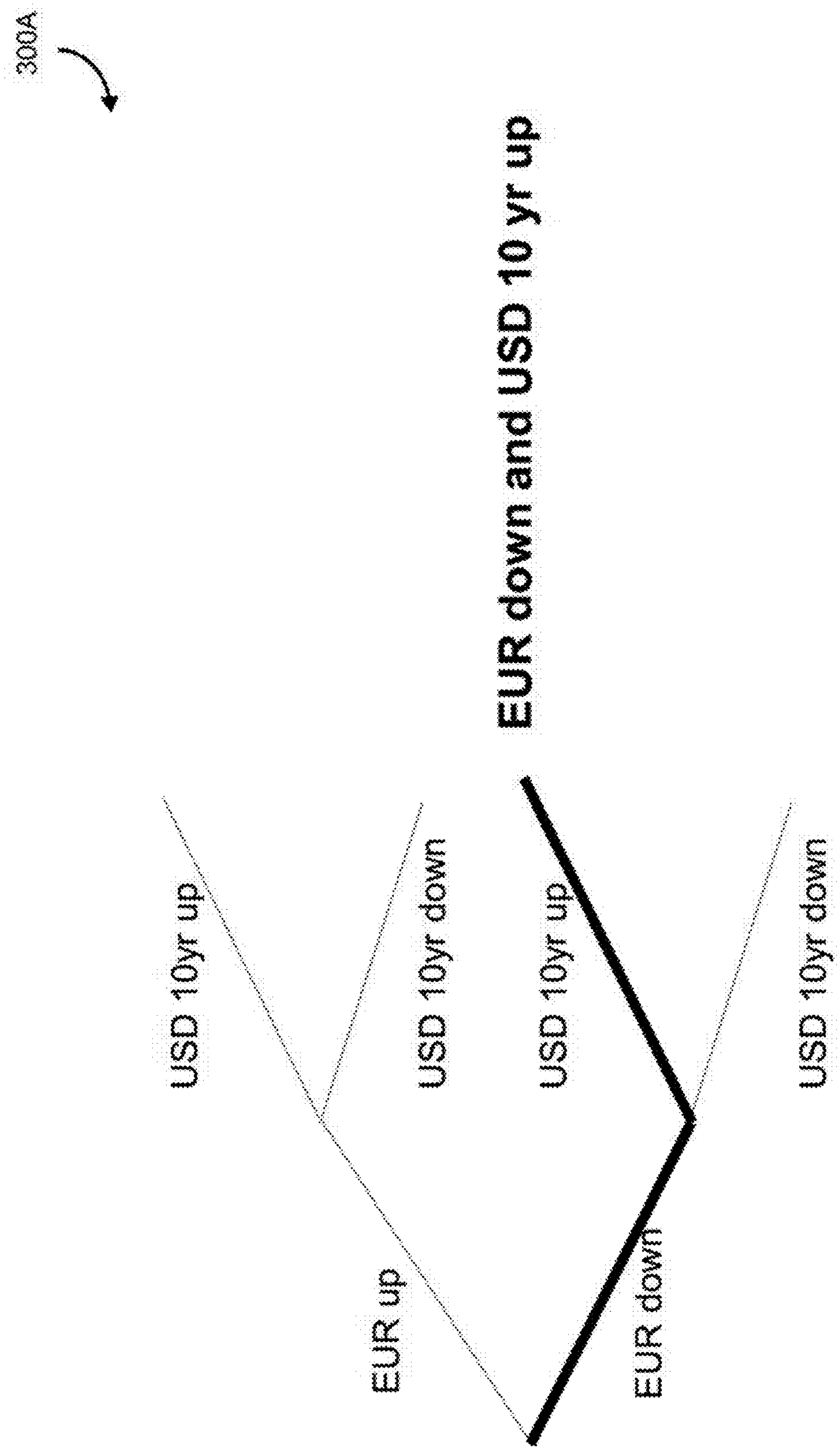
FIG. 3A illustrates example outcome scenarios based on currency fluctuation according to some embodiments.

FIG. 3A illustrates example outcome scenarios 300A based on currency fluctuation according to some embodiments. In this example, two macro factors are shown: EUR currency value and USD currency value over 10 year range. The financial scenarios are shown as a tree of nodes. Each path represents a scenario. The example path shown is the scenario with the EUR currency value going down and the USD currency value over a 10 year range going up.

Figure 3B:
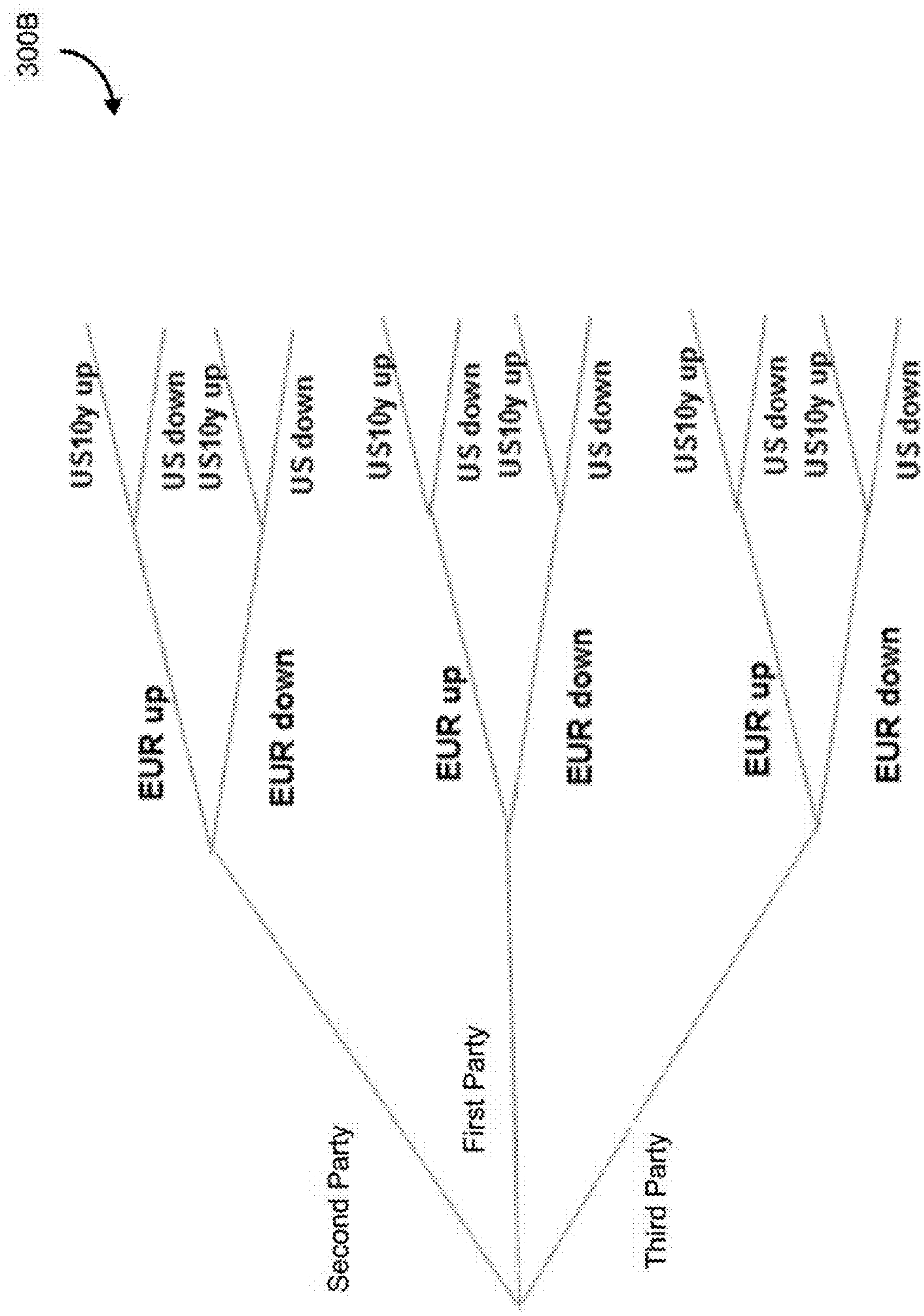
FIG. 3B illustrates example outcome scenarios based on political victories and currency fluctuation according to some embodiments.

FIG. 3B illustrates example outcome scenarios 300B based on political victories and currency fluctuation according to some embodiments.

In this example three outcomes for an election (event) are shown: first party wins, second party wins, and third party wins. Different example scenarios are shown for each of these outcomes. In this example, two macro factors are shown: EUR currency value and the value of U.S. 10 year swaps. The financial scenarios are shown as a tree of nodes. Each path represents a scenario.

Figure 4:
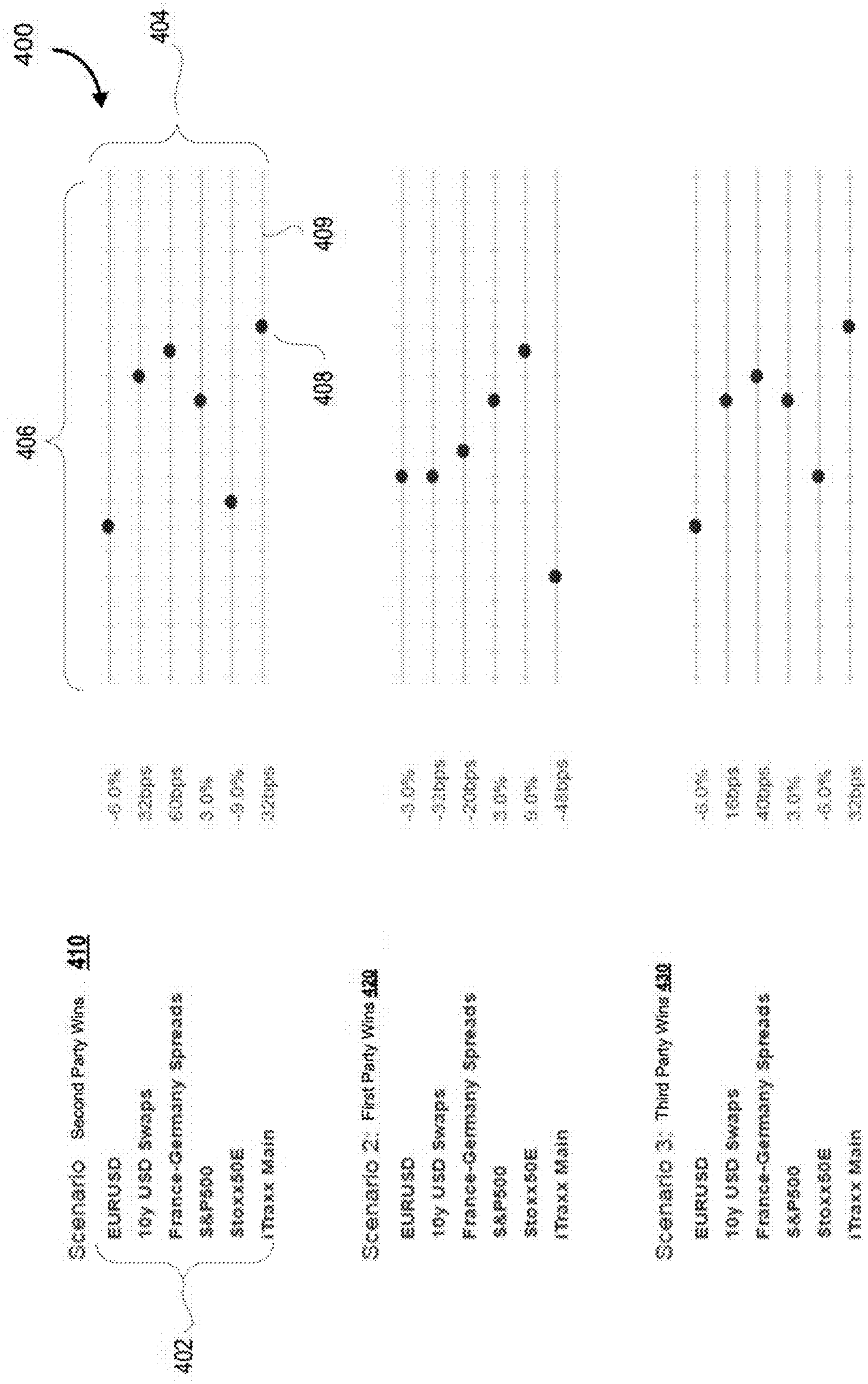
FIG. 4 illustrates an interface with visual elements corresponding to polling questions, a range of data values, and an indicator for a selected data value.

FIG. 4 illustrates an interface 400 with visual elements corresponding to polling questions, a range of data values, and an indicator for a selected data value. In example interface 400, three outcomes 410, 420, and 430 are shown.

The interface includes a set of polling questions for each outcome. The polling questions are directed to various macro factors 402 or shocks, which can be dynamically selected, for example, based on the particular track record or expertise of the expert. In some embodiments, the machine learning unit 120 applies expert analysis rules that modify which factors are shown for which expert based on the past performance of the expert. For example, if an expert is worse than random (or not significantly better [e.g., one standard deviation]), it may be unproductive or counterproductive to ask an expert about a particular factor.

Each outcome 410, 420, and 430 is linked to a user interface elements indicating a set of macro factors 402. For each polling question, the interface indicates a range of data values using a visual element representing a scale 406. A selection unit 408 can be used to move a selector interface (e.g., a cursor/pointer/dot/symbol) across scale 406, and decimation points 409 may be applied to aid in the designation of points on which the selection unit 408 may reside. The scale 406 may show ten standard deviations for example.

The scale 406 can correspond to a distribution of possible values for each factor or shock. For each range of data values, the interface indicates an indicator for the selected data value. In some embodiments, the interface is dynamically and automatically modifiable by the machine learning unit 120 to encourage/discourage various behaviours, or to constrain behaviours by the experts. For example, the range of possible values on scale 406 may be modified, the decimation points and decimation lines may be modified, etc.

The machine learning unit 120 is configured to track performance via validation unit 104 and expert inputs 102 may be continually compared against real-world results (or in some cases, trained against past results). Machine learning unit 120 maintains a set of rules that determine which factors are asked of which expert, and how the interface elements are configured. The configuration of interface elements may provide a large band of discretion (e.g., +50 bps to −40 bps), narrow bands of discretion (e.g., +5 bps to −10 bps), and as noted, the bands are not necessarily symmetrical across positive and negative numbers (e.g., does not have to be +10 bps to −10 bps).

Furthermore, the ranges shown across scale 406 are not necessarily incrementing evenly across scale 406. In some embodiments, scale 406 is specifically refactored based on a specific distribution, or based on a specific scale type (e.g., log scale, geometric scale). These dynamic modifications of how scale 406 interfaces with the expert provide a useful mechanism for constraining choices by the expert or making it more/less likely that an expert will select borderline values along scale 406, or cause the scale 406 to be particularly sensitive in select portions of scale 406. For example, for a scale 406 that ranges between +10 and −10 bps, the center 60% of scale 406 may vary between +/−3 bps, the 20% at the left end of scale 406 may provide for a variance between −10 bps to −3 bps, and the 20% at the right end of scale 406 may provide for a variance between 3 bps to 10 bps.

Accordingly, in this example, the centre 60% of the scale 406 provides for increased fine adjustment, while the "tail" ends allow for rougher adjustment. In this example, it may be that machine learning unit 120 has maintained a rule based on prior types of events and outcomes that the effect is likely around the +/−3 bps, and the rule set therefore provides increased fine adjustment around these ranges such that an expert can more carefully select a value. On the other hand, if the expert wishes to select a value outside this range, the expert is free to do so. The scales 406 for each factor may be different based on particular rules being applied. For example, the machine learning unit 120 has a rule to correct for overly conservative estimates for Expert A that is only applicable to Expert A's considerations relating to the price movement of 10 year USD swaps for election-related events, the machine learning unit 120 applying the rule due to prior validation of Expert A's performance.

The scale 406 indicates a range of selectable responses for each macro factor 402. The middle point on the scale 406 represents zero and points on either side represent up or down values for the macro factor 402. The ends represent the extreme points or values for the macro factor 402.

Each expert accesses interface 400 to provide input data in response to the poll questions. A large number of experts can be polled using interface 400 to leverage the law of large numbers. Taking many experts into account can remove or reduce bias given the law of large numbers. Further, using many experts ideally will result in contrarian views received in response to the polls. Each expert can independently respond to the poll using interface 400. Further not all responses received via interface 400 need to be treated equally. For example, system 100 can weight responses from some experts higher than responses from other experts. The responses received at interface 400 used to define distribution graphs. Experts can be categorized based on expert type. Responses received from one type of expert can be normalized or filtered. For example responses can be received from 100 experts of type 1 and responses can be received from 30 experts of type 2. The responses can be normalized or filtered in order to generate a weighted average or other value for each type of expert. Then the filtered values can be aggregated across all types of experts.

An expert can access interface 400 to provide responses over a time period. As the event date approaches the responses by a particular expert can vary as new information is uncovered. Accordingly, system 100 can identify a date for the event and outcome and dates for responses. System 100 is operable to process our filter responses based on the date information.

In some embodiments, interface 400 can be presented to a diverse group of experts to attempt to reduce bias that can be generated by the selection of experts. There can be geographic diversity. There can be subject matter diversity. The system 100 can use natural language processing to identify market sentiment and unstructured text data which can further be used to weight responses from experts. The system 100 can label experts and their corresponding responses by type and pre-group the responses by each type. Different weights can be attached to the expert responses. System 100 is operable to preprocess the responses to remove or mitigate inherent bias. System 100 is operable to preprocess response data using a filter to identify and remove bias, for example. System 100 processes the responses to generate a spanning set of scenarios that can include contrarian views.

System 100 can have conditions for spanning set of scenarios. For every macro factor the range of possible values spans both negative and positive movements (the distribution curve must cross the 0 line). The spanning set covers all different outcomes (see the interface with the graphs overlapping). This can also extend to micro factors. If this is not met then this is an indication that the poll is wrong. System 100 captures contrarian scenarios (that the market generally feels will not happen). System 100 can catch unusual events that typically would not be foreseen by humans, for example. System 100 generates a spanning set of scenarios.

The middle of the scale 406 can correspond to zero and the side sections can correspond to up and down ranges to an extreme value. The system 100 receives input data in response to the polls. The experts should independently respond to the polls and the experts can be weighted based on expert type. System 100 can leverage the law of large numbers. The system 100 can poll a diverse range of expert types. System 100 can leverage historical data and accuracy in relation to responses from a particular expert. System 100 store the response data tagged with an expert identifier, for example. System 100 can also store the response data in relation to other attributes such as expert type, date, time, and so on. System 100 can weigh the expert data based on their previous responses. System 100 is operable to evaluate the historical response data using actual outcome data. System 100 generates histograms using the response data which are in turn used to generate the distribution curves for the interface. System 100 is operable to poll more frequently as the date of the event approaches. System 100 leverages the law of large numbers by asking a large number of experts to include contrarian views and mitigate bias. System 100 can collect the raw responses and filter the dataset to account for cases where there is no response. System 100 may not fit the data to any distribution and may also fit certain distributions to derive shocks. From raw dataset, system 100 can derive the probability of up vs down move. This is defined by number of responses below and above zero, for example.

To derive upside and downside shock levels system 100 can process the filtered dataset to look at the 5% and 95% to derive upside and downside shocks. The choice of percentiles is dynamic and will be a function of poll results and participation.

In terms of the polls, system 100 can add information about the historical frequency of the moves and the amplitude in a normalized metric (standard deviation) to frame the responses of the users. System 100 can add a “No View” choice to avoid forcing the user to choose when s/he has low conviction. System 100 can organize the questions so as to get a coherent market state from the user, representing his/her perception of the correlations as well as the direction and amplitudes of the moves.

Figure 35:
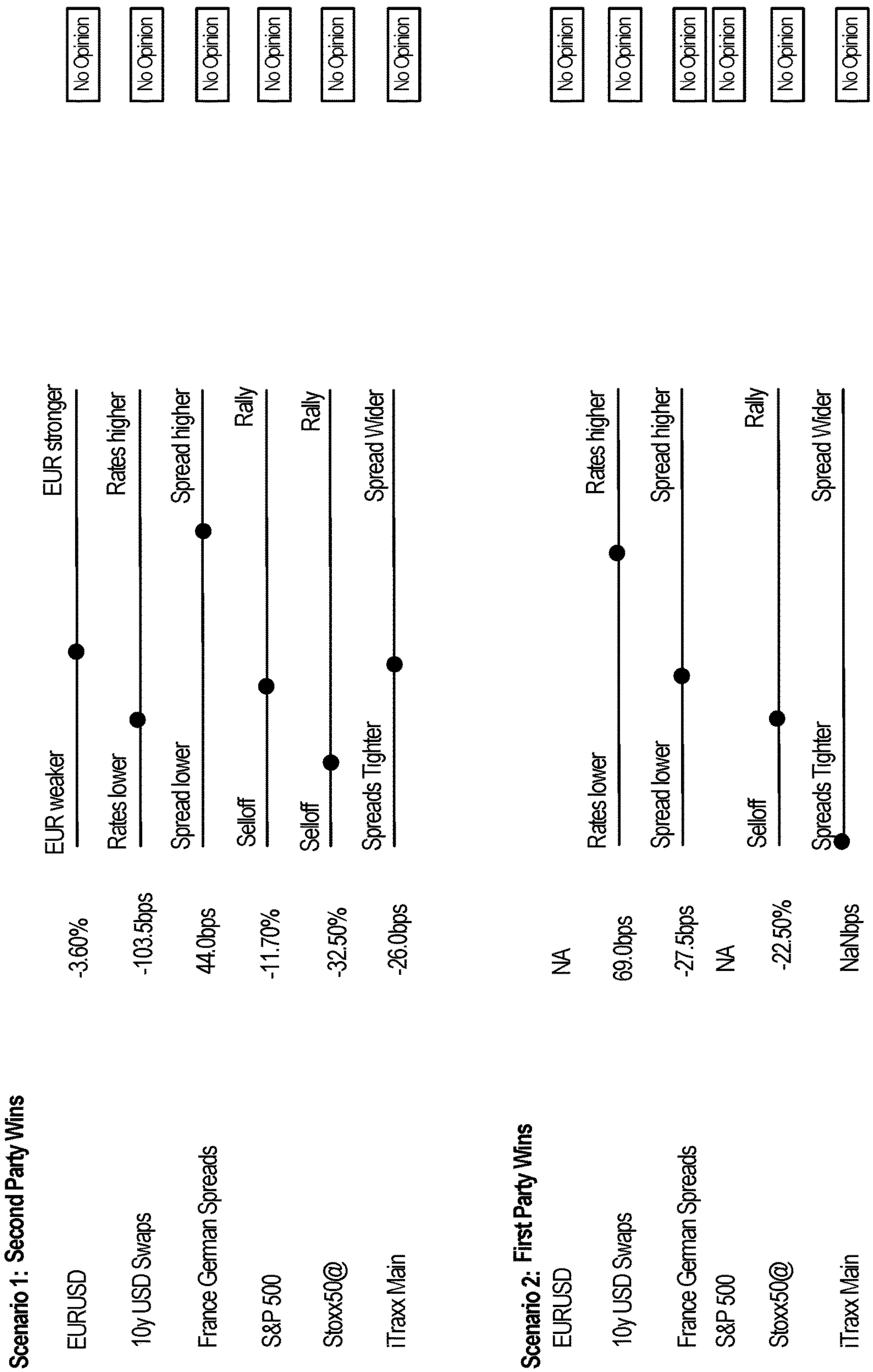
FIG. 35 illustrates an interface for polls according to some embodiments.
Figure 36:
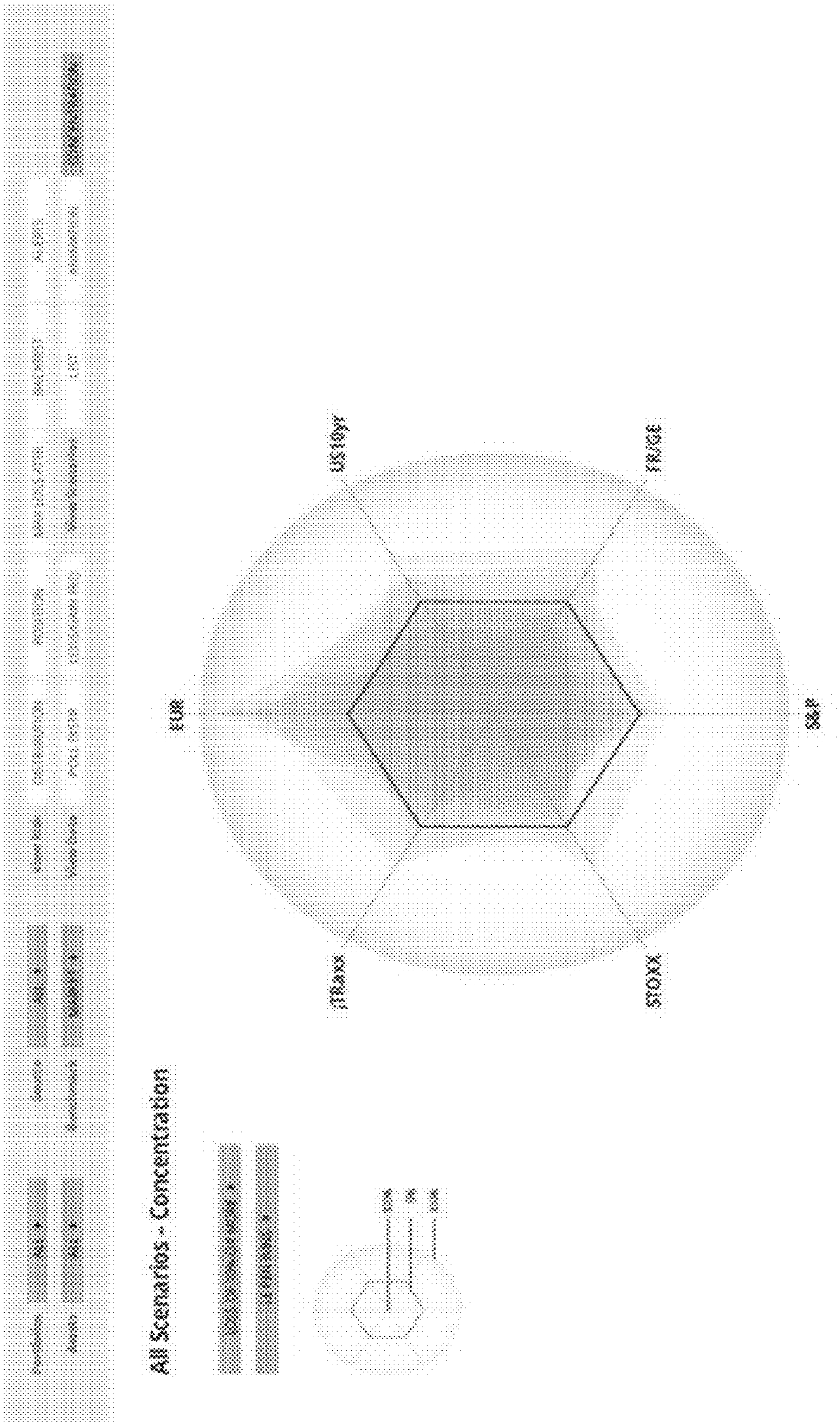
FIG. 36 illustrates an interface with graphical representations according to some embodiments.
Figure 37:
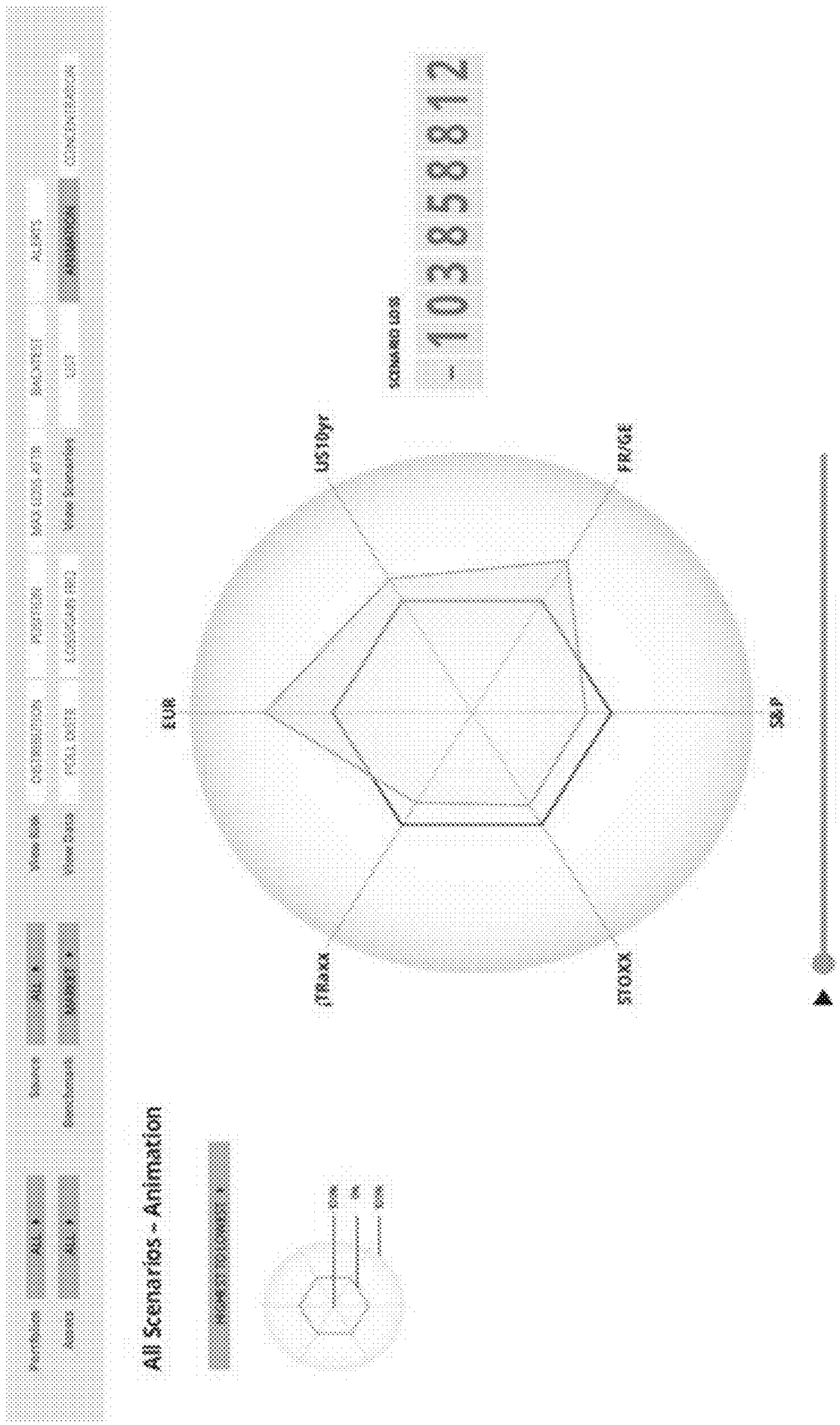
FIG. 37 illustrates an interface with graphical representations according to some embodiments.
Figure 38:
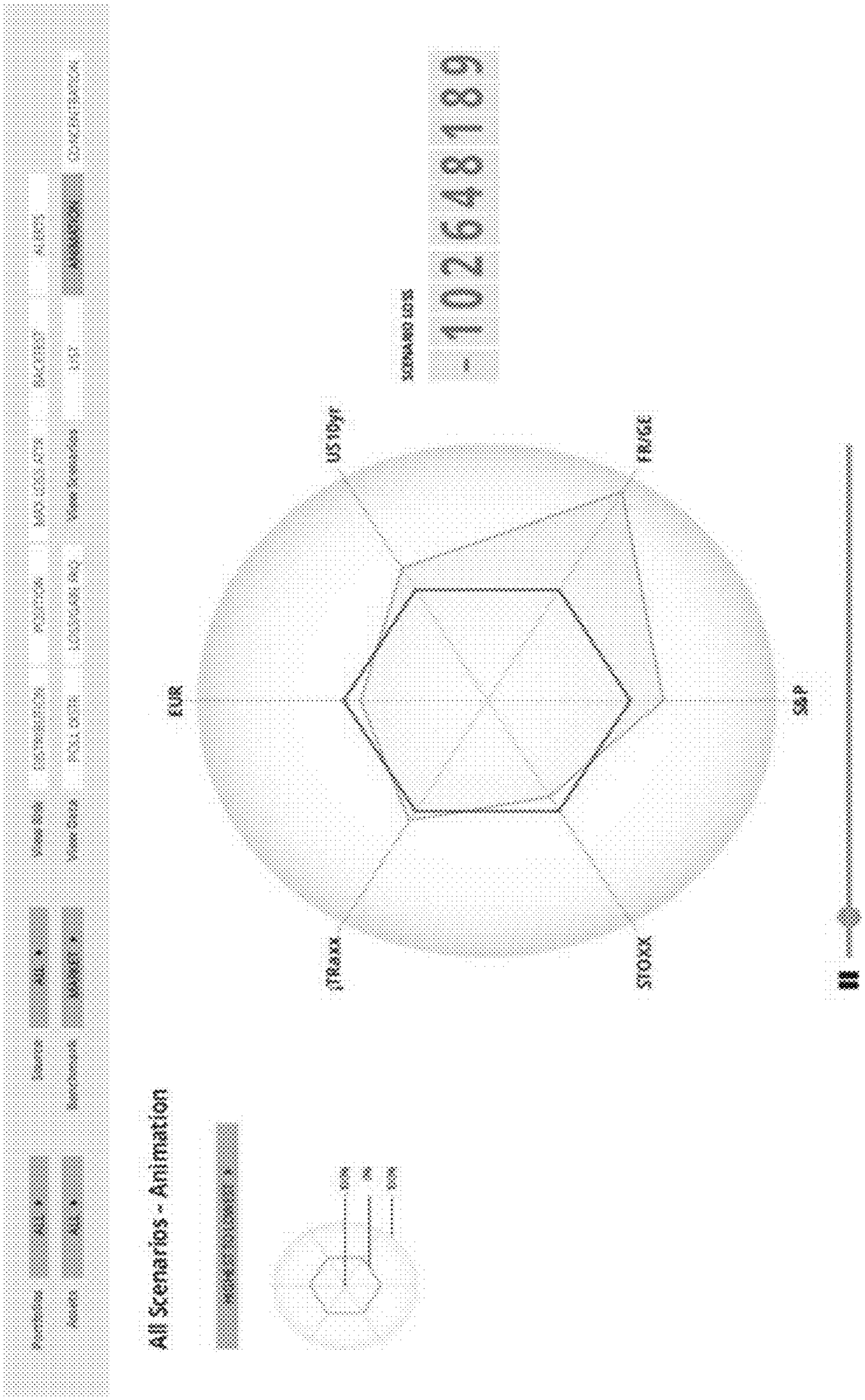
FIG. 38 illustrates an interface with graphical representations according to some embodiments.
Figure 39:
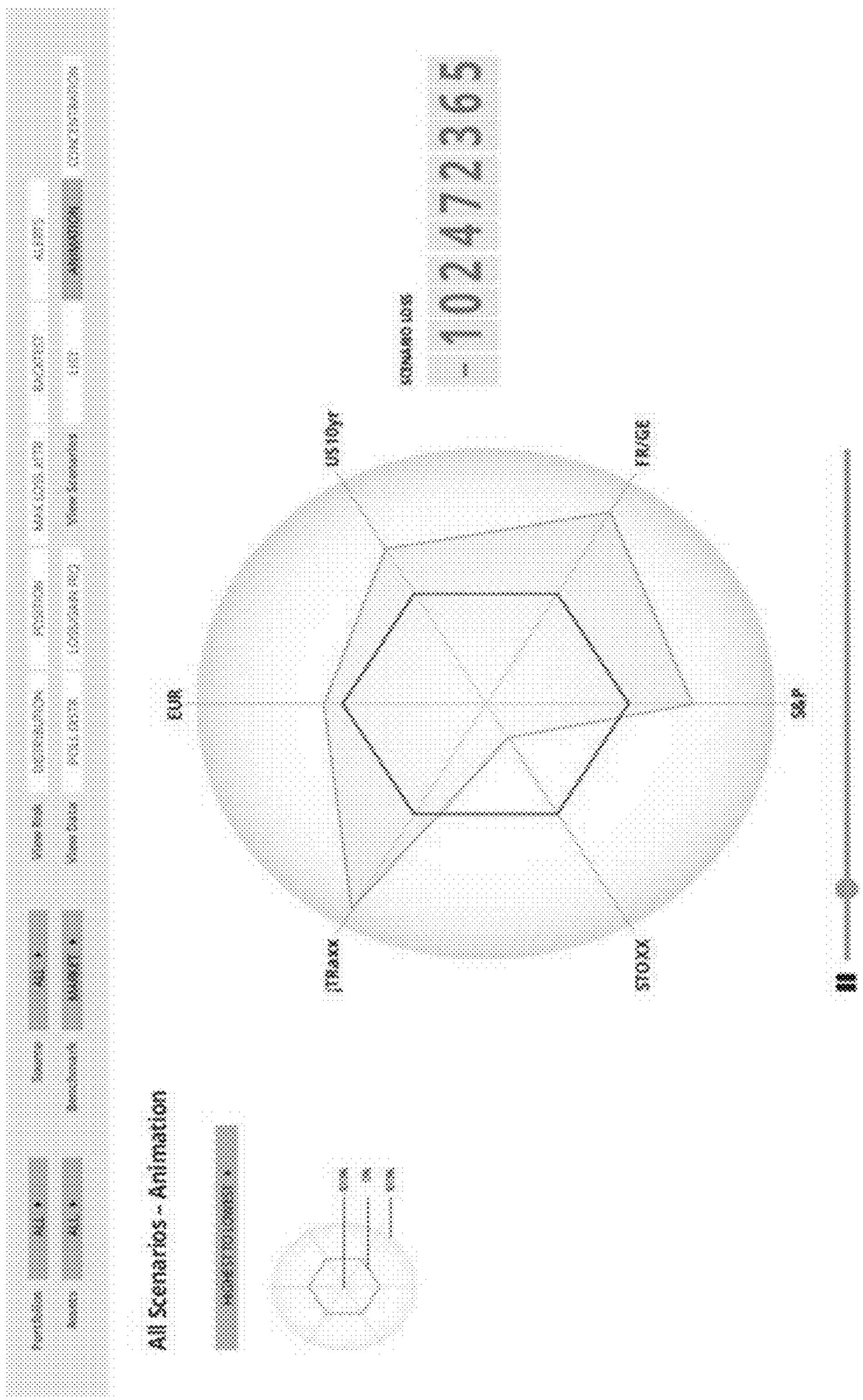
FIG. 39 illustrates an interface with graphical representations according to some embodiments.
Figure 40:
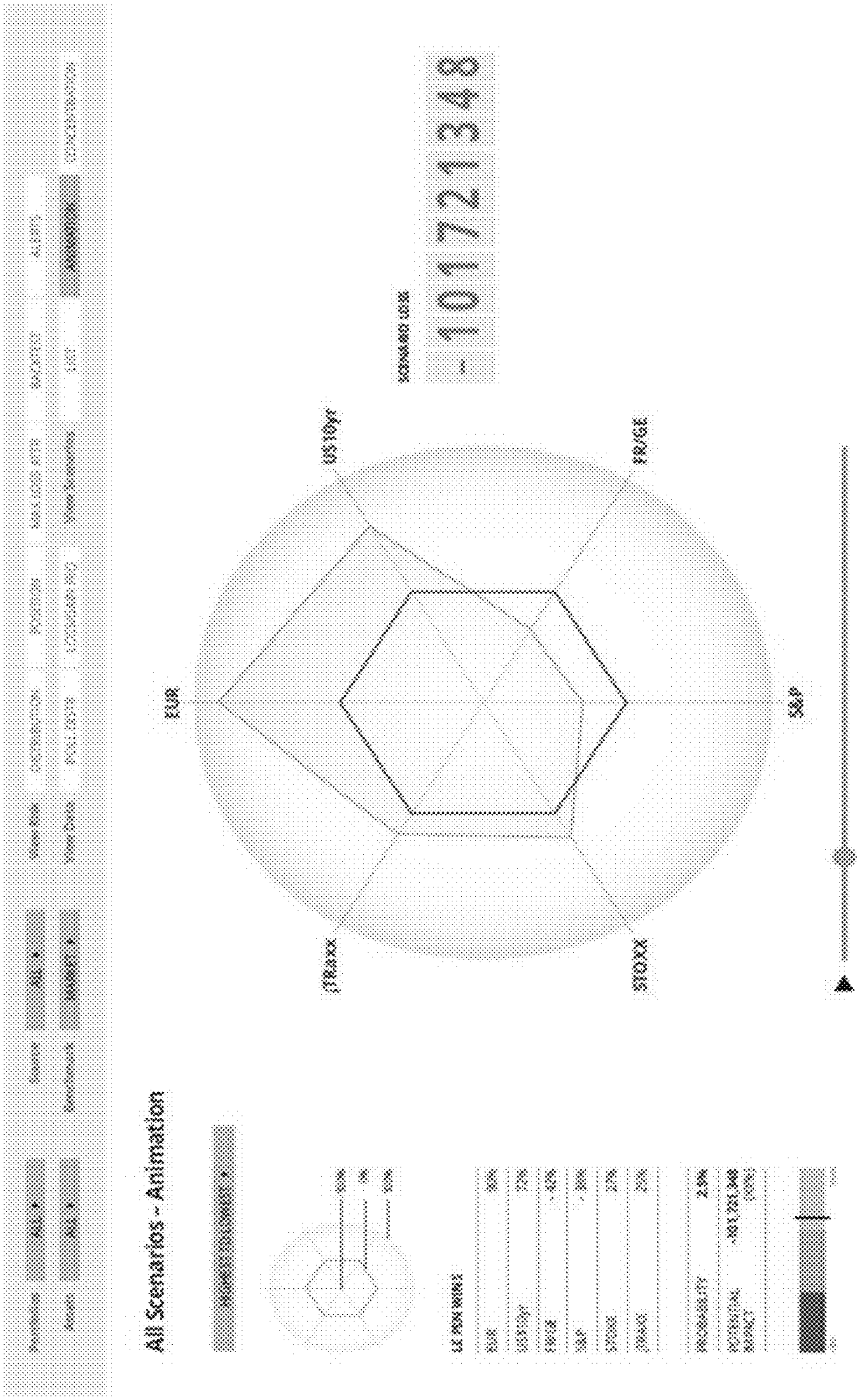
FIG. 40 illustrates an interface with graphical representations according to some embodiments.

For example, the percentiles and standard deviations can show up on hover. FIG. 35 shows an example interface with polls.

FIG. 5A illustrates a table 500A of effects on macro factors, according to some embodiments. The table 500A includes a portion for each outcome. The columns of the table correspond to different macro factors. Some rows correspond to the probability of the factor going up or down. Some rows correspond to the shock or data value range of the factor going up or down. The cells correspond to different probability are shock values for the various factors. System 100 collects responses from polls and generates probabilities and values for the macro factors. System 100 also generates distributions using the data collected in response to the poll. See for example FIG. 27.

These factors illustrate values that may be stored in accordance to the tree data structure. These values are stored in linkages defined between different nodes, and during traversal of the nodes, all possible combinations of outcomes can be identified. In the example shown, the probabilities up and down and the shocks up and down are shown, but there may be more than two possibilities, in other embodiments.

Machine learning unit 120 interoperates with polling unit 128 to determine the values, and expert inputs 102 may be weighted or otherwise processed through the application of rule sets maintained by machine learning unit 120. Input from some experts may be weighted differently than others, and similarly, expert inputs 102 may be adjusted due to tracked patterns of biases in inputs received from certain experts. These values are then provided as parameters into the scenario generation unit 124, which populates and instantiates the tree data structure.

Figure 5B:
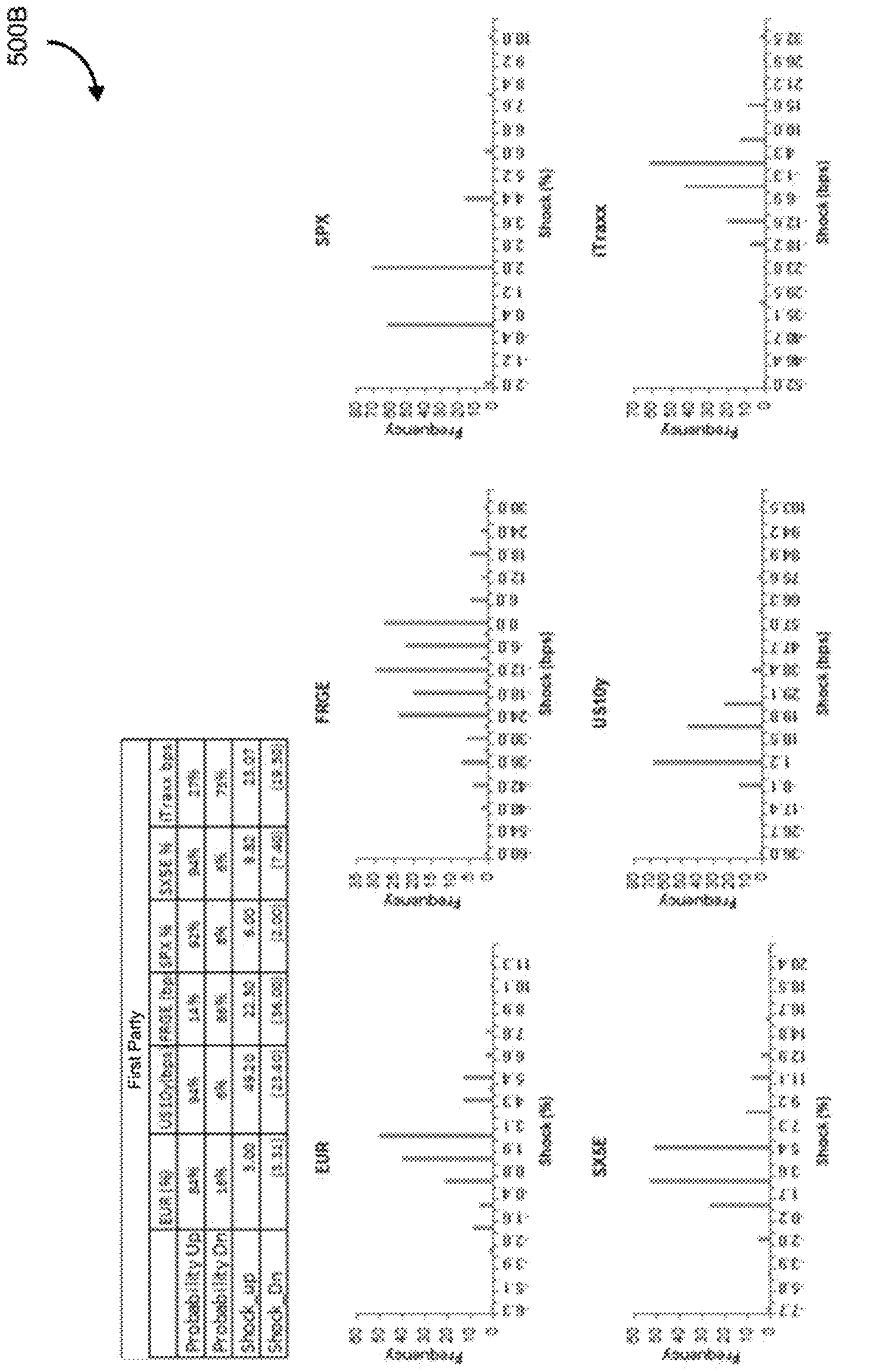
FIG. 5B illustrates an interface with visual elements corresponding to shock level distributions for an example outcome when a first party wins.

FIG. 5B illustrates an interface 500B with visual elements corresponding to shock level distributions for an example outcome when a first party wins according to some embodiments. The system 100 processes the responses to the polling questions to generate the probability and the shock value ranges using the distribution curves.

The visual elements include a table with columns corresponding to different macro factors for the event. The cells of the table are populated with values that are derived using the responses to the polling questions. The rows correspond to the probability of the factor value going up or down and the shock value spans in the visual elements also include graphs for each macro factor. System 100 generates the probability and value ranges for the macro factors by generating distributions for the responses received by experts from polls.

Sample probability distributions are shown for the financial factors. Statistical measures may be utilized to derive the probability up/down, and shock magnitude values from the received polling information. In some embodiments, the probability up/down, and shock magnitude values are determined based on at least one of a determined average, median, among others. In some embodiments, outlier values are ignored or flagged for review.

Figure 5C:
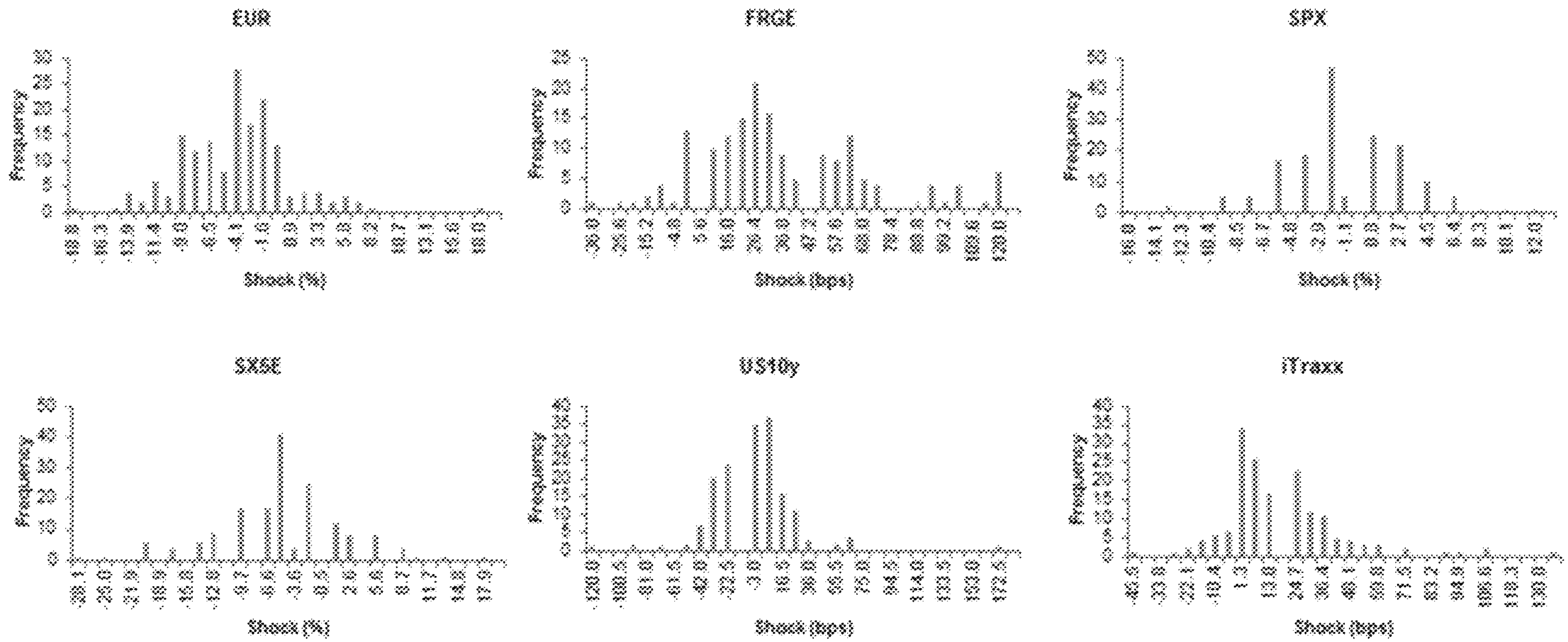
FIG. 5C illustrates an interface with visual elements corresponding to shock level distributions for an example outcome when a second party wins.

FIG. 5C illustrates an interface 500C with visual elements corresponding to shock level distributions for an example outcome of an event (a second party wins). The visual elements include a table with columns that correspond to different macro factors for the event. The visual elements also include graphs showing different values for the factors.

Similarly, sample probability distributions are shown for the financial factors. Statistical measures may be utilized to derive the probability up/down, and shock magnitude values from the received polling information. In some embodiments, the probability up/down, and shock magnitude values are determined based on at least one of a determined average, median, among others. In some embodiments, outlier values are ignored or flagged for review. In this example, the values differ from those from FIG. 5B as the event outcome is different. Accordingly, the potential values, economic direction, political direction, etc., is considered by the various experts and provided to the system such that a predicted scenario where a second party wins can be analyzed.

Figure 5D:
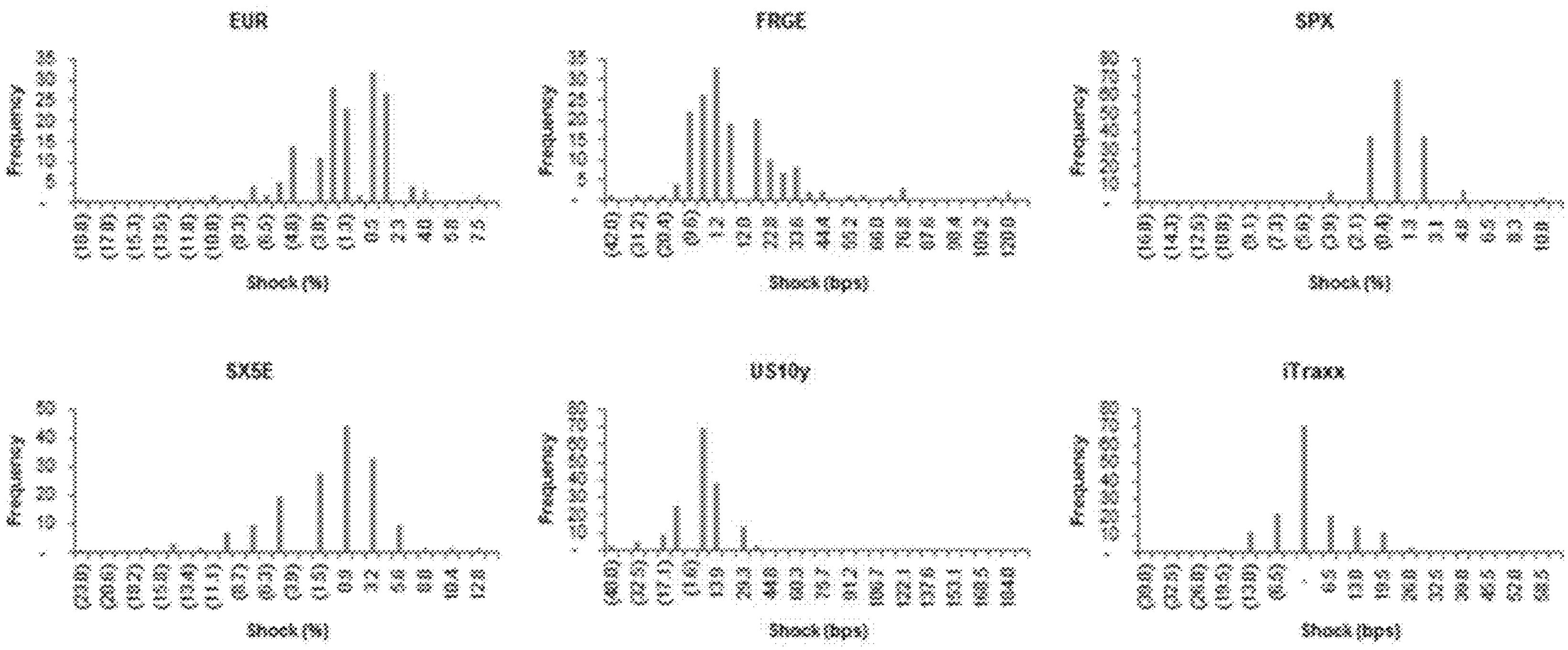
FIG. 5D illustrates an interface with visual elements corresponding to shock level distributions for an example outcome when a third party wins.

FIG. 5D illustrates an interface 500D with visual elements corresponding to shock level distributions for an example outcome when a third party wins. The visual elements include a table with columns that correspond to different macro factors for the event. The visual elements also include graphs showing different values for the factors.

Similarly, sample probability distributions are shown for the financial factors. Statistical measures may be utilized to derive the probability up/down, and shock magnitude values from the received polling information. In some embodiments, the probability up/down, and shock magnitude values are determined based on at least one of a determined average, median, among others. In some embodiments, outlier values are ignored or flagged for review. In this example, the values differ from those from FIG. 5A and FIG. 5B as the event outcome is different. Accordingly, the potential values, economic direction, political direction, etc., is considered by the various experts and provided to the system such that a predicted scenario where a third party wins can be analyzed.

Figure 5E:
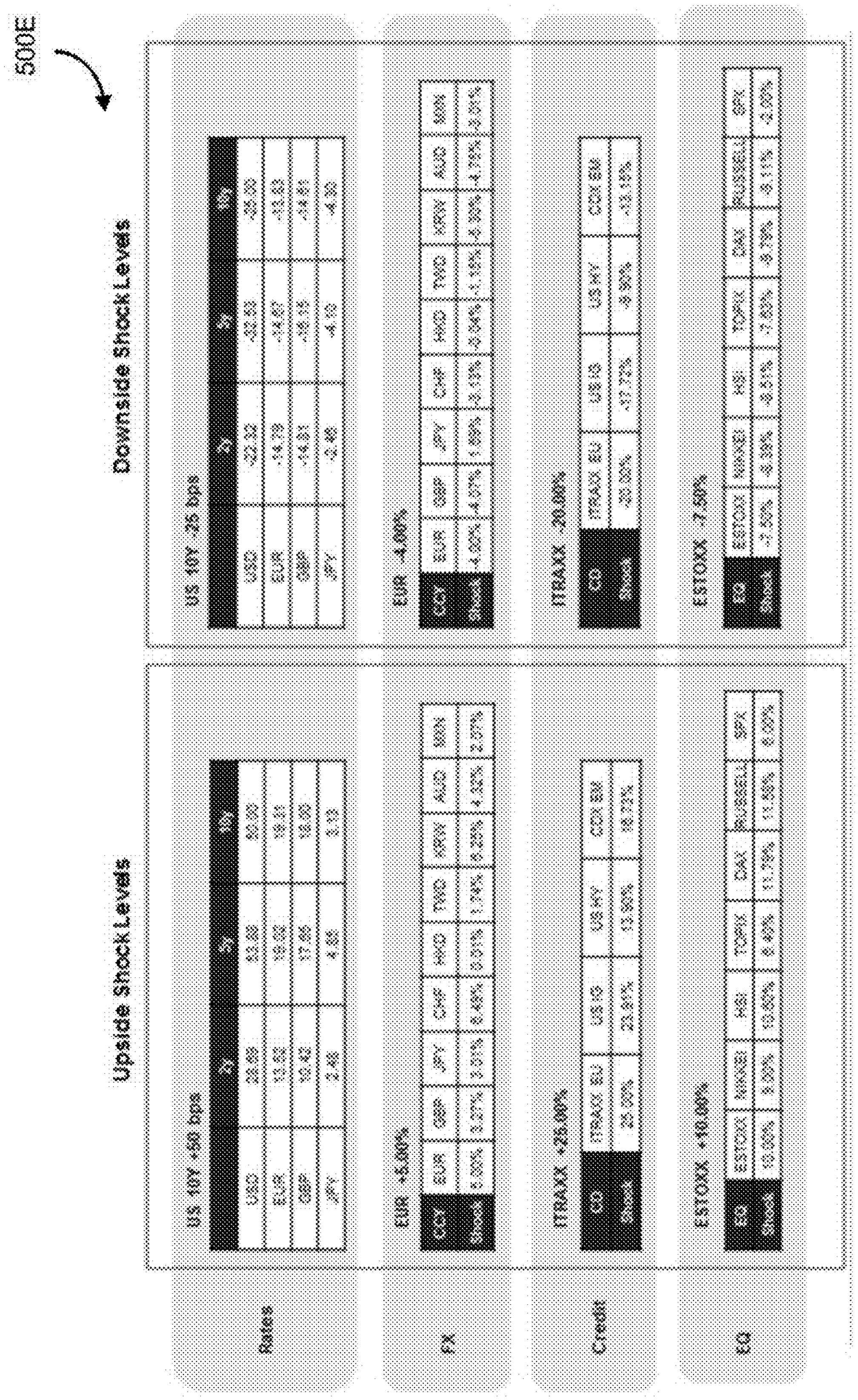
FIG. 5E illustrates an interface with visual elements corresponding to macro to micro upside and downside shock levels for an example outcome when a first party wins.

FIG. 5E illustrates an interface 500E with visual elements corresponding to macro to micro upside and downside shock levels for an example outcome when a first party wins. The visual elements include upside shock levels and downside shock levels for each risk factor linked to the outcome. The left hand side columns illustrate the effect of upside shock, and the right hand side columns illustrate the effect of downside shock. The micro factors are linked to the movement of the macro factors.

As shown on the upper row, the movement of 50/−25 bps in the 10 year U.S. swaps may cause corresponding changes to 2 year, 5 year, and 10 year rates for USD, EUR, GBP, and JPY. Similarly, as shown in the next row, the movement of 5%/−4% in the value of the EUR may lead to shifts in other currencies, such as the GBP, JPY, CHF, HKD, TWD, KRW, AUD, and MXN, among others. In the next row, the movement of ITRAXX by 25%/−20% may cause shifts in credit defaults relating to U.S. investment grade, U.S. high yield, and credit swap indices (e.g., CDX EM). In the last row, the movement of ESTOXX by 10%/−7.5% may cause shifts in various tracked indices around the world, including, for example, the NIKKEI, HIS, TOPIX, DAX, RUSSELL, and SPX.

The micro values can be utilized to estimate/track price movements of portfolios in view of various events taking place. For example, a portfolio manager holding JPY denominated assets may be interested in the potential price movement relative to the USD, and based on an analysis of outcomes of the event (e.g., an election), may decide to shift assets to more efficiently capture gains or to spread/limit maximum downside risk. For example, a portfolio manager may recognize that he/she will be exposing the portfolio to a large amount of downside risk and may choose to utilize a hedging strategy to offset the downside risk.

Figure 5F:
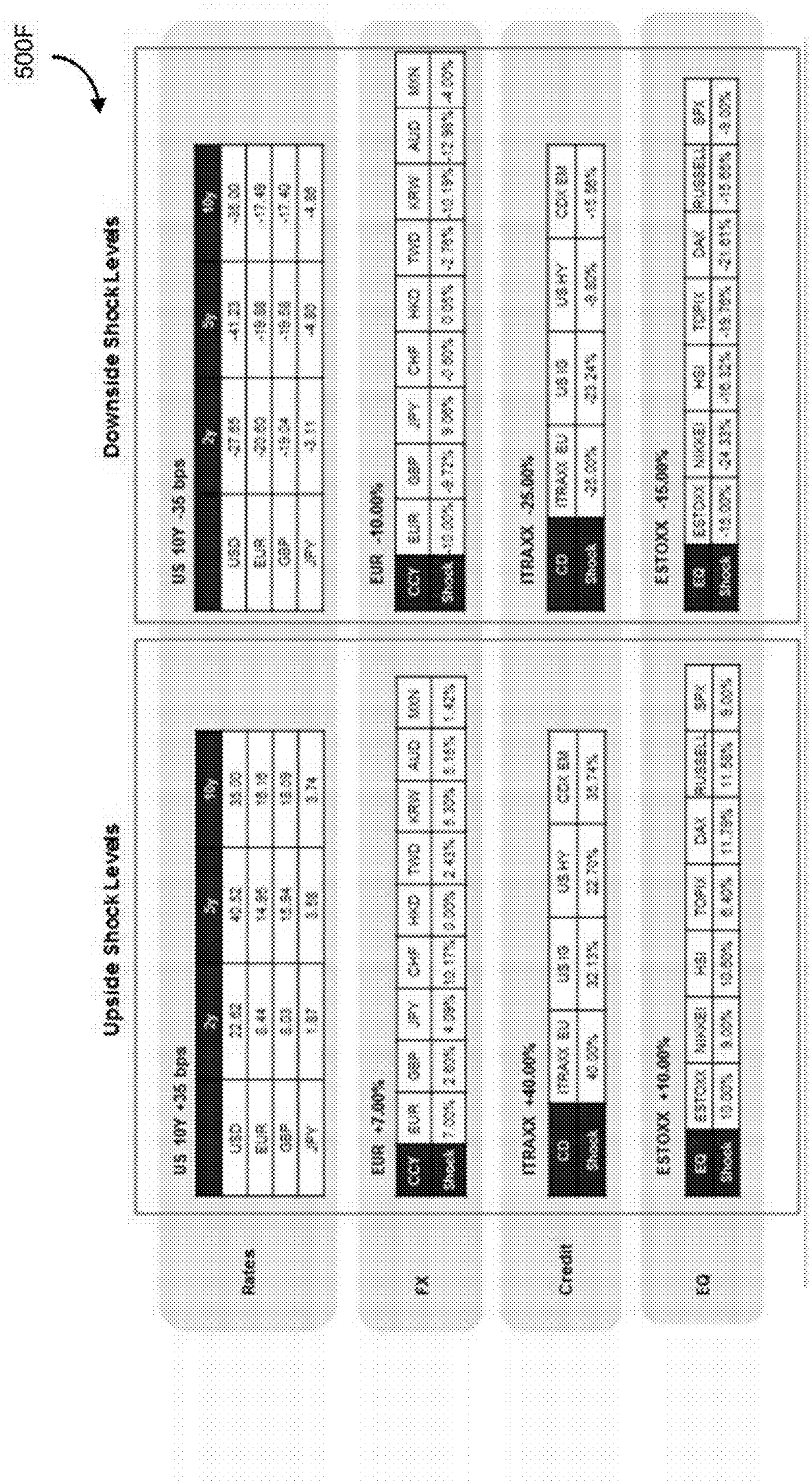
FIG. 5F illustrates an interface with visual elements corresponding to macro to micro upside and downside shock levels for an example outcome when a second party wins.

FIG. 5F illustrates an interface 500F with visual elements corresponding to macro to micro upside and downside shock levels for an example outcome when a second party wins. The visual elements include upside shock levels and downside shock levels for each risk factor linked to the outcome. As shown on the upper left, the movement of 35 bps in the 10 year U.S. swaps may cause corresponding changes to 2 year, 5 year, and 10 year rates for USD, EUR, GBP, and JPY. Similarly, as shown in the next row, the movement of 7% in the value of the EUR may lead to shifts in other currencies, such as the GBP, JPY, CHF, HKD, TWD, KRW, AUD, and MXN, among others. In the next row, the movement of ITRAXX by 25% may cause shifts in credit defaults relating to U.S. investment grade, U.S. high yield, and credit swap indices (e.g., CDX EM). The left hand side columns illustrate the effect of upside shock, and the right hand side columns illustrate the effect of downside shock.

As shown on the upper row, the movement of 35/−35 bps in the 10 year U.S. swaps may cause corresponding changes to 2 year, 5 year, and 10 year rates for USD, EUR, GBP, and JPY. Similarly, as shown in the next row, the movement of 7%/−10% in the value of the EUR may lead to shifts in other currencies, such as the GBP, JPY, CHF, HKD, TWD, KRW, AUD, and MXN, among others. In the next row, the movement of ITRAXX by 40%/−25% may cause shifts in credit defaults relating to U.S. investment grade, U.S. high yield, and credit swap indices (e.g., CDX EM). In the last row, the movement of ESTOXX by 10%/−15% may cause shifts in various tracked indices around the world, including, for example, the NIKKEI, HIS, TOPIX, DAX, RUSSELL, and SPX.

In this example, a portfolio manager is equipped with the differences in outcome that may occur if the election results in this scenario, and can compare with the interface of FIG. 5E to ascertain the differences between the scenarios.

Figure 5G:
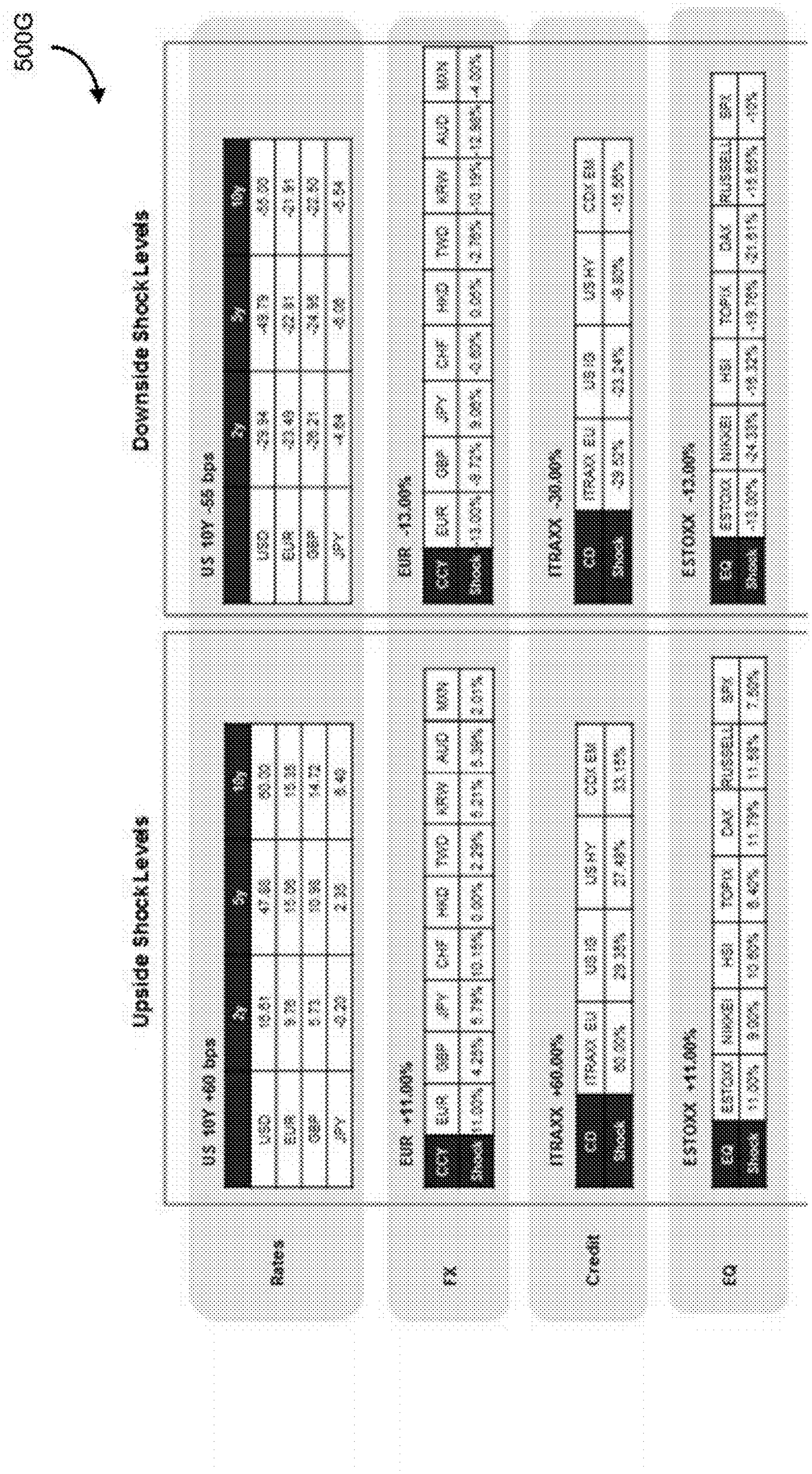
FIG. 5G illustrates an interface with visual elements corresponding to macro to micro upside and downside shock levels for an example outcome when a third party wins.

FIG. 5G illustrates an interface 500G with visual elements corresponding to macro to micro upside and downside shock levels for an example outcome when a third party wins. The visual elements include upside shock levels and downside shock levels for each risk factor linked to the outcome. System 100 generates the shock values and the probabilities using the distributions; these are generated from the responses to the poll questions for the macro factors.

As shown on the upper row, the movement of 60/−55 bps in the 10 year US swaps may cause corresponding changes to 2 year, 5 year, and 10 year rates for USD, EUR, GBP, and JPY. Similarly, as shown in the next row, the movement of 11%/−13% in the value of the EUR may lead to shifts in other currencies, such as the GBP, JPY, CHF, HKD, TWD, KRW, AUD, and MXN, among others. In the next row, the movement of ITRAXX by 60%/−30% may cause shifts in credit defaults relating to U.S. investment grade, U.S. high yield, and credit swap indices (e.g., CDX EM). In the last row, the movement of ESTOXX by 11%/−13% may cause shifts in various tracked indices around the world, including, for example, the NIKKEI, HIS, TOPIX, DAX, RUSSELL, and SPX.

Given a view of all the three possible outcomes of an election, a portfolio manager may be able to obtain a holistic view of potential exposures and outcomes, and make decisions relating to the structure and mix of the portfolio assets accordingly. To obtain such a view, the system 100 instantiates a tree data structure based on the expert polled values, the tree data structure configured to hold probabilistic values and impacts such that traversal of the tree data structure across all possible paths allows for the generation of a spanning set of paths that capture all possible outcomes in relation to the macro factors, and ultimately the effect of the cumulative micro factors on the portfolio assets.

System 100 automatically generates the scenarios on the financial factors affected by the event. This step involves generating a possible set of scenarios that is derived from the responses to polling information and potentially information on the correlations between the macro factors. System 100 can use historical conditional correlations or implied ones where available and use the response implied correlations.

In order to scale the inputs, system 100 can look at the historical moves over last 20 years for the same time horizon and scale it by the largest moves, for example. In addition, system 100 can provide the user with information about the standard deviation of the move and the historical percentile of their inputs.

System 100 can use financial networks or decision trees to generate a spanning set of scenarios.

Figure 6A:
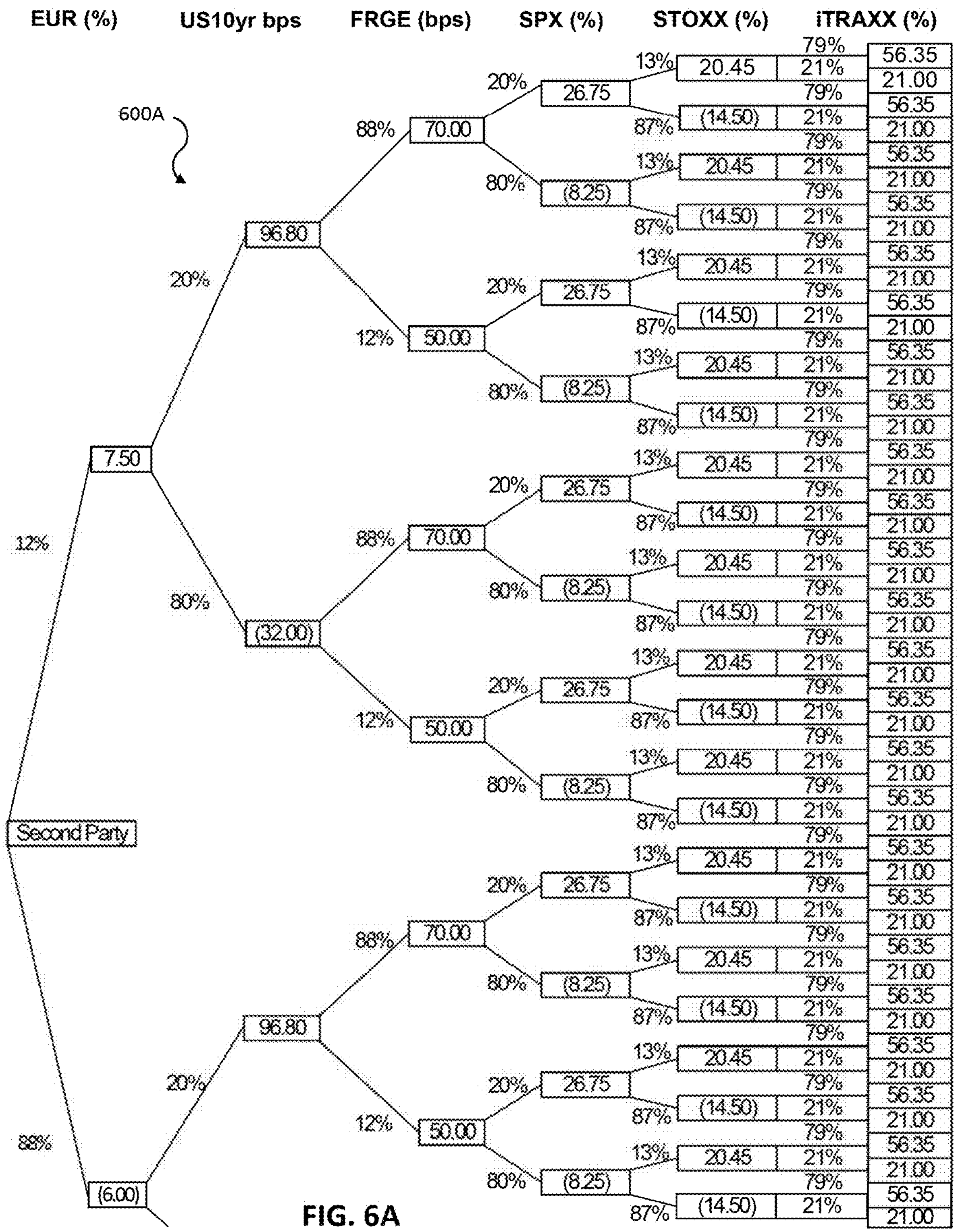
FIGS. 6A and 6B illustrate a tree structure of possible outcome scenarios for an event according to some embodiments.
Figure 6B:
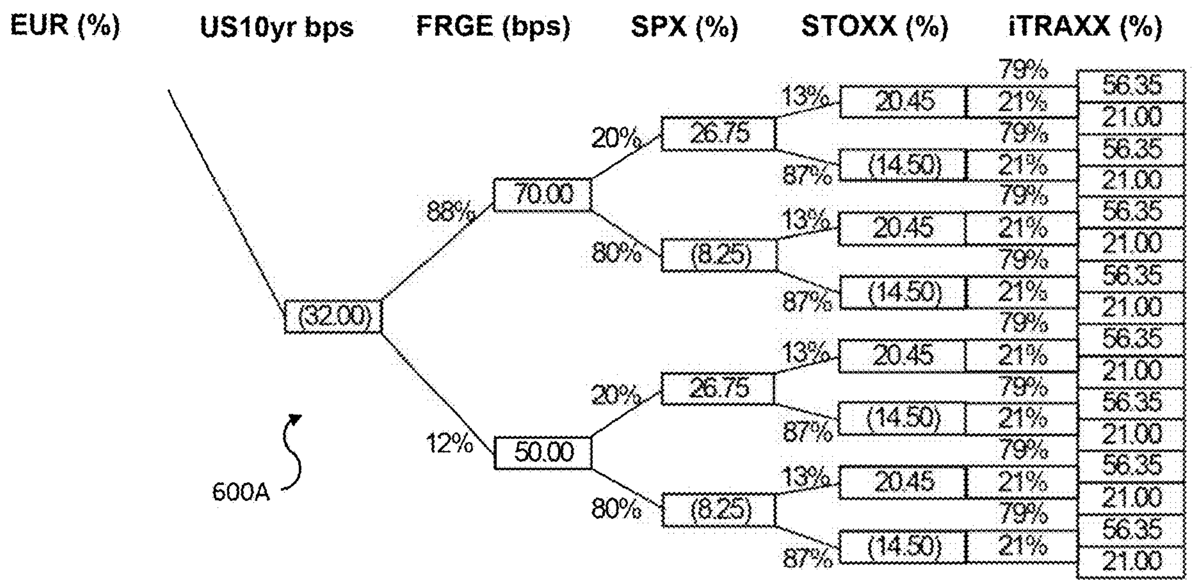

FIGS. 6A and 6B illustrate a tree structure 600A of possible outcome scenarios for an event according to some embodiments. The root of the tree corresponds to an event node. The event node has a child node for each outcome which can also be referred to as an outcome node. The children of the outcome nodes represent macro factor nodes. Each outcome node can be the root of the subtree of macro factor nodes linked to that outcome. A path from the outcome node to a leaf node represents a scenario where each macro factor node has a corresponding data value. The data values are also referred to a shock values herein. An edge between nodes represents a probability of traversing from the parent node to the child node. Accordingly, the probability of a scenario can be represented using the edges between the nodes of the scenario path. The data values and the probabilities can be calculated by system 100 using the response to pull questions. System 100 can update the data values probabilities in real time in response to receiving updated responses to pull questions. Accordingly system 100 operates continuously and in real time to ensure the tree structure includes an up-to-date representation of data values and probabilities.

Each outcome node of the tree defines a subtree of 2n paths of macro factor nodes, each path corresponding to a scenario. In this example, there are three subtrees, one for each possibility or outcome of the event: first, second, and third parties winning. Each subtree has 2n paths, where n=6 is the number of macro factors affected by the election results. Each path through the tree corresponds to a scenario.

Figure 6C:
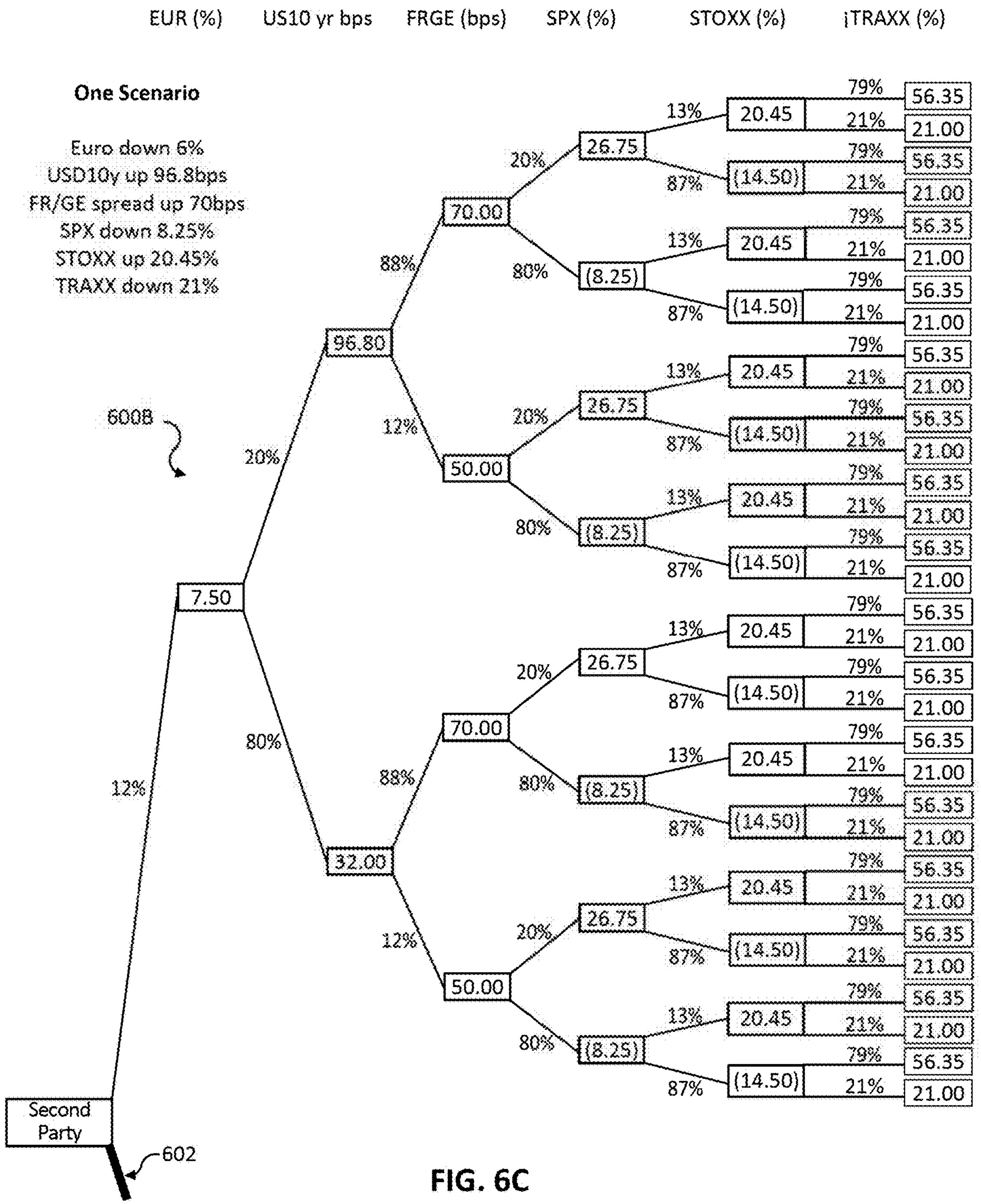
FIGS. 6C and 6D illustrate a tree structure of possible outcome scenarios when a second party wins according to some embodiments including an example scenario path.
Figure 6D:
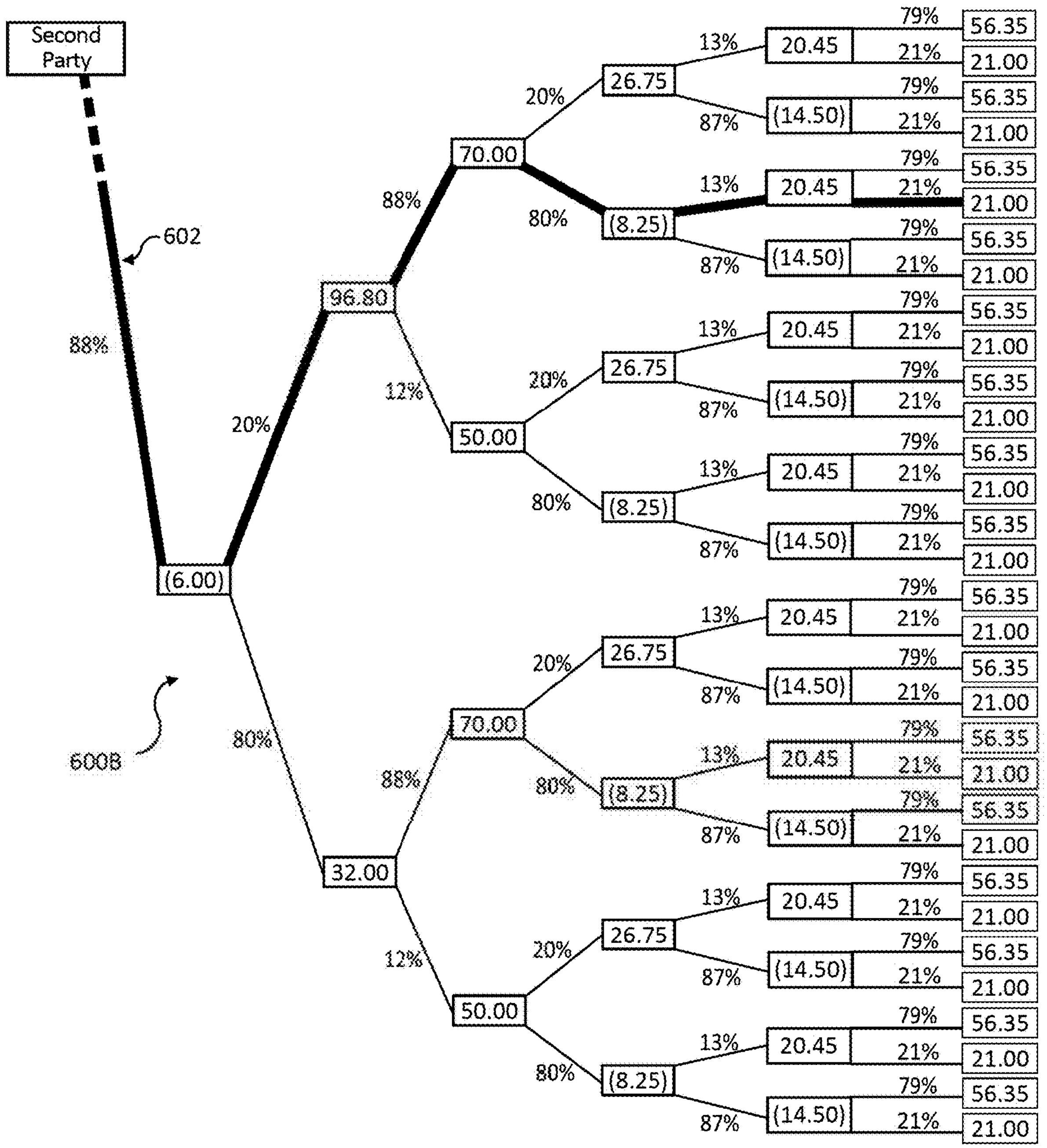

FIGS. 6C and 6D illustrate a tree structure 600B of possible outcome scenarios when a second party wins according to some embodiments including an example scenario path 602. The scenario shown relates to a particular outcome of when a second party wins. As noted each edge between a parent node and a child node in the scenario path corresponds to a probability of traversing from the parent node to the child node in the path 602. In this example there are six macro factors and 64 scenario paths. The path 602 corresponds to the EUR factor going down by 6%, the 10 year USD swaps factor going by 96.8 bps, the France/Germany spread going by 70 bps, the SPX going down by 8.25%, the STOXX factor going by 20.45%, and the TRAXX factor going down by 21%.

Figure 6E:
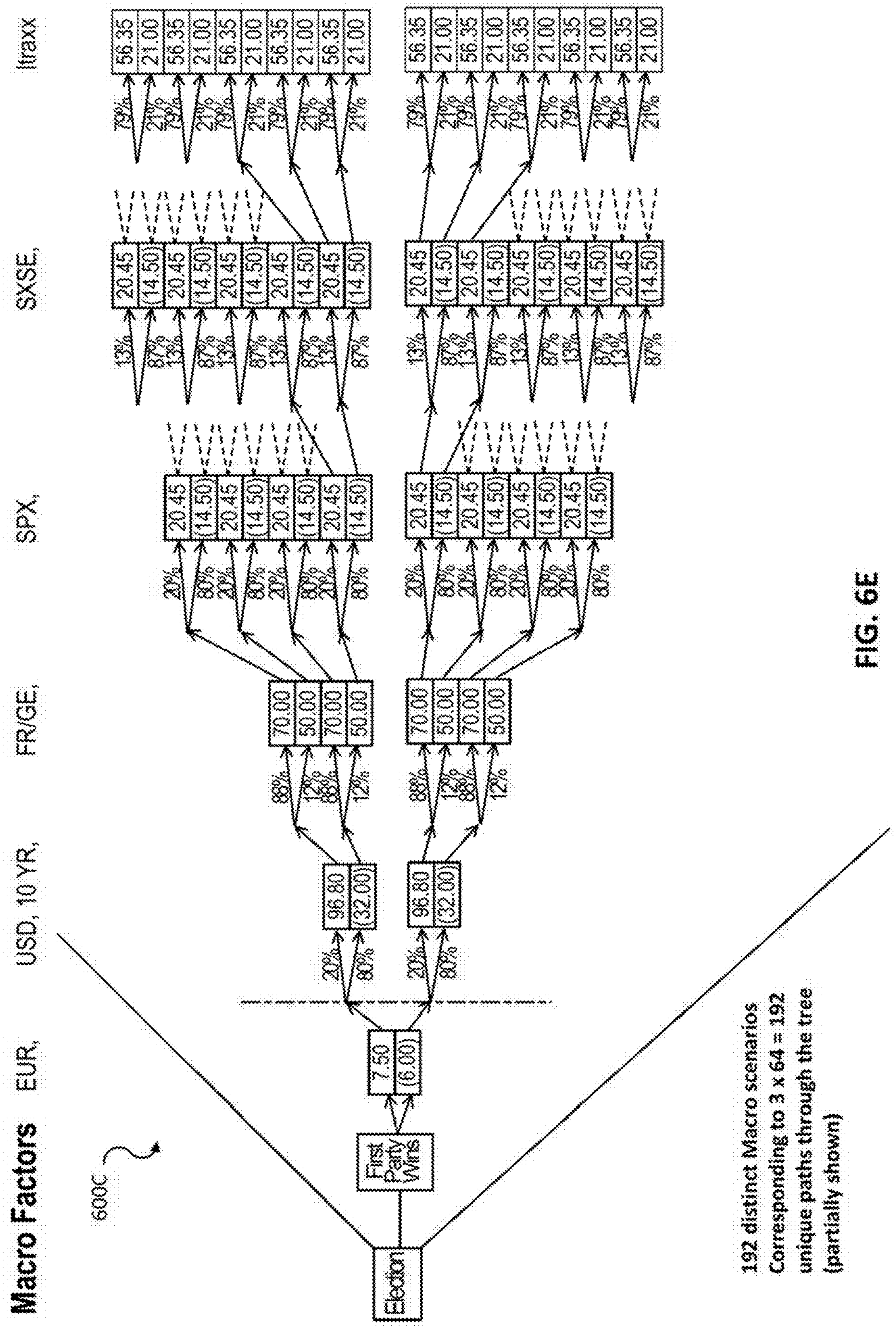
FIGS. 6E, 6F, and 6G illustrate a tree structure of possible outcome scenarios for an event according to some embodiments.
Figure 6F:
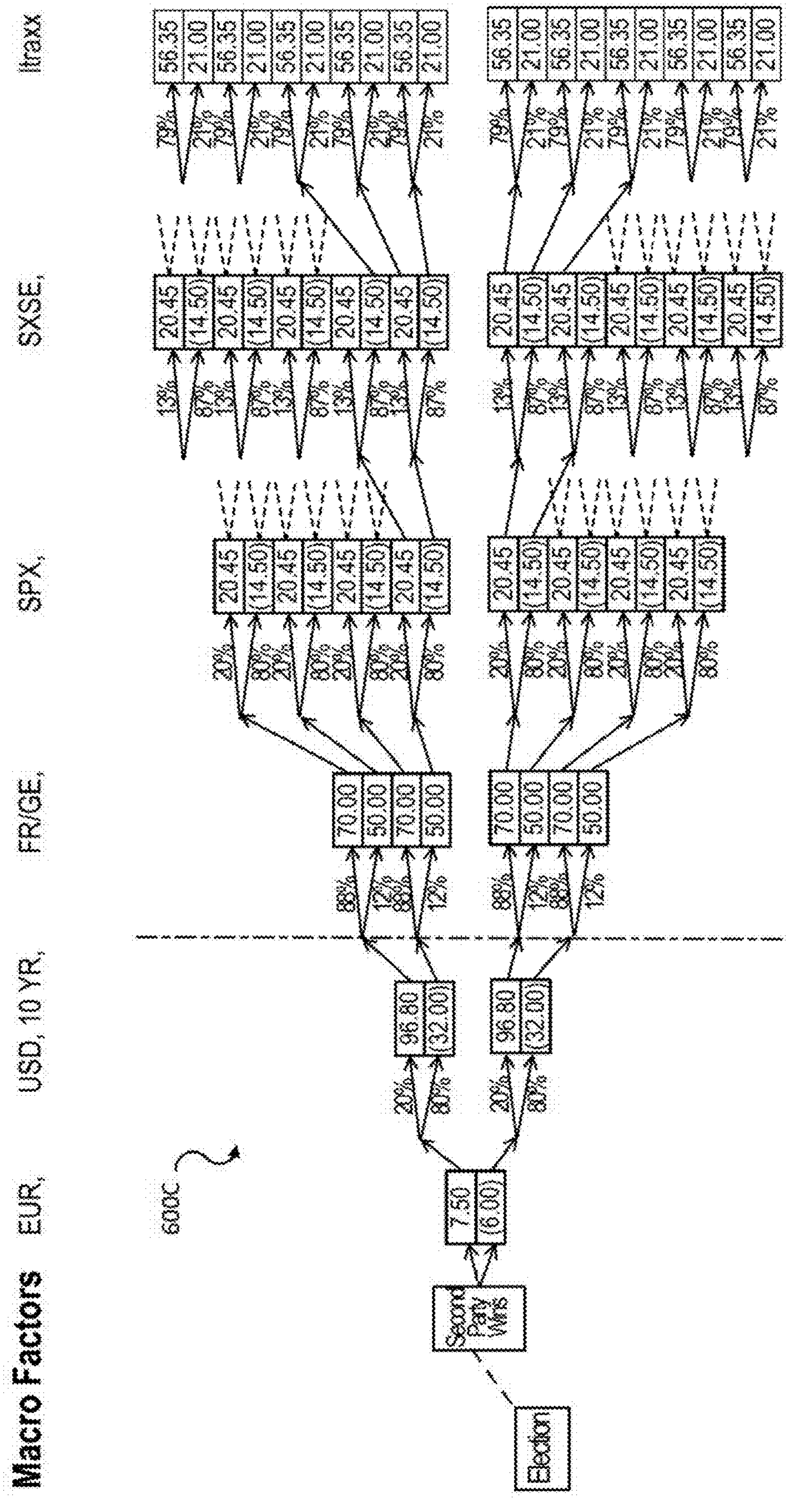
Figure 6G:
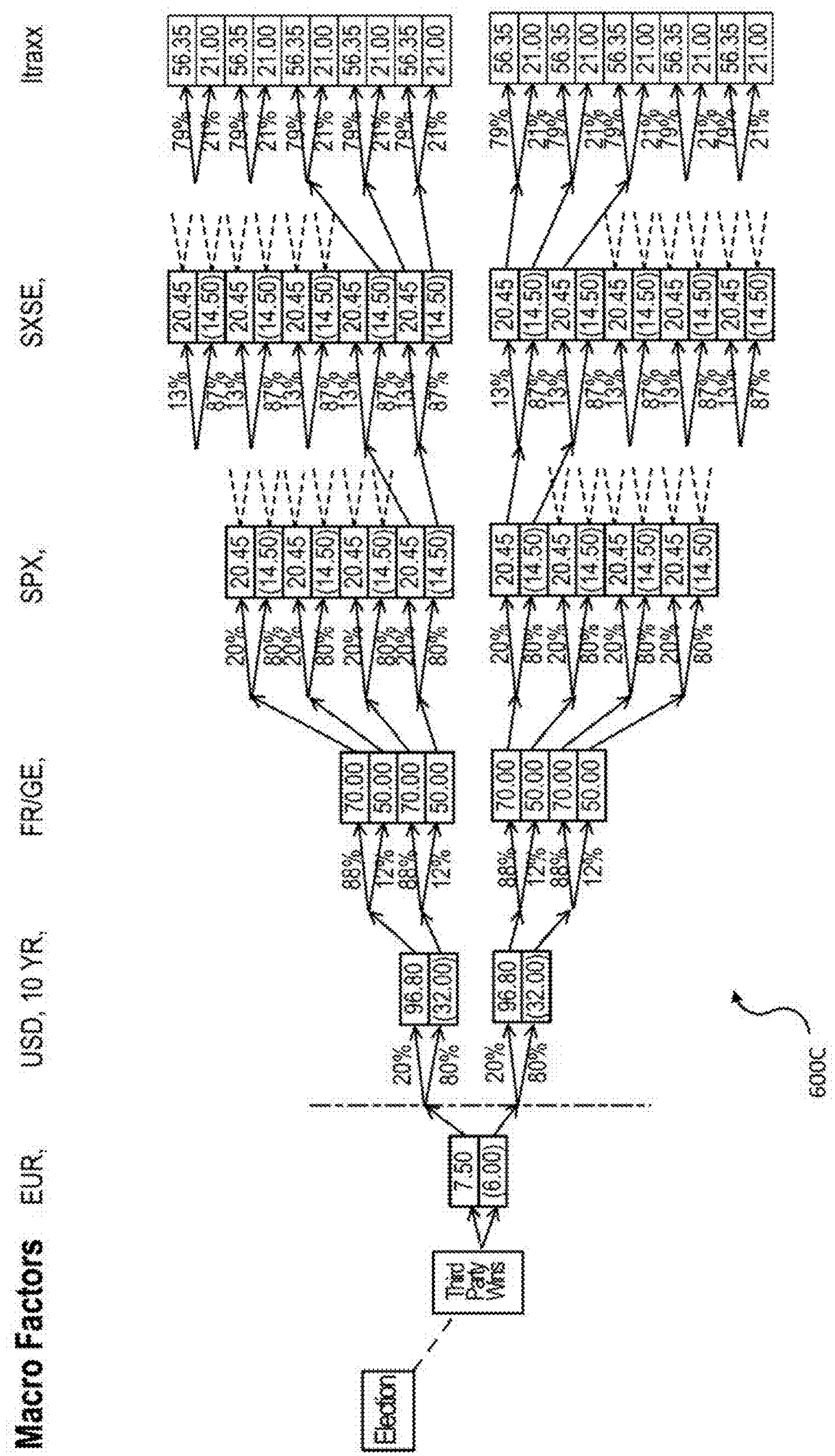

FIGS. 6E, 6F, and 6G illustrate a tree structure 600C of possible outcome scenarios for an event according to some embodiments. Outcomes spanning the entirety of outcomes are generated, showing a portion of the 192 possible scenarios.

System 100 generates a tree data storage structure representing scenarios for the macro factors and the outcomes. The tree has different nodes, each node in the tree structure defining a descriptor and a data value. The tree structure has an event node corresponding to a root node (an election). The outcome nodes correspond to children of the root nodes.

The macro factor nodes correspond to further children of the outcome nodes. Each macro factor node has a data value. Each outcome node of the tree defines a subtree of 2n paths of macro factor nodes, each path corresponding to a scenario. In this example, there are three subtrees, one for each possibility or outcome of the event: first, second, and third parties winning. Each subtree has 2n paths, where n=6 is the number of macro factors affected by the election results. Each path through the tree corresponds to a scenario.

Figure 7A:
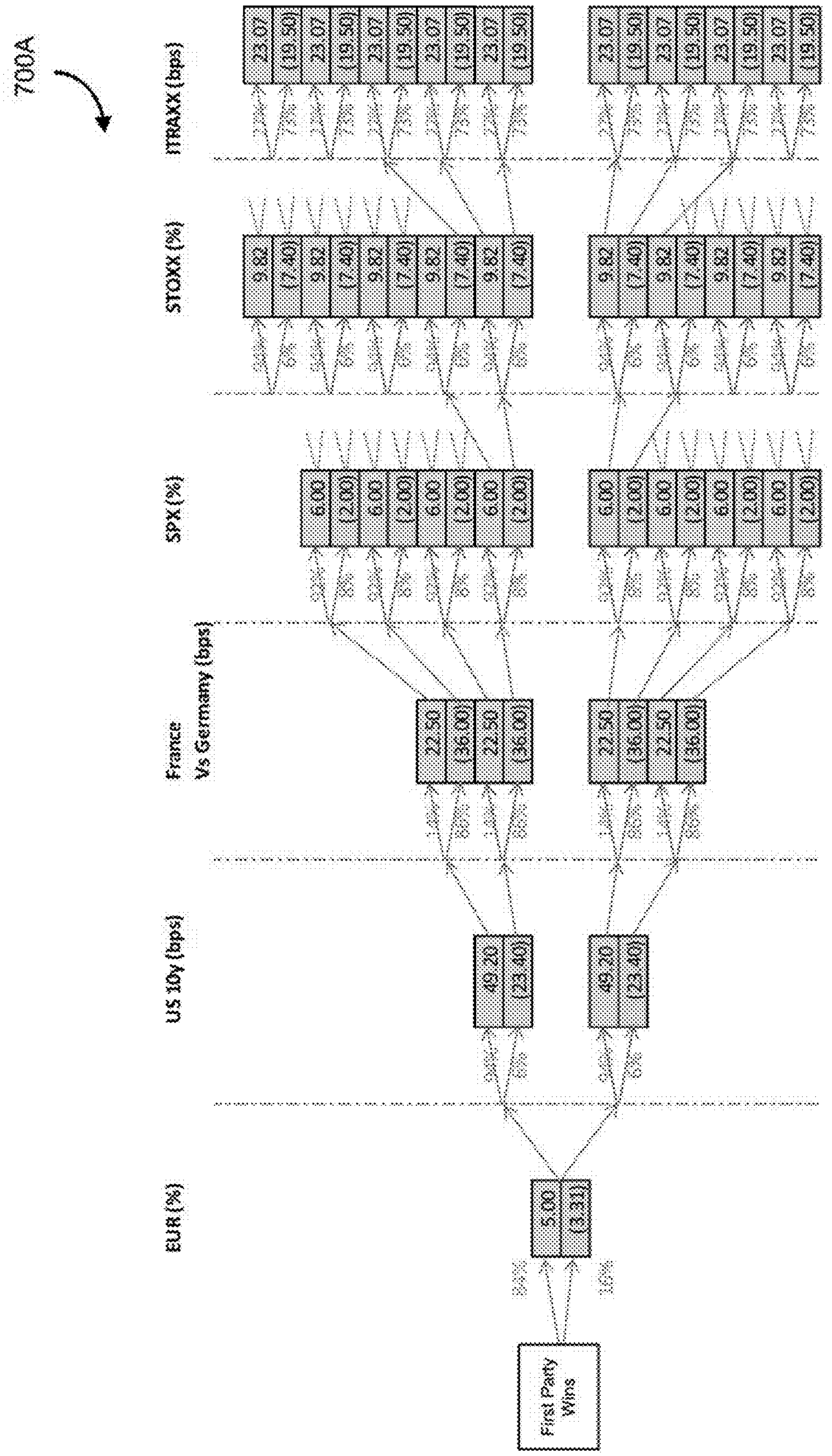
FIG. 7A illustrates a subtree of possible outcome scenarios for an event according to some embodiments.

FIG. 7A illustrates a subtree 700A of possible outcome scenarios for an event according to some embodiments. This shows in greater detail, potential effects on macro factors in accordance with a simulated victory in an election by a first party. Traversing through the tree, potential outcomes can be considered through each path. Each complete path considers upward or downward movement of each of the macro factors. The subtree for the outcome node defines 2n paths of macro factor nodes, each path corresponding to a scenario, and in this case there are a total of 26 possible paths.

Figure 7B:
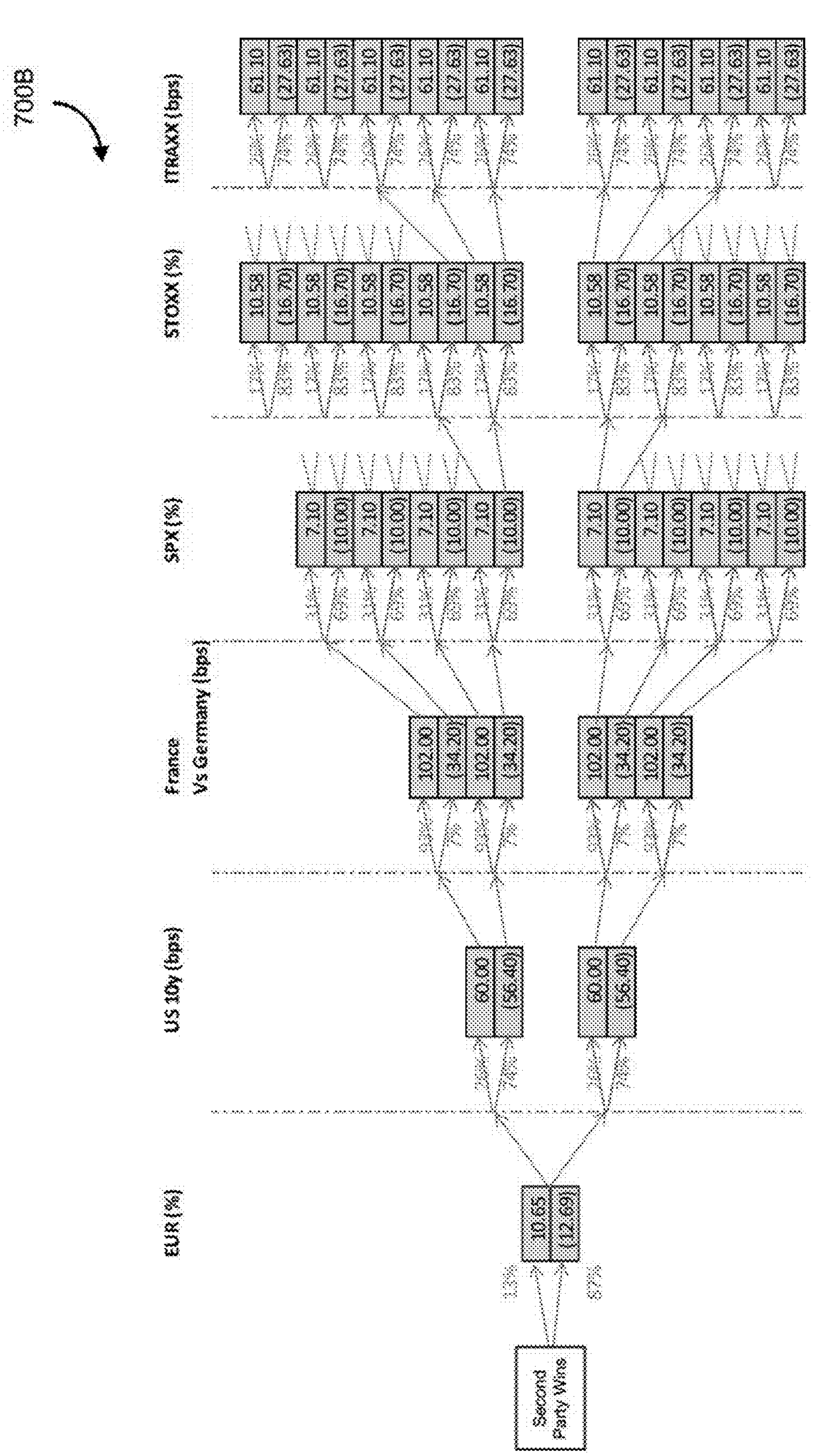
FIG. 7B illustrates a subtree of possible outcome scenarios for an event, according to some embodiments.

FIG. 7B illustrates a subtree 700B of possible outcome scenarios for an event, according to some embodiments. This shows in greater detail, potential effects on macro factors in accordance with a simulated victory in an election by the second party. The subtree 700B illustrates, in greater detail, potential effects on macro factors in accordance with a simulated victory in the election (event node) by the second party (outcome node). In comparison with FIG. 7A, it can be noted that the probabilities and the magnitude of shocks has changed. For a second party victory, there may be greater volatility that leads to corresponding increases in upside potential and downside risk.

Figure 7C:
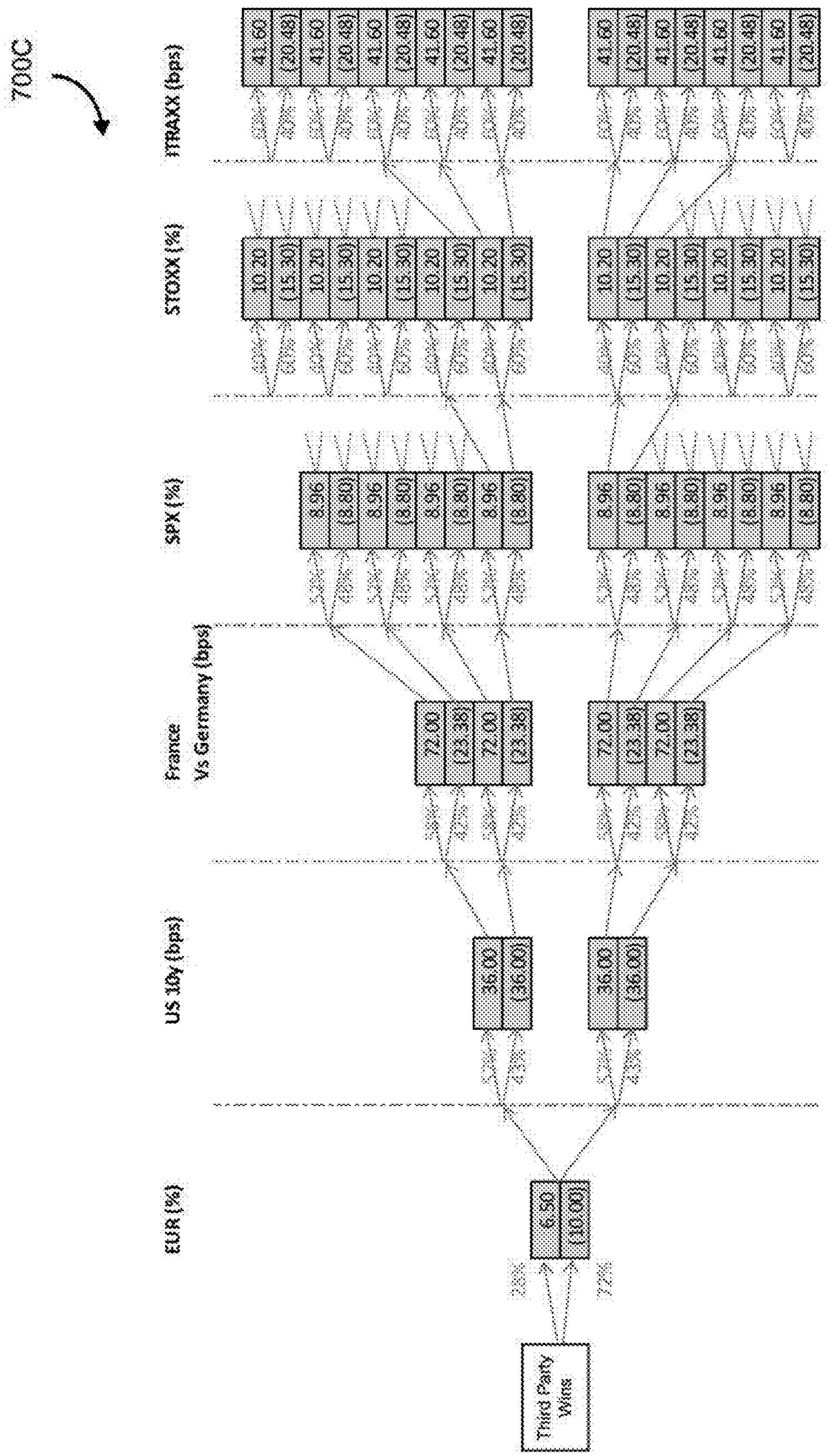
FIG. 7C illustrates a subtree of possible outcome scenarios for an event according to some embodiments.

FIG. 7C illustrates a subtree 700C of possible outcome scenarios for an event according to some embodiments. This shows in greater detail, potential effects on macro factors in accordance with a simulated victory in an election by a third party. The combination of FIGS. 7A, 7B, and 7C allow for the analysis of the entirety of an election.

When independence of the financial factors may be assumed the probability of a scenario can be represented as the product of the probabilities along the path. The probabilities of up and down moves and the size of the moves will be different in each subtree when actual data is used. This tree is for illustrative purposes only. The numbers shown are not necessarily indicative of the actual numbers that would be generated in a real application of this methodology.

Consider the tree structure shown in FIG. 6 derived for the event of an election. This example includes six macro factors that are affected whenever one of the candidate's win. There are 26 possible scenario paths for each possible win, making 3×26 possible scenario paths in total. That is 192 possible paths or 192 possible scenarios.

The example trees in FIGS. 6A, 6B, 6C are examples of a tree or network that system 100 can use to automatically generate scenarios based on the information obtained on the market's views of possible moves that the macro risk factors might experience, conditioned on this event. A scenario is a single path of nodes through the tree (see FIG. 6B). The hierarchical tree structure has a root value and subtrees of children with a parent node, represented as a set of linked nodes. The path may be nodes from the root node (or root node of the subtree) to a leaf node (a node with no children). The tree or network could be more complicated than the simple example depicted above for example a Bayesian Network that is continually updated with new information as the responses to the polled questions change with changing news. The probabilities of the macro scenarios occurring in the simplest case, where all the macro risk factors are independent, is simply the product of the probabilities along the path. In more complicated networks (trees) the order of the risk factors as they appear in the tree is important and we need to consider correlations between factors and the correlations themselves will be changing from day to day. Accordingly, system 100 is operable to continuously and in real-time transmit poll questions, receive response data to the poll questions, and dynamically update the data values of the nodes of the tree structure. For the purposes of simplifying the exposition, we can assume independence and that the order is unimportant in calculating the over probability for a scenario. However, in some embodiments there will be correlations and dependencies between macro factors.

Figure 8:
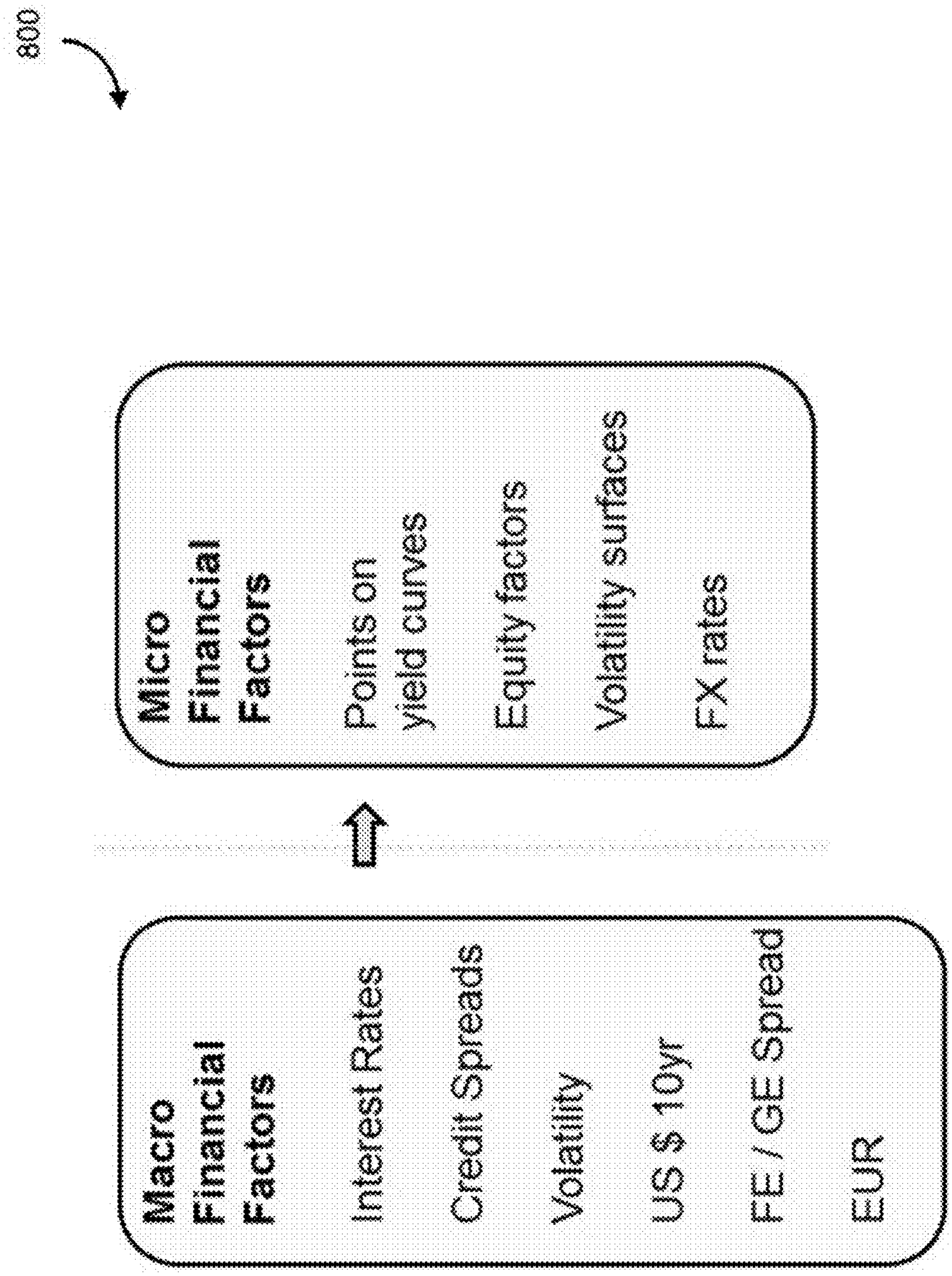
FIG. 8 illustrates a flowchart of macro factors leading to changes in micro factors according to some embodiments.

System 100 is operable to generate micro factors shocks from the macro factor scenarios. FIG. 8 illustrates a flowchart of macro factors leading to changes in micro factors, according to some embodiments. These shifts can be noted, for example, in FIGS. 5E-5G. In FIGS. 5E-5G, linkages are provided to illustrate that shifts in a macro factor (e.g., 10 year U.S. swaps, EUR currency value, ITRAXX, and ESTOXX index values) may cause corresponding micro factor shifts. These micro factor shifts can be utilized in re-assessing portfolio asset values in view of the set of probabilistic paths that may arise as a result of the event outcome.

Figure 9:
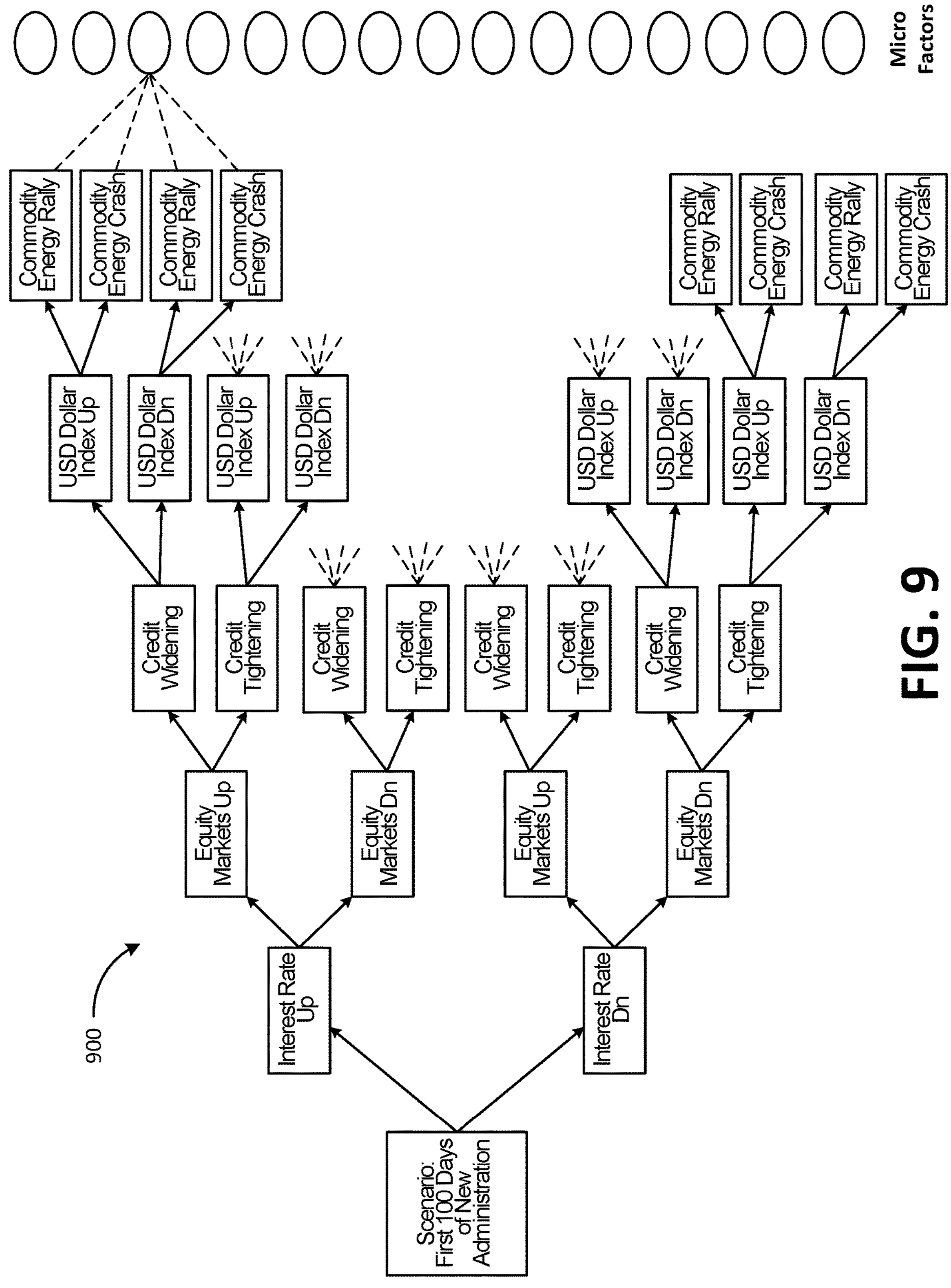
FIG. 9 illustrates a tree of interrelationships between factors according to some embodiments.

FIG. 9 illustrates a tree 900 of interrelationships between factors according to some embodiments. FIG. 9 is an example of a different scenario, one where the specific election campaign is being considered. FIG. 9 depicts the complexity that could be present in a financial system and a more complex example where there are many more macro factors being analyzed, leading to further more linked micro factors.

The leaf nodes in the tree correspond to a particular macro scenario which is a combination of all the macro-factors that appear along the path. System 100 then is configured to convert these macro-factor shocks into micro-factor shocks that can be used to value their effect on portfolios. This may be achieved automatically. For example, this can done using conditional expectations.

In summary, once the principal event has been defined, the macro risk factors can be generated using a machine learning unit 120 and expert input(s) 102. The macro scenarios are then generated by combining machine learning rules, and an automated poll of a large number of independent experts, with a financial network or, in an example form, a decision tree. The contribution of this method is the marrying of automated expert system with machine learning to develop a scenario tree (network) with macro to micro factor conversion, to create a fully automated scenario generation system. The only input to this system is the data feeds for detecting the event to be studied.

System 100 generates a spanning set. By construction, in the example tree in FIG. 6, for every move in a factor the system 100 also considers a counter move. The paths are all possible combinations of these macro shocks. There are 2n paths, where n is the number of macro variables in the subset detected for the event. Assuming that the system 100 has not omitted a factor that is important, then the system 100 will span the range of possible macro shocks that need to be considered. So, without knowing the contents of the portfolio the system 100 can catch both upside and downside moves in any portfolio. It is true however, that for highly nonlinear portfolios system 100 would have to have a very fine grained set of possible shocks and factors to catch all possibilities (consider a portfolio of binary options and the difficulty of catching the precisely points/combinations that result in the binary options being exercised).

System 100 brings together machine learning and polling with a network model for scenario generation. System 100 automatically generates scenarios from non-financial or financial macro events that can be used to value portfolios. The set of scenarios generated also satisfies some important properties which makes them particularly useful in stress testing and general risk management. They span the range of possibilities for stressing a portfolio without a priori knowledge of the positions in the portfolio. The system 100 can catch the black swans that could result in devastating losses.

Figure 10:
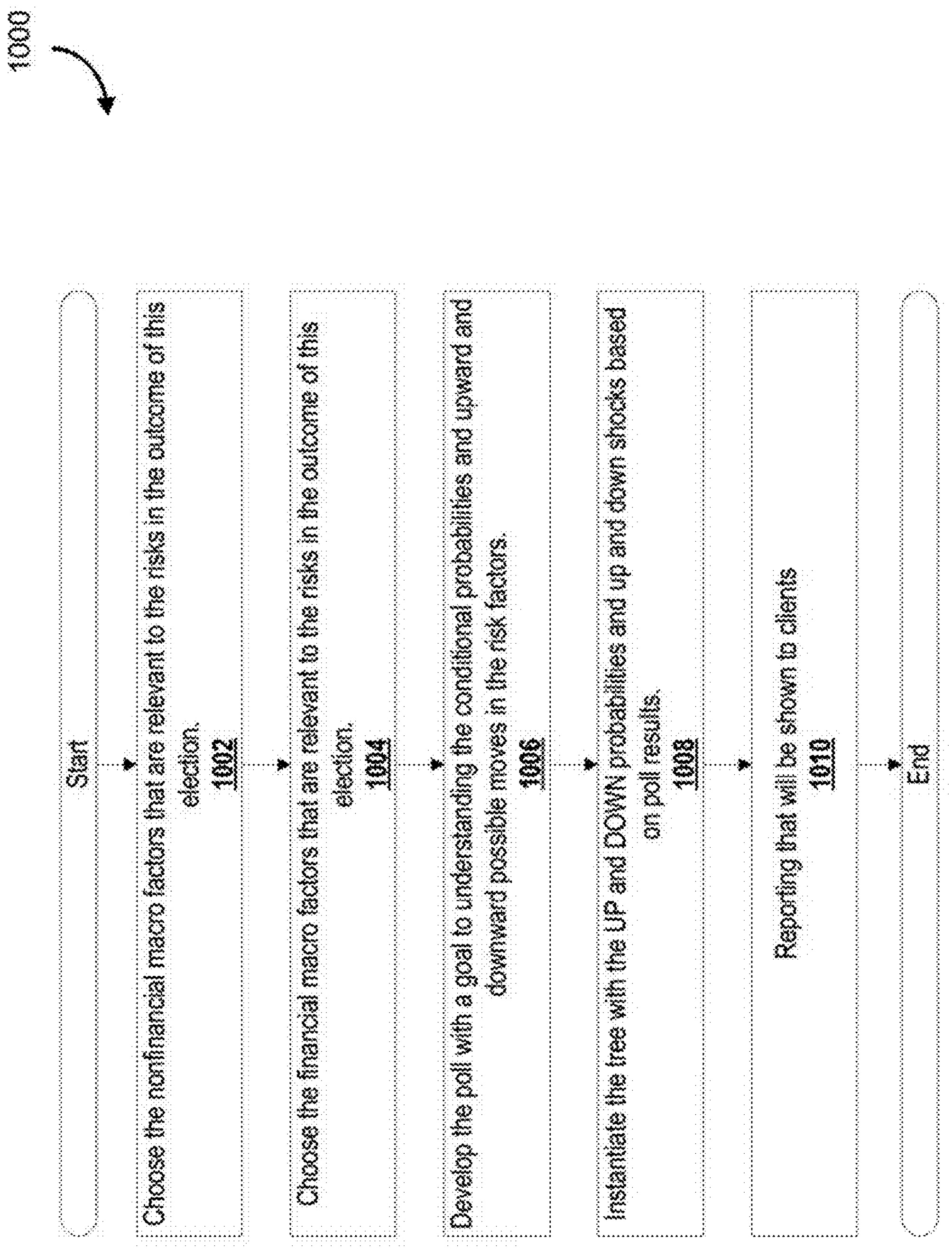
FIG. 10 illustrates a process for generating a scenario model according to some embodiments.

FIG. 10 illustrates a process 1000 for generating a scenario model, according to some embodiments.

Generating a scenario model may include, at 1002, the selecting non-financial macro factors that are relevant to the risks in relation to an event (e.g., the election). In the example of an election, these may include wins by first, second, and third parties.

At 1004, the system 100 is configured to select the macro factors that are relevant to the risks in the outcome of this election. In some embodiments, machine learning unit 120 automatically identifies the financial macro factors based on an analysis of corpuses of similar data (e.g., which measures were most affected by past elections). In this example, the macro factors may include foreign exchange rates for the EUR, rates that include: French/German spreads, the value of 10 year U.S. treasuries, equity indices such as the S&P500®, Stoxx50E®, and/or credit indices such as the ITRAXX.

At 1006, the system 100 is configured to develop the poll designed for incorporating an understanding of the conditional probabilities and upward and downward possible moves in the risk factors. These conditional probabilities, and upward/downward magnitude of moves may, in some embodiments, be selected automatically by machine learning unit 120 or designated by way of information polled from various experts. The experts may indicate the level of "shock" and the probability of "shock" associated with each of the macro factors, and/or which macro factors are most likely to be impacted by the event. Given new information that may be obtained, data points collected above may change (e.g., from week to week).

At 1008, the system 100 by way of scenario generation unit 124 instantiates the tree data structure with the up and down probabilities and up and down shocks based on poll results. Various market models can be used to derive corresponding micro shocks, and in some embodiments, the value of the portfolio under different scenarios can be priced based on a combination of the macro and micro factors, and their related "shocks".

At 1010, various reports and interfaces can be generated for provisioning to end users (e.g., client, traders, portfolio managers), and in some embodiments, instructions are automatically sent for processing (e.g., to automatically initiate a trade or other transaction).

Dynamically Rendered Interfaces

FIGS. 11-30 illustrate example screenshots of a user interface according to some embodiments.

Figure 11:
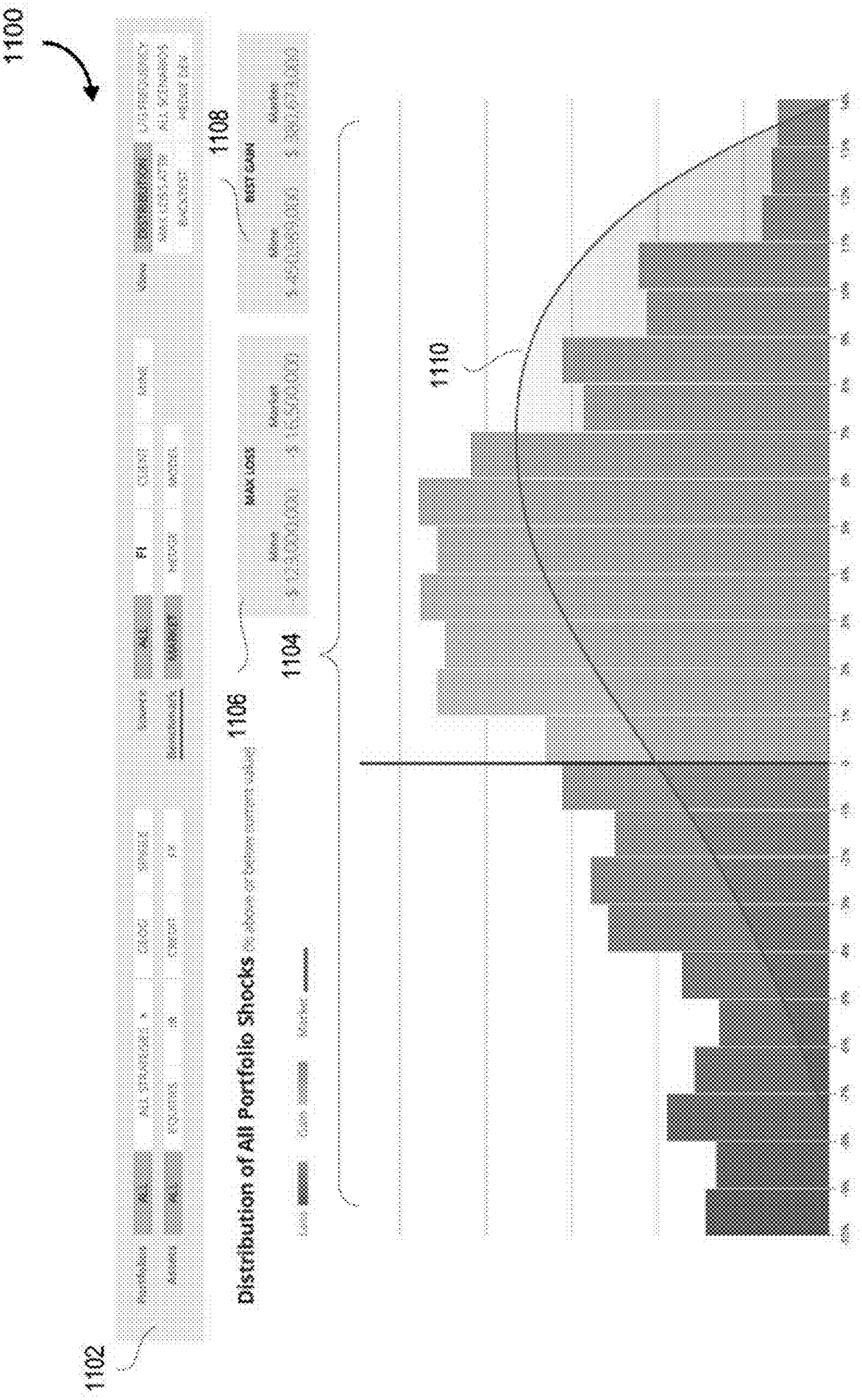
FIGS. 11-30 illustrate example screenshots of a user interface according to some embodiments.

FIG. 11 illustrates an interface screen 1100 that is usable to provide a user with a graphical view of the distribution of the portfolio shocks (e.g., the % change in a portfolio above or below a certain value). In FIG. 11, an options bar 1102 is shown having selectable interface elements that can be used, for example, to modify the interface view to switch which portfolios, assets, sources, benchmarks, and view types are applied. For FIG. 11, the view is of all the portfolios, all of the assets, based on all of the data sources, the benchmark is the market, and the view is illustrative of the distribution of portfolio shocks. A histogram 1104 is shown where the entirety of outcomes the spanning set of scenarios is shown (bars ranging from −10% to +14%, and a benchmark reference line is shown that illustrates a benchmark against the market. Visual elements 1106, 1108 are provided illustrating the maximum loss and best gain as it relates to a specific portfolio ("mine"), as compared to the market (as shown via trend line 1110.

Figure 12:
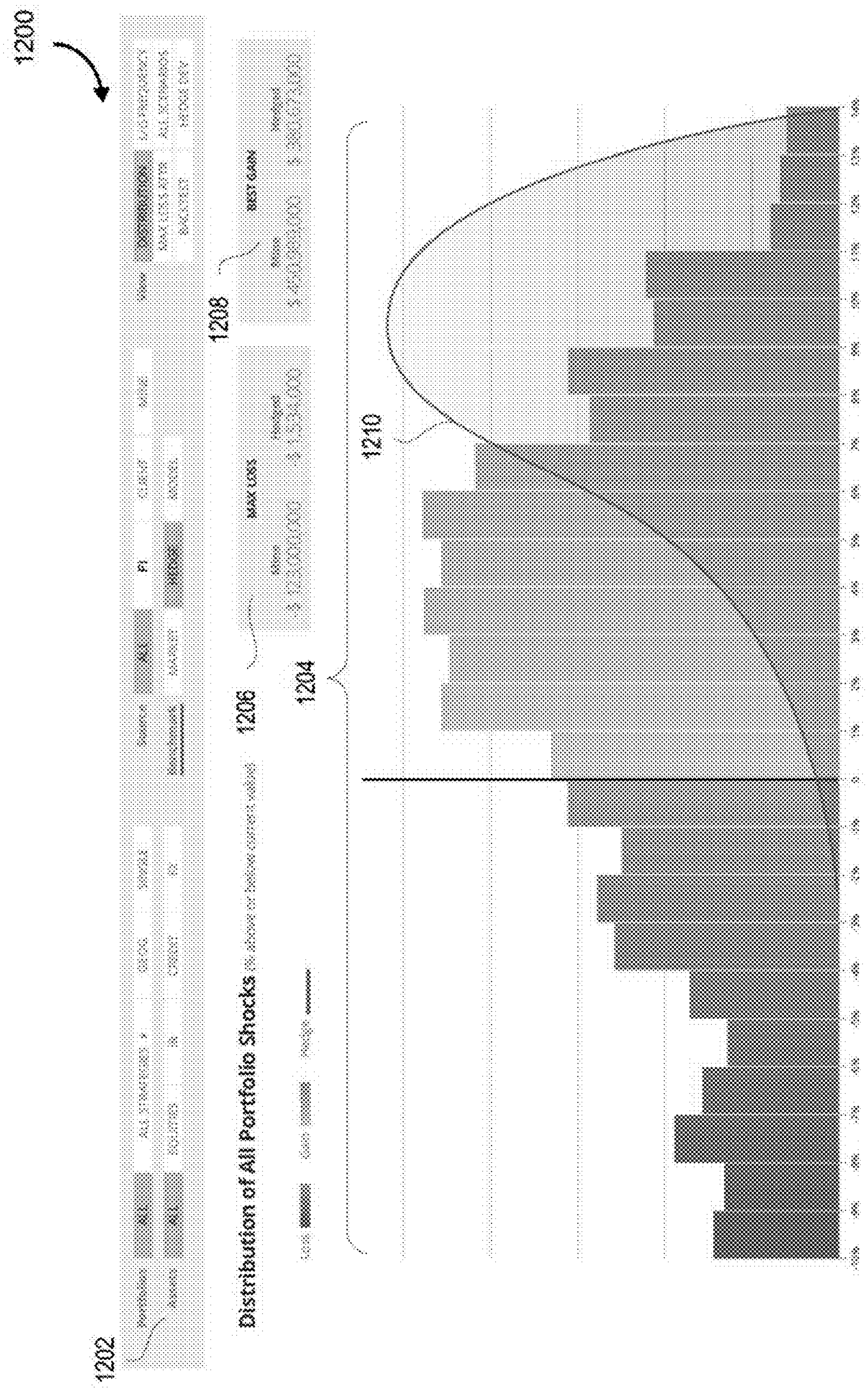

FIG. 12 illustrates an interface screen 1200 that is usable to provide a user with a graphical view of the distribution of the portfolio shocks (e.g., the % change in a portfolio above or below a certain value). In the example of FIG. 12, the benchmark is selected as hedge and the benchmark line, relative to FIG. 11. Similarly, in FIG. 12, an options bar 1202 is shown having selectable interface elements. For FIG. 12, the view is of all the portfolios, all of the assets, based on all of the data sources, the benchmark is the hedge (e.g., a hedged version of the market), and the view is illustrative of the distribution of portfolio shocks. A bar graph 1204 is shown where the entirety of outcomes the spanning set of scenarios is shown (bars ranging from −10% to +14%), and a benchmark reference line is shown that illustrates a benchmark against the hedged market. Visual elements 1206, 1208 are provided illustrating the maximum loss and best gain as it relates to a specific portfolio ("mine"), as compared to the hedge (as indicated by trend line 1210). Notably, in FIG. 12, the maximum loss of the hedge is less than the maximum loss of FIG. 11 (where the benchmark was the market). This reduction of maximum loss is likely due to the reduction of risk of adverse price movements by way of the operation of the hedging mechanism.

Figure 13:
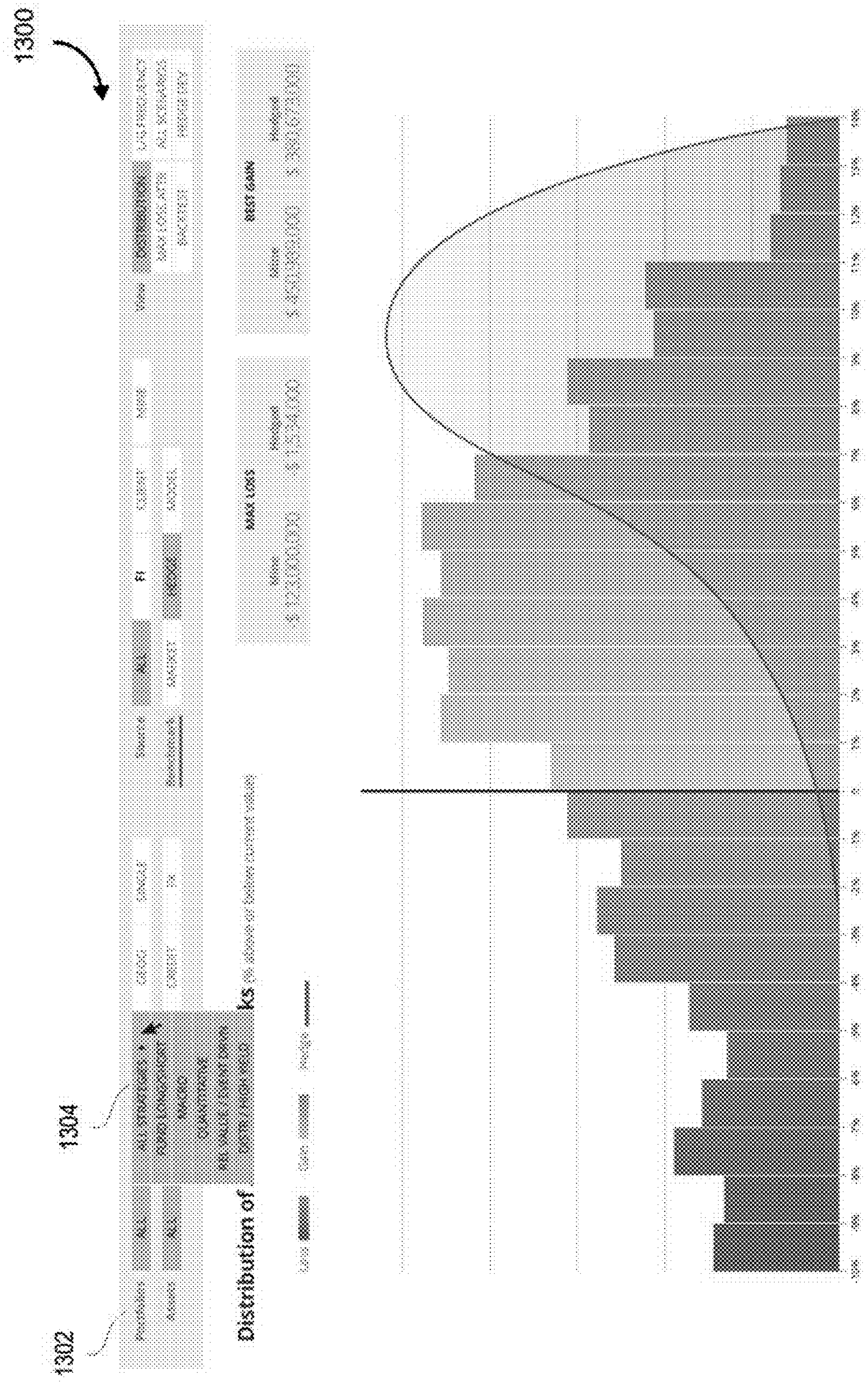

FIG. 13 illustrates an interface screen 1300 similar to the screen FIG. 12, and illustrates an example where the options bar 1302 has been engaged to show a "drop down" menu 1304 where several selectable options for strategies are provided (e.g., fund long/short, macro, quantitative, relative value/event driven, distribution/high yield), etc. These strategies may modify, for example, the makeup of the portfolio assets under analysis.

Figure 14:
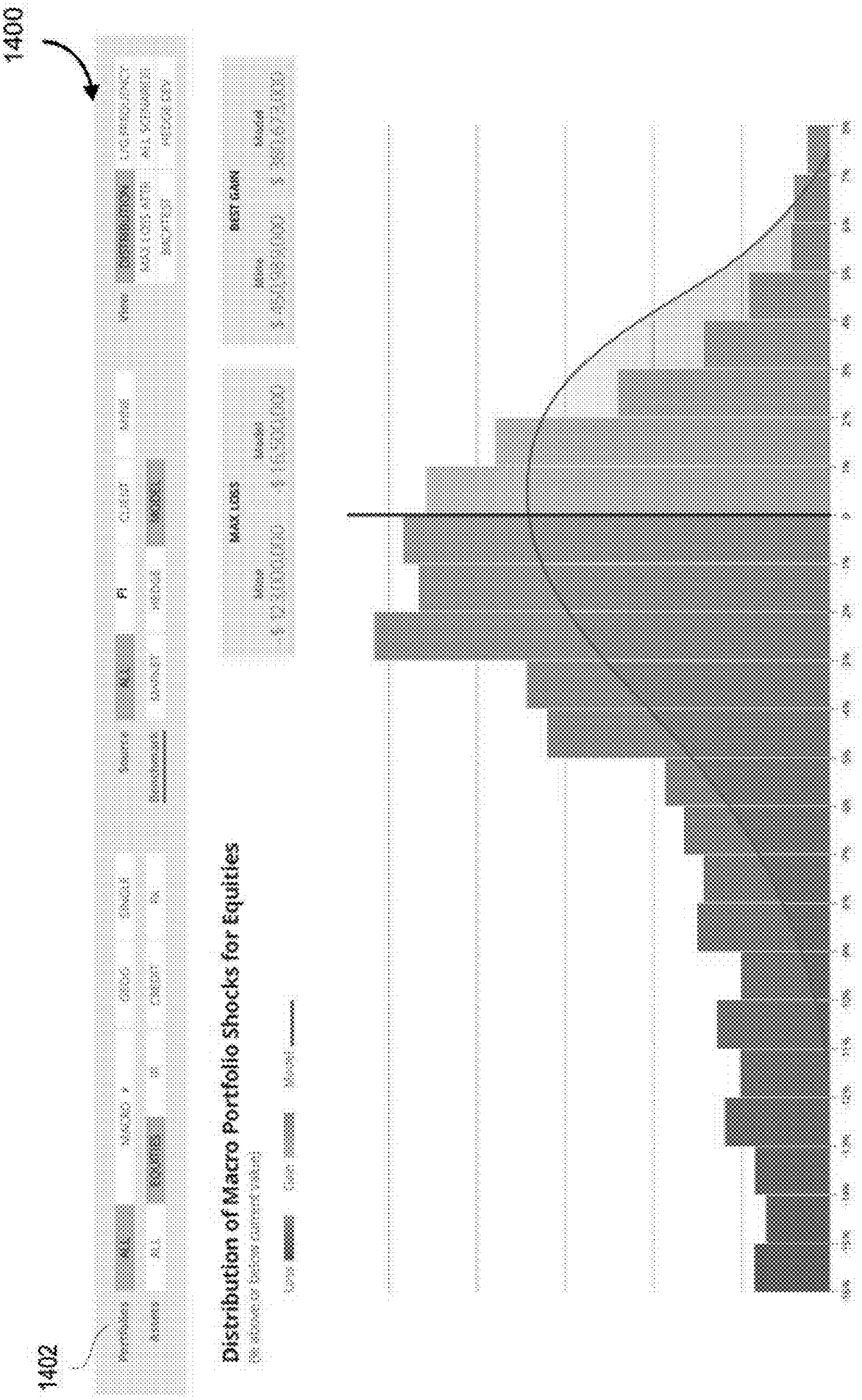

FIG. 14 illustrates an interface screen 1400 similar to the screen FIG. 11, and illustrates an example where the options bar 1402 has been engaged to change the benchmark to model, and the assets under analysis are equities.

Figure 15:
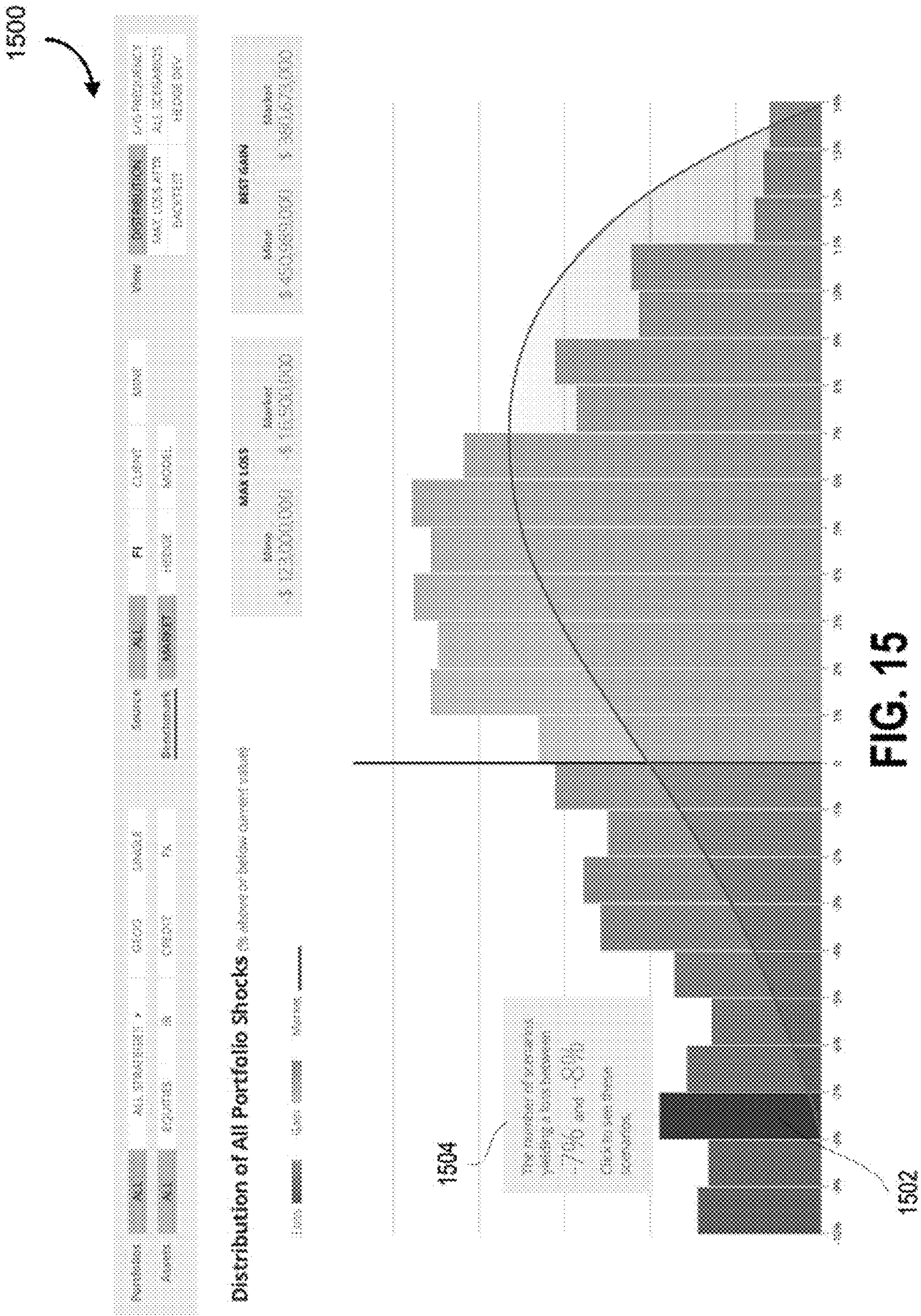

FIG. 15 illustrates an interface screen 1500 similar to the screen FIG. 11, and illustrates an example where a visual element, the distribution interface element 1502, is selected. An annotation 1504 is placed alongside the distribution interface element 1502. In this example, the distribution interface element 1502 relates to scenarios yielding a loss between −7 and −8%, and the annotation 1504 indicates that a user may interact (e.g., click) on the distribution interface element 1502 to view the underlying scenarios.

Figure 16:
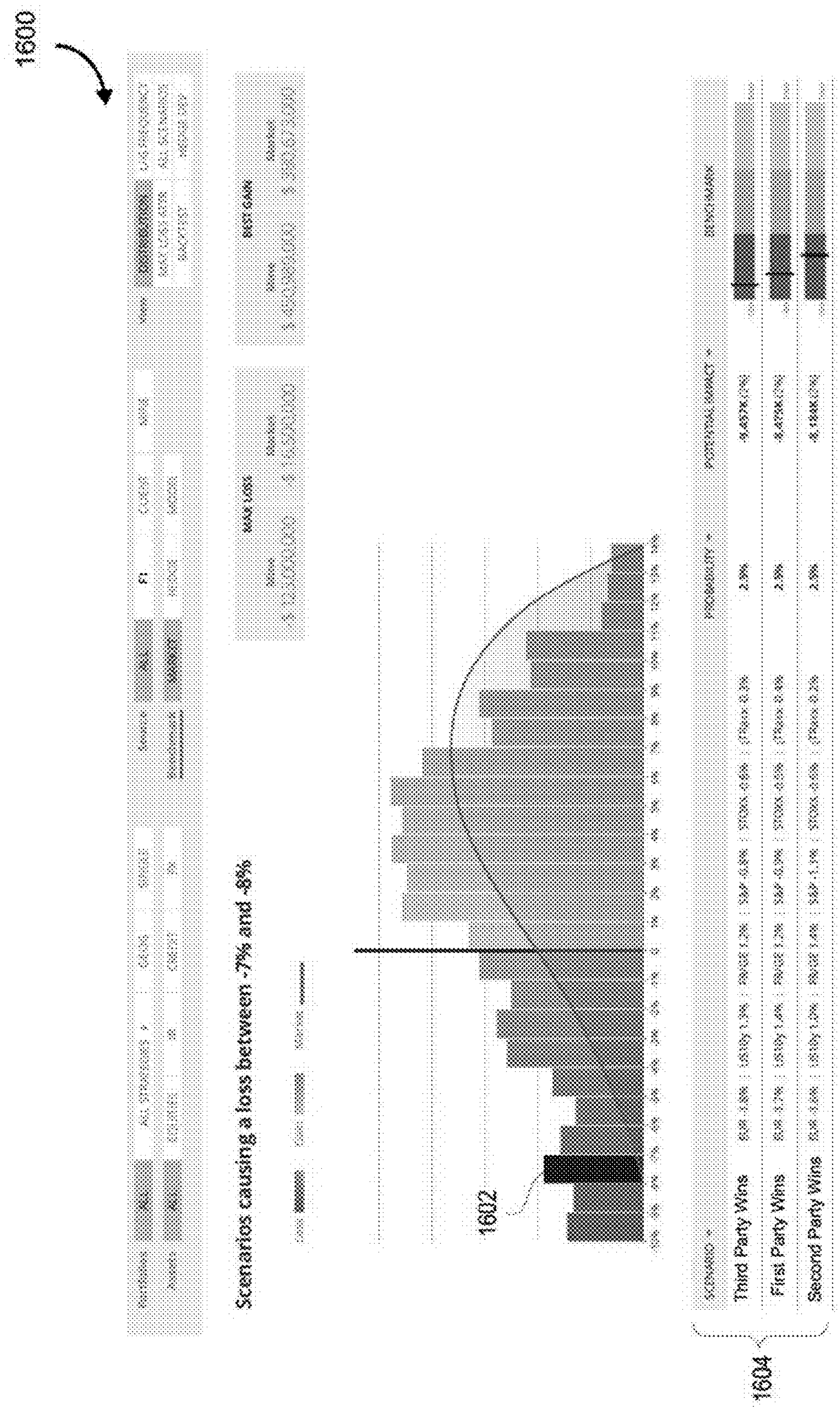

FIG. 16 illustrates an interface screen 1600 similar to the screen FIG. 15, and the distribution interface element 1602 was selected. Responsive to the selection, the interface unit 122 generates a scenario bar 1604 showing the three different scenarios that led to a loss between −7 and −8%, including, for each of the macro factors, the percentage change, the overall probability of the scenario occurring, and the potential impact on the portfolio itself.

Figure 17:
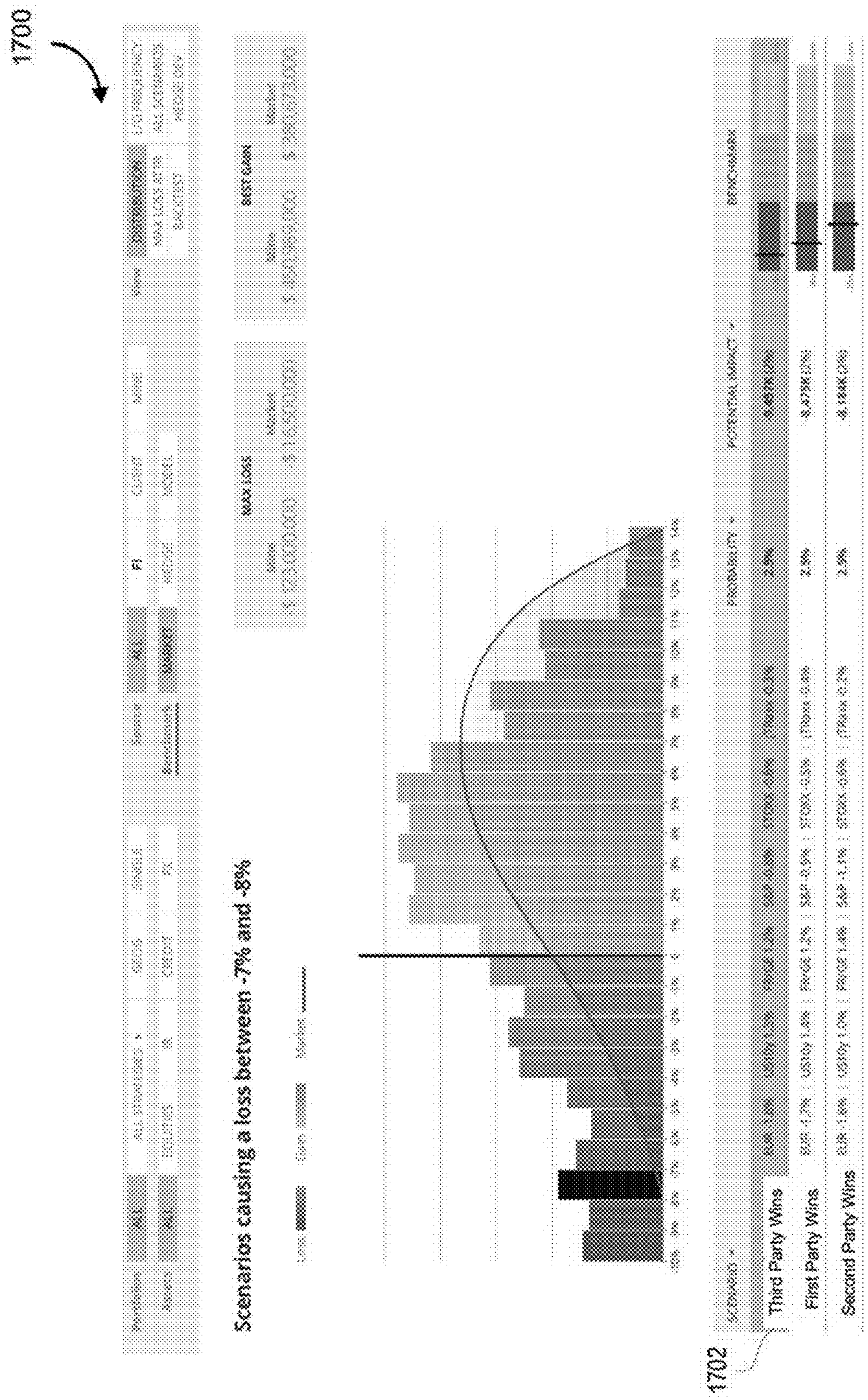

FIG. 17 illustrates an interface screen 1700 similar to the screen FIG. 16, and in this example, the visual element representing the first scenario, a third party wins 1702, has been selected. The selection of 1702 causes the interface to transition to the interface of FIG. 18.

Figure 18:
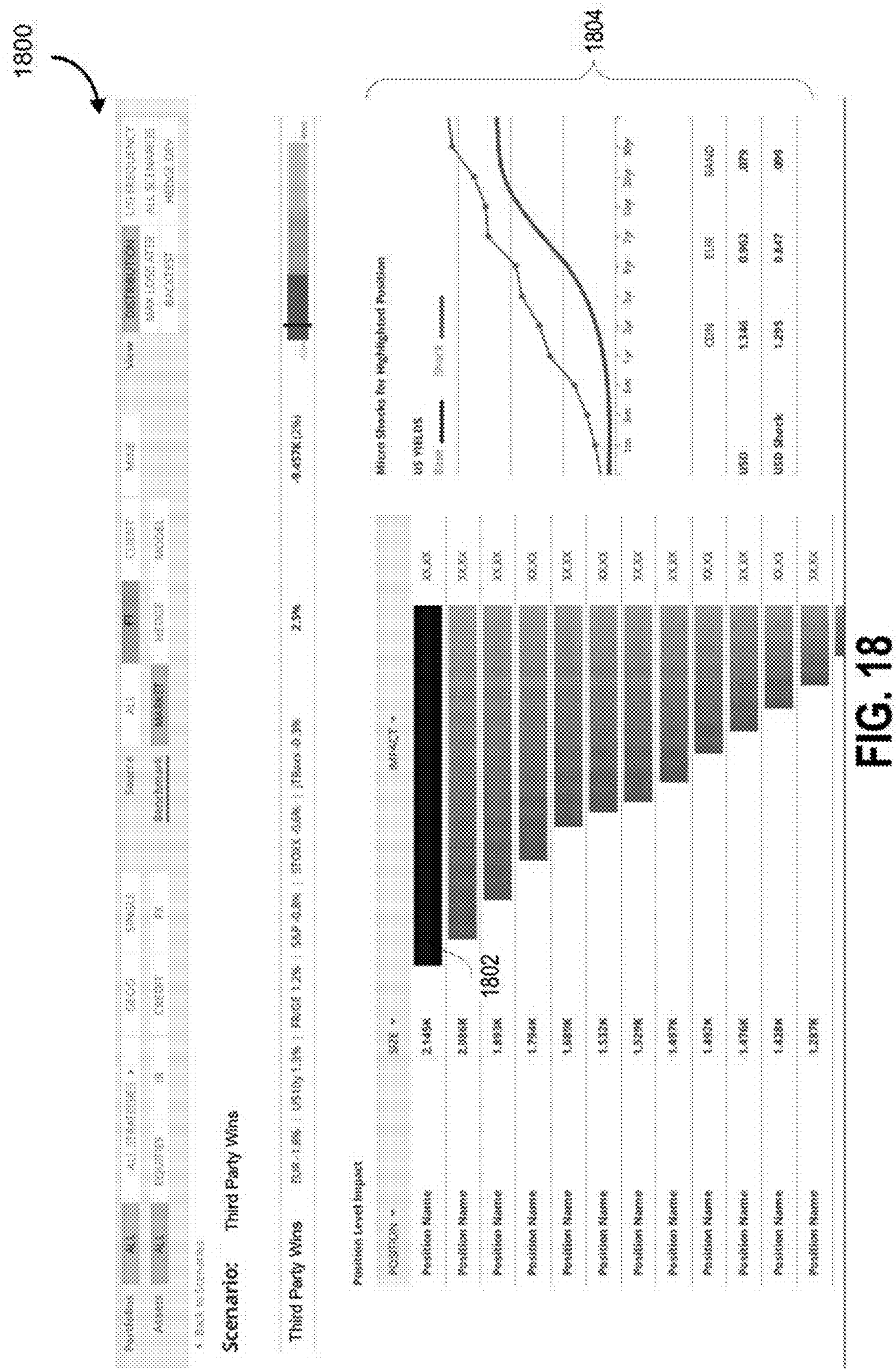

FIG. 18 illustrates an interface screen 1800 where the scenario selected above in relation to FIG. 17 is illustrated in more detail. The interface unit 122 requests a traversal of the tree data structure to obtain a position level impact for each position in the portfolio, and provides a graphical representation of the position level impacts. A position may be selected as shown by selected position 1802, and a widget section 1804 may be rendered to show, for the selected position 1802, specific shock and yield values associated with that position such that a user may more readily understand how the scenario led to the corresponding position impact (e.g., price movements of foreign exchange rates), etc.

Figure 19:
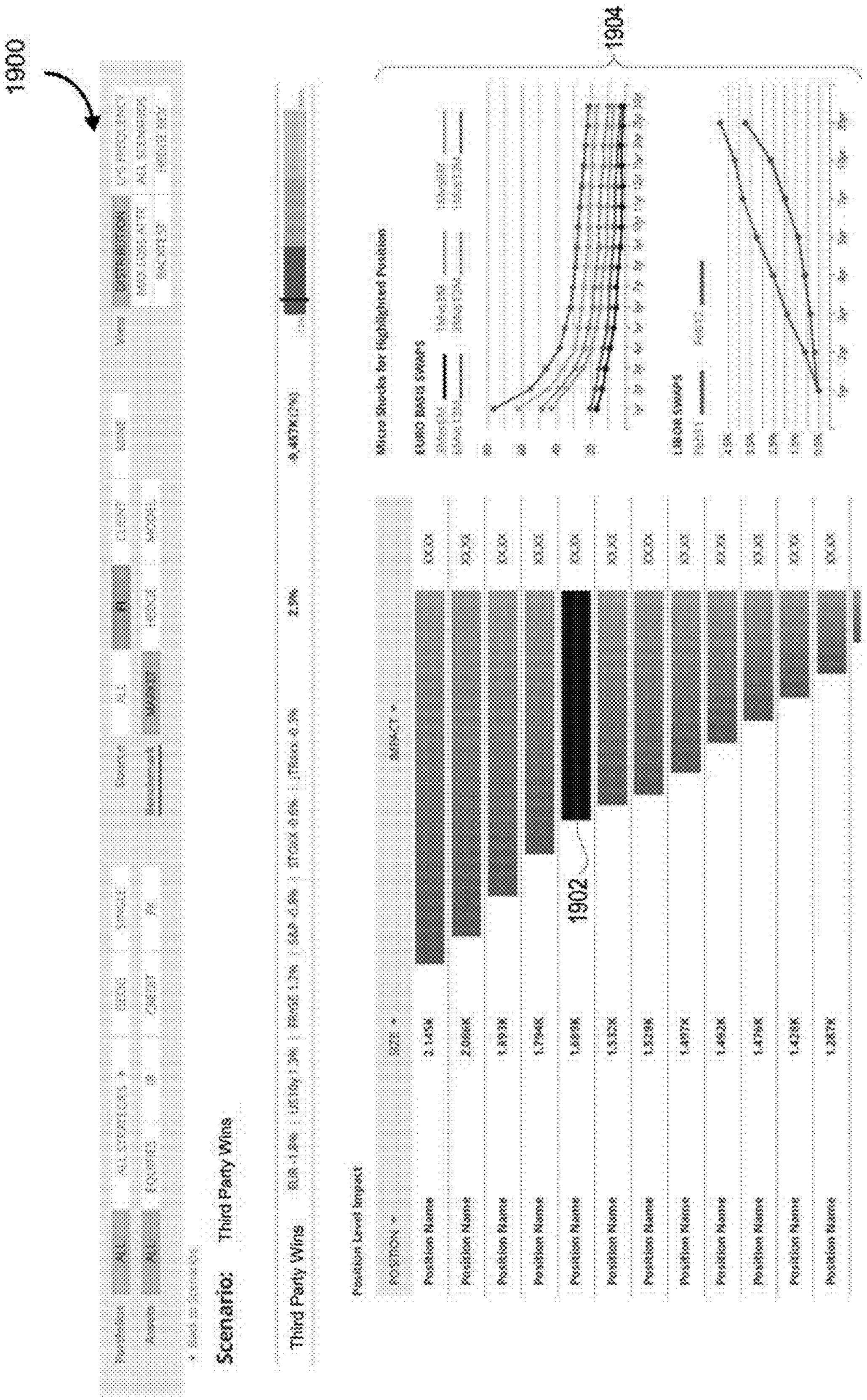

FIG. 19 illustrates an interface screen 1900 similar to FIG. 18 but having a different selected position 1902. The widget section 1904 is rendered to show different information than FIG. 18, in that information presented for the shocks are related to Euro basis swaps and LIBOR swap movements. Line charts may be shown for a dynamically selected span of asset types (e.g., 1 year, 2 year, 3 year, etc.).

Figure 20:
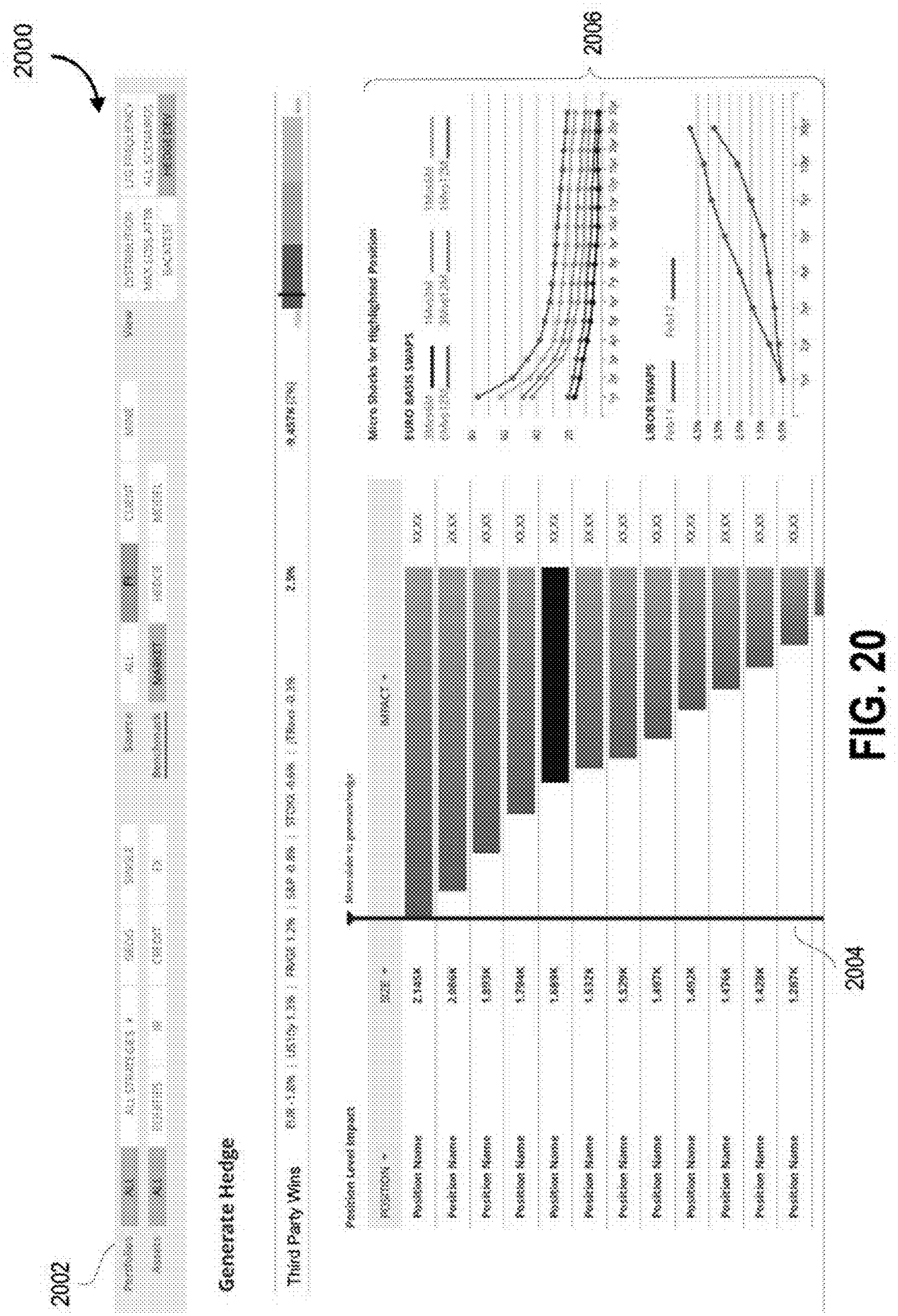

FIG. 20 illustrates an interface screen 2000 where the options bar 2002 has been activated to show a hedge development view. A moveable hedge bar is provided in the form of a slider visual element 2004 that can be interacted with by the user to dynamically generate a hedge mechanism in relation to various positions. In some embodiments, as slider visual element 2004 is moved along, the rendering of the widget section 2006 may be dynamically modified to represent changes in relation to the impact of micro shocks after the application of the hedging mechanism represented by the slider visual element 2004.

Figure 21:
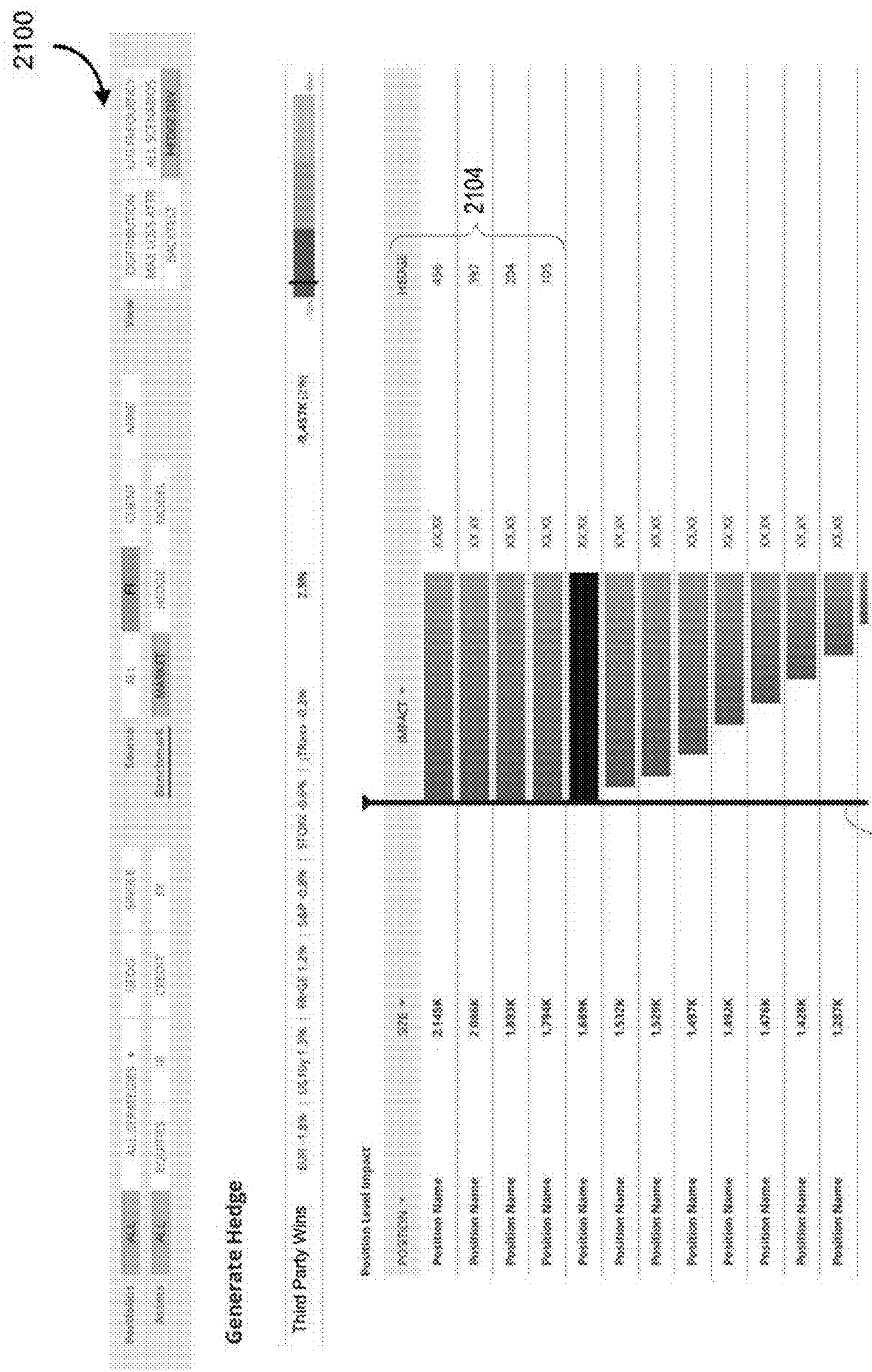

FIG. 21 illustrates an interface screen 2100 that is similar to FIG. 20, except that slider visual element 2102 has been moved to the right. As depicted in FIG. 21, the impact of the various positions is reduced as downside risk is countered by the effect of the hedge. A hedge section 2104 indicates how much hedge mechanism is required to establish the hedge for a particular position.

Figure 22:
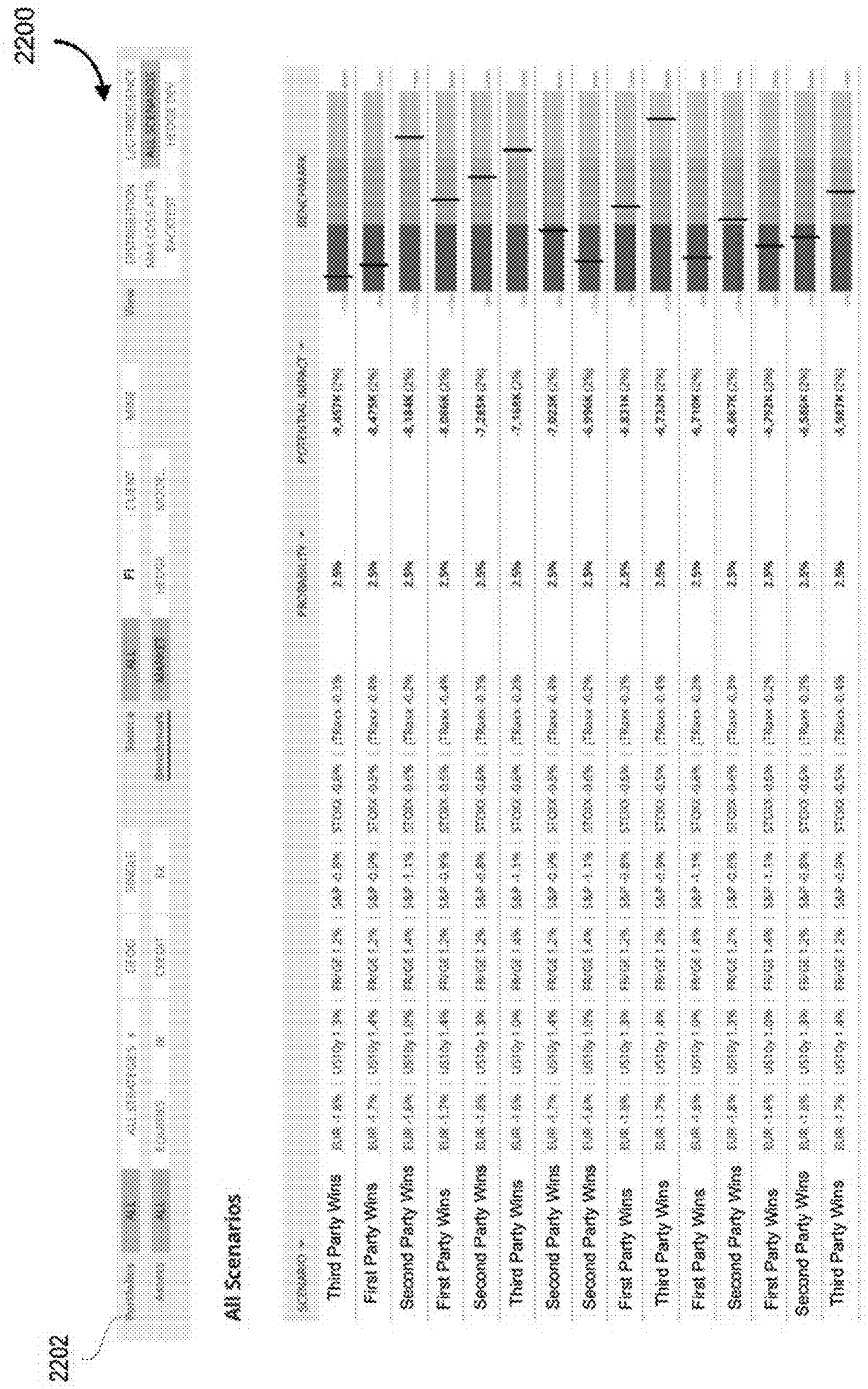

FIG. 22 illustrates an interface screen 2200 illustrating a view of all scenarios, as noted by the options bar 2202. In this example screen, all scenarios are listed and a user may be able to navigate through various scenarios, interacting with various visual interface elements to obtain more information about specific scenarios. The scenarios are obtained by way of the tree data structure, and each represents a separate path through the tree. A probability is noted for each path, along with the potential impact and a comparison against a benchmark (in this case, the market).

Figure 23:
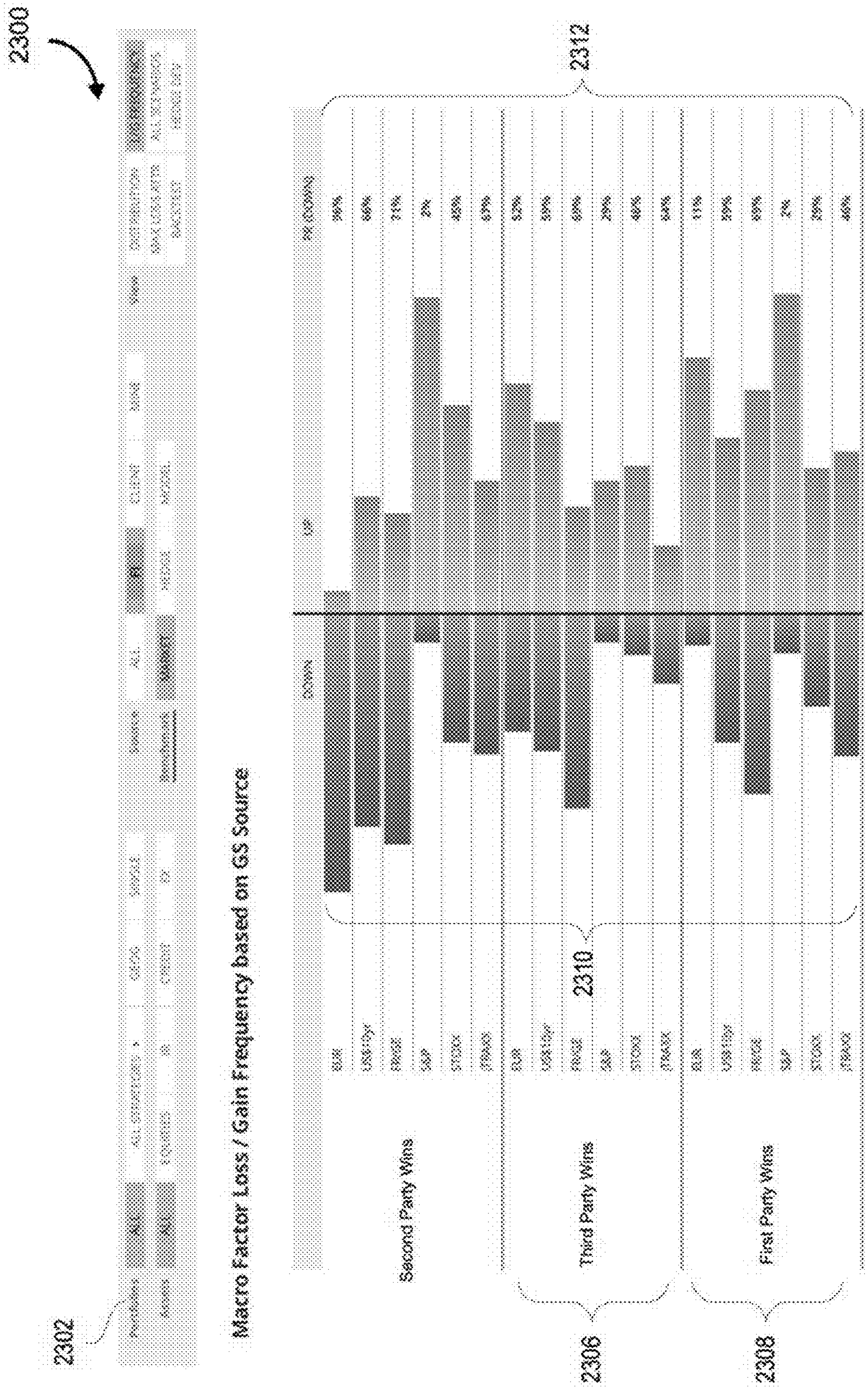

FIG. 23 is an interface screen 2300 illustrating a different view as selected by way of options bar 2302, where a loss/gain frequency view is provided based on expert sources obtained from sources internal to the financial institution. Each event is analyzed in corresponding interface sections 2304, 2306, and 2308, each illustrating different sets of macro factors. Each of these factors has associated graph bars provided at 2310, and an overall score on a probability of downside risk provided at 2312.

Figure 24:
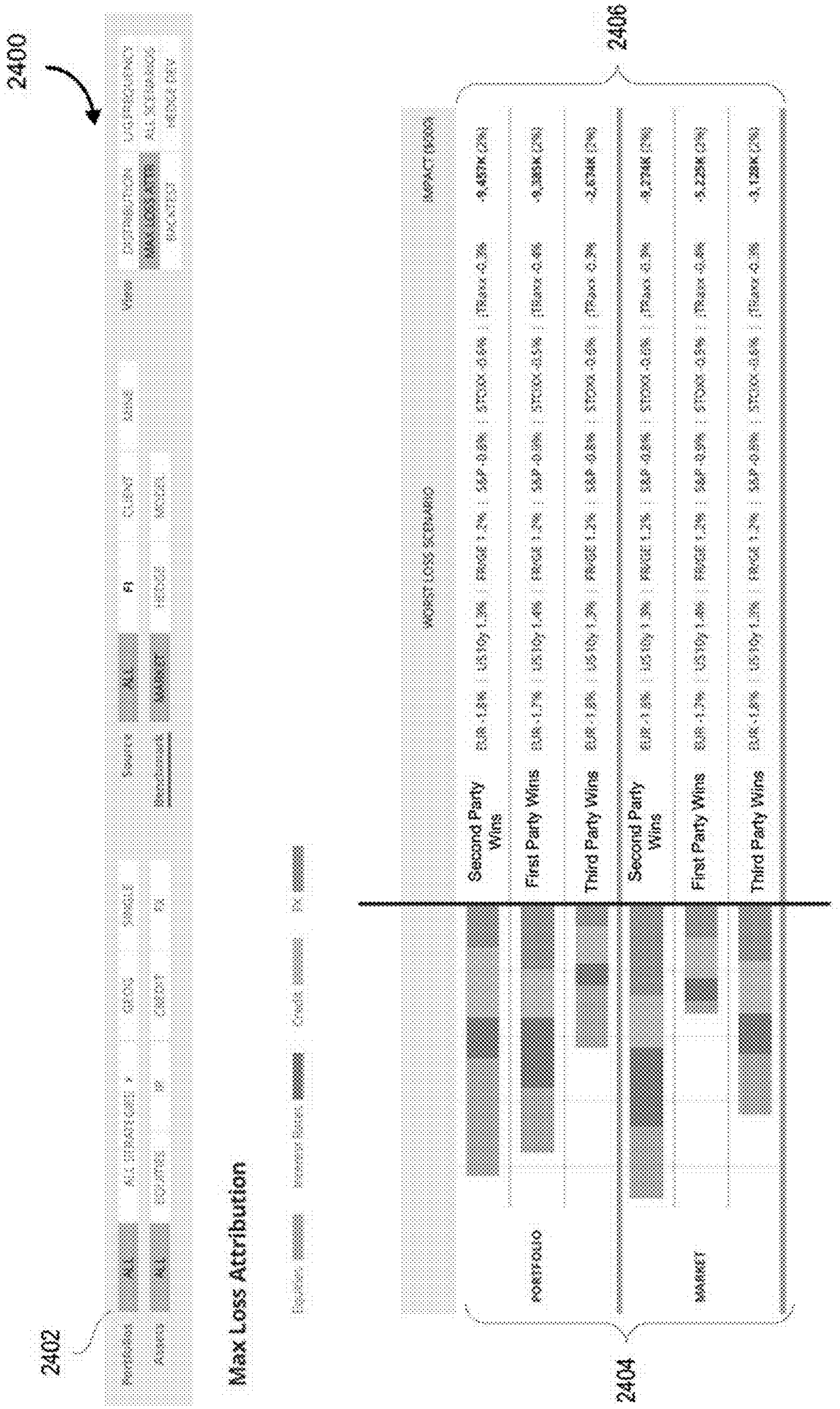

FIG. 24 illustrates an interface screen 2400 illustrating a different view as selected by way of options bar 2402 where information regarding various worst loss scenarios are presented. In the example of FIG. 24, a comparison is made between the worst loss scenarios for the portfolio (for each possible event outcome), and the worst loss scenarios for a market benchmark (for each possible event outcome). Segmented graph bars 2404 are provided as interactive visual elements, and a summary table is provided at 2406. The summary table 2406 indicates the combination of macro factors that lead to the maximum loss, as well as the overall financial impact on the portfolio itself.

Figure 25:
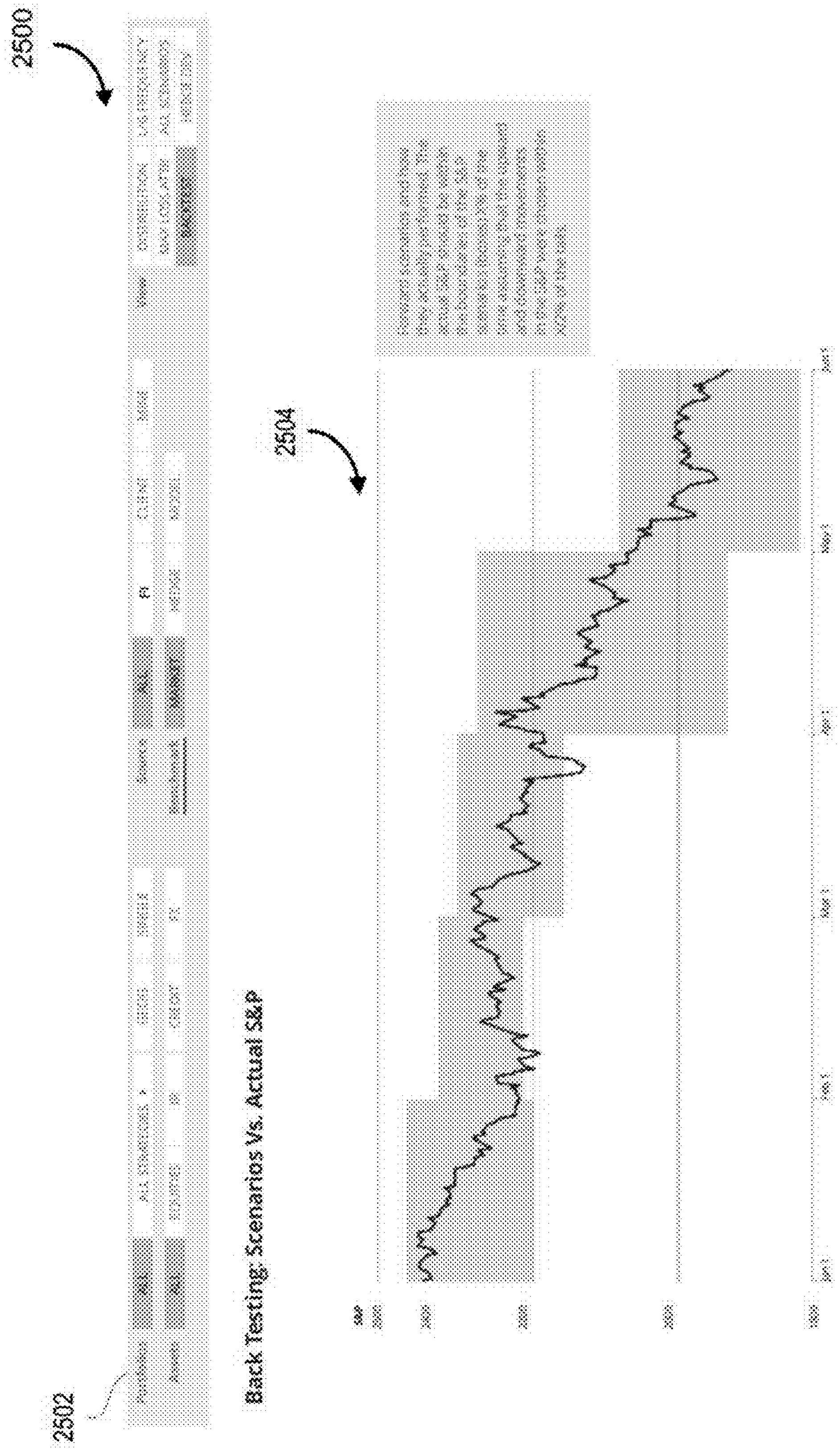

FIG. 25 illustrates an interface screen 2500 illustrating a different view as selected by way of options bar 2502 where information generated in a validation test ("backtest") is provided. An analysis of the scenarios compared to the actual S&P performance is shown in the chart 2504.

Figure 26:
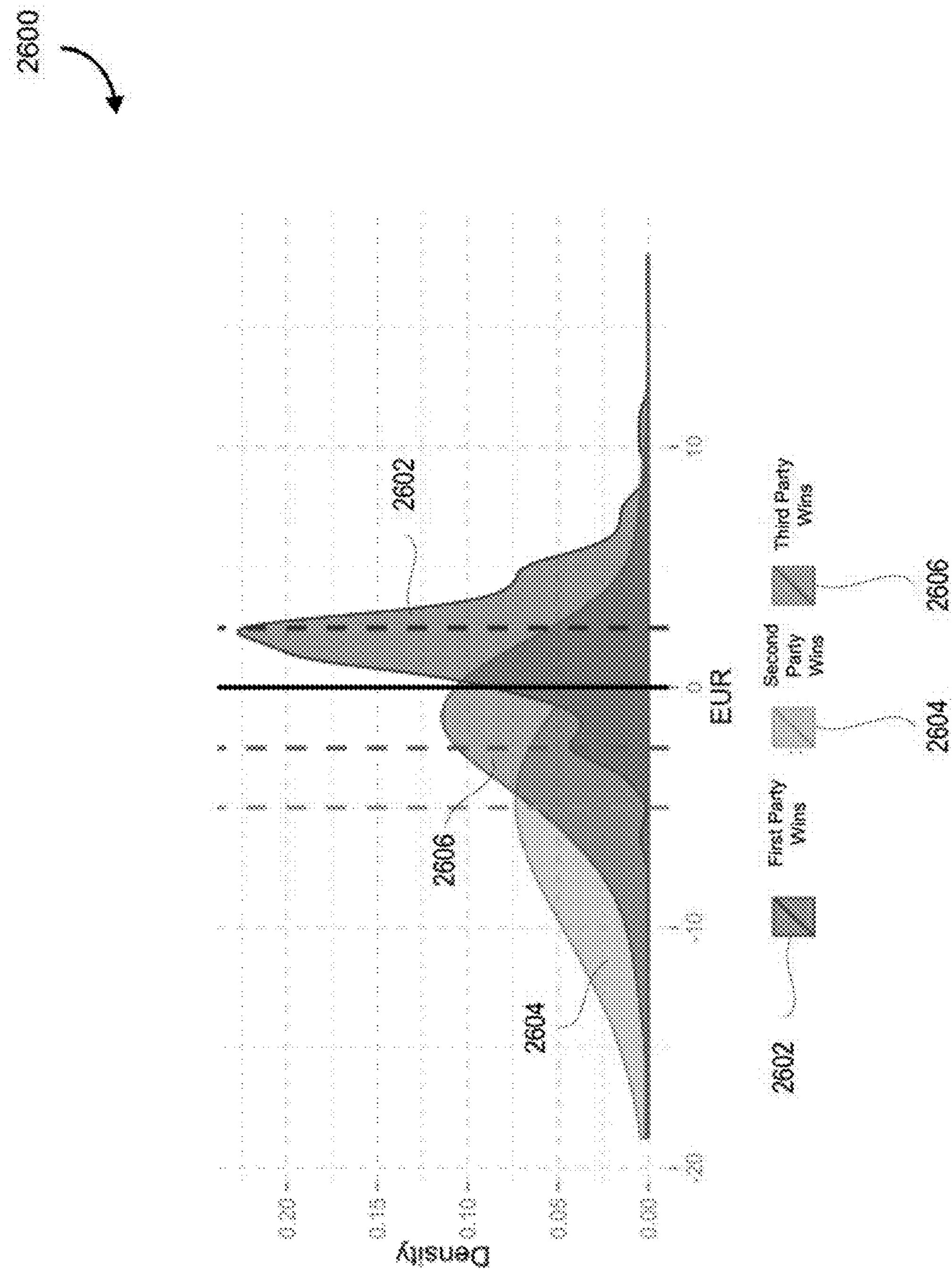

FIG. 26 illustrates an example distribution 2600 illustrating probability distributions formed based on mining expert polling results. The x axis is the movement of the EUR in terms of basis points, and the y axis is a measure of density related to the received inputs. Distribution 2602 indicates the expected movement of the EUR if a first party wins, 2604 indicates the expected movement of the EUR if a second party wins, and 2606 indicates the expected movement of the EUR if a third party wins.

Figure 27:
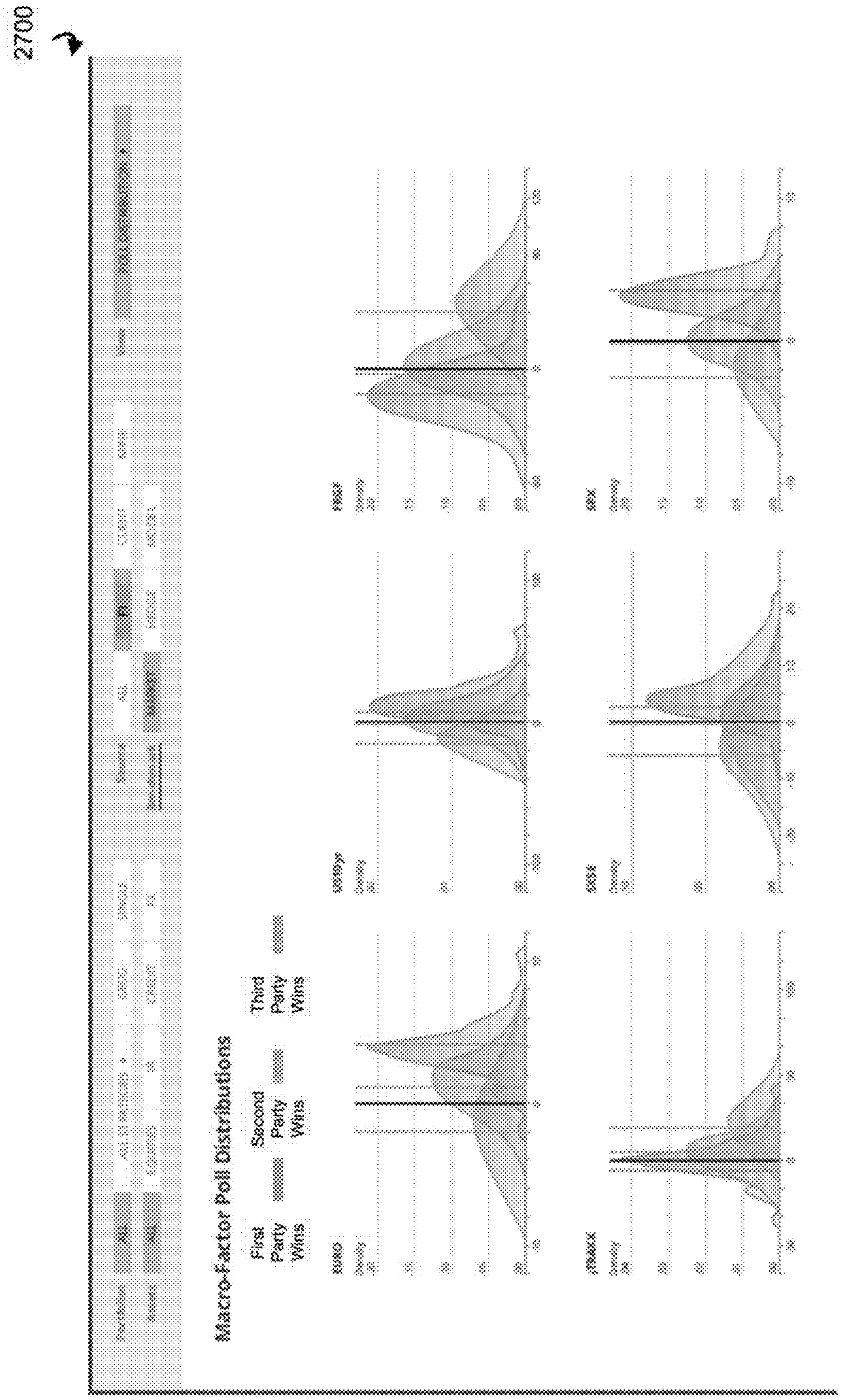

FIG. 27 illustrates an interface screen 2700 showing macro factor poll distributions for various macro factors.

Figure 28:
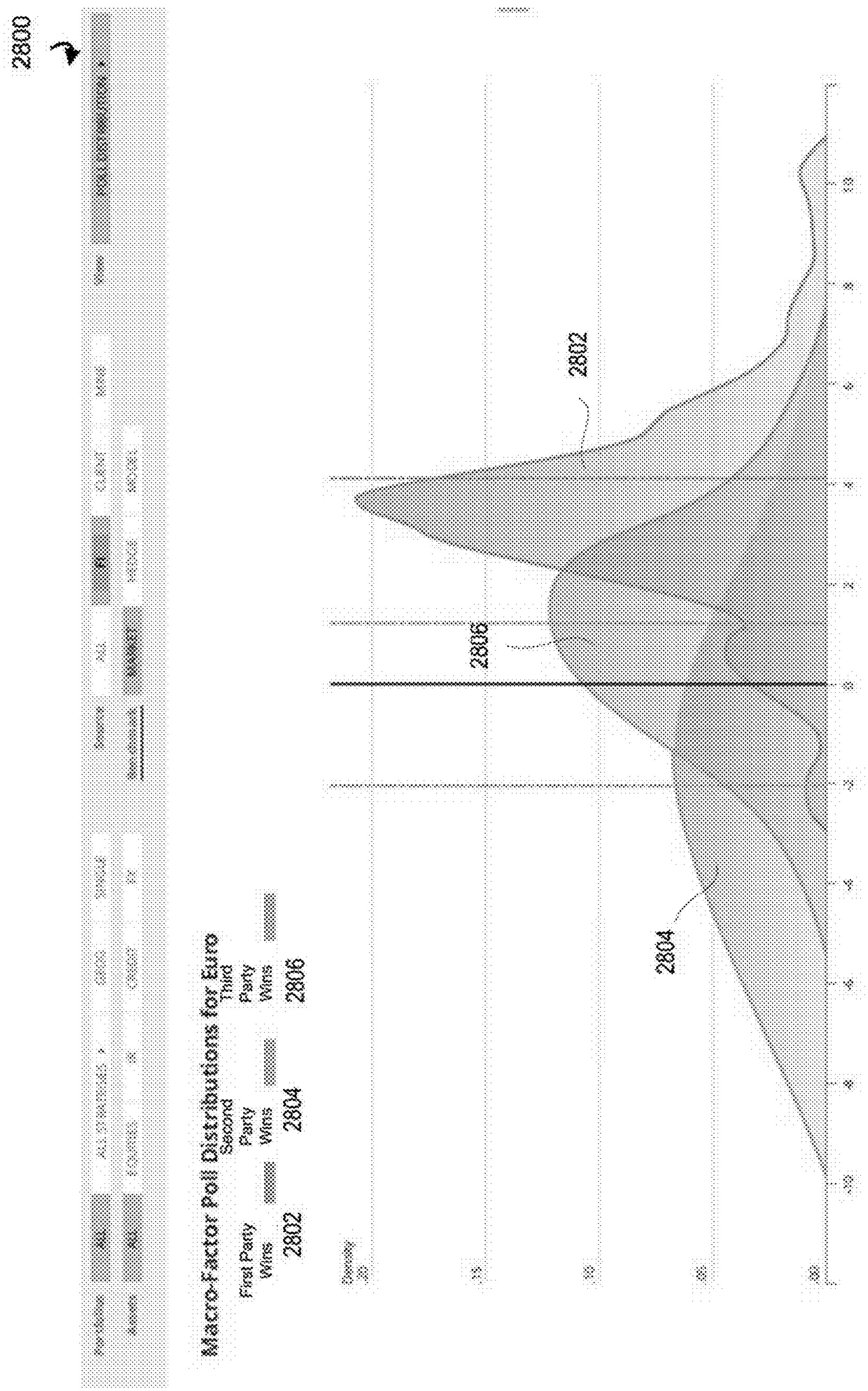

FIG. 28 illustrates an interface screen 2800 illustrative of a distribution. 2802 represents the distribution of EUR movement if a first party wins, 2804 represents the distribution of EUR movement if a second party wins, and 2806 represents the distribution of EUR movement if a third party wins.

Figure 29:
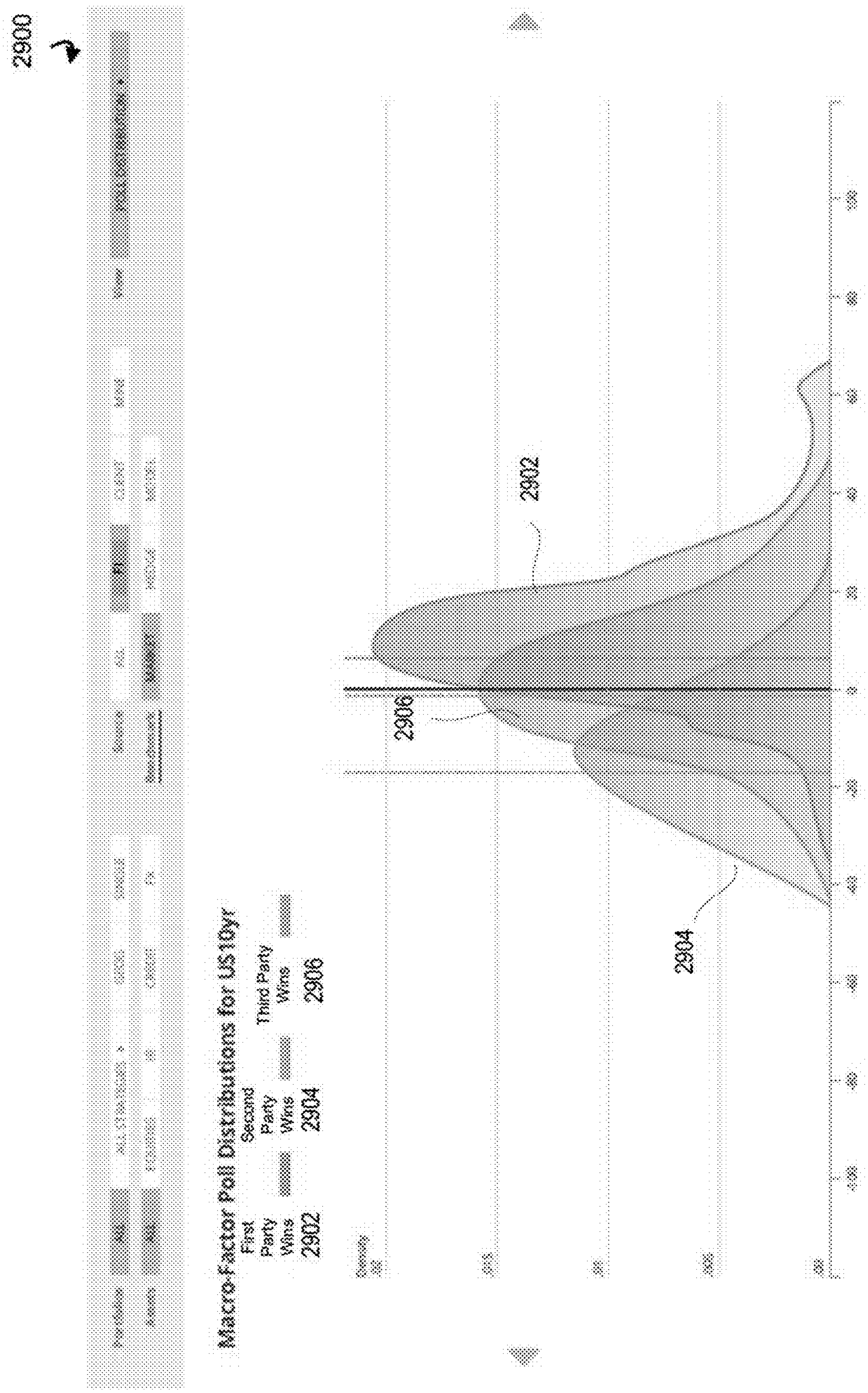

FIG. 29 illustrates an interface screen 2900 illustrative of a distribution. 2902 represents the distribution of U.S. 10 year asset movement if a first party wins, 2904 represents the distribution of 10 year asset movement if a second party wins, and 2906 represents the distribution of U.S. 10 year asset movement if a third party wins.

Figure 30:
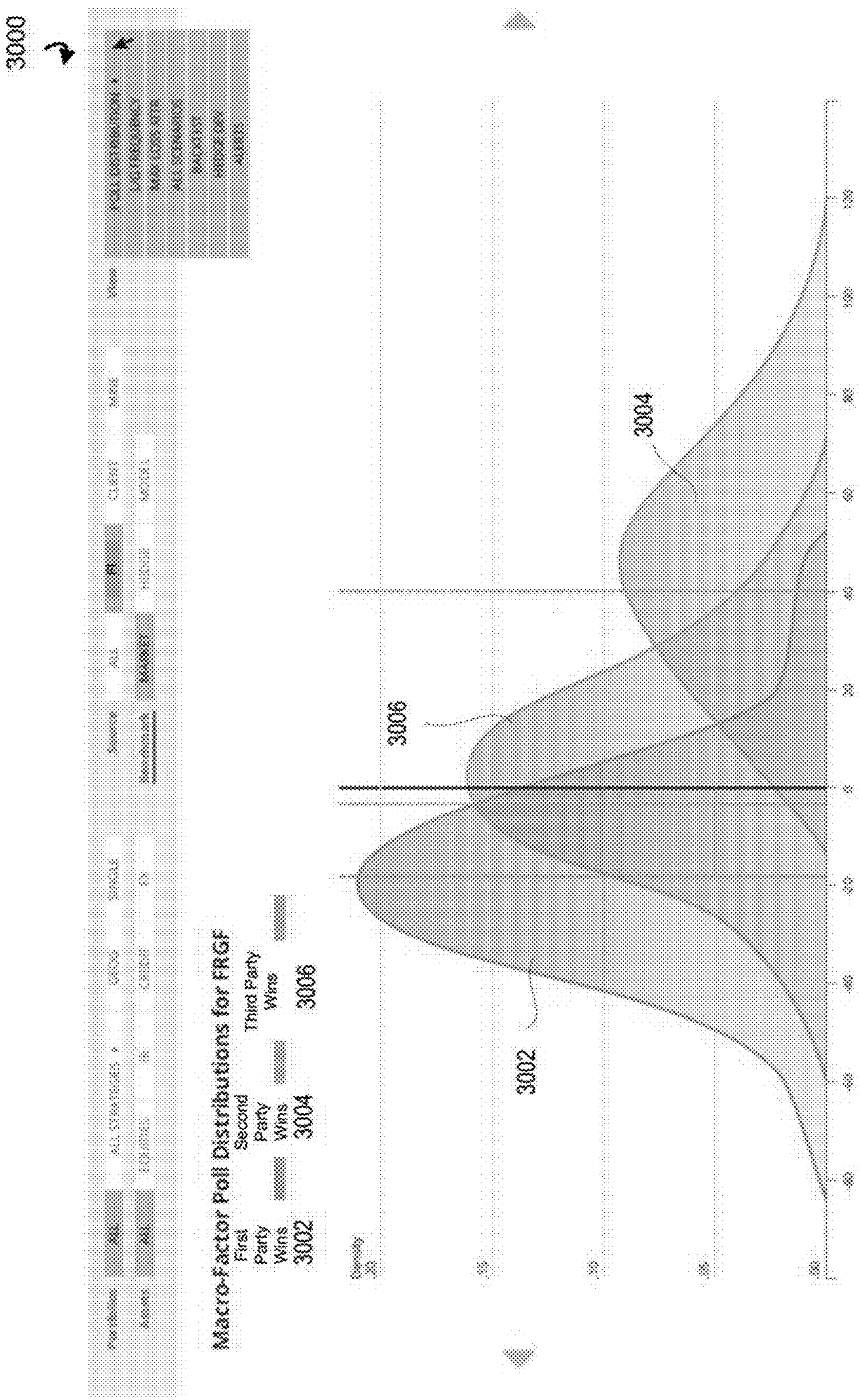

FIG. 30 illustrates an interface screen 3000 illustrative of a distribution. 3002 represents the distribution of France/Germany spreads movement if a first party wins, 3004 represents the distribution of France/Germany spreads movement if a second party wins, and 3006 represents the distribution of France/Germany spreads movement if a third party wins.

Figure 31A:
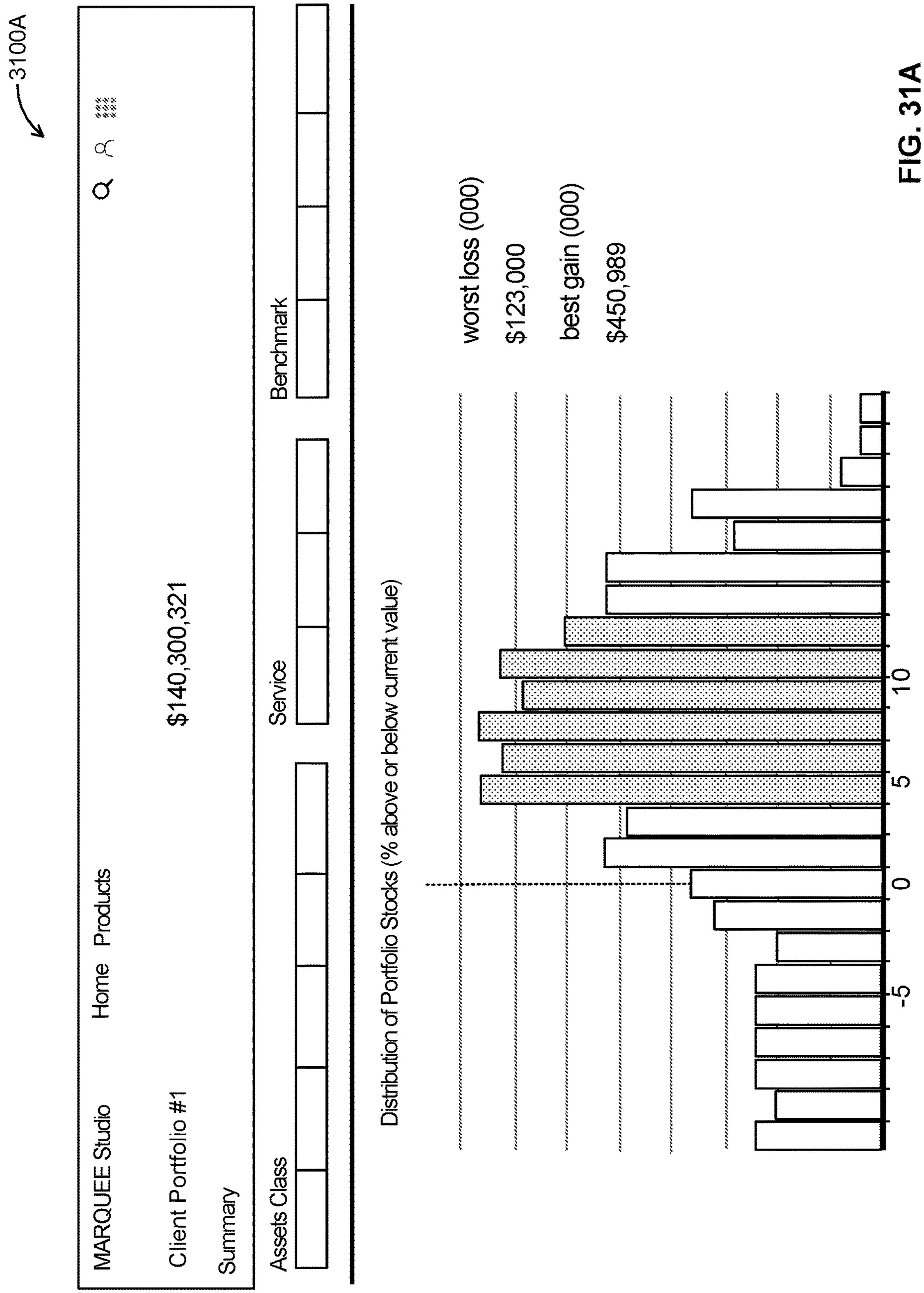
FIGS. 31A, 31B, 31C, 31D, 31E, and 31F illustrate example screenshots of report interfaces according to some embodiments.
Figure 31B:
Figure 31C:
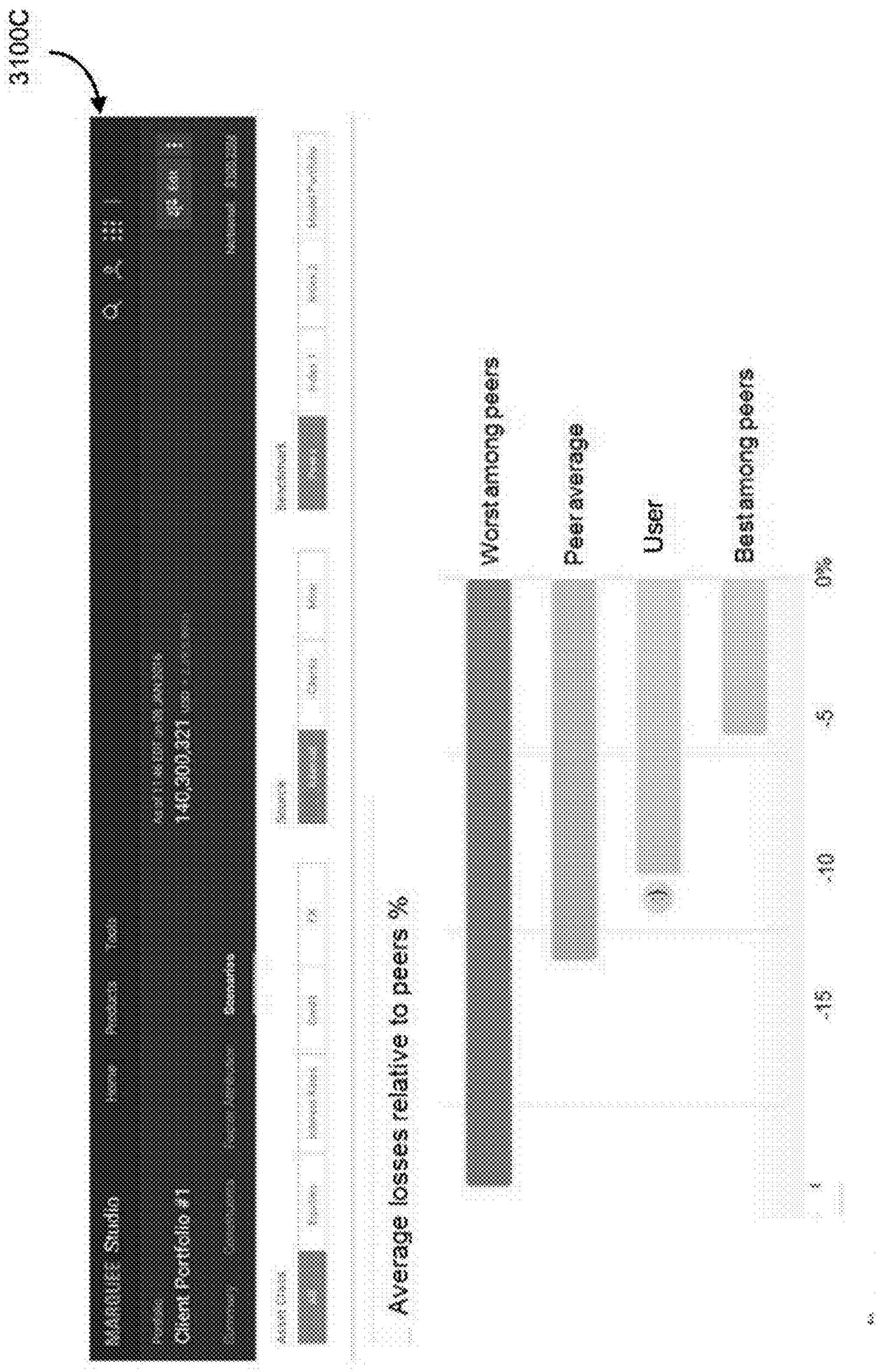
Figure 31D:
Figure 31E:
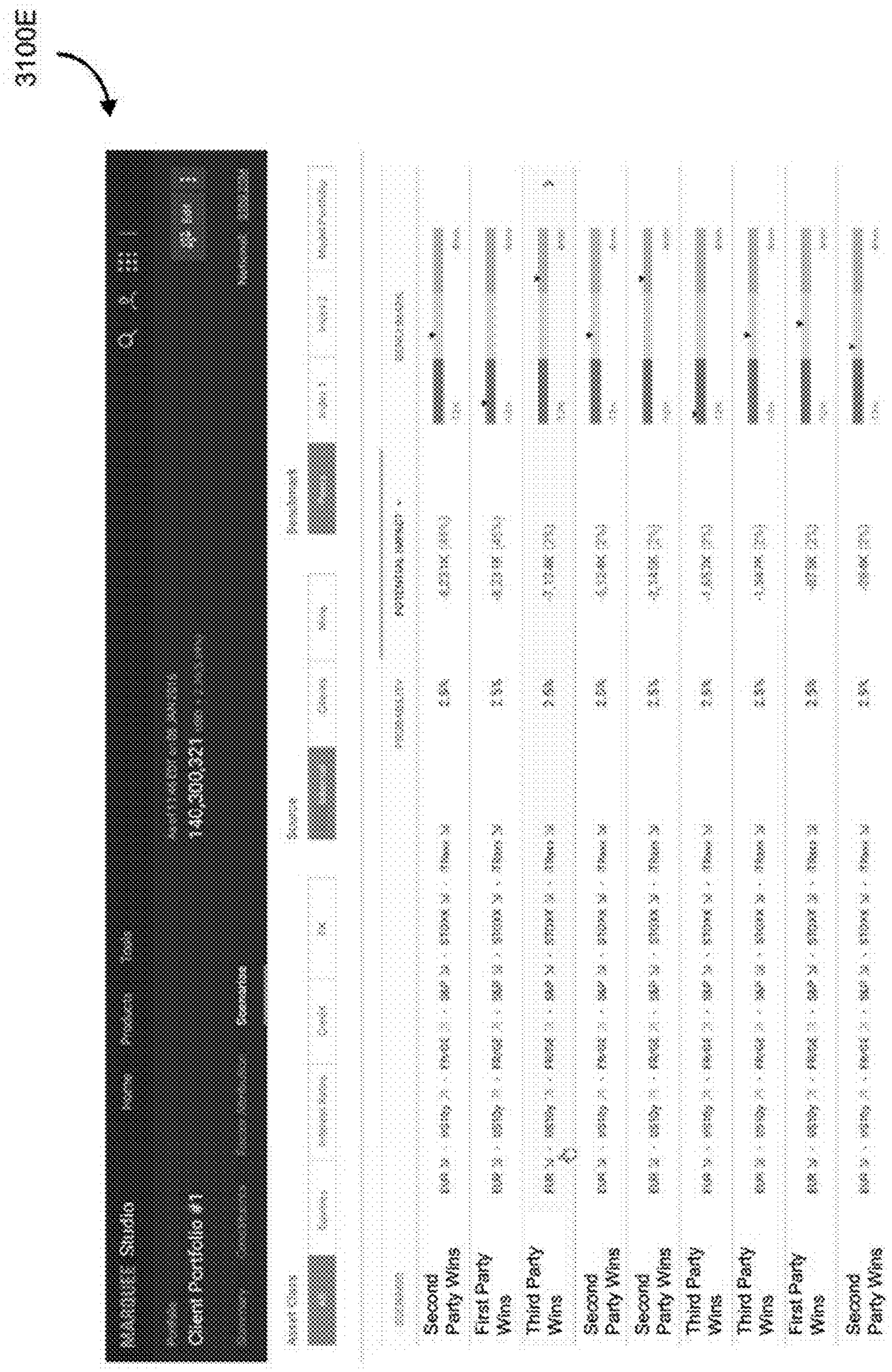
Figure 31F:
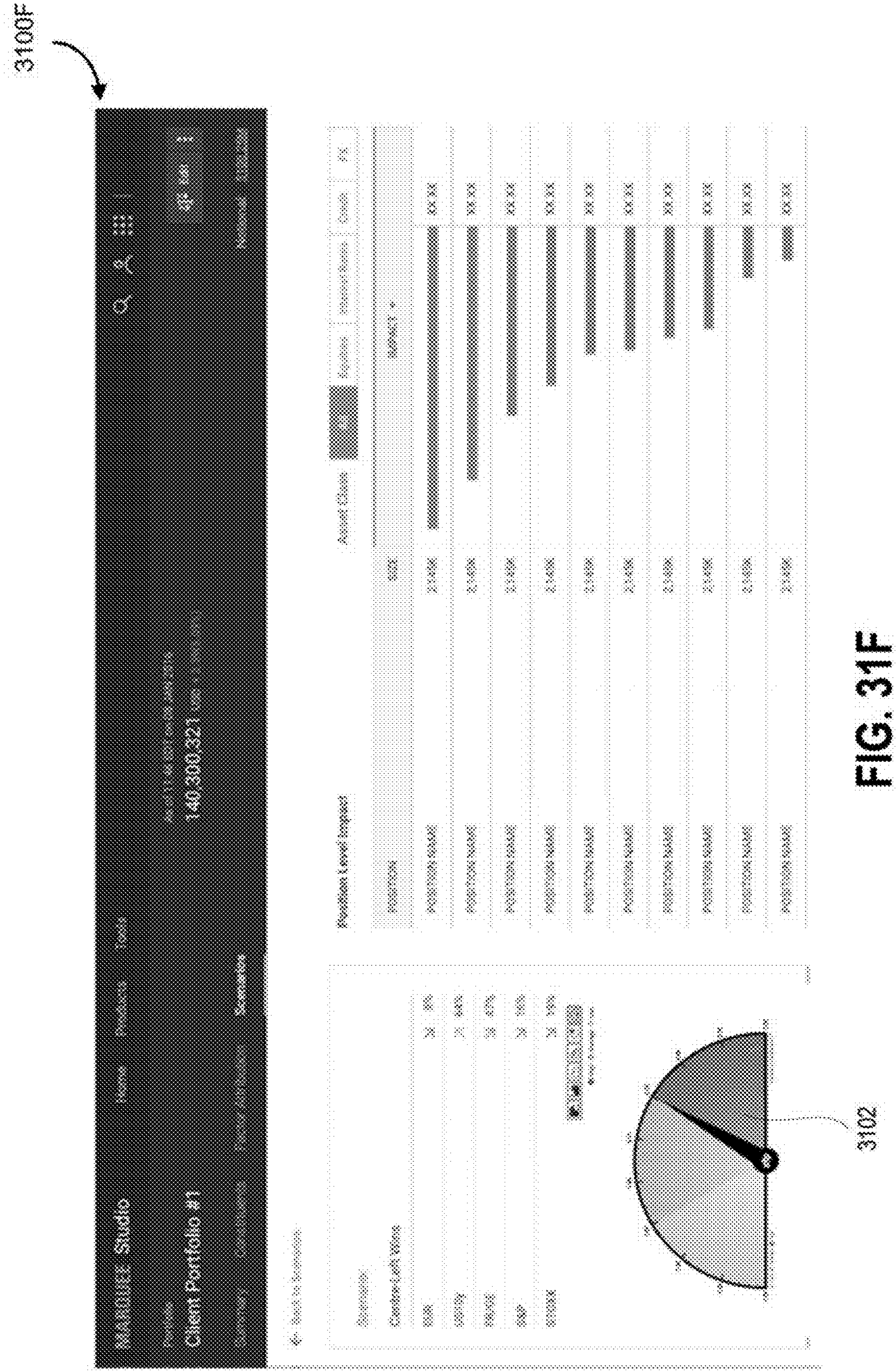

FIGS. 31A, 31B, 31C, 31D, 31E, and 31F illustrate example screenshots of report interfaces according to some embodiments. FIG. 31A illustrates a screenshot 3100A of a report directed to illustrating the distribution of portfolio shocks, measured against current value. FIG. 31B illustrates a screenshot 3100B of a report directed to illustrating the distribution of portfolio shocks, measured against peers. FIG. 31C illustrates a screenshot 3100C of a report directed to illustrating average losses, measured against peers. FIG. 31D illustrates a screenshot 3100D of a report directed to illustrating worst loss scenarios of a user, measured against peers. FIG. 31E illustrates a screenshot 3100E of a report providing a scenario dashboard. FIG. 31F illustrates a screenshot 3100F of a report providing position level impacts, and a visual element 3102 that provides a dynamically rendered meter indicative of risk. In some embodiments, the scale used across visual element 3102 may be dynamically determined.

Figure 32:
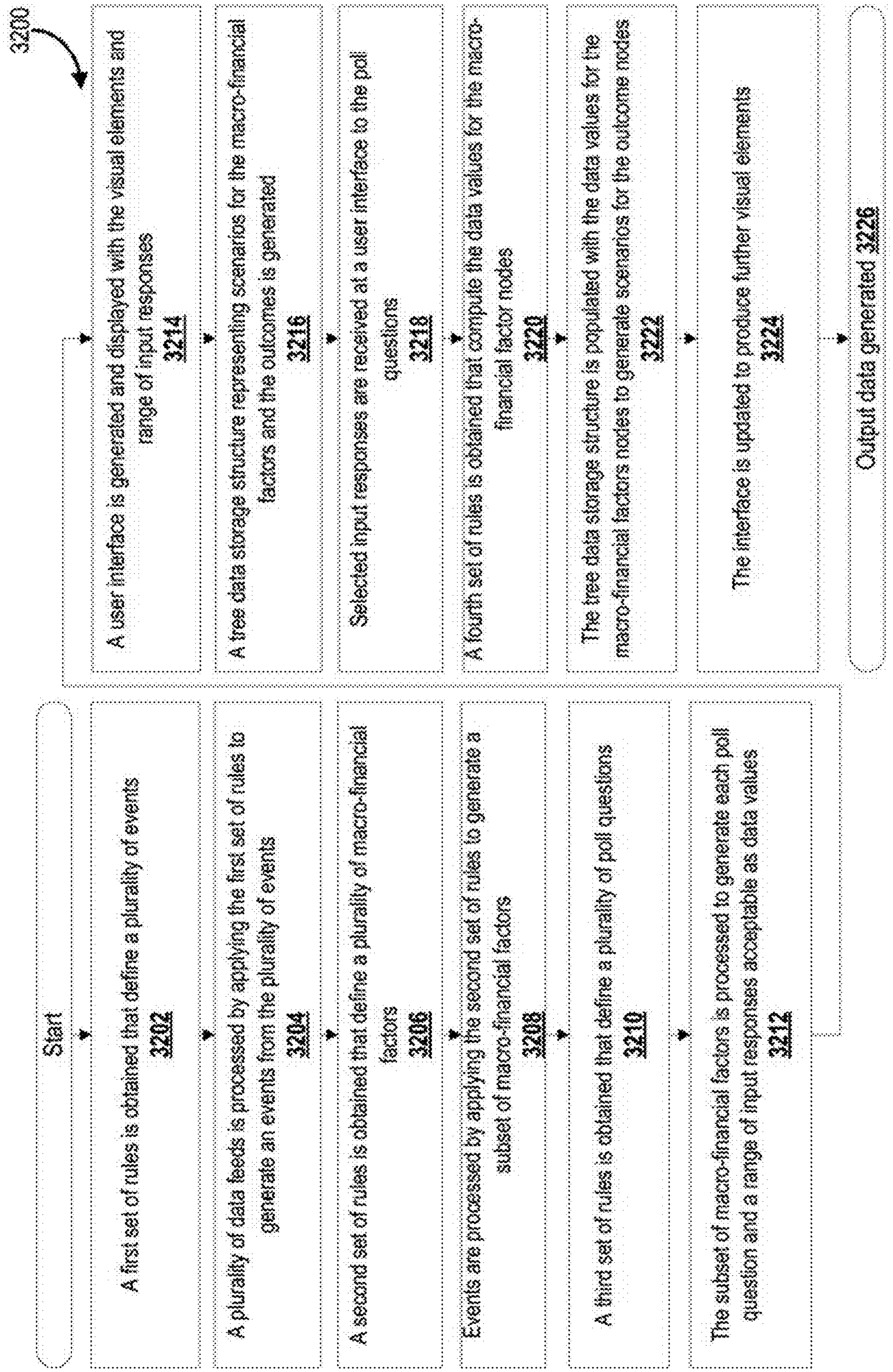
FIG. 32 illustrates a method for automatically generating scenarios and user interface elements representing valuations of instruments according to some embodiments.

FIG. 32 illustrates a method 3200 for automatically generating scenarios and user interface elements representing valuations of instruments, according to some embodiments.

The method 3200 is provided for automatically generating scenarios and user interface elements representing valuations of instruments under the scenarios, and the method may include one or more of the following steps. The steps are provided as examples for an embodiment, and there may be different, more, less, or alternate steps.

At 3202, a first set of rules is obtained that define a plurality of events.

At 3204, a plurality of data feeds is processed by applying the first set of rules to generate events linked to a set of outcomes.

At 3206, a second set of rules is obtained that define a plurality of macro factors.

At 3208, the events are processed by applying the second set of rules to generate a subset of macro factors.

At 3210, a third set of rules is obtained that define a plurality of poll questions.

At 3212, the subset of macro factors is processed to generate, by applying the third set of rules to generate a subset of poll questions, each poll question linked to a macro factor of the subset of macro factors and a range of input responses acceptable as data values for the macro factor.

At 3214, a user interface is generated and displayed with visual elements for the poll questions linked to macro factors and the ranges of input responses acceptable as the data values for the macro factors.

At 3216, a tree data storage structure representing scenarios for the macro factors and the outcomes is generated, each node in the tree structure defining a descriptor and a data value, the tree structure having an event node corresponding to a root node, outcome nodes corresponding to children of the root nodes, and macro factor nodes corresponding to further children of the outcome nodes, each macro factor node having a data value.

At 3218, selected input responses are received at a user interface to the poll questions, and at 3220, a fourth set of rules is obtained that compute the data values for the macro factor nodes.

At 3220, the selected input responses is processed by applying the fourth set of rules to generate the data values for the macro factors nodes.

At 3222, the tree data storage structure is populated with the data values for the macro factors nodes to generate scenarios for the outcome nodes.

At 3224, the interface is updated to produce further visual elements indicating a distribution of poll questions and the selected input responses and valuations of instruments under the scenarios of the tree data storage structure.

At 3226, output data is generated for the tree data storage structure.

Figure 33:
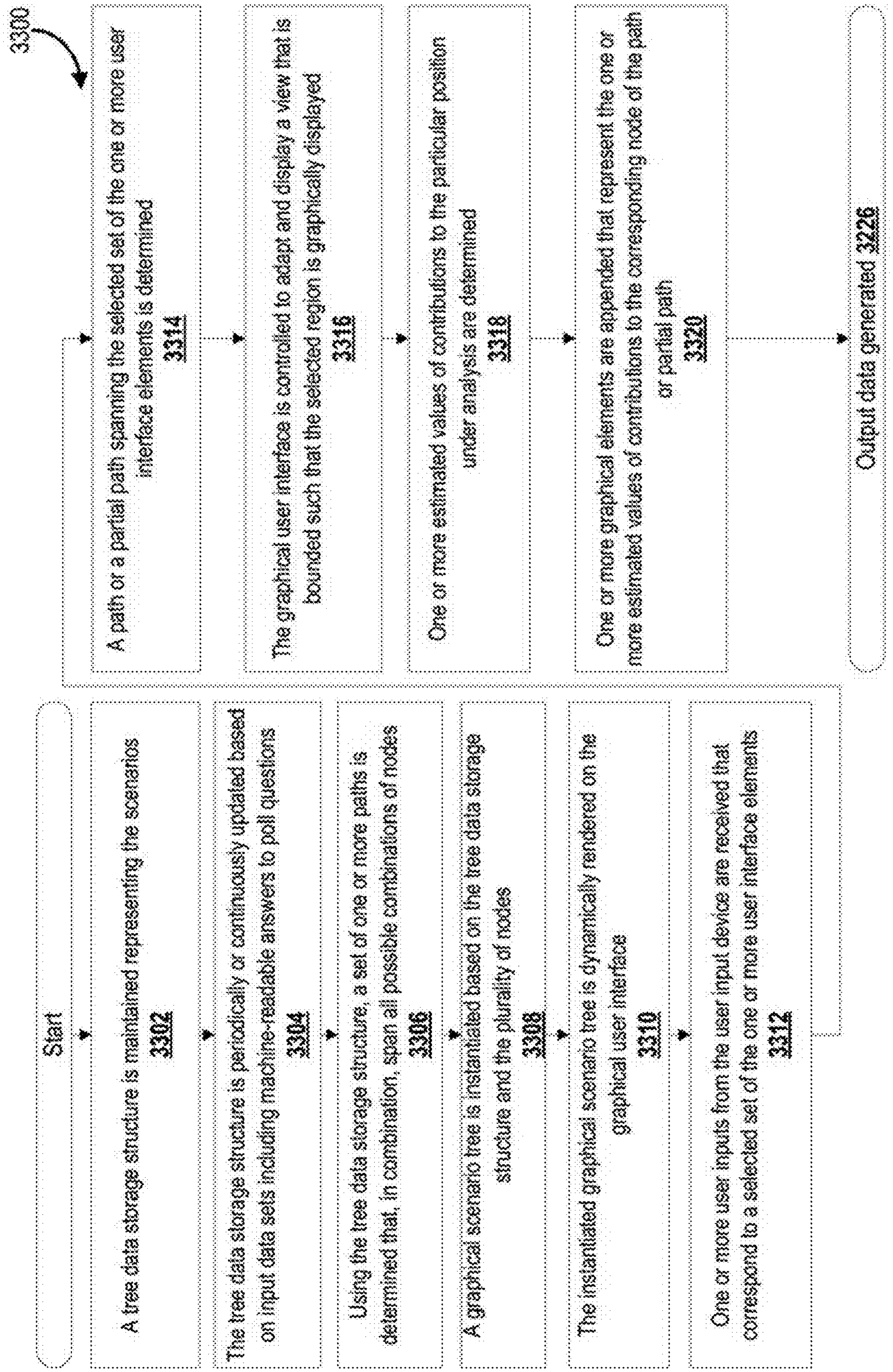
FIG. 33 illustrates a method for generating a user interface of visual elements according to some embodiments.

FIG. 33 illustrates a method 3300 for generating a user interface of visual elements according to some embodiments.

A method of automatically generating scenarios and user interface elements representing valuations of instruments under the scenarios using a graphical user interface and a user input device is provided at method 3300. The method 3300 is provided as an example, and there may be more, less, different, etc. steps.

At 3302, a tree data storage structure is maintained representing the scenarios, the tree data storage structure including a plurality of nodes defining a descriptor, a probability value, and a data value, the tree structure having an event node corresponding to a root node, outcome nodes corresponding to children of the root nodes, and macro factors nodes corresponding to further children of the outcome nodes, each macro factors node having a data value.

At 3304, the tree data storage structure is periodically or continuously updated based on received input data sets including at least machine-readable answers to poll questions.

Each machine-readable answer is processed to determine and apply one or more morph factors to at least one node of the plurality of nodes, the one or more morph factors modifying at least one of the probability value and the data value.

At 3306, using the tree data storage structure, a set of one or more paths is determined that, in combination, span all possible combinations of nodes. The spanning set of paths is important for a holistic analysis of all scenarios available in view of the potential changes in financial factors.

For each path, the tree data storage is traversed, for example, to determine a corresponding contribution to a particular portfolio position under analysis. In some embodiments, there may be other elements under analysis.

At 3308, a graphical scenario tree is instantiated based on the tree data storage structure and the plurality of nodes, the graphical scenario tree rendering a visual representation of the tree data storage structure and the plurality of nodes, the graphical scenario tree having user interface elements associated with each node of the plurality of nodes.

At 3310, the instantiated graphical scenario tree is dynamically rendered on the graphical user interface.

At 3312, one or more user inputs from the user input device are received that correspond to a selected set of the one or more user interface elements. These received inputs from a user may be indicative of a path or part of a path, the user selecting nodes for analysis.

At 3314, a path or a partial path spanning the selected set of the one or more user interface elements is determined. The system 100 may, based on the path or partial path, be configured to select a region of the instantiated graphical scenario tree, the region selected such that all nodes spanning the path or partial path are visible on the graphical user interface. A regional view can be created that is more attuned to the specific path chosen for analysis by the user.

At 3316, the graphical user interface is controlled to adapt a view displayed on the graphical user interface to be bounded such that the selected region is graphically displayed as an expanded partial display of the graphical scenario tree (e.g., zooming into the regional view of the selected path/partial path).

At 3318, one or more estimated values of contributions to the particular position under analysis are determined, each of the one or more estimated values of contributions corresponding to a corresponding node of the path or partial path.

At 3320, one or more graphical elements are appended that represent the one or more estimated values of contributions to the corresponding node of the path or partial path, the one or more graphical elements aligned with the nodes of the path or partial path. The appended graphical elements, for example, label the nodes of the path with the contributions in relation to the value of the position, or other types of contributions or information.

Figure 34:
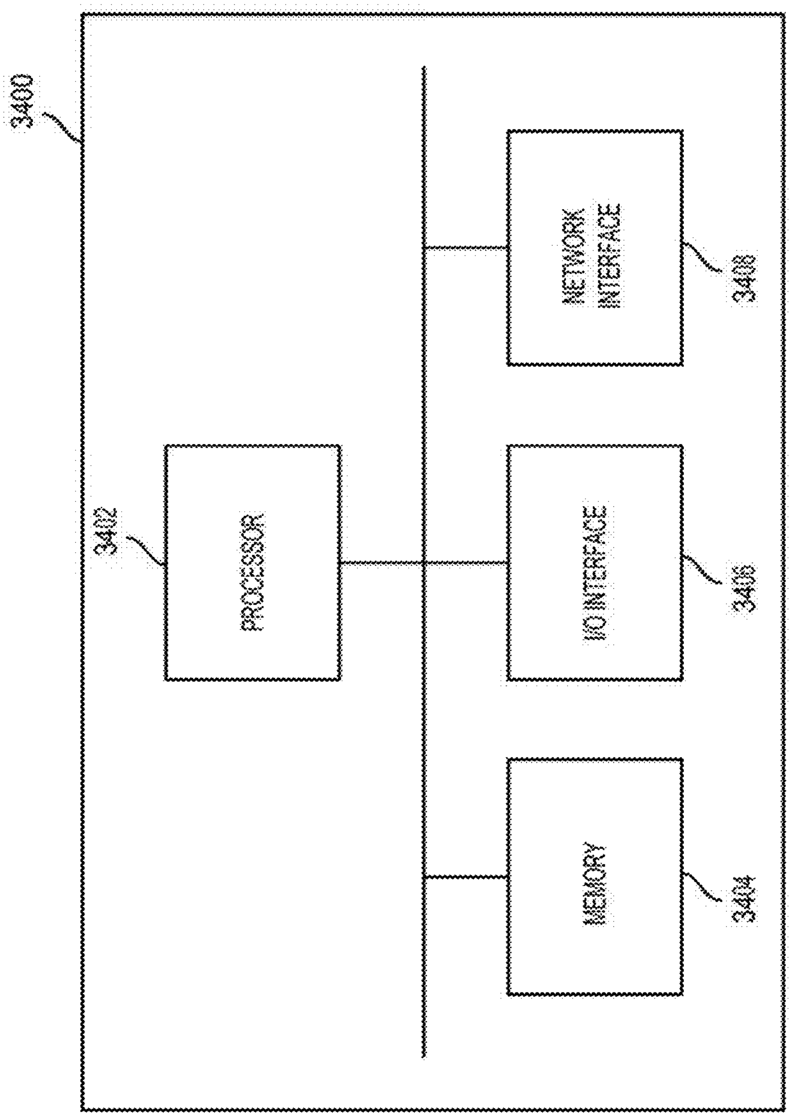
FIG. 34 illustrates a block schematic diagram of a computing device according to some embodiments.

FIG. 34 illustrates a block schematic diagram of a computing device 3400 according to some embodiments. The computing device 3400 is configured for automatically generating scenarios and user interface elements representing valuations of instruments under the scenarios. In one example embodiment, the computing device 3400 may be one example of a device in system 100 as shown in FIG. 1. In some embodiments, the computing device 3400 includes one or more processors 3402 and various computing components, including memory 3404, and storage. Computing device 3400 may be provided by a single or multiple devices (e.g., in a cloud/distributed resources configuration). The generation of scenarios is computationally difficult, especially with a larger set of macro/micro factors or more complicated events with various sub-events, etc.

Accordingly, the computing device 3400 may be specifically configured to apply heuristic approaches, parallel processing, and other approaches to reduce the amount of time required for computation. An I/O interface 3406 is provided for communication and interaction with various users, for example, by receiving, as computer-interpretable inputs, interactions with visual interface elements (e.g., clicks, pointer movement, gestures, keyboard inputs), among others. A network interface 3408 is provided for communications with other computing devices, for example, to obtain information relating to data sets, real world validation data, answers to expert poll questions, etc.

The computing device 3400 also includes storage that is capable of storing various sets of rules (e.g., a first set of rules that define a plurality of events, a second set of rules that define a plurality of macro factors, a third set of rules that define a plurality of poll questions, and a fourth set of rules that compute the data values for the macro factors nodes), and computing device 3400 is configured for processing a plurality of data feeds obtained from the I/O interface 3406.

The processors 3402 are configured to apply the first set of rules to generate an event from the plurality of events, the event linked to a set of outcomes, process the events by applying the second set of rules to generate a subset of macro factors; and process the subset of macro factors to generate, by applying the third set of rules to generate a subset of poll questions, each poll question linked to a macro factor of the subset of macro factors and a range of input responses acceptable as data values for the macro factor.

Various user interfaces are rendered by I/O interface 3406, providing, for example, interfaces with visual elements for the poll questions linked to macro factors and the ranges of input responses acceptable as the data values for the macro factors, and also interfaces with visual elements for display of information to various end users (e.g., portfolio managers, traders).

The processors 3402 are configured for generating a tree data storage structure representing scenarios for the macro factors and the outcomes, and processing selected input responses by applying the rule sets to generate the data values for the macro factors nodes, populating the tree data storage structure with the data values for the macro factors nodes to generate scenarios for the outcome nodes and updating the interface to produce further visual elements indicating a distribution of poll questions and the selected input responses and valuations of instruments under the scenarios of the tree data storage structure.

The processors 3402 are further configured for generating output data for the tree data storage structure, and this output data can be used to drive the rendering of various interfaces at the I/O interface 3406, which can include, for example, interfaces for displaying reports and information, interfaces for polling expert input, among others. The interfaces may include interaction elements, which when interacted with by a user, may cause the processors 3402 to undertake various steps in information retrieval, processing, and rendering.

System 100 can have a handful of market models which will define how the correlations are modeled among various market variables. One simple market model conceptualized for proof of concept involves looking at the historical moves given specific moves derived from the poll distribution data. Here the entire correlation structure is maintained within each asset class. There would be other market models where the constraint and model cross-asset class correlations could be relaxed. In summary, here are a few market models: Historical correlation; Implied Correlation; User defined correlation with overlay of historical and/or implied.

System 100 can generate shock values for a set of macro factors. The factors can be bucketed into a broader set of asset classes (equities, rates, credit, interest rates). Within each asset class the macro driver can be chosen and the shocks can be derived for other micro variables necessary for full re-valuation of portfolio. For an example of a French election, EUR is the macro variable which is used to derive the shocks for other FX currencies such as GBP, JPY, HKG, and the like.

Derivation of micro-shocks is conditioned on move happening in macro variable by looking at time series historically. For deriving micro shocks in other currencies historical moves of greater than 5% in EUR can be looked at first. The 5% being derived from the poll. On the days EUR moved more than 5% the moves for GBP, JPY, and HKG can be extracted and the expected move in those currencies can be computed over the date range. For example, the value or shocks can move in EUR greater than 5% and shows the moves in GBP, HKD, JPY, and CHF on those same days. From this dataset we derive the shocks to be applied in other currencies. FIG. 41 shows an example chart of values.

In similar breadth all the other asset classes can be looked at and the moves in the other micro factors can be derived. There may be derived subset for a chosen set of micro variables.

FIGS. 36 to 40 illustrate interfaces with graphical representations according to some embodiments. The interfaces include visual representations of distributions and overlay distributions for multiple factors.

FIG. 41 illustrates a graph of percentage values according to some embodiments.

Figure 42:
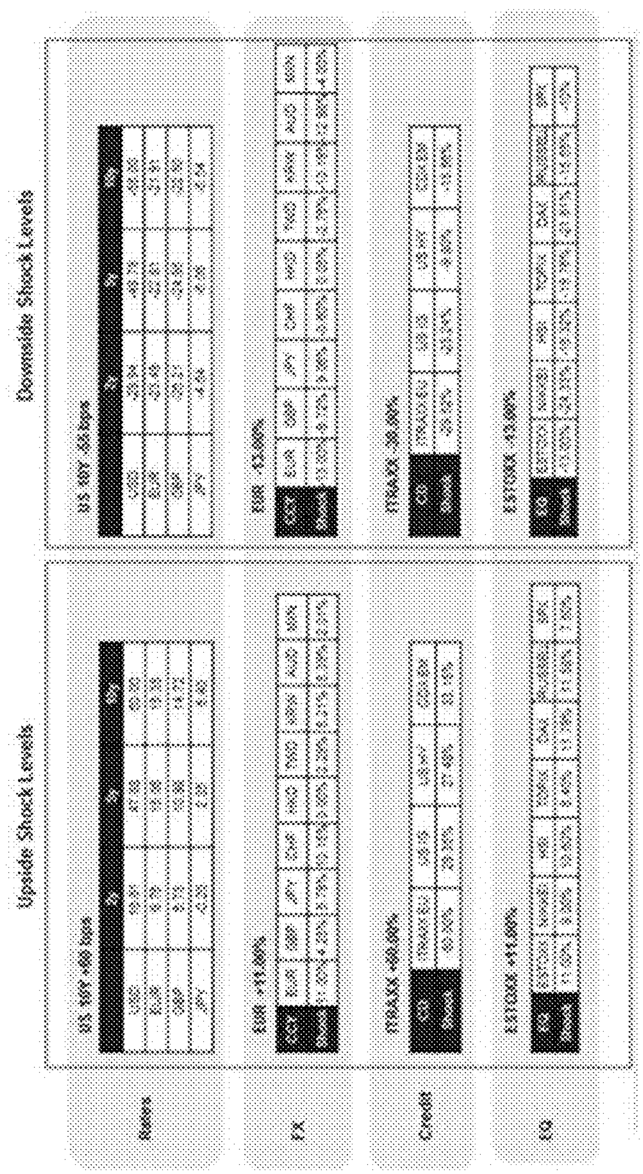
FIG. 42 illustrates upside shock levels and downside shock levels according to some embodiments.
Figure 43:
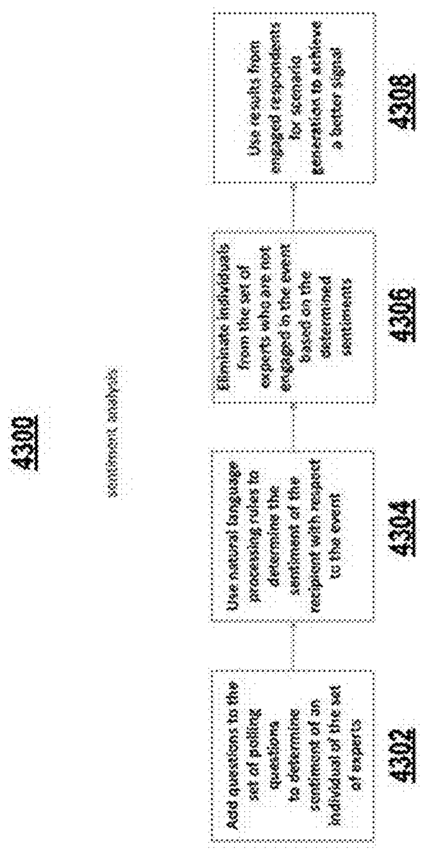
FIG. 43 illustrates a process flow of sentiment analysis according to some embodiments.

FIG. 42 illustrates upside shock levels and downside shock levels according to some embodiments FIG. 43 illustrates a process flow of sentiment analysis according to some embodiments.

At 4302, system 100 generates a set of polling questions. System 100 adds questions to the set of polling questions that can be used to determine the sentiment of experts of a set of experts. In some embodiments, the system 100 can use an opinion lexicon to determine sentiment, which is a dictionary containing opinion words with their polarity value to indicate the positive or negative sentiments, for example, "happy," "excellent," "bad," "boring," and so on. The system 100 can identify opinion targets about which some opinion is expressed and then determine the sentiment of that opinion. The system 100 can present the polling questions in an interface to receive responses in form fields.

At 4304, system 100 uses natural language processing rules to determine the sentiment of experts with regard to the event. The processing rules can define different sentiment factors, such as tone and formality, for example. The sentiment factors can also relate to excitement and anxiety, as further examples. The processing rules can process the responses from the polling questions to identify bias based on sentiment factors. For example, the processing rules that relate to excitement and anxiety can be used to process the responses from the polling questions to identify bias based on excitement and anxiety sentiment factors.

In some embodiments, the system 100 can use an opinion lexicon to determine sentiment, which is a dictionary containing opinion words with their polarity value to indicate the positive or negative sentiments, for example, "happy," "excellent," "bad," "boring," and so on. The system 100 can identify opinion targets about which some opinion is expressed and then determine the sentiment of that opinion.

The system 100 can have one or more sentiment analysis models based on knowledge extracted from ontology and context information data. The ontology can be used to determine the domain specific concepts which in turn produced the domain specific important features or factors that can be used for the sentiment determination. The system 100 can determine the polarities of the extracted concepts using a contextual polarity lexicon by considering the context information of a word. The semantic orientations of domain specific features of the review text can be aggregated based on the importance of a feature with respect to the domain. The importance of the feature is determined by the depth of the feature in the ontology, for example. Sentiment analysis determines opinion and sentiment towards entities such as products, services in the text of the responses to the polling questions.

At 4306, system 100 eliminates experts from the set of experts based on the results of the sentiment analysis. For example, the results of operation 4304 can be used to identify a set of responses that indicate bias based on the sentiment factors. As another example, the results of operation 4304 can be used to identify a set of experts linked to responses that indicate bias based on the sentiment factors. The system 100 can filter the experts and/or responses to the polling questions from the data set to attempt to eliminate bias. The filtering may involve removal of the responses. The filtering may involve attaching a lower weight to the responses, as another example.

Figure 44:
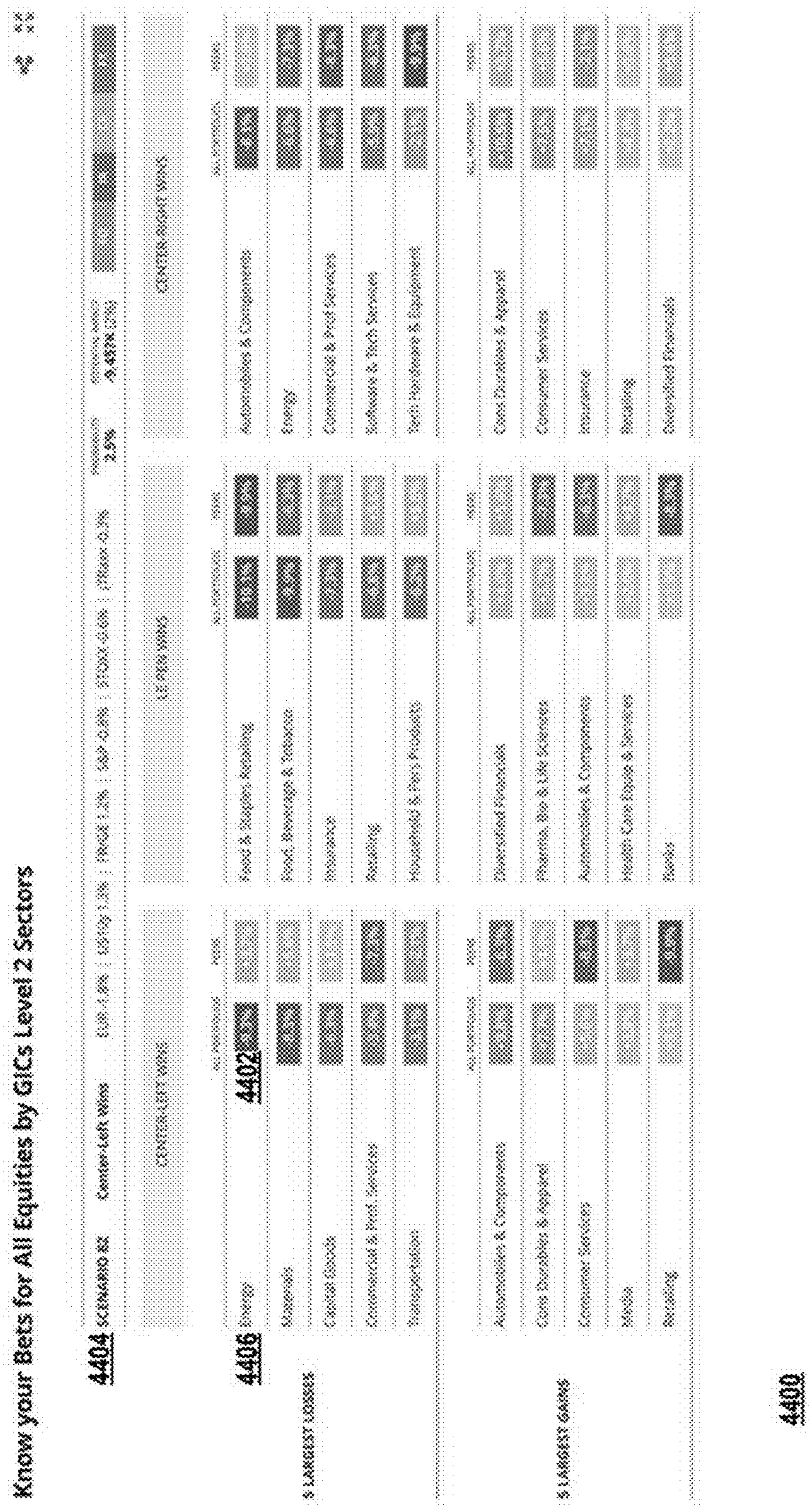
FIG. 44 illustrates an interface with scenario metrics according to some embodiments.

FIG. 44 illustrates an interface 4400 with scenario metrics according to some embodiments.

The interface 4400 detects a hover over bet indicia 4402 and in response displays corresponding scenario details in a toolbar 4404. This may be referred to as a "know your bets" view. The interface 4400 detects a click or selection of another bet indicia 4406 (e.g. top left bet for Largest Loss/Energy/Center-Left Wins) and the interface 4400 can display a sector drilldown in a toolbar 4404. For example, within the GIC sector level drilldown The interface 4400 can have Portfolio, Benchmark and Delta view toggles to change the bar chart or other visual representation of data.

The interface 4400 detects a hover over the bar chart bars to change the attribution pie, for example. The interface 4400 can have Attribution, Micro Shocks and Develop Hedge toggles to change the right hand panel contents, for example.

With the portfolio view selected, interface 4400 can use a develop hedge tool to enable a drag across the interface 400 and, in response, calculate hedge values for the first four rows in the bar chart. The interface 4400 detects a click or selection of a chevron or screen title to exit the drilldown view.

With an alert view selected, the interface 4400 can hover over a cell to initially select it for a drill down feature. In response, interface 4400 dynamically updates to create visual representations of detailed data related to the selected cell. For example, the cell can relate to a "retailing" scenario to view a sector drill down for an outcome or event.

With a benchmark view selected, the interface 4400 can hover over a cell to initially select it for a drill down feature. In response, interface 4400 dynamically updates to create visual representations of detailed benchmark data related to the selected cell. For example, the cell can relate to a "media" scenario to view sector benchmark data for an outcome or event.

With a delta view selected, the interface 4400 can hover over a cell to initially select it for a drill down feature to display a change over time, or a delta. In response, interface 4400 dynamically updates to create visual representations of detailed change data related to the selected cell. For example, the cell can relate to a "food and beverage" scenario to view sector comparison data for an outcome or event.

Figure 45:
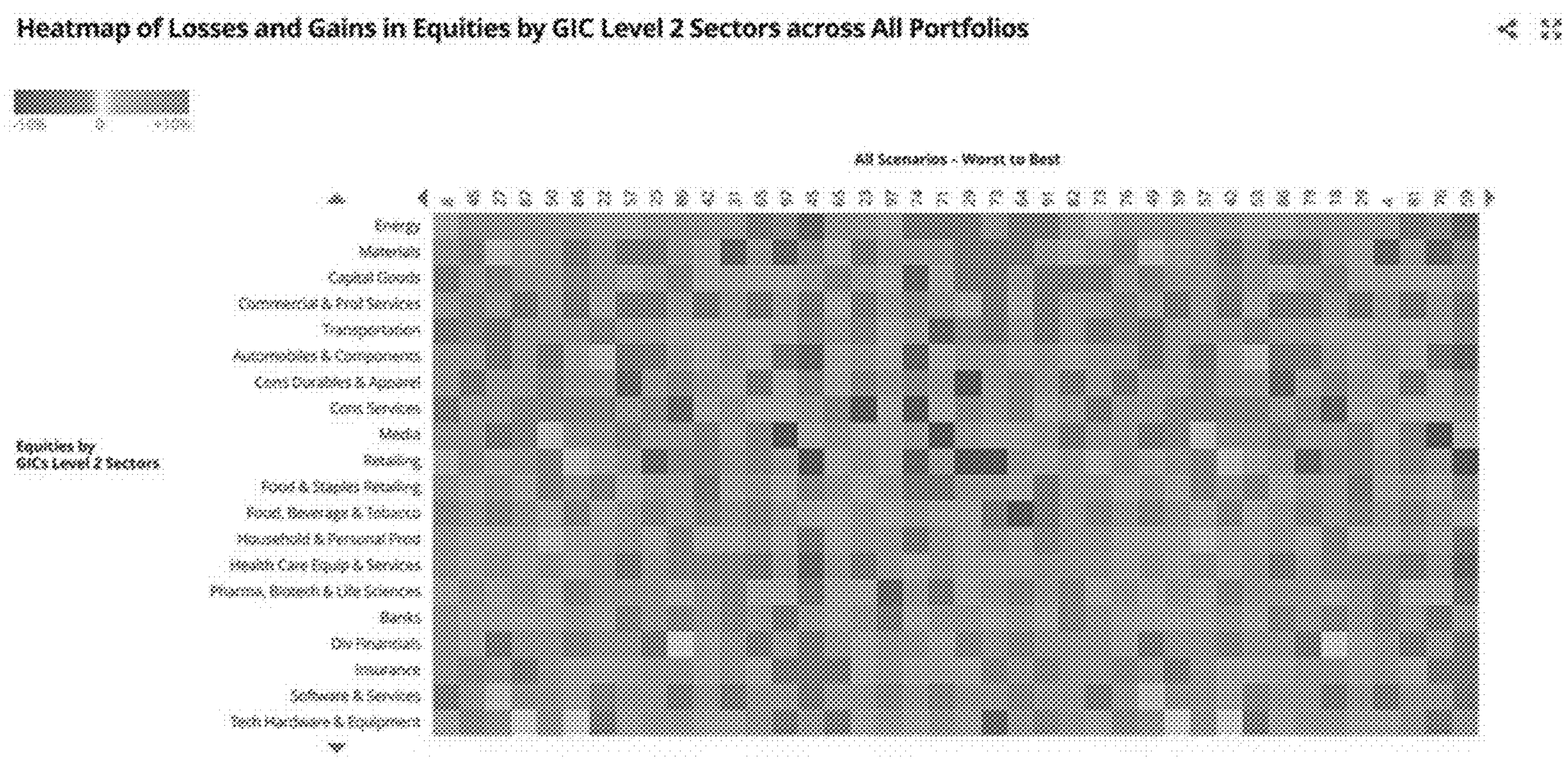
FIG. 45 illustrates an interface with a heat map of losses and gains according to some embodiments.

FIG. 45 illustrates an interface with a heat map of losses and gains according to some embodiments. The heatmap includes multiple visual elements representing losses and gains in equities by GIC level sectors across all portfolios. The visual elements can depict different shades of a color to represent a range or variance of values based on a configuration depicted in an example legend. The heat map can include an axis representing all scenarios (ranked worst to best in this example) and another axis depicting equity sectors. The heat map provides a helpful mechanism for visualization of raw data to assist the user in identifying trends.

Figure 46:
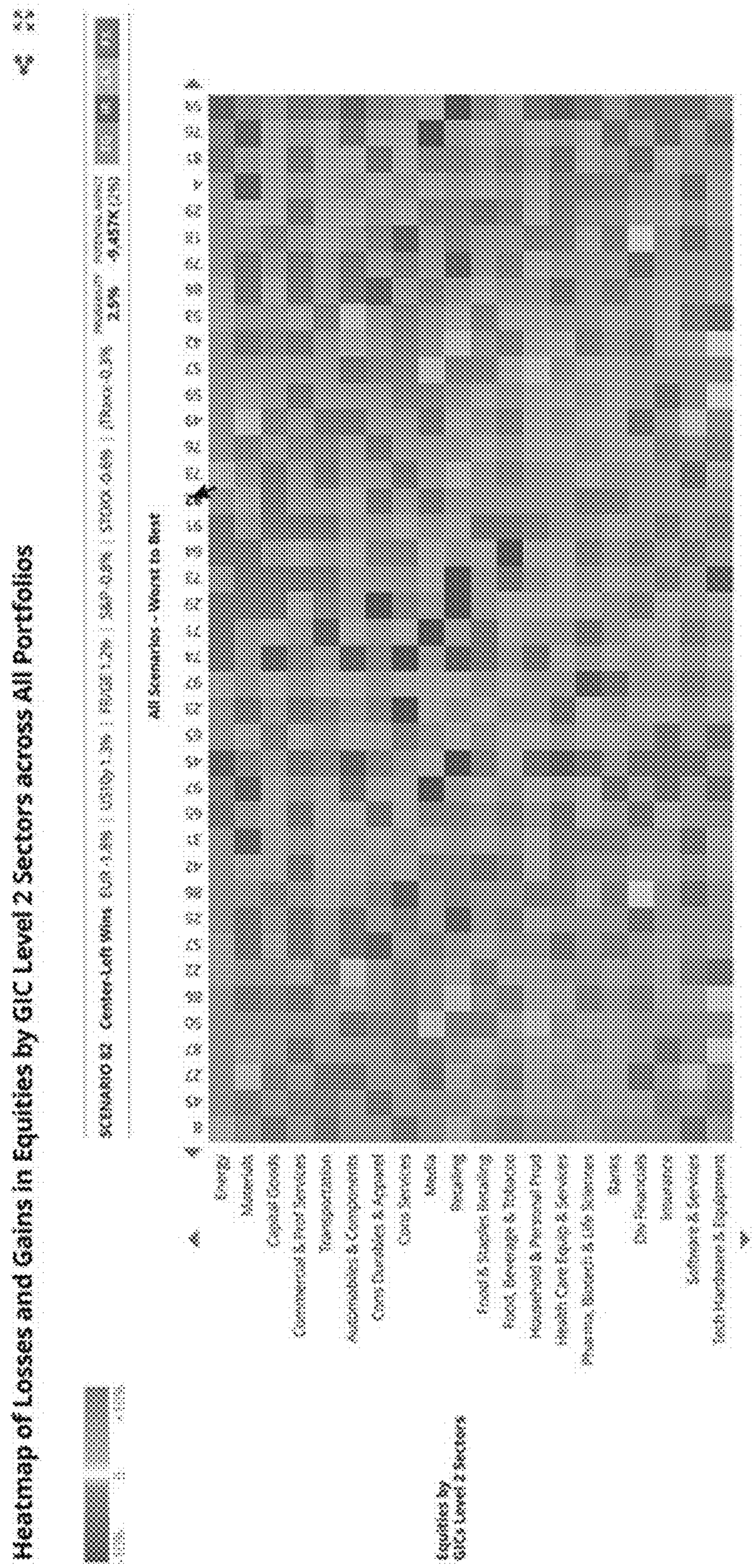
FIG. 46 illustrates an interface with a heat map of losses and gains according to some embodiments.

FIG. 46 illustrates an interface with a heat map of losses and gains according to some embodiments. In this example, a scenario (82) is selectable. In response to receiving a selection, the interface updates to provide detailed data regarding the selected scenario.

Figure 47:
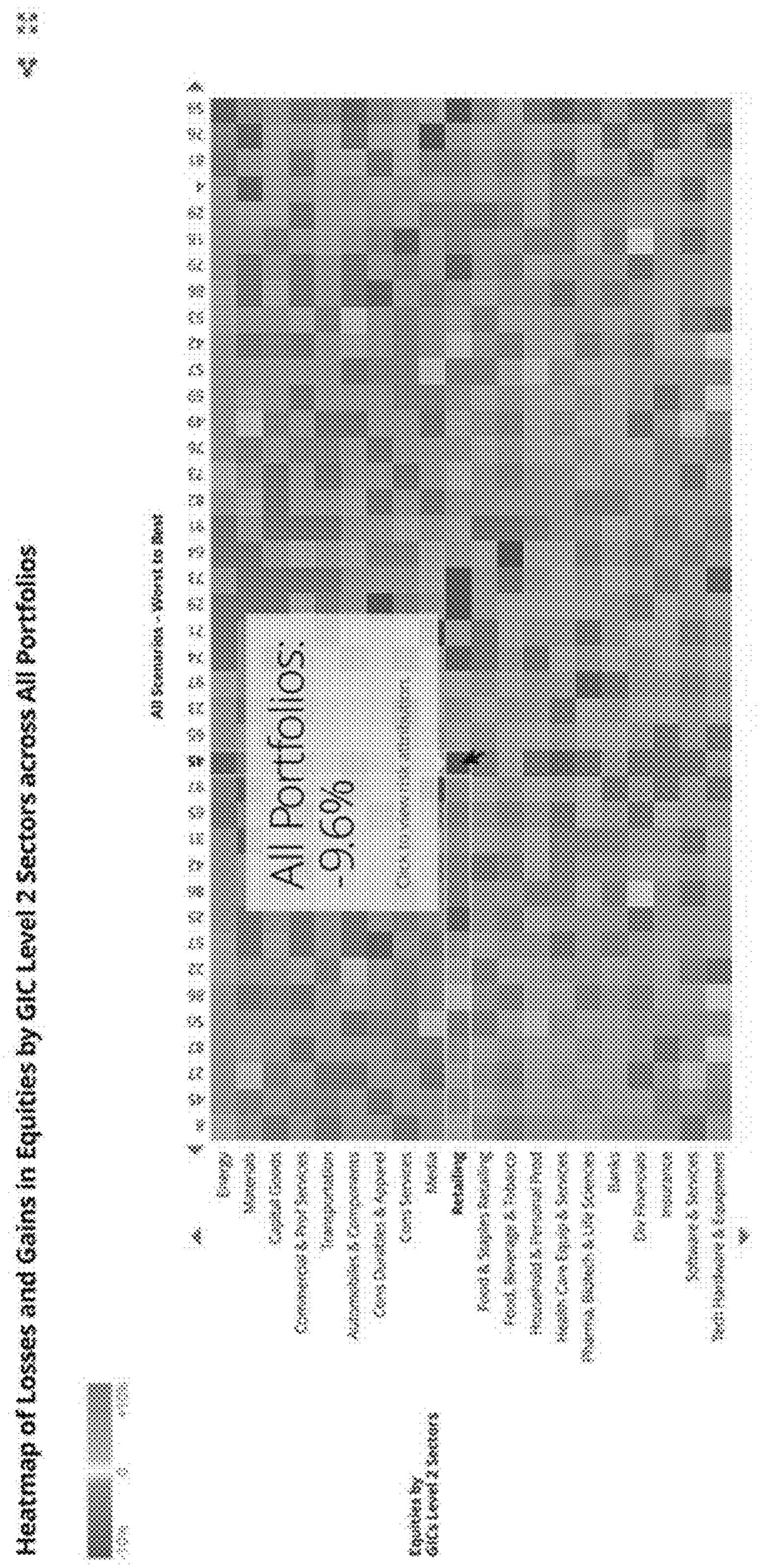
FIG. 47 illustrates an interface with a heat map of losses and gains according to some embodiments.

FIG. 47 illustrates an interface with a heat map of losses and gains according to some embodiments. In this example, a cell of the heat map is selectable (e.g. specific pair of scenario and sector). In response to receiving a selection, the interface updates to provide detailed data for the selected cell. In this example, the selected cell relates to scenario 45 for the retailing sector. The detailed data includes an impact on all portfolios. The detailed data is also selectable to trigger an update to the interface to indicate risk attribution.

Figure 48:
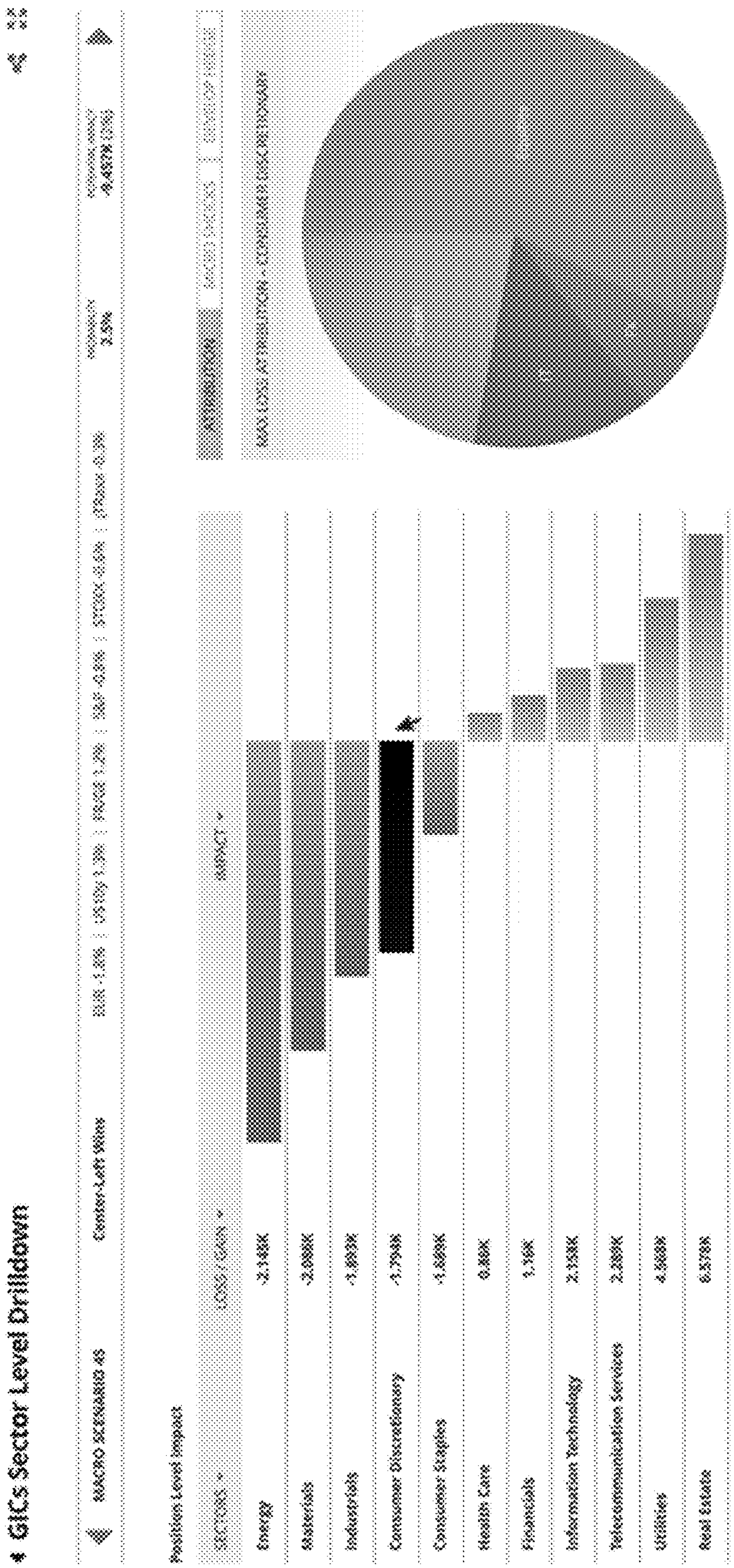
FIG. 48 illustrates an interface with a sector level summary according to some embodiments.

FIG. 48 illustrates an interface with a sector level summary according to some embodiments. The interface generates visual representations for a sector level drilldown to indicate visual metrics for position level impact along with chart data for attribution, micro shocks and hedge.

Figure 49:
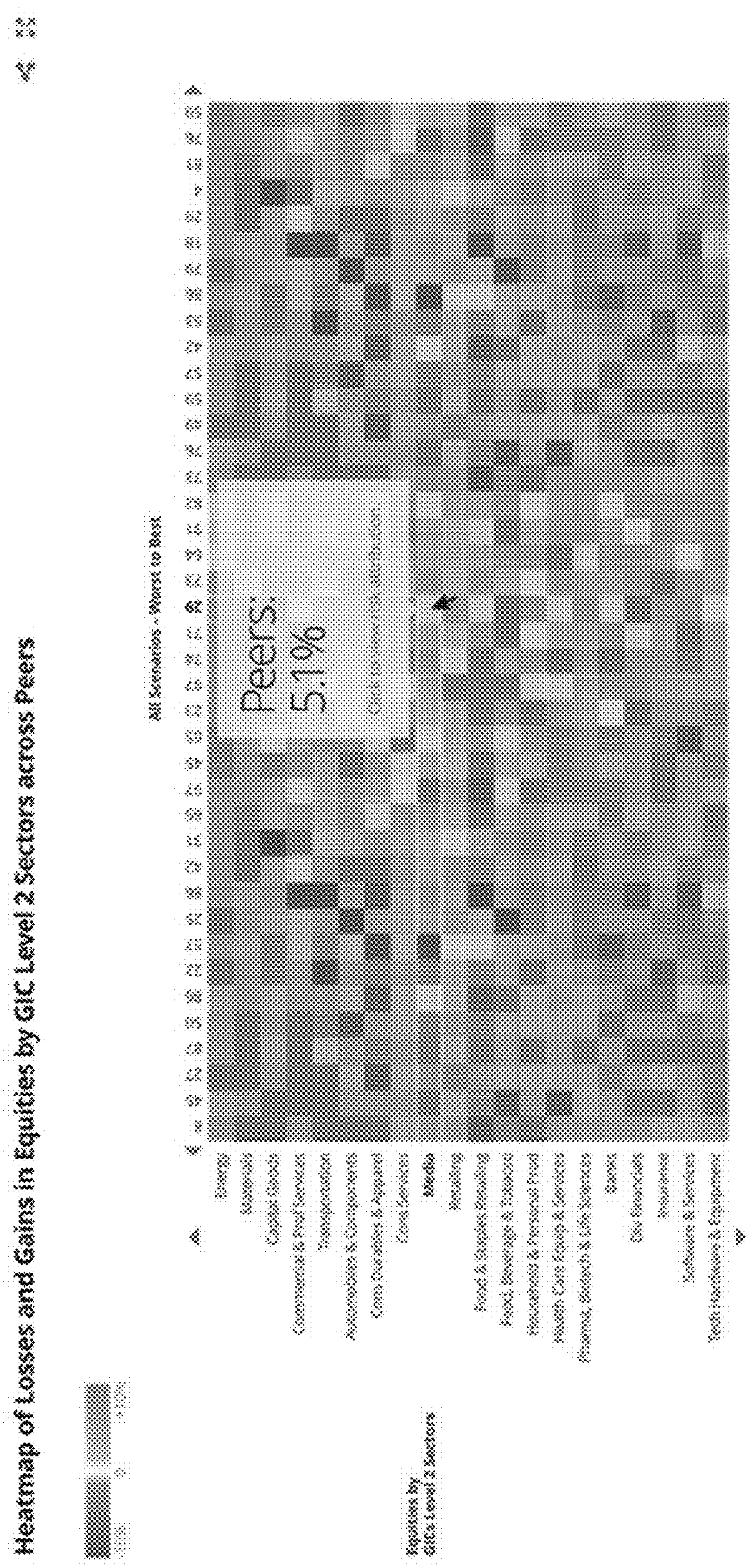
FIG. 49 illustrates an interface with a heat map of losses and gains according to some embodiments.

FIG. 49 illustrates an interface with a heat map of losses and gains according to some embodiments. In this example, a cell of the heat map is selectable (e.g. specific pair of scenario and sector). In response to receiving a selection, the interface updates to provide detailed data for the selected cell. In this example, the selected cell relates to scenario 29 for the media sector. The detailed data includes an impact on all portfolios. The detailed data is also selectable to trigger an update to the interface to indicate risk attribution.

Figure 50:
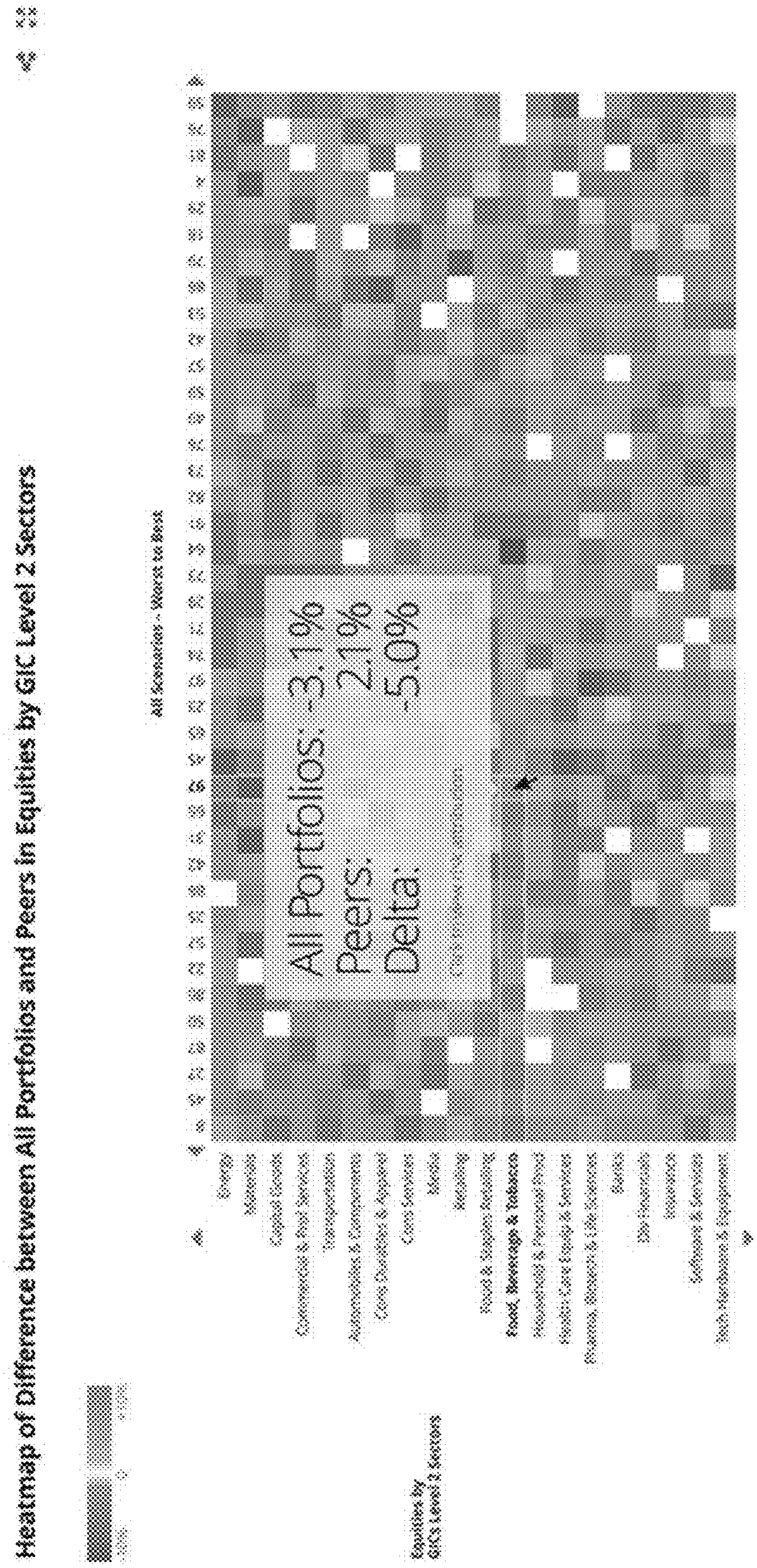
FIG. 50 illustrates an interface with a heat map of differences between portfolios and peers according to some embodiments.

FIG. 50 illustrates an interface with a heat map of losses and gains according to some embodiments. In this example, a cell of the heat map is selectable (e.g. specific pair of scenario and sector). In response to receiving a selection, the interface updates to provide detailed data for the selected cell. In this example, the selected cell relates to scenario 97 for the food, beverage and tobacco sector and the data relates to portfolio impact, along with benchmark (peers) and delta data. The detailed data includes an impact on all portfolios. The detailed data is also selectable to trigger an update to the interface to indicate risk attribution.

Figure 51:
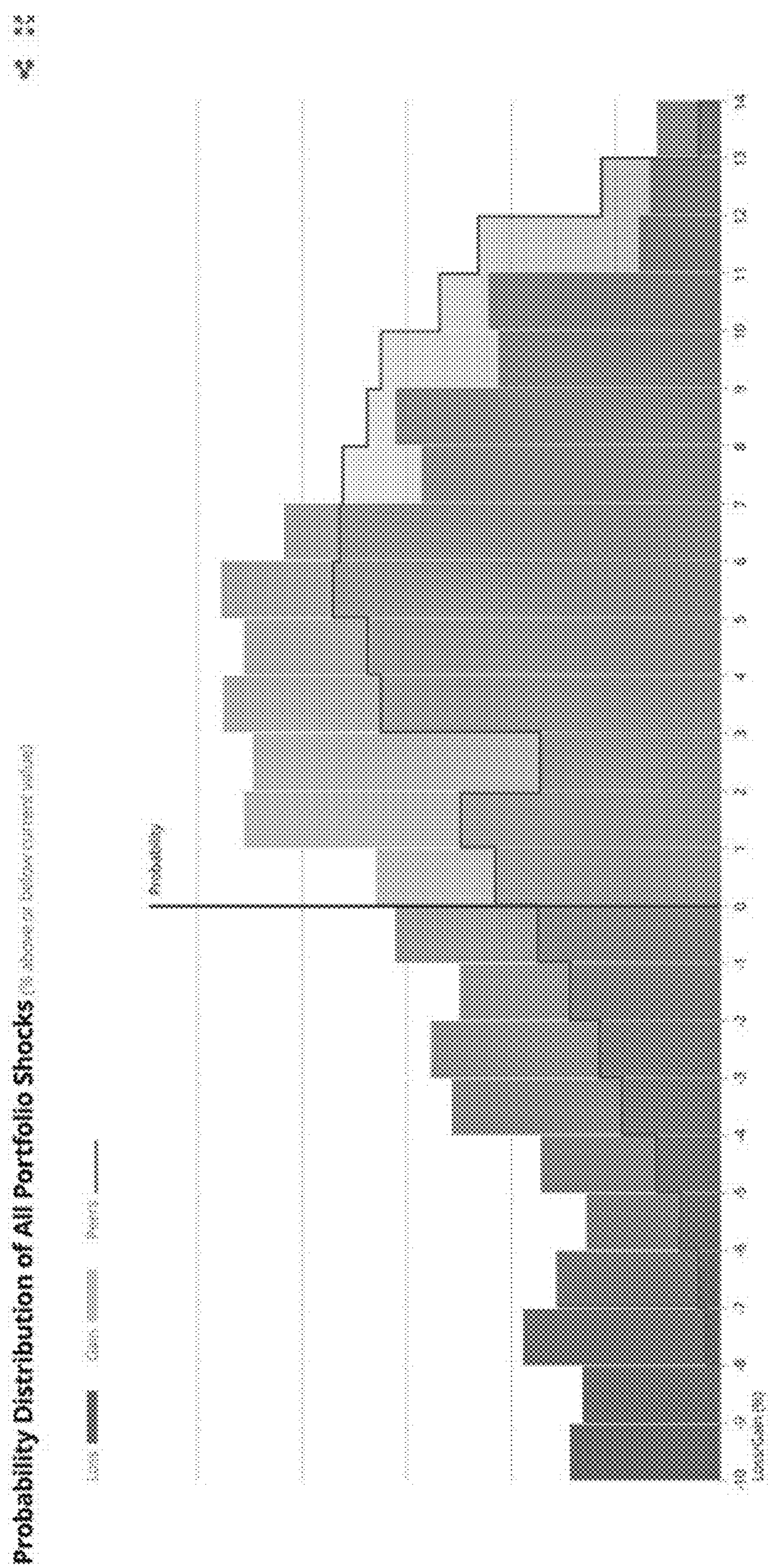
FIG. 51 illustrates an interface with a graph of distributions according to some embodiments.

FIG. 51 illustrates an interface with a graph of distributions according to some embodiments. The chart indicates probability distributions of all portfolio shocks. The dark line in the graph indicates benchmark data (peers). Each of the bars is selectable to trigger an update to interface for a popup. A portfolio filter indicator is selectable to trigger a change in portfolio data to focus on a specific portfolio or all portfolios, for example. Asset and source indicators are also selectable to change the data visualization. Each bar indicates the sum of the probabilities of scenarios yielding a loss in a given range (from −10 to 14 in this example).

Figure 52:
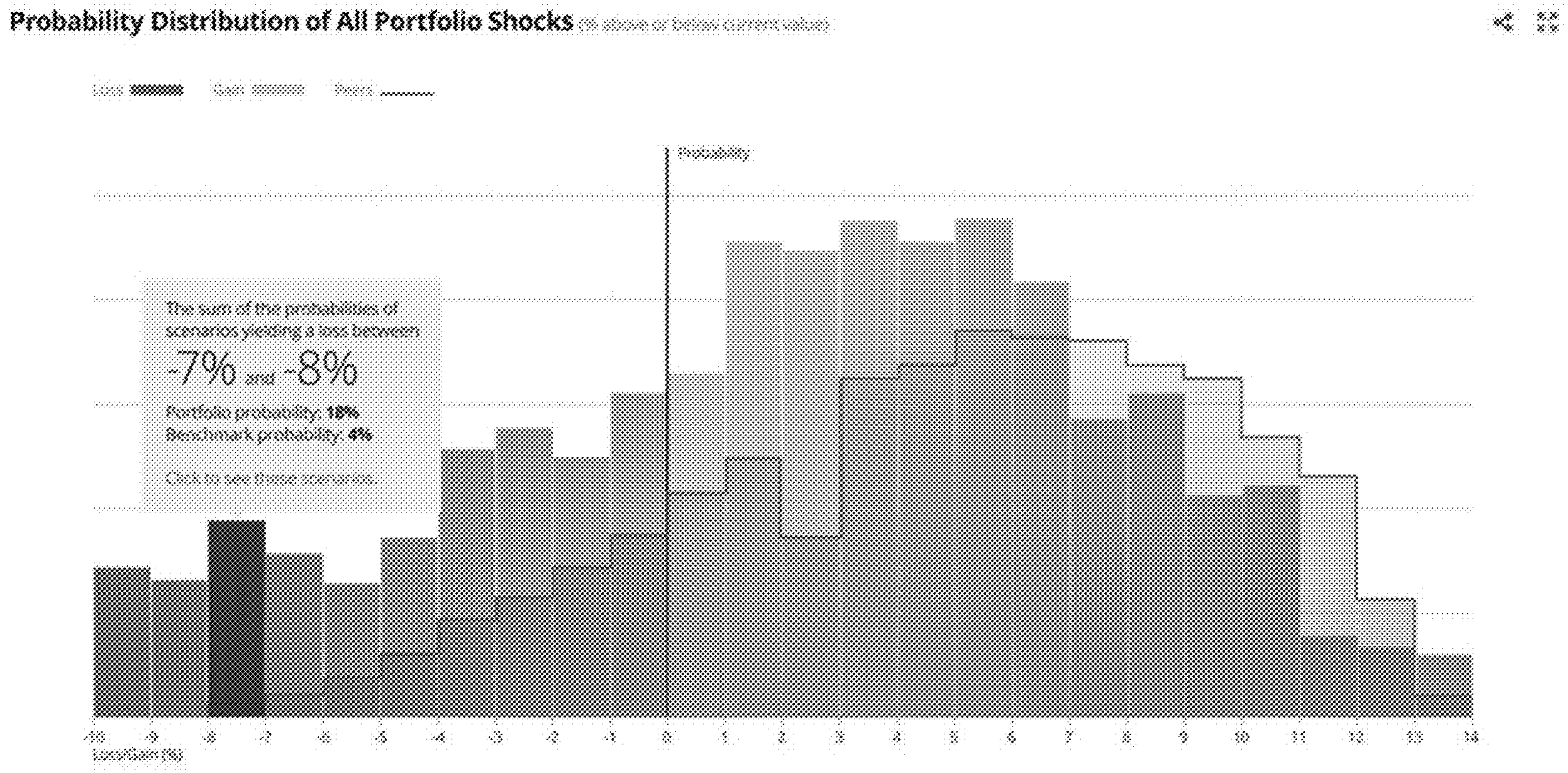
FIG. 52 illustrates an interface with a graph of distributions according to some embodiments.

FIG. 52 illustrates an interface with a graph of distributions according to some embodiments. The bars are selectable to trigger an update to the interface to include additional visual elements. In this example, the −7% and −8% bar is selectable to show the table of scenarios. The bar indicates the sum of the probabilities of scenarios yielding a loss between −7% and −8%. The data can also indicate portfolio probability and benchmark probability. Each scenario row at the bottom of the chart is selectable to update the interface with a sector drilldown.

Figure 53:
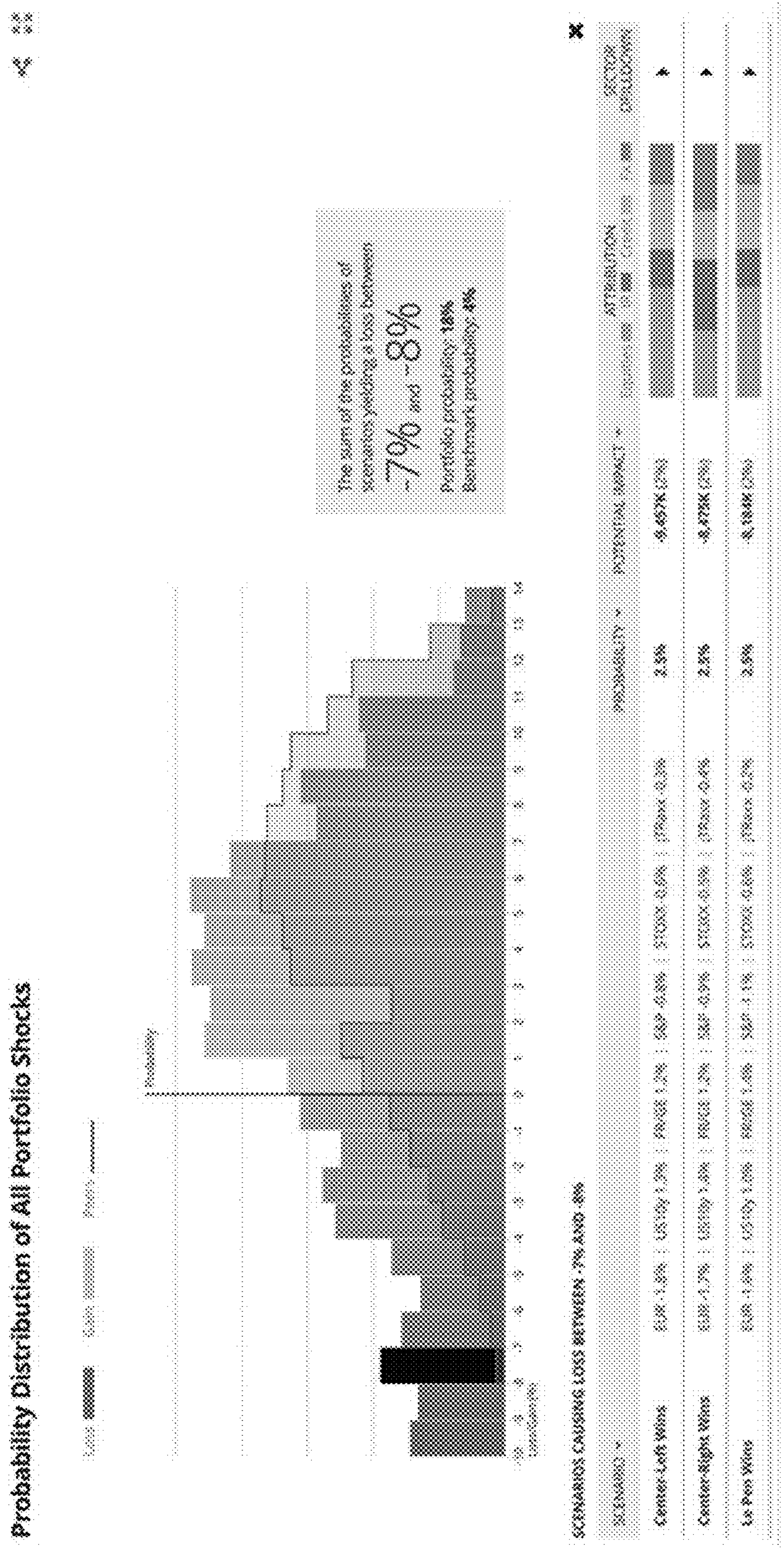
FIG. 53 illustrates an interface with a graph of distributions according to some embodiments.

FIG. 53 illustrates an interface with a graph of distributions according to some embodiments. In this example, the bar for the loss between −7% and −8% is selected to update the interface to indicate the table of scenarios and outcomes or events, including data for probability, potential impact, attribution, and so on. The interface dynamically updates in real-time to reflect updates to the response data from polling.

Figure 54:
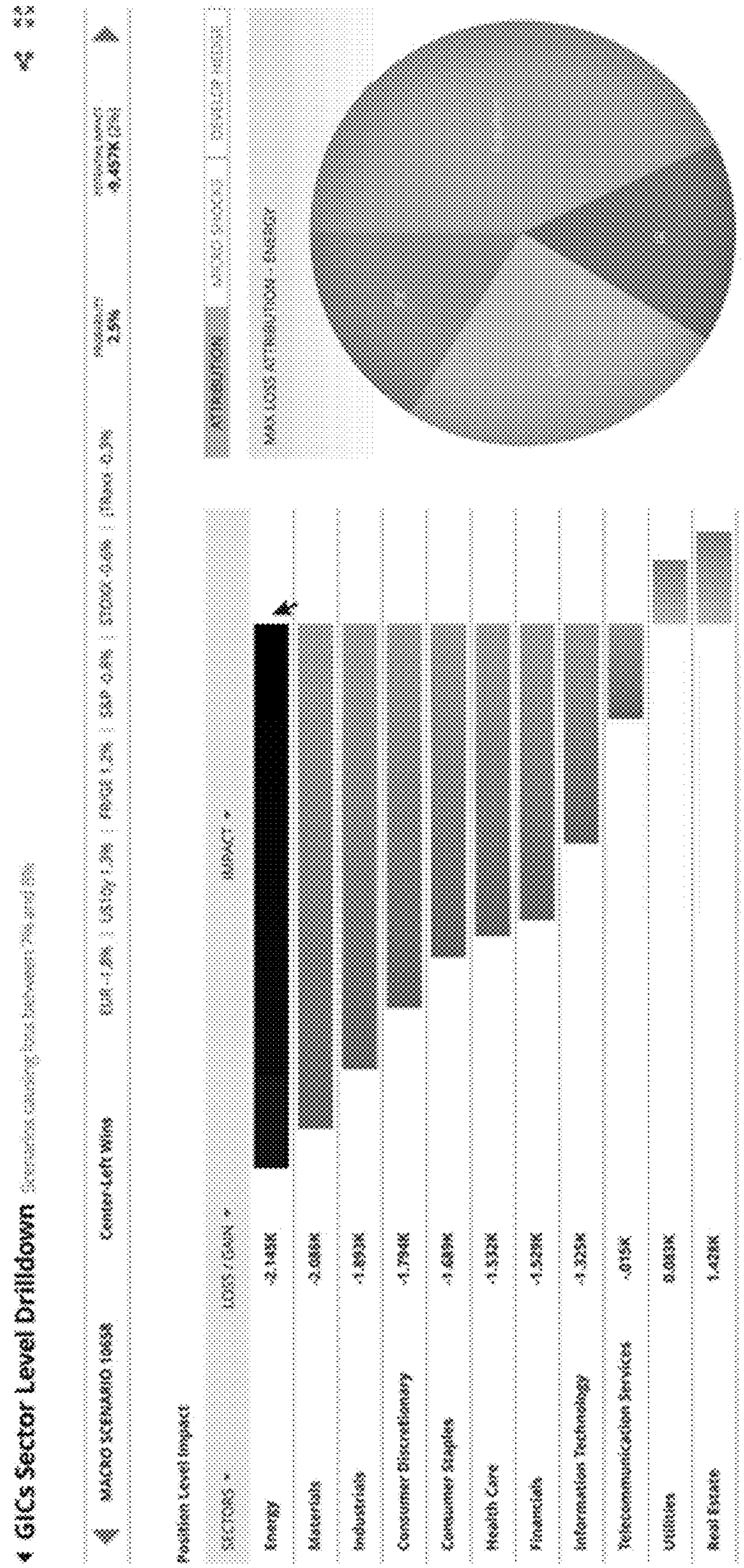
FIG. 54 illustrates an interface with a sector level summary according to some embodiments.

FIG. 54 illustrates an interface with a sector level summary according to some embodiments. For example, the interface can update to indicate a sector level drill down in response to a scenario row being selected. Within the sector level drill down, the interface can update to indicate different views, such as portfolio, benchmark, and delta. Each bar of the position level impact graph being selectable to change the attribution pie chart. The interface includes toggle views for attribution, micro shocks and hedge. The hedge tool can trigger a dynamic calculation and update of hedge values for a segment of rows for the bar chart.

Figure 55:
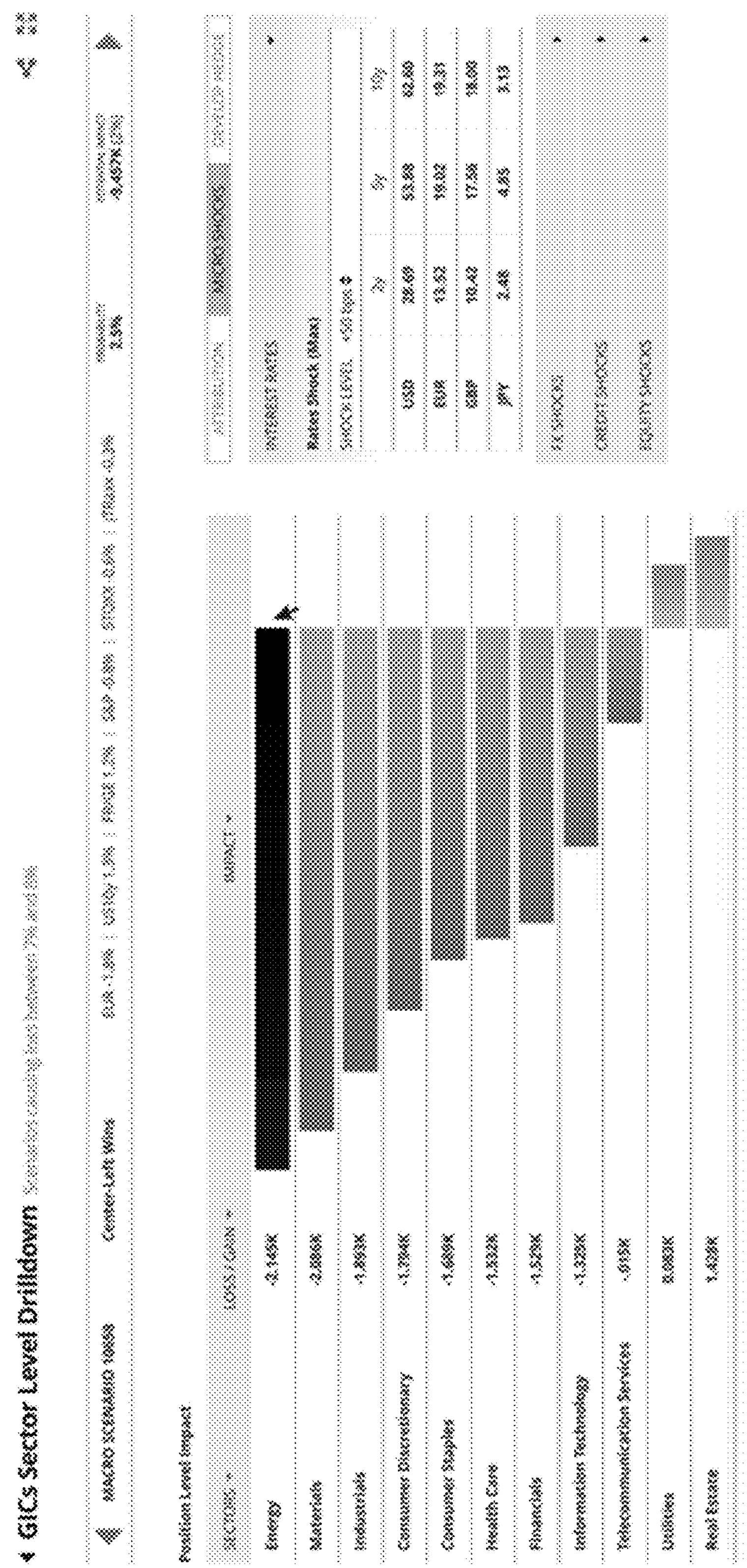
FIG. 55 illustrates an interface with a sector level summary according to some embodiments.

FIG. 55 illustrates an interface with a sector level summary according to some embodiments. In this example, the interface enables selection of the bar for the energy sector to trigger an update to the micro shock data.

Figure 56:
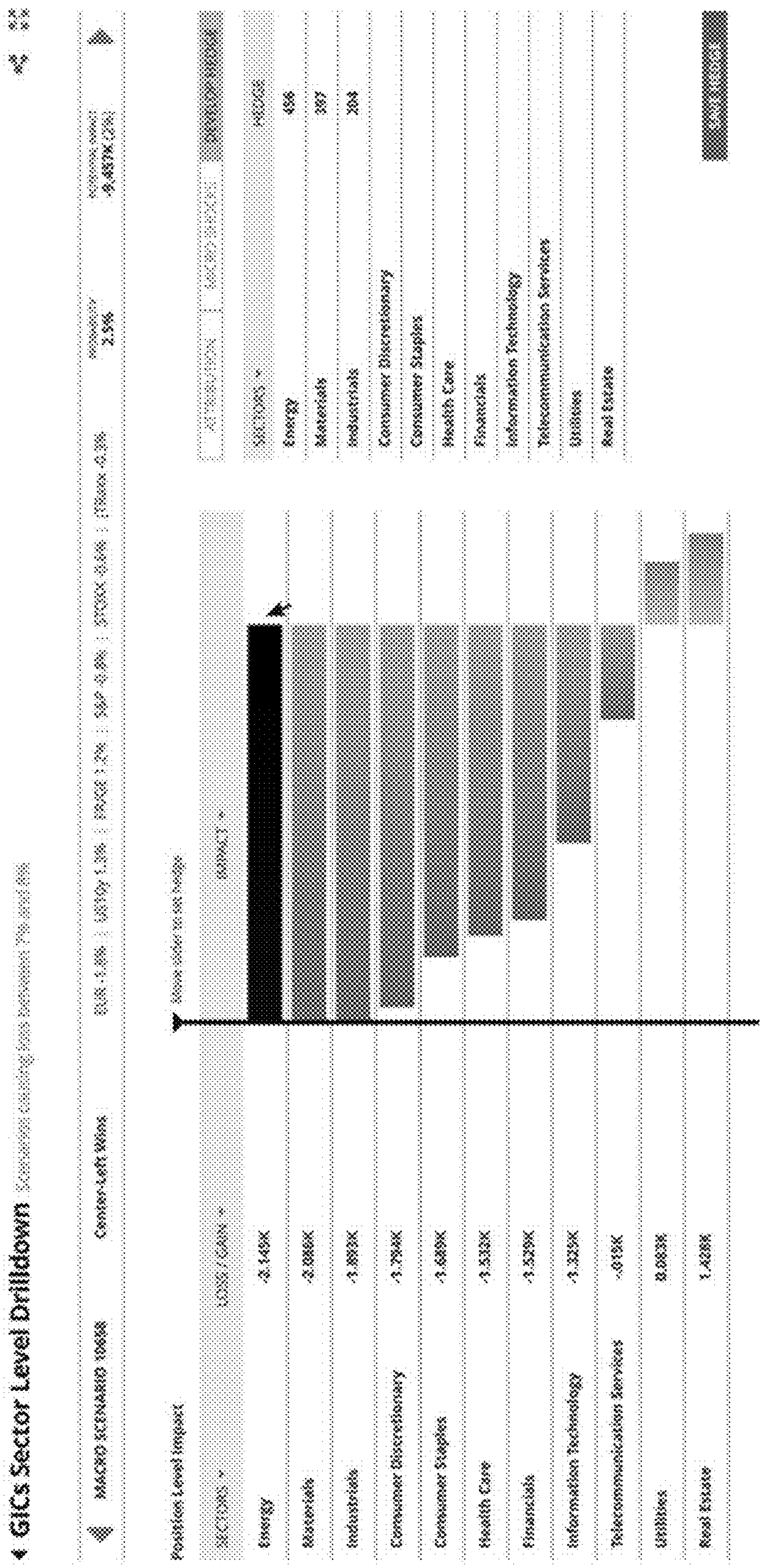
FIG. 56 illustrates an interface with a sector level summary according to some embodiments.

FIG. 56 illustrates an interface with a sector level summary according to some embodiments. In this example, the interface enables selection of the bar for the energy sector to trigger an update to the hedge tool.

Figure 57:
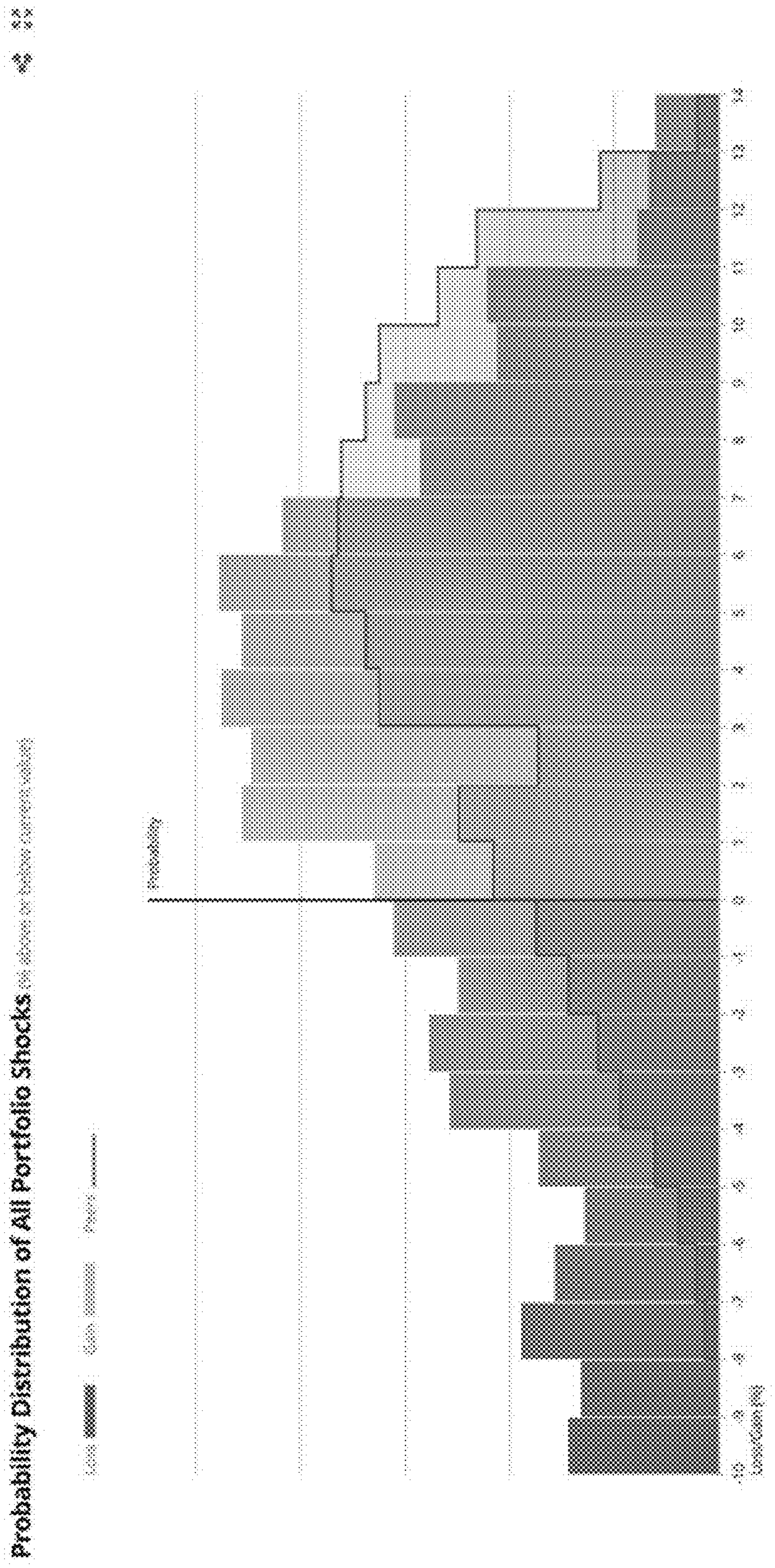
FIG. 57 illustrates an interface with a graph of distributions according to some embodiments.

FIG. 57 illustrates an interface with a graph of distributions according to some embodiments. The interface indicates probability distribution of all portfolio shocks in this example with a loss or gain range from −10% to 14%. The interface dynamically update with a dark line to indicate peer or benchmark data.

Figure 58:
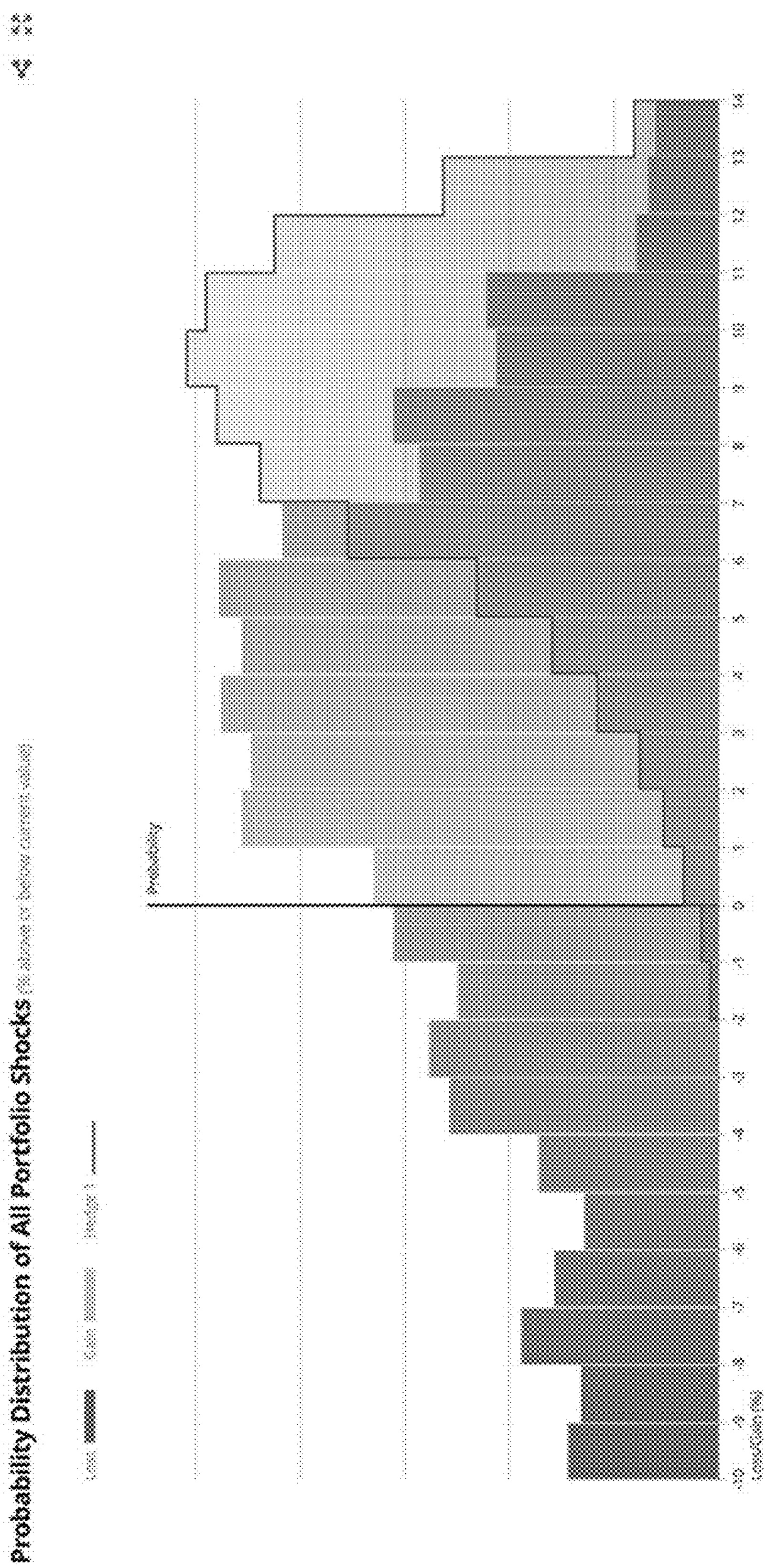
FIG. 58 illustrates an interface with a graph of distributions according to some embodiments.

FIG. 58 illustrates an interface with a graph of distributions according to some embodiments. The interface indicates probability distribution of all portfolio shocks in this example with a loss or gain range from −10% to 14%. The interface dynamically update with a dark line to indicate hedge data.

Figure 59:
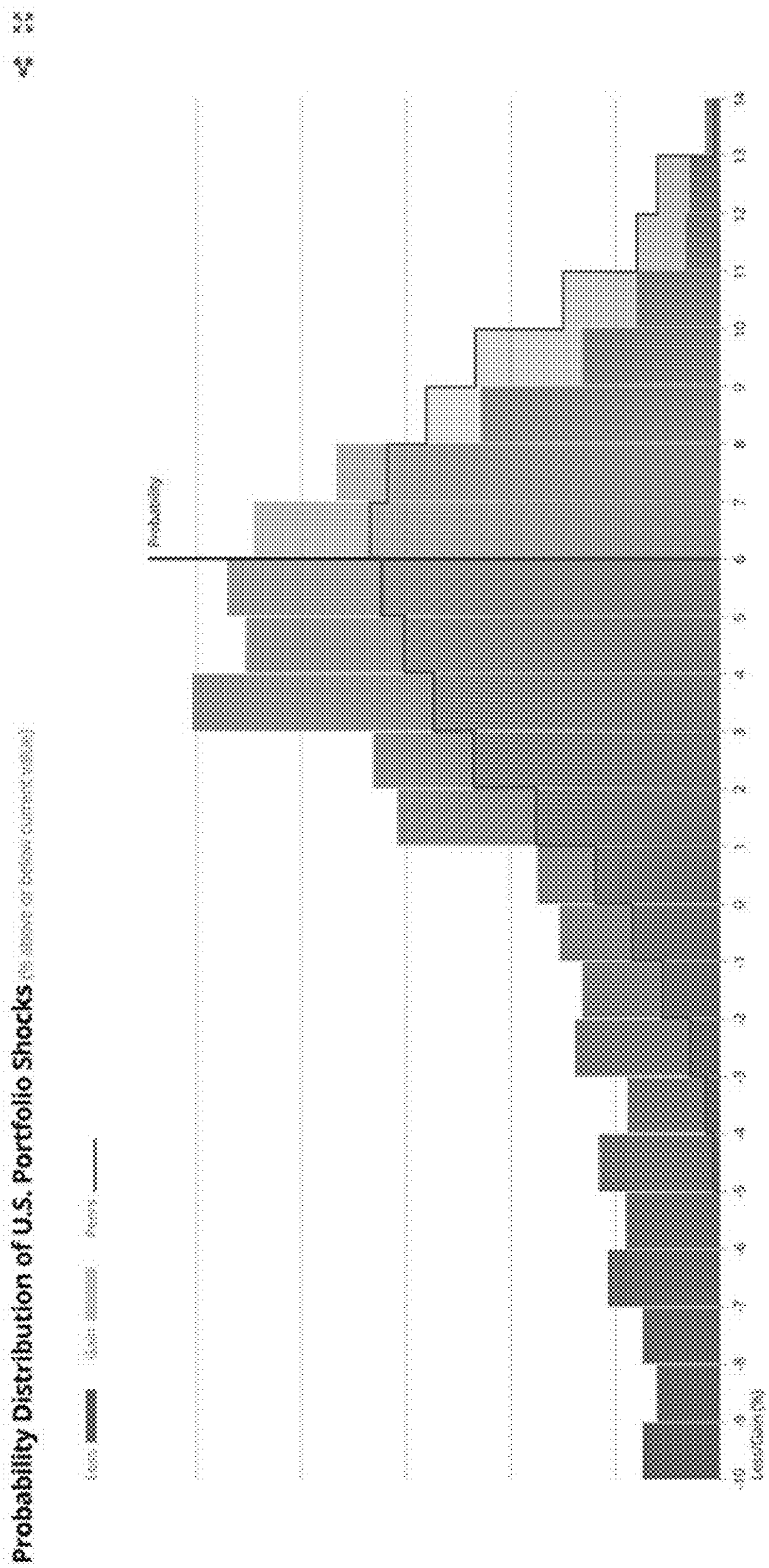
FIG. 59 illustrates an interface with a graph of distributions according to some embodiments.

FIG. 59 illustrates an interface with a graph of distributions according to some embodiments. The interface indicates probability distribution of all portfolio shocks in this example with a loss or gain range from −10% to 14%. The interface dynamically update with a dark line to indicate peer or benchmark data with the probability line updated to a new position.

Figure 60:
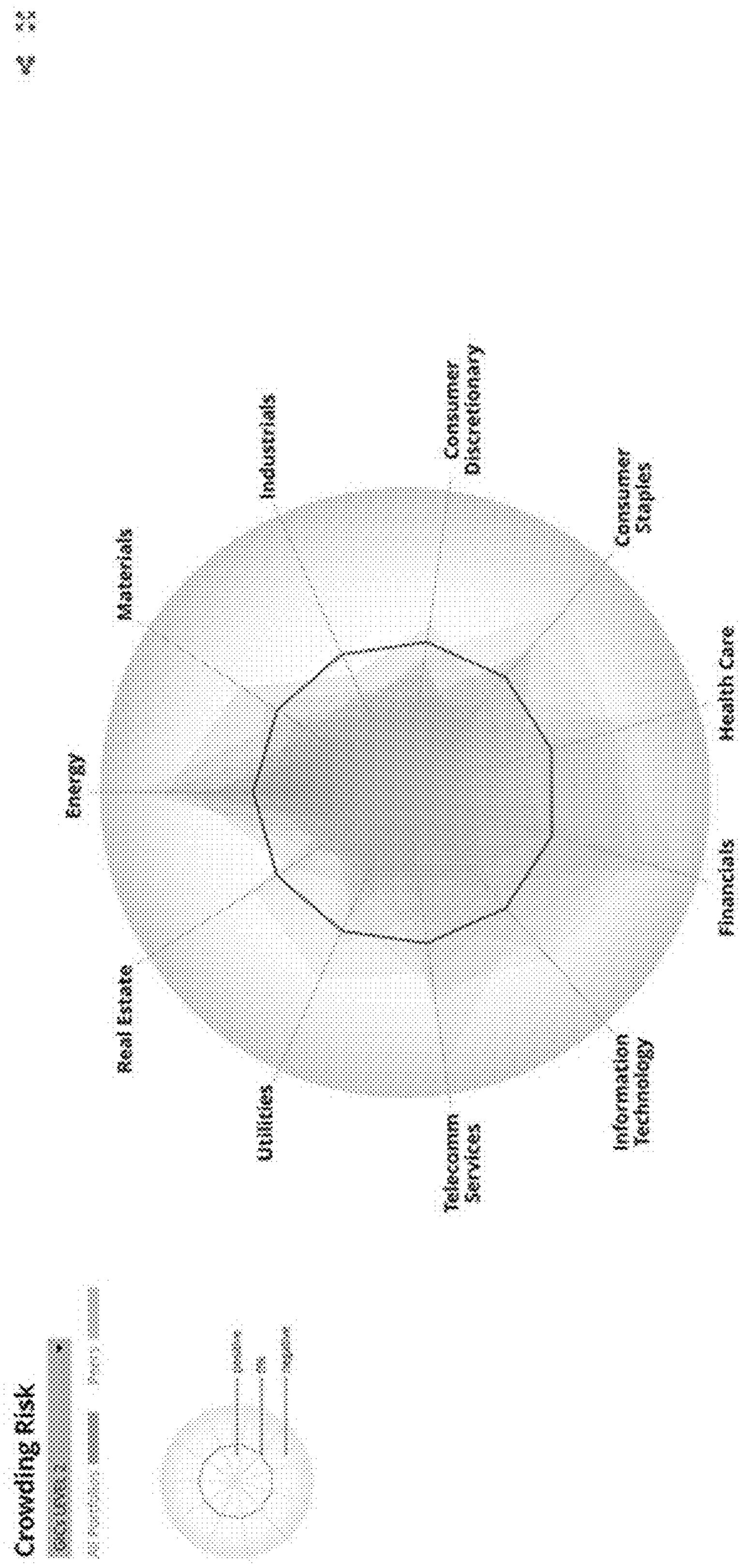
FIG. 60 illustrates an interface with graphical representations according to some embodiments.

FIG. 60 illustrates an interface with graphical representations according to some embodiments. The example interface shows crowding risk displayed as a dynamic visual representation. The centre segment indicates positive impact, the dark line indicates neutral impact and the outer segment indicates negative impact across different sectors. The interface also includes a visual representation for benchmark data as shading.

Figure 61:
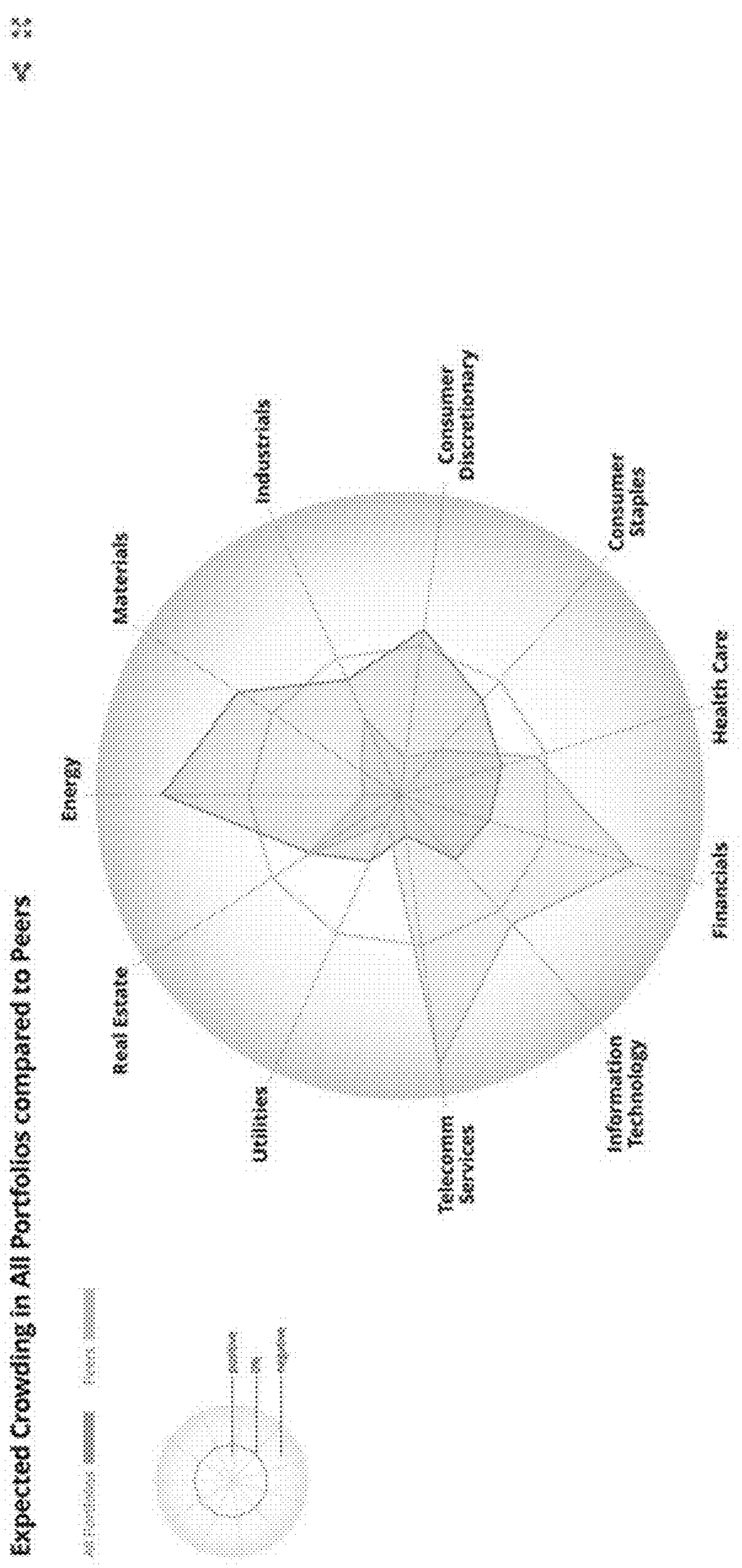
FIG. 61 illustrates an interface with graphical representations according to some embodiments.

FIG. 61 illustrates an interface with graphical representations according to some embodiments. The example indicates expected crowding in all portfolios compares to benchmark data across different sectors.

FIG. 62 illustrates an interface with a listing of macro scenarios according to some embodiments. The example interface indicates a listing of macro scenarios with a macro scenario drill down.

Figure 63:
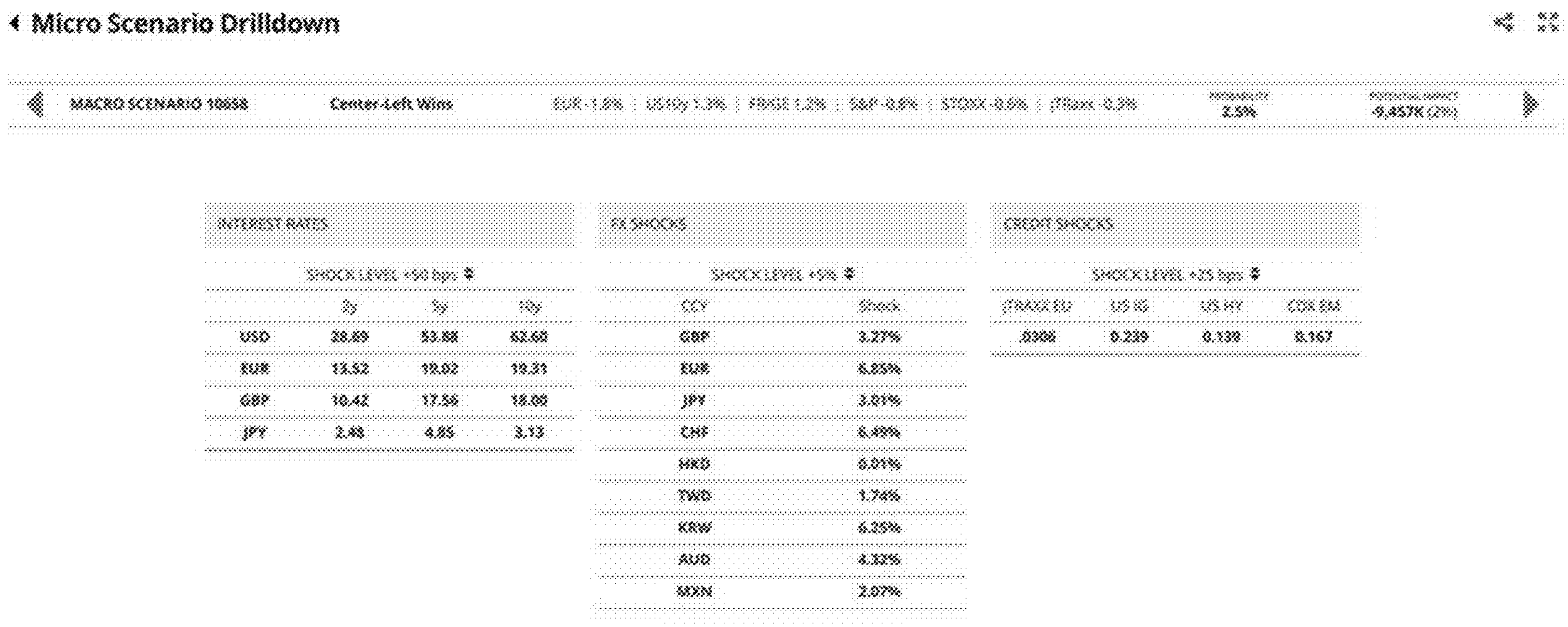
FIG. 63 illustrates an interface with a listing of macro scenarios according to some embodiments.

FIG. 63 illustrates an interface with a listing of macro scenarios according to some embodiments. The example interface indicates micro scenario drilldown data for interest rates, exchange shocks, and credit shocks.

Figure 64:
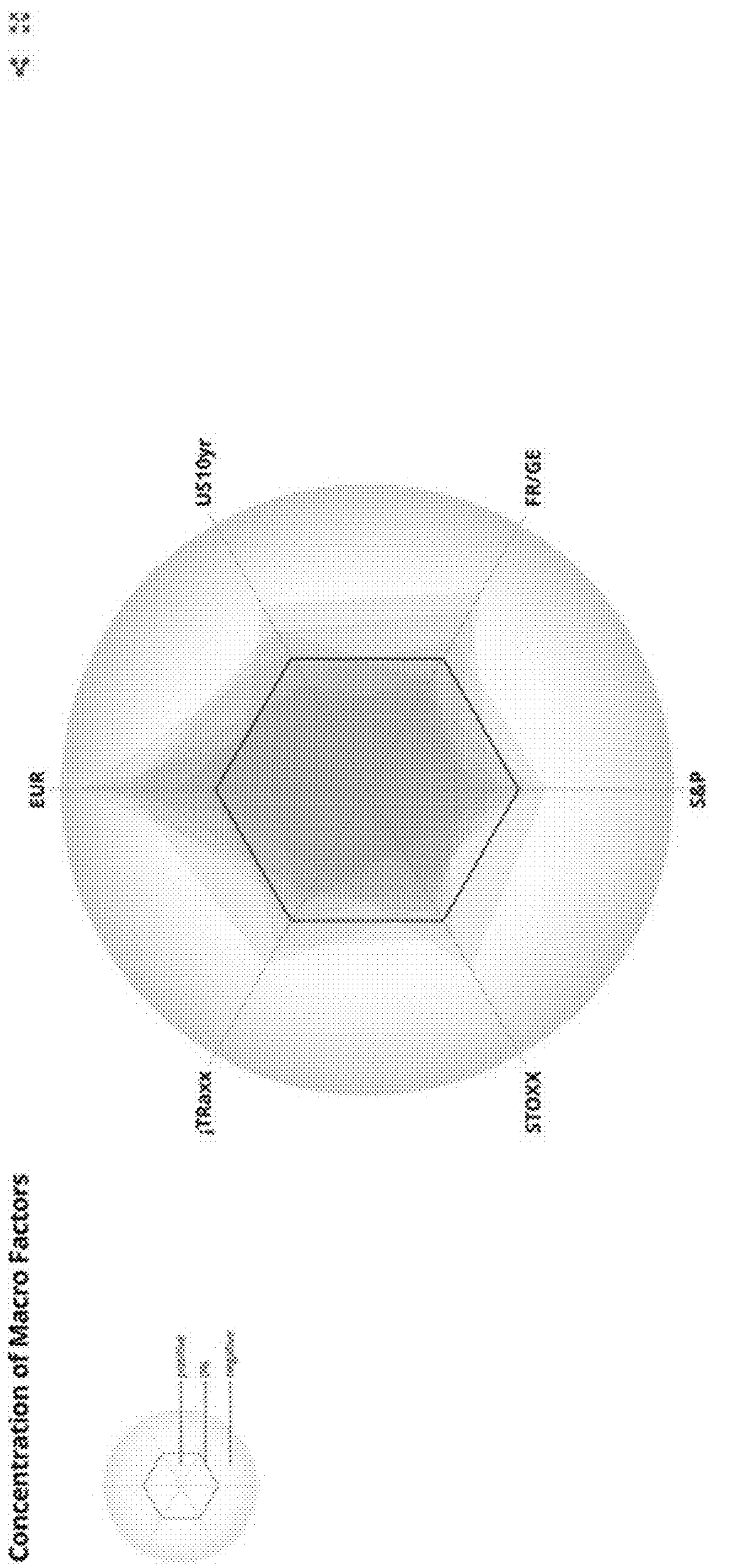
FIG. 64 illustrates an interface with graphical representations according to some embodiments.

FIG. 64 illustrates an interface with graphical representations according to some embodiments. The example interface indicates visual representations for a concentration of macro factors.

Figure 65:
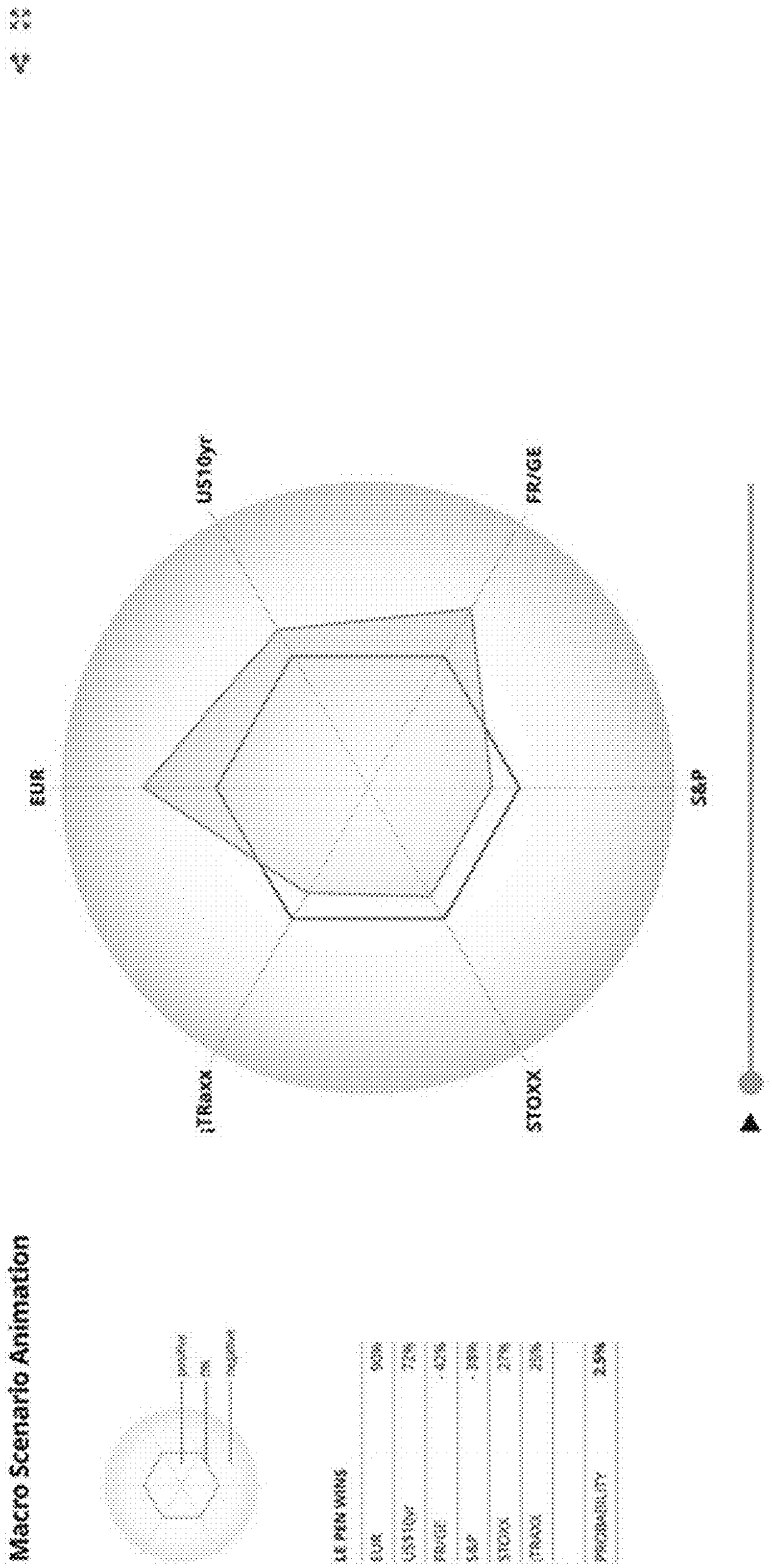
FIG. 65 illustrates an interface with graphical representations according to some embodiments.

FIG. 65 illustrates an interface with graphical representations according to some embodiments. The example interface indicates visual representations for macro scenario animation for different events or outcomes.

Figure 66:
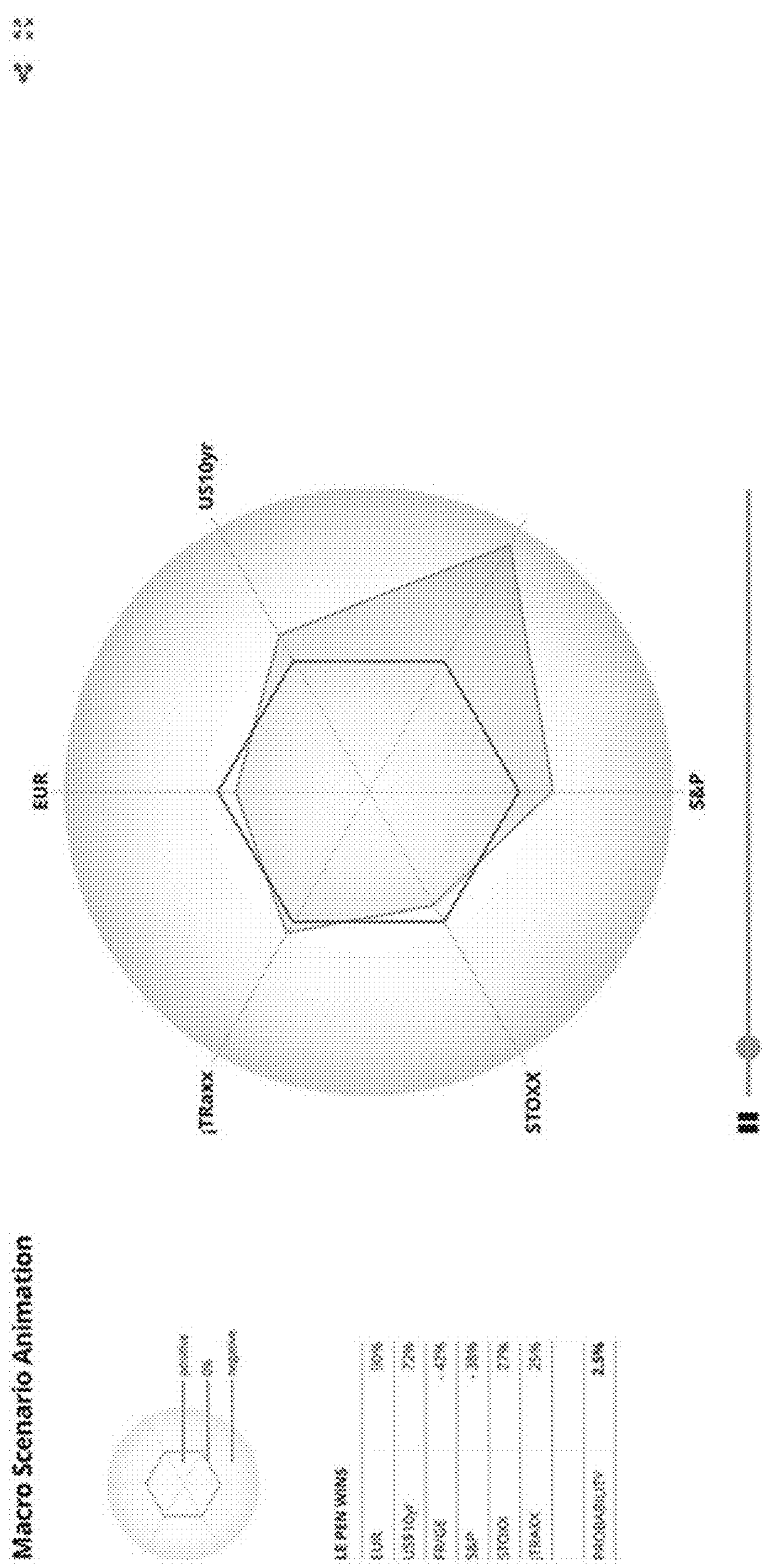
FIG. 66 illustrates an interface with graphical representations according to some embodiments.

FIG. 66 illustrates an interface with graphical representations according to some embodiments. The example interface indicates visual representations for macro scenario animation for different events or outcomes.

Figure 67:
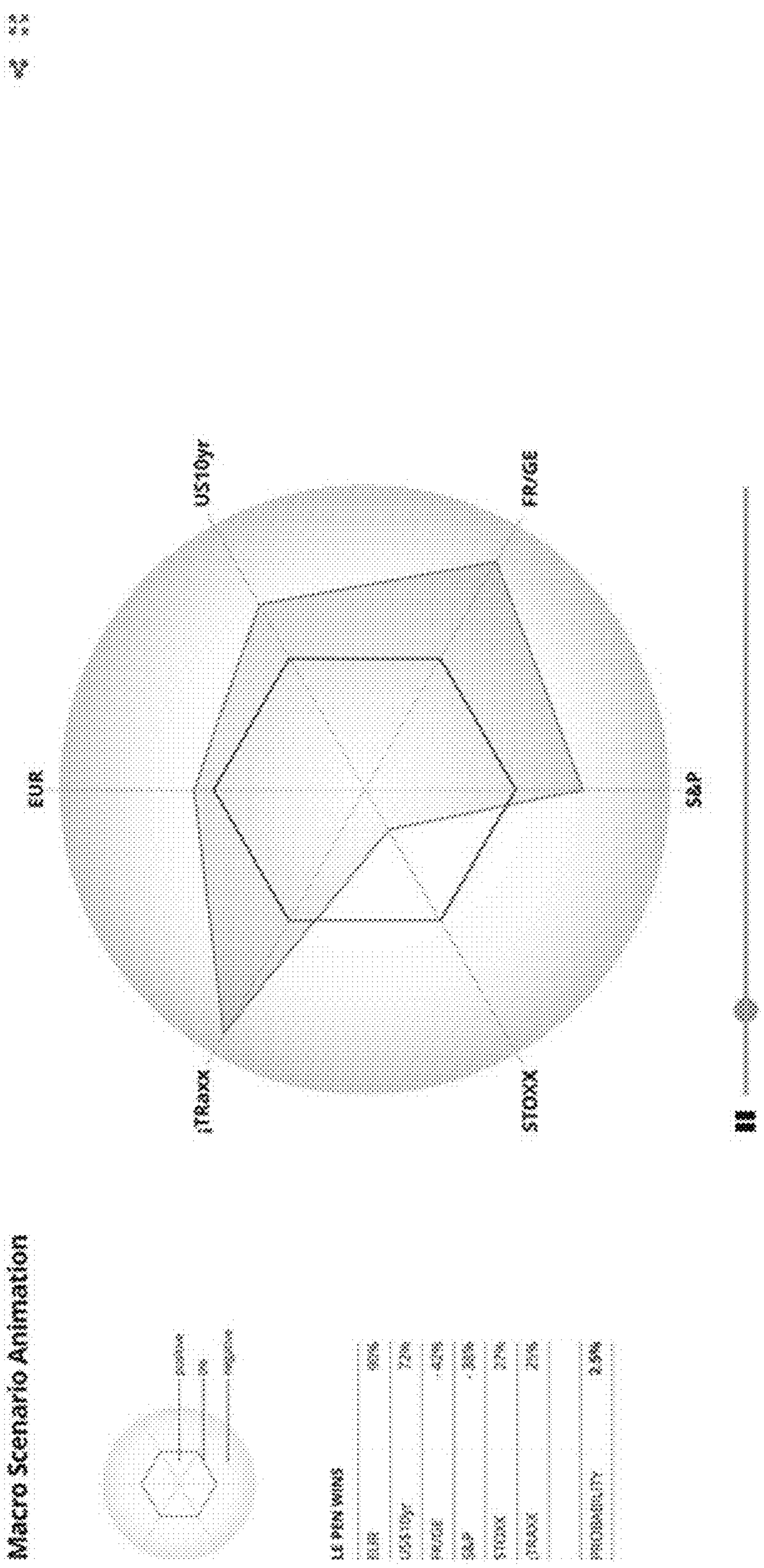
FIG. 67 illustrates an interface with graphical representations according to some embodiments.

FIG. 67 illustrates an interface with graphical representations according to some embodiments. The example interface indicates other visual representations for macro scenario animation for different events or outcomes.

Figure 68:
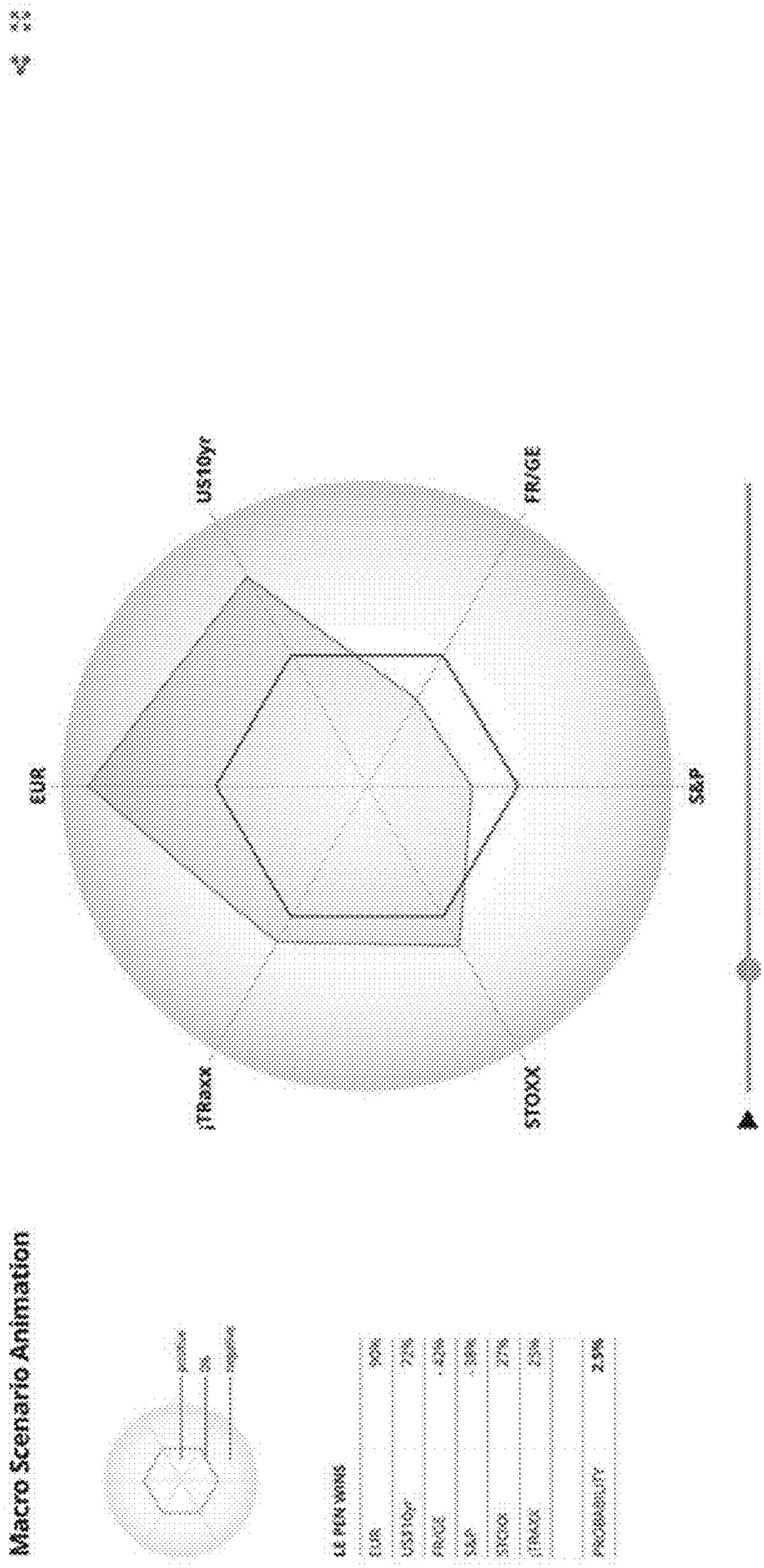
FIG. 68 illustrates an interface with graphical representations according to some embodiments.

FIG. 68 illustrates an interface with graphical representations according to some embodiments. The example interface indicates further visual representations for macro scenario animation for different events or outcomes.

Figure 69:
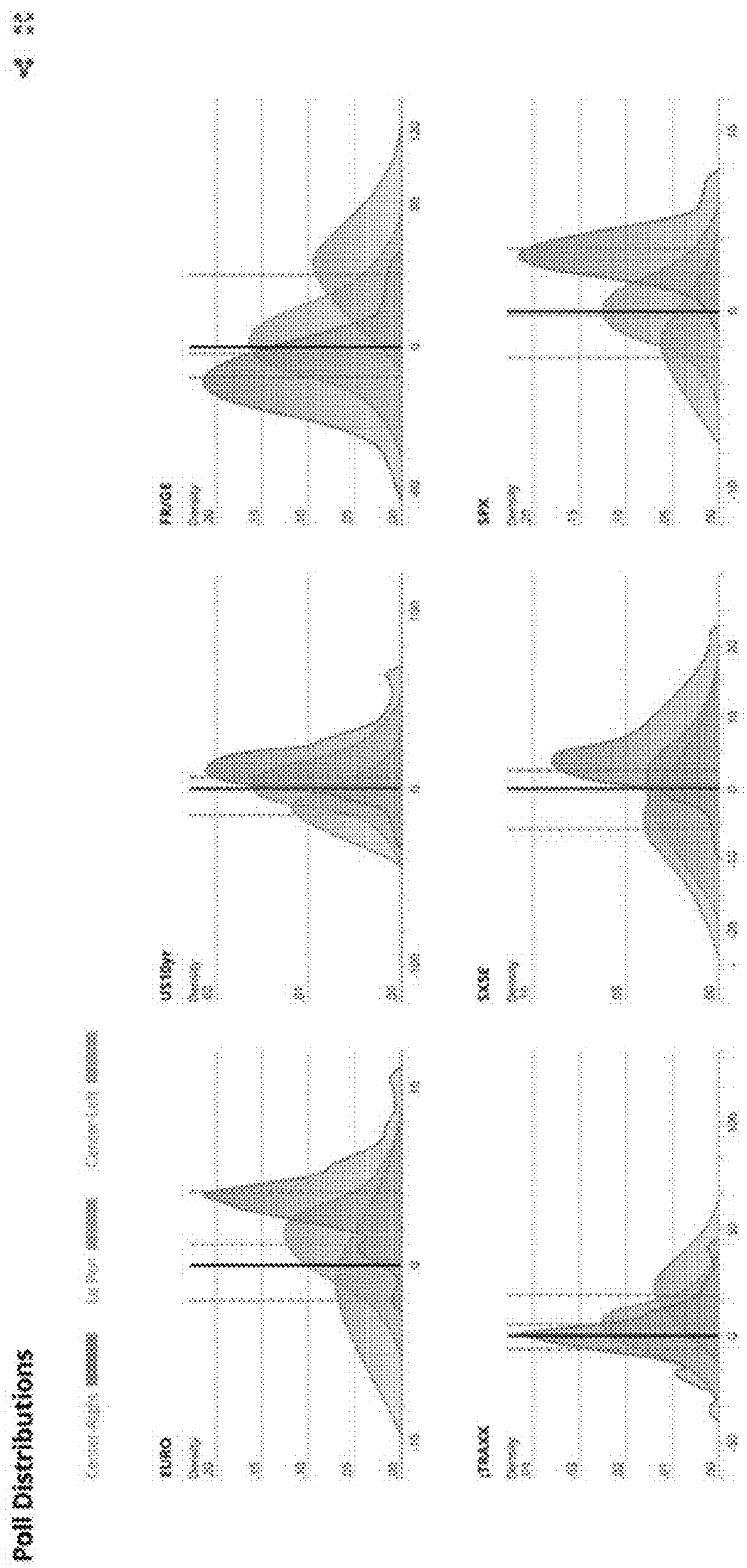
FIG. 69 illustrates an interface with graphs of poll distributions according to some embodiments.

FIG. 69 illustrates an interface with graphs of poll distributions according to some embodiments. The example interface indicates visual representations for poll distribution across different macro factors. The charts are selectable for drill down and in response the interface updates to display more information.

Figure 70:
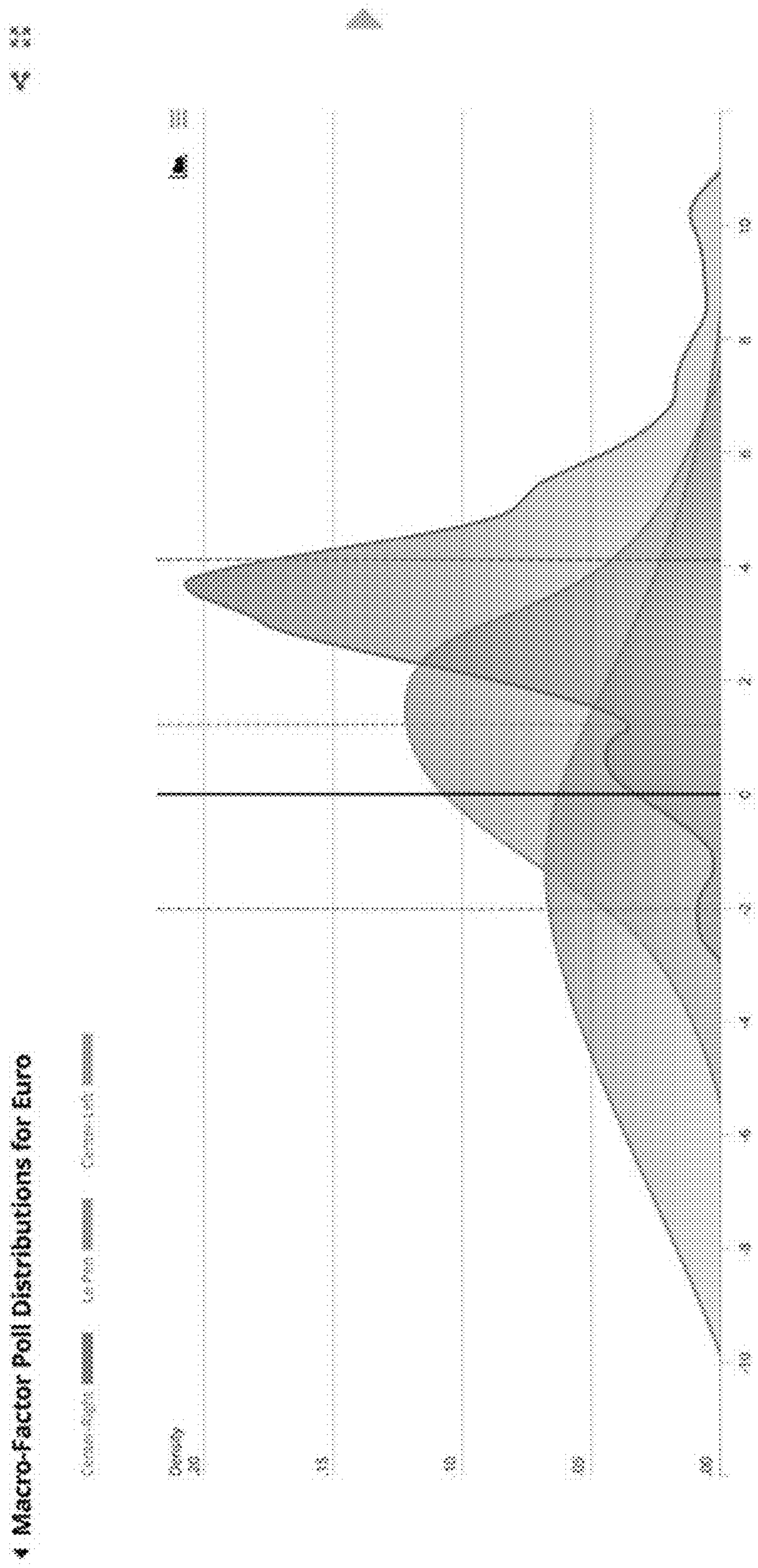
FIG. 70 illustrates an interface with a graph of poll distributions according to some embodiments.

FIG. 70 illustrates an interface with a graph of poll distributions according to some embodiments. The example interface indicates visual representations for macro factor drill down for Euro as an example.

Figure 71:
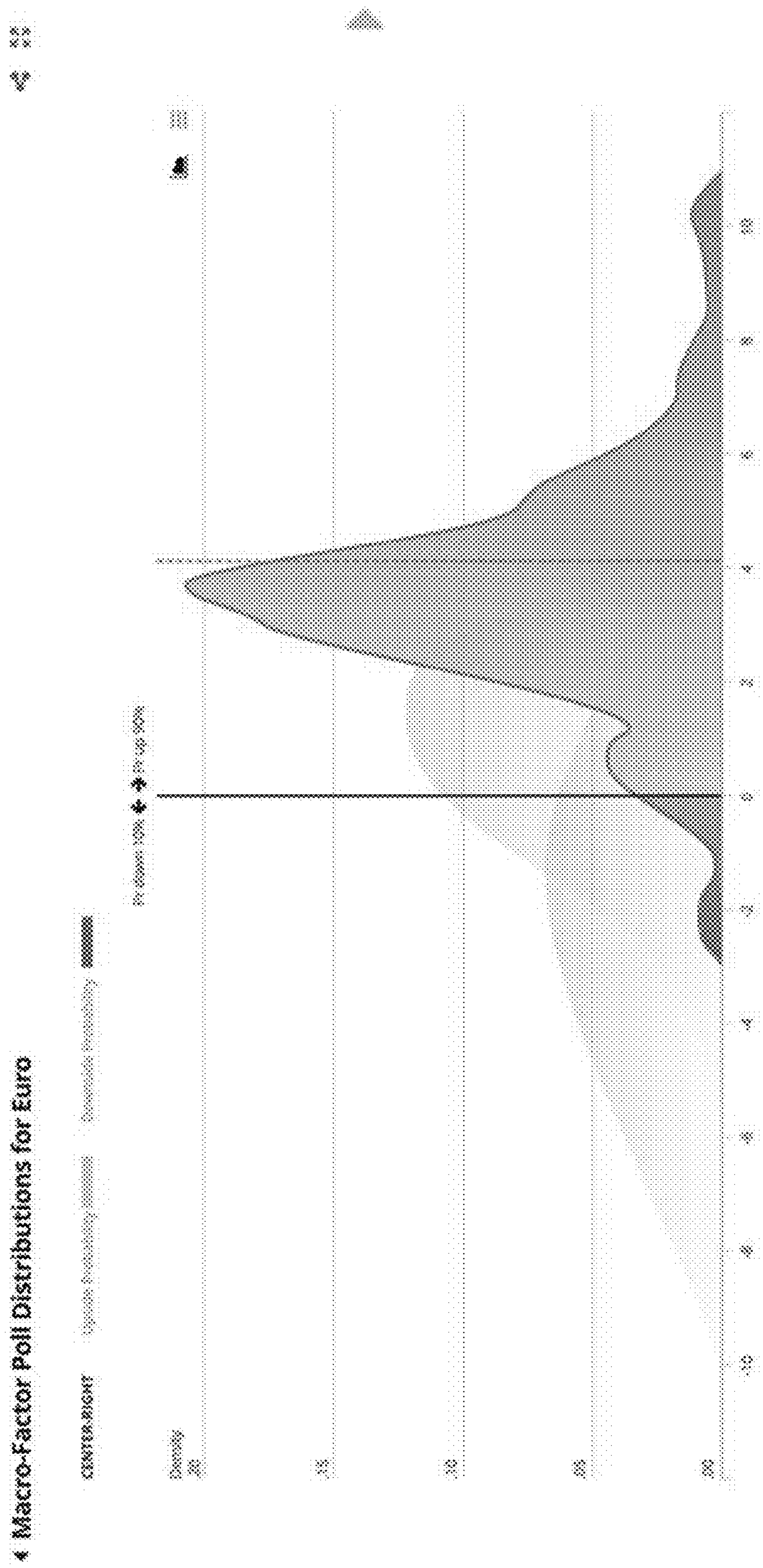
FIG. 71 illustrates an interface with a graph of poll distributions according to some embodiments.

FIG. 71 illustrates an interface with a graph of poll distributions according to some embodiments. The example interface indicates visual representations for the Euro macro factor drill down. The Pr line is selectable to dynamically update the interface.

FIG. 72 illustrates an interface with a table of poll distributions according to some embodiments. The example interface indicates visual representations for macro factor poll distributions for Euro.

Figure 73:
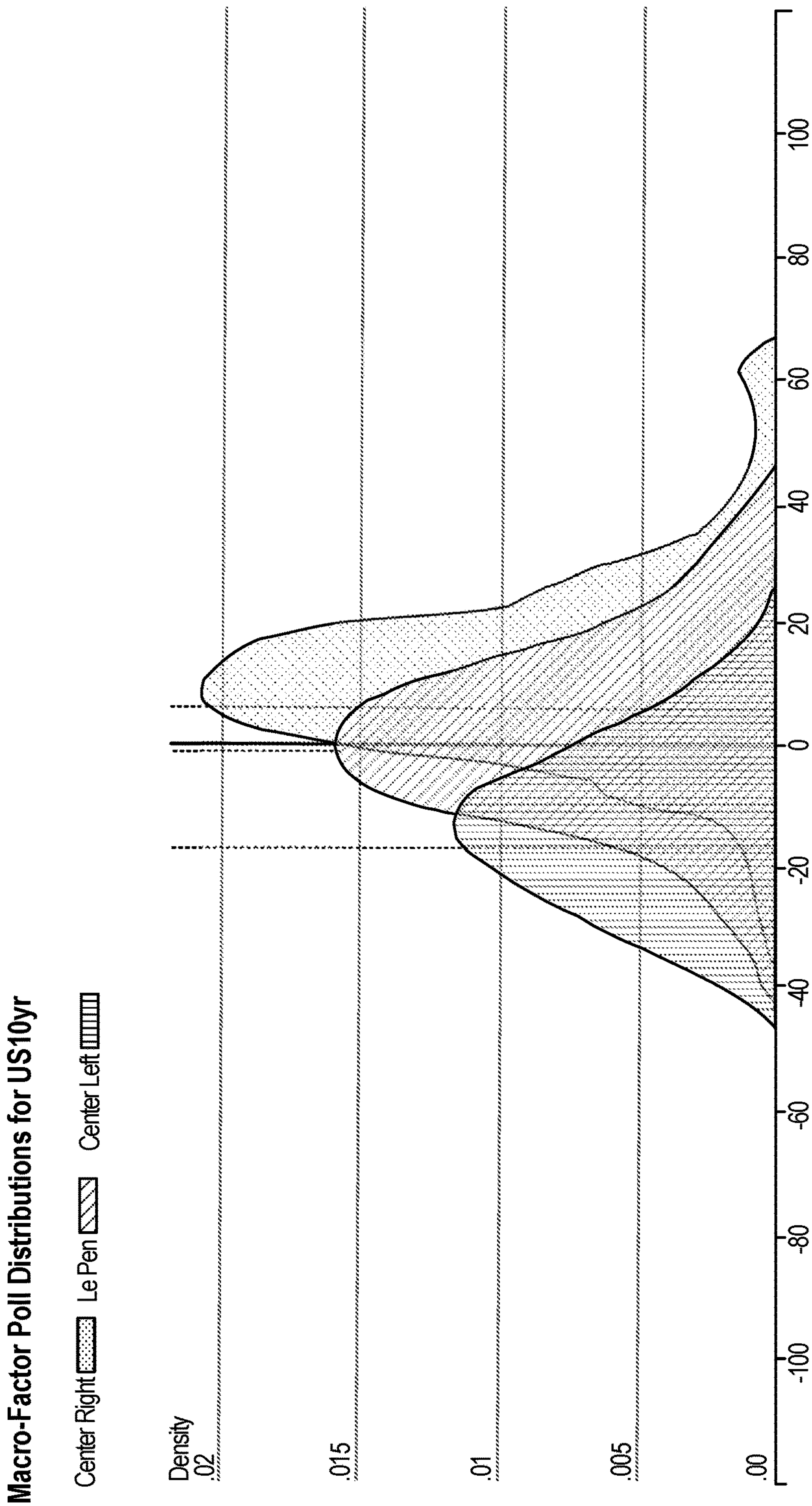
FIG. 73 illustrates an interface with a graph of poll distributions according to some embodiments.

FIG. 73 illustrates an interface with a graph of poll distributions according to some embodiments. The example interface indicates visual representations for macro factor poll distributions for U.S. 10 yr.

Figure 74:
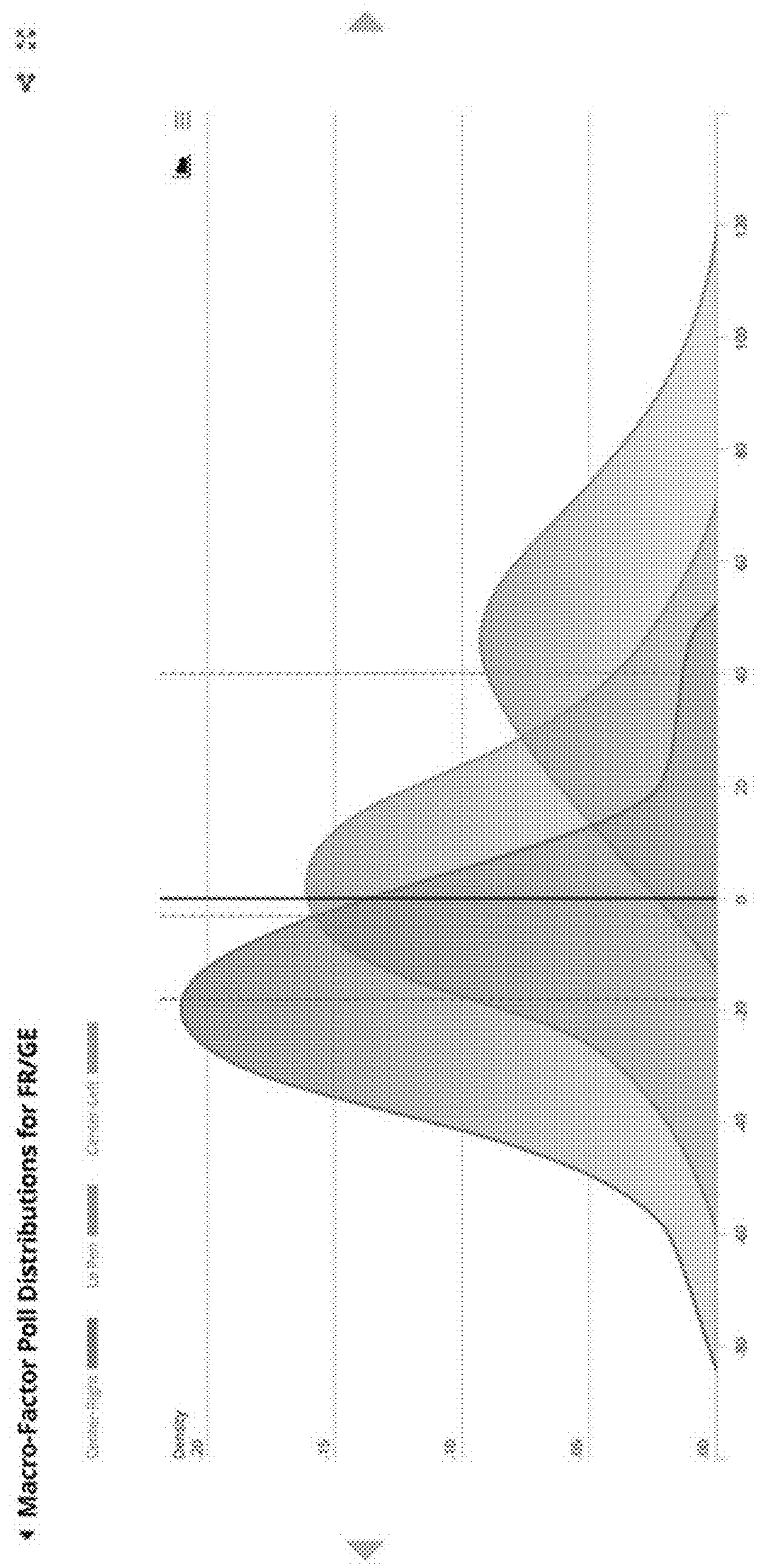
FIG. 74 illustrates an interface with a graph of poll distributions according to some embodiments.

FIG. 74 illustrates an interface with a graph of poll distributions according to some embodiments. The example interface indicates visual representations for macro factor poll distributions for FR/GE.

Figure 75:
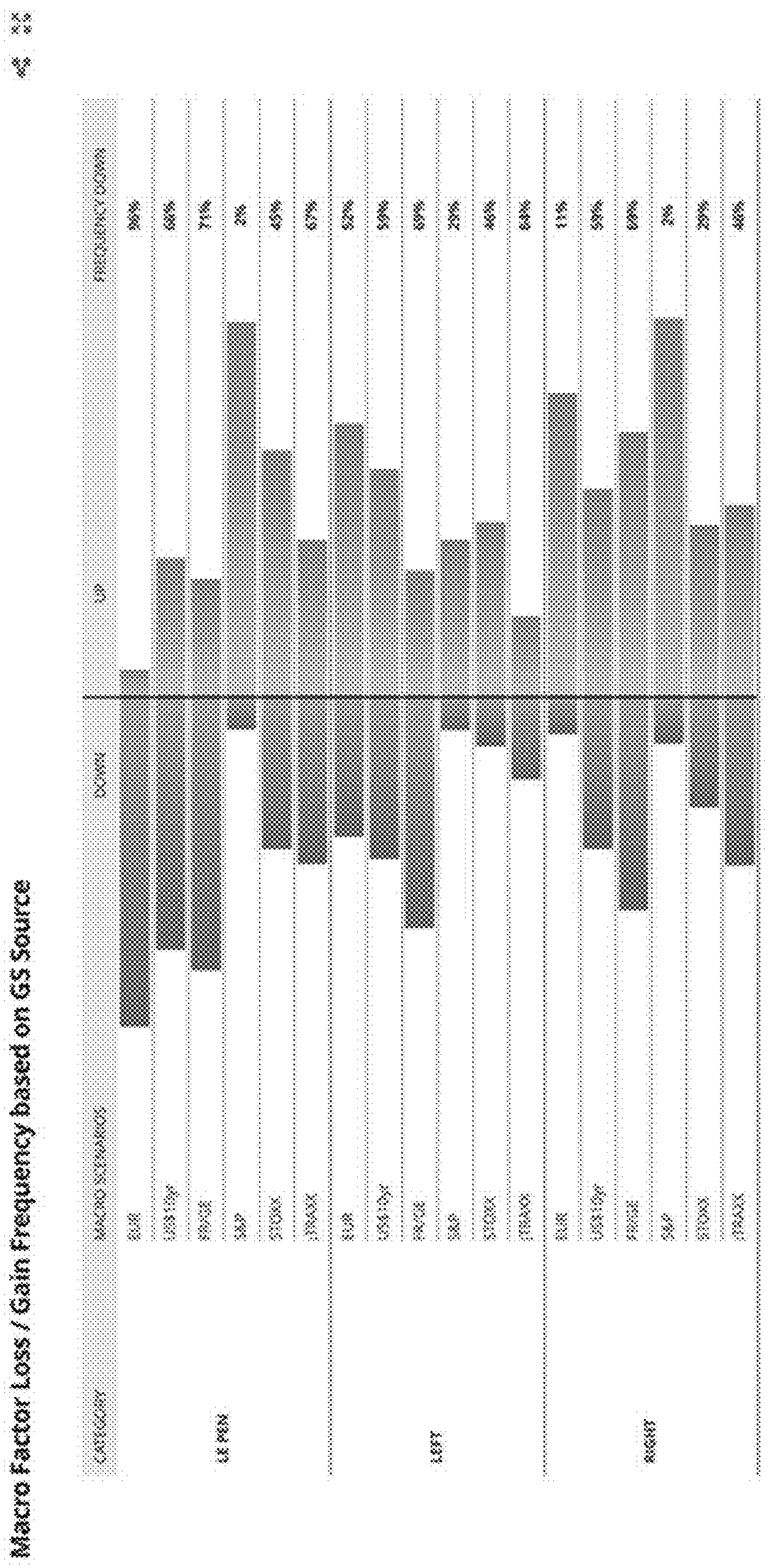
FIG. 75 illustrates an interface with a graph of loss and gain frequencies according to some embodiments.

FIG. 75 illustrates an interface with a graph of loss and gain frequencies according to some embodiments. The example interface indicates visual representations for macro factor loss or gain frequency based on source.

Figure 76:
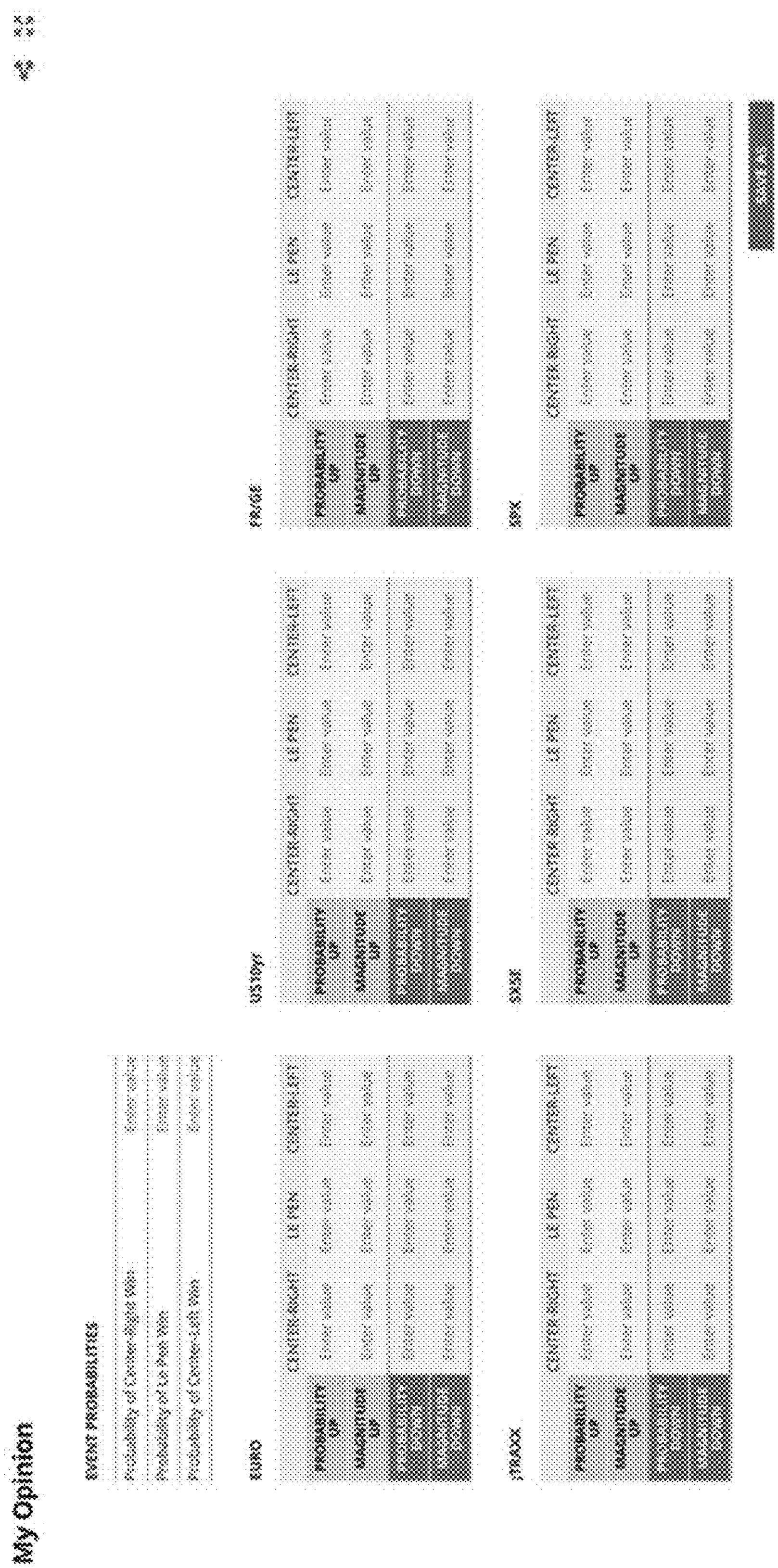
FIG. 76 illustrates an interface with a table of event probabilities according to some embodiments.

FIG. 76 illustrates an interface with a table of event probabilities according to some embodiments. The example interface indicates visual representations for event or outcome probabilities, along with macro factor drill down poll distributions.

Figure 77:
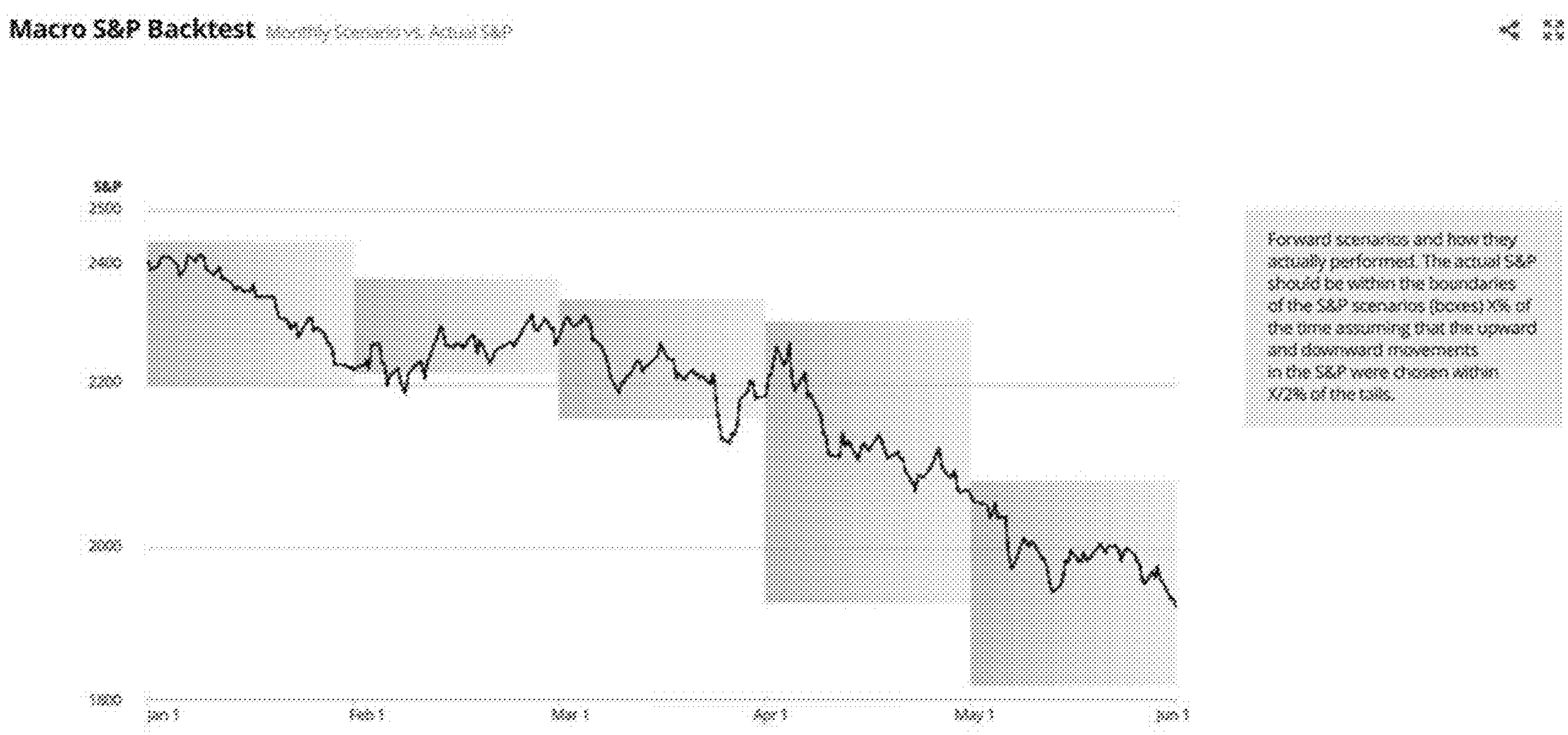
FIG. 77 illustrates an interface with a graph of backtests according to some embodiments.

FIG. 77 illustrates an interface with a graph of backtests according to some embodiments. The example interface indicates visual representations for macro factor S&P backtest. The interface enables selection of a macro variable filter to change the backtest.

Figure 78:
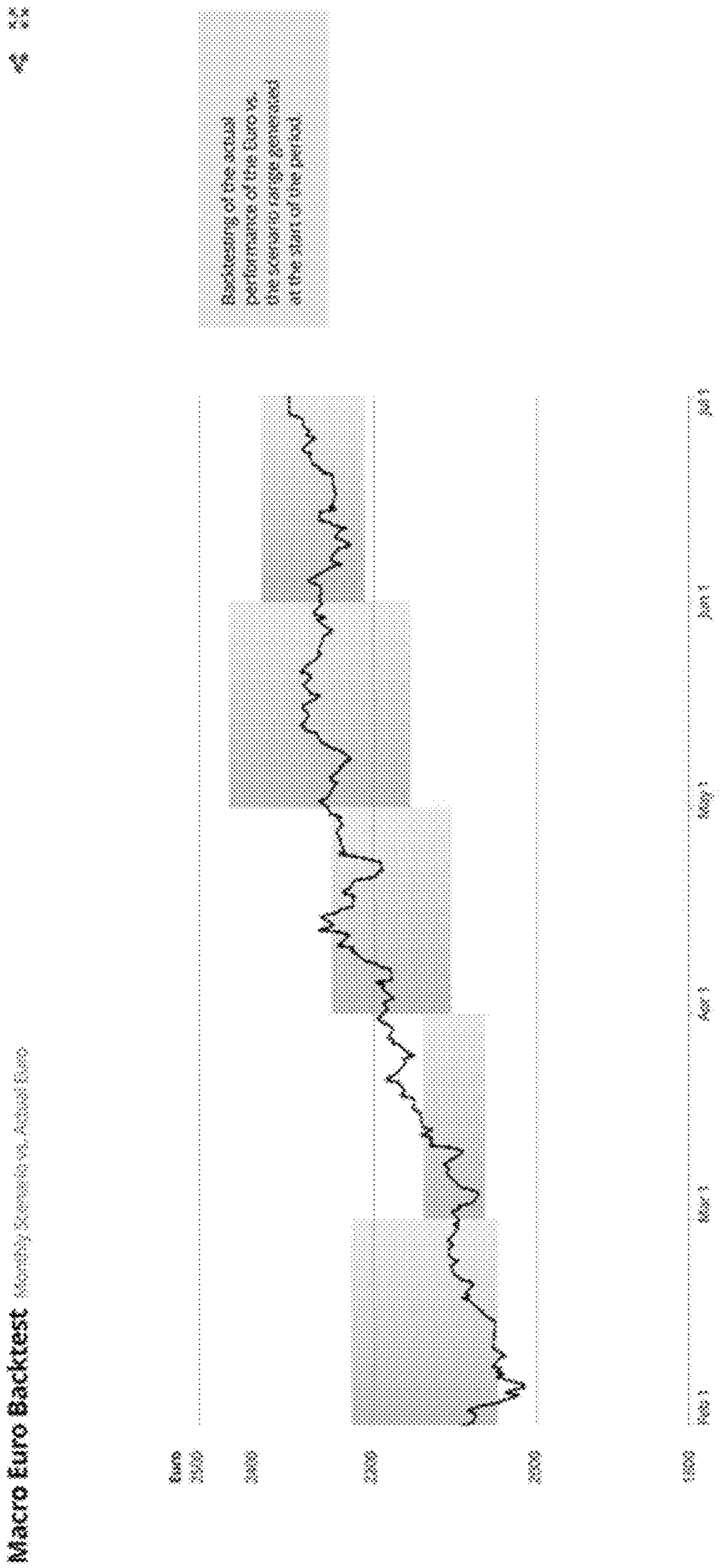
FIG. 78 illustrates an interface with a graph of backtests according to some embodiments.

FIG. 78 illustrates an interface with a graph of backtests according to some embodiments. The example interface indicates visual representations for macro factor backtest for the Euro, as an example.

The following section describes potential applications that may be practiced in regards to some embodiments. There may be other, different, modifications, etc. of the below potential applications, and it should be understood that the description is provided as non-limiting, illustrative examples only. For example, there may be additions, omissions, modifications, and other applications may be considered.

The embodiments of the devices, systems and methods described herein are implemented in a combination of both hardware and software.

These embodiments are implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components.

Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for dynamically generating data structures representing scenarios for an event linked to a plurality of macro factors and a plurality of outcomes, the method comprising:

receiving responses to a set of poll questions, each poll question linked to a macro factor of the plurality of macro factors;

generating a graph data storage structure representing scenarios for the plurality of macro factors and the plurality of outcomes, each node in the graph data storage structure including a descriptor and a data value, the graph data storage structure including a root node, outcome nodes connected to the root node, and macro factor nodes connected to the outcome nodes, the root node corresponding to the event, each outcome node corresponding to one of the plurality of outcomes, and each macro factor node corresponding to one of the macro factors and including a data value;

filtering the responses for bias based on sentiment factors;

applying a set of rules to the filtered responses to generate values for the macro factors;

populating the macro factor nodes in the graph data storage structure with the data values for the corresponding macro factors to generate scenarios for the outcome nodes; and providing for display a user interface including visual elements indicating the scenarios and a distribution of responses, wherein each scenario is a path from the root node to a leaf node of the generated graph data storage structure.

2. The method of claim 1, wherein the responses to the poll questions were generated by:

processing a plurality of data feeds by applying a second set of rules;

generating a plurality of events defined by the second set of rules based on the processing;

selecting the event from the plurality of events;

generating a set of macro factors by applying a third set of rules to the event;

applying a fourth set of rules to identify the plurality of macro factors from among the set of macro factors and generate the set of poll questions; and providing for display a user interface with visual elements for the poll questions linked to macro factors and one or more controls for inputting responses to the poll questions.

3. The method of claim 2, wherein each macro factor is associated with a range of acceptable data values as responses for the macro factor, and the user interface with visual elements for the poll questions further includes an indication of the range of acceptable data values acceptable for each macro factor.

4. The method of claim 2, wherein the user interface including visual elements indicating the scenarios and the user interface with visual elements for the poll questions are parts of a single user interface.

5. The method of claim 1, further comprising generating the set of macro factors by applying rules to the event, the rules generated, at least in part, using at least one of:
deep learning on historical data, and
regression on historical data.

6. The method of claim 1, wherein the data values for the macro factor nodes include a probability for increasing or decreasing in value.

7. The method of claim 1, wherein each outcome node of the graph data storage structure defines a subtree of $2^n$ paths of macro factor nodes, each path corresponding to a scenario, n being a number of macro factors in the subset of macro factors.

8. The method of claim 1, wherein a scenario is defined by a path from the root node to a leaf node of a tree data storage structure along edges between nodes, each edge being associated with a probability of traversing the edge, and the scenario having a scenario probability derived using the probabilities associated with the edges traversed by the path.

9. The method of claim 1, further comprising generating the ranges of acceptable responses for the macro factors using a scale with a middle point representing no change, a portion representing upward change to an extreme, and another portion representing downward change to another extreme.

10. The method of claim 1, further comprising processing the responses to generate a probability distribution for each macro factor, each probability distribution including $p^u(F_i)$, a probability of an upward movement in macro factor i over a time horizon.

11. The method of claim 1, further comprising processing the responses to generate a probability distribution for each macro factor, each probability distribution including, $p^d(F_i)$, a probability of a downward movement in an $i^{th}$ macro factor over a time horizon, wherein i is an iterator identifying a particular macro factor.

12. The method of claim 1, wherein each macro factor is associated with a range of acceptable data values as responses for the macro factor, the method further comprising processing the ranges of acceptable data values to obtain, for each macro factor, at least one of: a range of possible upside moves for an $i^{th}$ macro factor ($r^u(F_i)$) or a range of possible downside moves for the $i^{th}$ macro factor ($r^d(F_i)$), wherein i is an iterator identifying a particular macro factor.

13. A non-transitory machine-readable medium storing instructions that, when executed, cause one or more processors to perform operations comprising:
receiving responses to a set of poll questions, each poll question linked to a macro factor of the plurality of macro factors, wherein the responses to the poll questions were generated by:
processing a plurality of data feeds by applying a first set of rules;
generating a plurality of events defined by the second set of rules based on the processing;
selecting the event from the plurality of events;
generating a set of macro factors by applying a second set of rules to the event;
applying a third set of rules to identify the plurality of macro factors from among the set of macro factors and generate the set of poll questions; and
providing for display a user interface with visual elements for the poll questions linked to macro factors and one or more controls for inputting responses to the poll questions;
generating a graph data storage structure representing scenarios for the plurality of macro factors and the plurality of outcomes, each node in the graph data storage structure including a descriptor and a data value, the graph data storage structure including a root node, outcome nodes connected to the root node, and macro factor nodes connected to the outcome nodes, the root node corresponding to the event, each outcome node corresponding to one of the plurality of outcomes, and each macro factor node corresponding to one of the macro factors and including a data value;
applying a fourth set of rules to at least some of the responses to generate values for the macro factors;
populating the macro factor nodes in the graph data storage structure with the data values for the corresponding macro factors to generate scenarios for the outcome nodes; and
providing for display a user interface including visual elements indicating the scenarios and a distribution of responses, wherein each scenario is a path from the root node to a leaf node of the generated graph data storage structure.

14. The non-transitory machine-readable medium of claim 13, the operations further comprising:
filtering the responses for bias based on sentiment factors, wherein the fourth set of rules are applied to the filtered responses.

15. The non-transitory machine-readable medium of claim 14, wherein each macro factor is associated with a range of acceptable data values as responses for the macro factor, and the user interface with visual elements for the poll questions further includes an indication of the range of acceptable data values acceptable for each macro factor.

16. The non-transitory machine-readable medium of claim 13, wherein the second set of rules are generated, at least in part, using at least one of:
deep learning on historical data; and
regression on historical data.

17. The non-transitory machine-readable medium of claim 13, wherein each outcome node of the graph data storage structure defines a subtree of $2^n$ paths of macro factor nodes, each path corresponding to a scenario, n being a number of macro factors in the subset of macro factors.

18. The non-transitory machine-readable medium of claim 13, wherein the operations further comprise generating the ranges of acceptable responses for the macro factors using a scale with a middle point representing no change, a portion representing upward change to an extreme, and another portion representing downward change to another extreme.

19. The non-transitory machine-readable medium of claim 13, wherein the operations further comprise processing the responses to generate a probability distribution for each macro factor, each probability distribution including at least one of: $p^u(F_i)$, a probability of an upward movement in macro factor i over a time horizon, or $p^d(F_i)$, a probability of a downward movement in an ith macro factor over a time horizon.

20. A system for generating scenarios and user interface elements representing valuations of instruments under the scenarios, the system comprising:

at least one processor; and a machine-readable medium storing instructions that, when executed, cause the at least one processor to perform operations including:

receiving responses to a set of poll questions, each poll question linked to a macro factor of the plurality of macro factors, wherein the responses to the poll questions were generated by:

processing a plurality of data feeds by applying a first set of rules;

generating a plurality of events defined by the second set of rules based on the processing;

selecting the event from the plurality of events;

generating a set of macro factors by applying a second set of rules to the event;

applying a third set of rules to identify the plurality of macro factors from among the set of macro factors and generate the set of poll questions; and providing for display a user interface with visual elements for the poll questions linked to macro factors and one or more controls for inputting responses to the poll questions;

generating a graph data storage structure representing scenarios for the plurality of macro factors and the plurality of outcomes, each node in the graph data storage structure including a descriptor and a data value, the graph data storage structure including a root node, outcome nodes connected to the root node, and macro factor nodes connected to the outcome nodes, the root node corresponding to the event, each outcome node corresponding to one of the plurality of outcomes, and each macro factor node corresponding to one of the macro factors and including a data value;

filtering the responses for bias based on sentiment factors, the filtering including:

applying natural language processing to at least a subset of the responses to identify sentiments of authors of the responses; and eliminating responses from authors for whom the identified sentiment indicates bias with regard to the event;

applying a set of rules to the filtered responses to generate values for the macro factors;

populating the macro factor nodes in the graph data storage structure with the data values for the corresponding macro factors to generate scenarios for the outcome nodes; and providing for display a user interface including visual elements indicating the scenarios and a distribution of responses, wherein each scenario is a path from the root node to a leaf node of the generated graph data storage structure.

* * * * *